US012735327B2

United States Patent
Regna et al.

(10) Patent No.: US 12,735,327 B2
(45) Date of Patent: Sep. 15, 2026

(54) COPPER-64 COMPOSITIONS AND PURIFICATION PROCESSES FOR THE PREPARATION OF NOVEL COPPER-64 COMPOSITIONS

(71) Applicant: Curium US LLC, St. Louis, MO (US)

(72) Inventors: Brian Regna, St. Louis, MO (US); Lars Lindskog, St. Louis, MO (US); Allan Casciola, St. Louis, MO (US); Jeffrey Randick, St. Louis, MO (US)

(73) Assignee: Curium US LLC, St. Louis, MO (US)

( * ) Notice: Subject to any disclaimer, the term of this patent is extended or adjusted under 35 U.S.C. 154(b) by 0 days.

(21) Appl. No.: 19/242,810

(22) Filed: Jun. 18, 2025

(65) Prior Publication Data

US 2025/0368528 A1 Dec. 4, 2025

Related U.S. Application Data

(63) Continuation-in-part of application No. 18/745,888, filed on Jun. 17, 2024.

(Continued)

(51) Int. Cl.

*C01G 3/05* (2006.01)
*B01D 15/18* (2006.01)

(Continued)

(52) U.S. Cl.

CPC ........... *C01G 3/05* (2013.01); *B01D 15/1894* (2025.01); *B01D 15/363* (2013.01);

(Continued)

(58) Field of Classification Search

None

See application file for complete search history.

(56) References Cited

U.S. PATENT DOCUMENTS 5,619,545 A 4/1997 Grummon et al.
6,011,825 A 1/2000 Welch et al.

(Continued)

FOREIGN PATENT DOCUMENTS

CN 1522448 A 8/2004
CN 111133842 A 5/2020

(Continued)

OTHER PUBLICATIONS

Alliot C., et al., "One Step Purification Process for No-Carrier-Added 64Cu Produced Using Enriched Nickel Target," Radiochimica Acta, 2011, vol. 99, pp. 627-630.

(Continued)

*Primary Examiner* — Daniel Berns
(74) *Attorney, Agent, or Firm* — Polsinelli PC

(57) ABSTRACT

The present invention relates to novel compositions comprising high levels of copper-64 (e.g., high radionuclidic purity, high activity, and/or high specific activity), and processes for preparing said compositions. The compositions may comprise from about 2 Ci to about 120 Ci, about 15 Ci to about 120 Ci, about 20 Ci to about 120 Ci, about 30 Ci to about 120 Ci, about 40 Ci to about 110 Ci, or about 50 Ci to about 120 Ci of isolated copper-64 and/or have specific activities of about 10 mCi to about 3850 mCi copper-64 per microgram of copper. The processes for preparing said compositions may comprise bombarding a nickel-64 target with a low-medium energy, high current proton beam, and purifying the copper-64 from other metals by a process comprising ion exchange chromatography and/or a process comprising a combination of extraction chromatography and ion exchange chromatography.

16 Claims, 16 Drawing Sheets

Related U.S. Application Data

(60) Provisional application No. 63/815,197, filed on May 30, 2025, provisional application No. 63/783,024, filed on Apr. 3, 2025, provisional application No. 63/772,248, filed on Mar. 14, 2025, provisional application No. 63/733,863, filed on Dec. 13, 2024, provisional application No. 63/654,673, filed on May 31, 2024, provisional application No. 63/521,580, filed on Jun. 16, 2023.

(51) Int. Cl.
*B01D 15/36* (2006.01)
*G21G 1/00* (2006.01)

(52) U.S. Cl.
CPC ...... *C01P 2006/80* (2013.01); *C01P 2006/88* (2013.01); *G21G 2001/0094* (2013.01)

(56) References Cited

U.S. PATENT DOCUMENTS

| | | | |
|---|---|---|---|
| 8,647,595 | B2 | 2/2014 | Watanabe et al. |
| 11,521,762 | B2 | 12/2022 | Pipes et al. |
| 11,581,103 | B2 | 2/2023 | Pipes et al. |
| 11,798,701 | B2 | 10/2023 | Pipes et al. |
| 11,972,874 | B2 | 4/2024 | Pipes et al. |
| 11,978,569 | B2 | 5/2024 | Pipes et al. |
| 2006/0004491 | A1 | 1/2006 | Welch et al. |
| 2022/0064015 | A1* | 3/2022 | Pipes ..................... G21G 1/001 |
| 2022/0118120 | A1 | 4/2022 | Wurzer et al. |
| 2023/0165979 | A1 | 6/2023 | Babich et al. |
| 2023/0402199 | A1 | 12/2023 | Pipes et al. |
| 2023/0420152 | A1 | 12/2023 | Pipes et al. |
| 2024/0024519 | A1 | 1/2024 | Donovan et al. |
| 2024/0331889 | A1 | 10/2024 | Pipes et al. |
| 2024/0339235 | A1 | 10/2024 | Regna et al. |

FOREIGN PATENT DOCUMENTS

| | | | | |
|---|---|---|---|---|
| JP | 2007512118 | A | 5/2007 | |
| JP | 2013113821 | A | 6/2013 | |
| JP | 5880931 | B2 | 3/2016 | |
| KR | 20100085727 | A | 7/2010 | |
| KR | 101041180 | B1 | 6/2011 | |
| KR | 101041181 | B1 | 6/2011 | |
| KR | 20230066382 | A * | 5/2023 | ......... A61K 51/0472 |
| TW | 201141791 | A | 12/2011 | |
| WO | 2019203342 | A1 | 10/2019 | |

OTHER PUBLICATIONS

Anderson C. J., et al., “Production and Applications of Copper-64 Radiopharmaceuticals,” Methods in Enzymology, 2004, vol. 386, pp. 237-261.
Anderson C. J., et al., “The In Vivo Behavior of Copper-64-Labeled Azamacrocyclic Complexes,” Nuclear Medicine Biology, 1998, vol. 25, pp. 523-530.
Avila-Rodriguez M. A., et al., “Simultaneous Production of High Specific Activity 64Cu and 61Co with 11.4 MeV Protons on Enriched 64Ni Nuclei,” Applied Radiation and Isotopes, 2007, vol. 65, pp. 1115-1120.
Braccini S., et al., “Science with a Medical PET Cyclotron,” CERN Courier, Apr. 2016, pp. 21-22.
Burke P., et al., “An Automated Method for Regular Productions of Copper-64 for PET Radiopharmaceuticals,” Inorganica Chimica Acta, 2010, vol. 363, No. 6, pp. 1316-1319.
Chakarvarty R., et al., “A Simple and Robust Method for Radiochemical Separation of No. Carrier-Added 64Cu Produced in a Research Reactor for Radiopharmaceutical Preparation,” Applied Radiation and Isotopes, Nov. 2020, vol. 165, 7 pages.
Corrected Notice of Allowance for U.S. Appl. No. 18/238,951, dated Aug. 1, 2024, 2 pages.
Corrected Notice of Allowance for U.S. Appl. No. 18/745,906, dated Dec. 27, 2024, 2 pages.
Extended European Search Report for European Application No. 21865183.4 dated Nov. 21, 2024, 13 Pages.
Fan X., et al., “A simple and selective method for the separation of Cu radioisotopes from Nickel,” Nuclear Medicine and Biology, 2006, vol. 33, pp. 939-944.
Final Office Action for U.S. Appl. No. 17/466,443 dated May 24, 2022, 15 pages.
Final Office Action for U.S. Appl. No. 18/745,896 dated Jan. 8, 2025, 13 Pages.
Final Office Action for U.S. Appl. No. 18/238,972, dated Apr. 9, 2024, 8 pages.
Final Office Action for U.S. Appl. No. 18/733,537, dated Dec. 26, 2024, 13 pages.
Final Office Action for U.S. Appl. No. 18/733,537, dated Jan. 21, 2025, 15 pages.
Gaehle G., et al., “Reproducible High Yielding Cu-64 Radioisotope Manufacturing,” Washington University Office of Technology Management, Oct. 2019, 3 pages.
Ikotun O. F., et al., “The Rise of Metal Radionuclides in Medical Imaging: Copper-64, Zirconium-89 and Yttrium-86,” Future Medicine Chemistry, 2011, vol. 3, No. 5, pp. 599-621, [doi:10.4155/fmc.11.14].
International Search Report and Written Opinion for PCT Application No. PCT/US2024/060406, dated Apr. 2, 2025, 20 pages.
International Search Report and Written Opinion for PCT/US2021/049039 dated Jan. 21, 2022, 12 pages.
Jeffery C. M., et al., “Routine Production of Copper-64 Using 11.7 MeV Protons,” AIP Conference Proceedings, 2012, vol. 1509, pp. 84-90.
Kraus K. A., et al., “Proceedings of the International Conference on the Peaceful Uses of Atomic Energy,” United Nations Publication, 1956, vol. 7, 15 pages.
Kume M., et al., “A Semi-Automated System for the Routine Production of Copper-64,” Applied Radiation and Isotopes, Aug. 2012, vol. 70, No. 1, pp. 1803-1806.
Matarrese M., et al., “Automated Production of Copper Radioisotopes and Preparation of High Specific Activity [64Cu]Cu-ATSM for PET Studies,” Applied Radiation and Isotopes, 2010, vol. 68, No. 1, pp. 5-13.
McCarthy D. W., et al., “Efficient Production of High Specific Activity 64Cu Using a Biomedical Cyclotron,” Nuclear Medicine Biology, 1987, vol. 24, pp. 35-43.
Mikolajczak R., et al., “Radiometals for Imaging and Theranostics, Current Production, and Future Perspectives,” Journal of Labelled Compounds and Radiopharmaceuticals, 2019, vol. 62, pp. 615-634.
Non-Final Office Action for U.S. Appl. No. 18/238,951 dated Feb. 23, 2024, 25 pages.
Non-Final Office Action for U.S. Appl. No. 18/745,896 dated Sep. 5, 2024, 15 Pages.
Non-Final Office Action for U.S. Appl. No. 17/466,443, dated Mar. 29, 2022, 28 pages.
Non-Final Office Action for U.S. Appl. No. 17/993,186, dated Apr. 27, 2023, 25 pages.
Non-Final Office Action for U.S. Appl. No. 18/213,194, dated Nov. 9, 2023, 27 pages.
Non-Final Office Action for U.S. Appl. No. 18/238,966 dated Dec. 6, 2023, 33 pages.
Non-Final Office Action for U.S. Appl. No. 18/238,972, dated Dec. 14, 2023, 13 pages.
Non-Final Office Action for U.S. Appl. No. 18/238,972, dated May 16, 2024, 24 pages.
Non-Final Office Action for U.S. Appl. No. 18/733,537 dated Aug. 22, 2024, 15 pages.
Notice of Allowance for U.S. Appl. No. 17/894,874 dated Nov. 9, 2022, 29 pages.
Notice of Allowance for U.S. Appl. No. 18/745,896 dated Mar. 26, 2025, 9 Pages.
Notice of Allowance for U.S. Appl. No. 17/993,186 dated Aug. 24, 2023, 16 pages.
Notice of Allowance for U.S. Appl. No. 18/213,194, dated Mar. 13, 2024, 33 pages.

(56) References Cited

OTHER PUBLICATIONS

Notice of Allowance for U.S. Appl. No. 18/238,951, dated Sep. 25, 2024, 2 pages.
Notice of Allowance for U.S. Appl. No. 18/238,966 dated Mar. 27, 2024, 9 pages.
Notice of Allowance for U.S. Appl. No. 18/745,906, dated Oct. 17, 2024, 10 pages.
Notice of Allowance in related U.S. Appl. No. 17/466,443 dated Aug. 31, 2022, 10 pages.
Notice of Allowance in related U.S. Appl. No. 18/238,951 dated Jul. 17, 2024, 10 pages.
Obata A., et al., "Production of Therapeutic Quantities of 64Cu Using a 12 MeV Cyclotron," Nuclear medicine and biology, 2003, vol. 30, No. 5, pp. 535-539, doi: 10-1016/S0969-8051(03)00024-6.
Office Action for Japanese Patent Application No. 2023-514725, mailed Apr. 2, 2025, 7 Pages.
Partial Supplementary Search Report for European Application No. 21865183.4, dated Aug. 9, 2024, 12 pages.
Smith S. V., et al., "Separation of 64Cu from 67Ga Waste Products Using Anion Exchange and Low Acid Aqueous/ Organic Mixtures," Radiochimica Acta, 1996, vol. 75, pp. 65-68.
Szajek L. P., et al., "Semi-Remote Production of [64Cu]CuCI2 and Preparation of High Specific Activity [64Cu]Cu-ATSM for PET Studies," Radiochimica Acta, 2005, vol. 93, pp. 239-244.
Thieme S., et al., "Module-Assisted Preparation of 64 Cu with High Specific Activity," Applied Radiation and Isotopes, Apr. 2012, vol. 70, No. 4, pp. 602-608.
Toyota T., et al., "A purification system for 64Cu produced by a biomedical cyclotron for antibody PET imaging," Journal of Radioanal Nuclear Chemistry, 2013, vol. 298, pp. 295-300.
Xie Q., et al., "Establishing Reliable Cu-64 Production Process: From Target Plating to Molecular Specific Tumor Micro-PET Imaging," Molecules, 2017, vol. 22, No. 641, pp. 10 pages.
Zweit J., et al., "Excitation Functions for Deuteron Induced Reactions in Natural Nickel: Production of No-Carrier-Added 64Cu from Enriched 64Ni Targets for Positron Emission Tomography," International Journal of Radiation Applications and Instrumentation: Part A, 1991, vol. 42, No. 2, pp. 193-197.
Notice of Allowance for U.S. Appl. No. 19/184,830, dated Jul. 15, 2025, 9 pages.
Office Action for Japanese Patent Application No. 2023-514725, mailed Jul. 10, 2025, 3 Pages.
Bokhari T.H., et al., "Production of Low and High Specific Activity 64Cu in a Reactor," Journal of Radioanalytical and Nuclear Chemistry, Mar. 2010, vol. 284, pp. 265-271.
Non-Final Office Action for U.S. Appl. No. 19/030,236, dated Oct. 1, 2025, 14 pages.
International Search Report and Written Opinion for PCT Application No. PCT/US2025/034283, dated Oct. 22, 2025, 29 pages.
Notice of Allowance for U.S. Appl. No. 18/733,537, dated Aug. 19, 2025, 11 pages.
Office Action for European Application No. 21865183.4, mailed May 12, 2026, 28 pages.
Kambali I., "Calculated Radioactivity Yields of Cu-64 from Proton-Bombarded Ni-64 Targets using SRIM Codes," Atom Indonesia, 2014, vol. 40, No. 3, pp. 129-134.
Rayyes A.H., et al., "Cyclotron Produced Radionuclides: Emerging Positron Emitters for Medical Applications: 64Cu and 1241," IAEA Radioisotopes and Radiopharmaceuticals Reports No. 1, Jan. 1, 2016, 80 pages.
Svedjehed J., et al., "Automated, Cassette-based Isolation and Formulation of High-Purity [61Cu]CuCI2 from Solid Ni Targets," EJNMMI Radiopharmacy and Chemistry, Nov. 5, 2020, vol. 5, No. 21, 14 pages.
Non-Final Office Action for U.S. Appl. No. 19/195,850 dated Apr. 16, 2026, 9 pages.
Non-Final Office Action for U.S. Appl. No. 19/242,849 dated May 5, 2026, 11 pages.
Notice of Allowance for U.S. Appl. No. 19/030,236, dated Mar. 31, 2026, 8 pages.
Notice of Allowance for U.S. Appl. No. 19/396,014, dated Apr. 21, 2026, 11 pages.

* cited by examiner

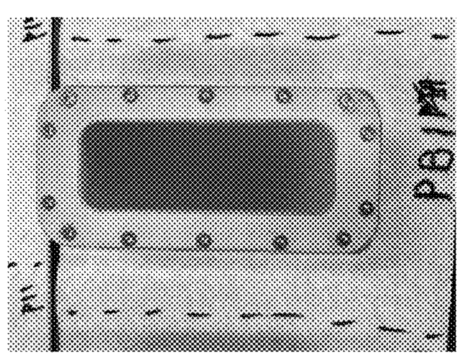
FIG. 5A
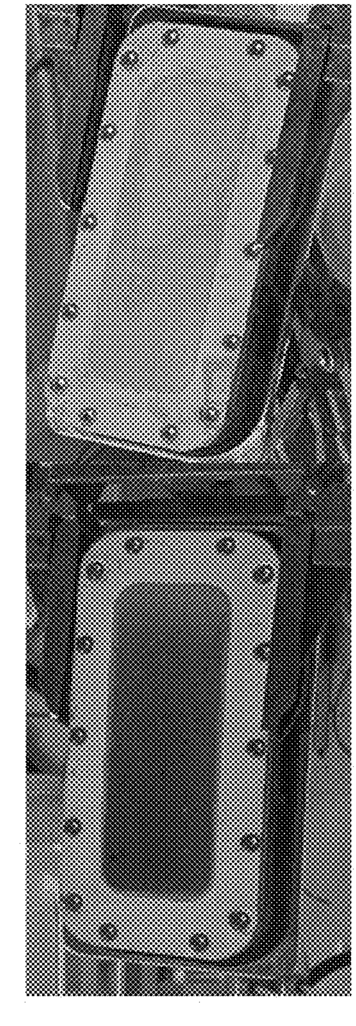
FIG. 5B
FIG. 5C
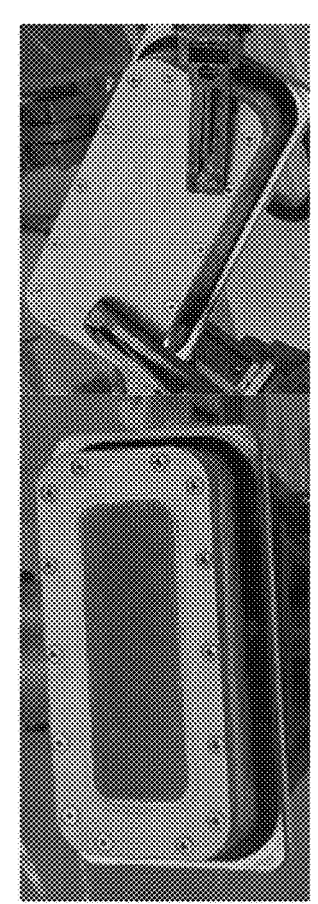
FIG. 5D
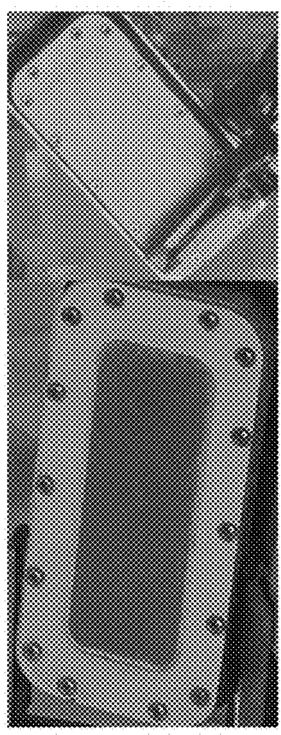
FIG. 5E Stopping Power (MeV/cm)
3,500
3,000
2,500
2,000
1,500
1,000
500
0
0
5
10
15
20
Proton Energy (MeV)
y = 976.07x^-0.552
R² = 0.9506

Stopping Power (MeV/cm)
3,000
2,500
2,000
1,500
1,000
500
0
0
5
10
15
Ion energy (MeV)
y = 925.43x^-0.554
R² = 0.9666

Gold Plate
5°
Nickel Deposit
Proton Beam

Proton Energy (MeV)
14
12
10
8
6
4
2
0
0
10
20
30
40
x_act (μm)
Natural Nickel
Ni-64

Cross Section (mb)
800
700
600
500
400
300
200
100
0
0
5
10
15
20
25
30
Proton Energy (MeV)
Zero
Fit 1
Fit 2
Experimental Data Experimental Data
Theoretical Calculations
Activity at EOB (mCi)
1E+4
1E+3
1E+2
1E+1
1E+0
1E-1
1E-2
1E-3
1E-4
1E-5
Co-55
Co-57
Co-58
Co-61
Ni-57
Cu-60
Cu-61
Cu-62
Cu-64
In-111
V-48
Mn-52
Co-56
Zn-65
Ga-67

Experimental Data
Theoretical Calculations
Activity (mCi)
1E+4
1E+3
1E+2
1E+1
1E+0
1E-1
1E-2
1E-3
1E-4
1E-5
Co-55
Co-57
Co-58
Co-61
Ni-57
Cu-60
Cu-61
Cu-62
Cu-64
In-111
V-48
Mn-52
Co-56
Zn-65
Ga-67
Au-196
Bi-206

Activity at EOB (mCi) (log scale)
1E+4
1E+3
1E+2
1E+1
1E+0
1E-1
1E-2
1E-3
1E-4
1E-5
HPGe Data
Andromeda's Calculations
Co-55
Co-57
Co-58
Co-61
Ni-57
Cu-60
Cu-61
Cu-62
Cu-64
V-48
Mn-52
Co-56
Zn-65
Ga-67
Au-196
Bi-206

Activity at EOB (mCi) (log scale)
1E+4
1E+3
1E+2
1E+1
1E+0
1E-1
1E-2
1E-3
HPGe Data
Andromeda's Calculations
Co-55
Co-57
Co-58
Co-61
Ni-57
Cu-60
Cu-61
Cu-62
Cu-64

Activity at EOB (mCi) (log scale)
1E+5
1E+4
1E+3
1E+2
1E+1
1E+0
1E-1
1E-2
1E-3
1E-4
1E-5
Experimental Data
Theoretical Calculations
Co-55
Co-57
Co-58
Co-61
Ni-57
Cu-60
Cu-61
Cu-62
Cu-64
V-48
Mn-52
Co-56
Zn-65
Ga-67
Au-196
Bi-206

Activity at EOB (mCi)
1.0E+1
1.0E+0
1.0E-1
1.0E-2
1.0E-3
1.0E-4
1.0E-5
1.0E-6
Run 1
Run 2
Run 3
Run 4
In-111
V-48
Mn-52
Co-56
Zn-65
Ga-67
Au-196
Bi-206

COPPER-64 COMPOSITIONS AND PURIFICATION PROCESSES FOR THE PREPARATION OF NOVEL COPPER-64 COMPOSITIONS

CROSS-REFERENCE TO RELATED APPLICATION

This application is a continuation-in-part of U.S. Non-Provisional patent application Ser. No. 18/745,888, filed Jun. 17, 2024, which claims the benefit of U.S. Provisional Application 63/654,673, filed May 31, 2024, and to U.S. Provisional Application No. 63/521,580, filed Jun. 16, 2023, the entire contents of each of which are incorporated by reference herein. This application also claims the priority of U.S. Provisional Application Ser. No. 63/733,863, filed on Dec. 13, 2024, U.S. Provisional Application Ser. No. 63/772,248, filed on Mar. 14, 2025, U.S. Provisional Application Ser. No. 63/783,024, filed on Apr. 3, 2025, and U.S. Provisional Application Ser. No. 63/815,197, filed on May 30, 2025, the disclosures of which are hereby incorporated by reference in their entirety.

FIELD

The present disclosure relates to novel compositions comprising high levels of copper-64 (e.g., high radionuclidic purity, high activity, and/or high specific activity), and processes for preparing said compositions.

BACKGROUND

Diagnostic nuclear medicine primarily uses two imaging techniques-single photon emission tomography (SPECT) and positron emission tomography (PET), often in conjunction with computerized tomography (CT) or magnetic resonance imaging (MRI). Of the two imaging techniques, PET provides higher resolution images and quantitative information. The enhanced capabilities of PET have generated higher demand for radiopharmaceutical agents that are capable of being imaged using this technique, thus necessitating the production of commercial quantities of radioactive precursors capable of PET for routine clinical use.

Common clinically-used PET isotopes include oxygen-15 ($^{15}$O), nitrogen-13 ($^{13}$N), carbon-11 ($^{11}$C), fluorine-18 ($^{18}$F), and gallium-68 ($^{68}$Ga). Each of these isotopes, however, has a relatively short half-life, which necessitates producing them in close proximity to the PET imaging device and incorporating them into imaging agents before excessive radioactive decay or drug product decomposition occurs. A generator system for $^{68}$Ga is available but it can be difficult to obtain and severely limits the number of doses that can be prepared in a day. To address the limitations of the short half-life radionuclides, PET isotopes with relatively longer half-lives have been investigated for development of new diagnostic PET agents.

Copper-64 ($^{64}$Cu) is a 'non-standard isotope' that can be used in diagnostic nuclear medicine. It is a radionuclide with excellent characteristics for PET imaging. Its average positron energy of 278.2 keV provides high resolution images, and its moderate half-life (12.7 h) is suitably long to allow for production, purification, incorporation into a carrier molecule (e.g., peptide, small-molecule, antibody, etc.) and distribution to medical facilities as an end-use product.

For widespread availability of $^{64}$Cu on a commercial scale, large quantities of $^{64}$Cu (i.e., Ci or GBq amounts) must be produced and isolated in a highly pure and chemically useful form (e.g., $^{64}$Cu copper chloride) for use as a radioactive precursor. Preparations of $^{64}$Cu copper chloride have been produced from proton bombardment of isotopically enriched nickel-64 ($^{64}$Ni) targets, and the $^{64}$Cu has been purified using ion exchange chromatography. In references located as of 2020, the highest reported amount of $^{64}$Cu produced was 1.5 Ci, reported at end of bombardment (EOB). While this amount is sufficient for preparing patient doses, when factoring in decay and yield loss during manufacturing (i.e., formulation, sterilization, dispense, quality control, packaging and shipment)—1.5 Ci of $^{64}$Cu at EOB may yield 50 patient doses in a best-case scenario (assuming an average patient dose of 4 mCi, 32 h for manufacturing and shipment and 15% yield loss). The number of theoretical patient doses may be significantly improved by increasing the available quantity of $^{64}$Cu copper chloride precursor. The $^{64}$Cu must be of high chemical and radionuclidic purity.

Specific activity (i.e., activity of $^{64}$Cu per mass of total Cu) of $^{64}$Cu copper chloride is an indicator of its chemical purity and is often expressed in units of mCi/μg or Ci/mmol. In references located as of 2020, the highest reported specific activity of purified $^{64}$Cu copper chloride was 348 mCi/μg Cu. This is sufficient for radiolabeling, but improvements in specific activity may improve the purity and reactivity of a radioactive precursor, thereby decreasing the required amount of carrier molecule necessary in production of a radiolabeled pharmaceutical. This has implications for patient safety and may enhance the diagnostic capability of a radiopharmaceutical. Improvements in specific activity of $^{64}$Cu may be made by increasing the produced quantity of radioactive precursor, limiting the potential for introduction of trace metallic contaminants and creating a robust purification process.

If $^{64}$Cu were widely available, it would enhance the capabilities of existing PET centers and would also allow PET studies to be performed at medical centers that do not have an on-site $^{68}$Ge/$^{68}$Ga generator and/or do not rely on a regional cyclotron. Described herein are methods of making purified $^{64}$Cu having improved chemical and radionuclidic purities and/or a specific activity that is favorable for supplying commercial clinical needs of PET and medical centers.

SUMMARY

Among the various aspects of the present disclosure are compositions comprising high levels of $^{64}$Cu with high purity and high specific activity and processes for preparing said compositions.

One aspect of the present disclosure provides a composition comprising from about 15 Ci $^{64}$Cu or greater at end of bombardment (EOB). The composition is obtained from a single target after one particle accelerator run. The composition may have a specific activity of at least about 15 mCi $^{64}$Cu/μg Cu, at least about 20 mCi $^{64}$Cu/μg Cu, at least about 25 mCi $^{64}$Cu/μg Cu, at least about 30 mCi $^{64}$Cu/μg Cu, at least about 35 mCi $^{64}$Cu/μg Cu, at least about 40 mCi $^{64}$Cu/μg Cu, at least about 45 mCi $^{64}$Cu/μg Cu, at least about 50 mCi $^{64}$Cu/μg Cu, at least about 55 mCi $^{64}$Cu/μg Cu, at least about 60 mCi $^{64}$Cu/μg Cu, at least about 65 mCi $^{64}$Cu/μg Cu, at least about 70 mCi $^{64}$Cu/μg Cu, at least about 75 mCi $^{64}$Cu/μg Cu, at least about 80 mCi $^{64}$Cu/μg Cu, at least about 85 mCi $^{64}$Cu/μg Cu, at least about 90 mCi $^{64}$Cu/μg Cu, at least about 95 mCi $^{64}$Cu/μg Cu, at least about 100 mCi $^{64}$Cu/μg Cu, at least about 105 mCi $^{64}$Cu/μg Cu, at least about 110 mCi $^{64}$Cu/μg Cu, at least about 115 mCi $^{64}$Cu/μg Cu, at least about 120 mCi $^{64}$Cu/μg Cu, at least about 125 mCi $^{64}$Cu/μg Cu, at least about 130 mCi $^{64}$Cu/μg Cu, at least about 135 mCi $^{64}$Cu/μg Cu, at least about 140 mCi $^{64}$Cu/μg Cu, at least about 145 mCi $^{64}$Cu/μg Cu, or at least about 150 mCi $^{64}$Cu/μg Cu. The composition may have a specific activity of up to about 3750 mCi $^{64}$Cu/μg Cu, up to about 3775 mCi $^{64}$Cu/μg Cu, up to about 3800 mCi $^{64}$Cu/μg Cu, up to about 3825 mCi $^{64}$Cu/μg Cu, or up to about 3850 mCi $^{64}$Cu/μg Cu. The composition may have a specific activity at least about 30 mCi $^{64}$Cu/μg Cu up to about 3750 mCi $^{64}$Cu/μg Cu, at least about 30 mCi $^{64}$Cu/μg Cu up to about 3775 mCi $^{64}$Cu/μg, at least about 30 mCi $^{64}$Cu/μg Cu up to about 3850 mCi $^{64}$Cu/μg Cu, at least about 30 mCi $^{64}$Cu/μg Cu up to about 3825 mCi $^{64}$Cu/μg Cu, or at least about 30 mCi $^{64}$Cu/μg Cu up to about 3850 mCi $^{64}$Cu/μg Cu. The composition may have a specific activity of at least about 40 mCi $^{64}$Cu/μg Cu up to about 3750 mCi $^{64}$Cu/μg Cu, at least about 40 mCi $^{64}$Cu/μg Cu up to about 3775 mCi $^{64}$Cu/μg, at least about 40 mCi $^{64}$Cu/μg Cu up to about 3850 mCi $^{64}$Cu/μg Cu, at least about 40 mCi $^{64}$Cu/μg Cu up to about 3825 mCi $^{64}$Cu/μg Cu, or at least about 40 mCi $^{64}$Cu/μg Cu up to about 3850 mCi $^{64}$Cu/μg Cu. The composition may have a specific activity of at least about 50 mCi $^{64}$Cu/μg Cu up to about 3750 mCi $^{64}$Cu/μg Cu, at least about 50 mCi $^{64}$Cu/μg Cu up to about 3775 mCi $^{64}$Cu/μg Cu, at least about 50 mCi $^{64}$Cu/μg Cu up to about 3850 mCi $^{64}$Cu/μg Cu, at least about 50 mCi $^{64}$Cu/μg Cu up to about 3825 mCi $^{64}$Cu/μg Cu, or at least about 50 mCi $^{64}$Cu/μg Cu up to about 3850 mCi $^{64}$Cu/μg Cu. The composition may have a specific activity at least about 75 mCi $^{64}$Cu/μg Cu up to about 3750 mCi $^{64}$Cu/μg Cu, about 3775 mCi $^{64}$Cu/μg Cu about 3850 mCi $^{64}$Cu/μg Cu, about 3825 mCi $^{64}$Cu/μg Cu, or about 3850 mCi $^{64}$Cu/μg Cu. The composition may have a specific activity at least about 100 mCi $^{64}$Cu/μg Cu up to about 3750 mCi $^{64}$Cu/μg Cu, about 3775 mCi $^{64}$Cu/μg Cu about 3850 mCi $^{64}$Cu/μg Cu. The composition may have a specific activity at least about 35 mCi $^{64}$Cu/μg Cu up to about 50 mCi $^{64}$Cu/μg Cu, about 50 mCi $^{64}$Cu/μg Cu up to about 75 mCi $^{64}$Cu/μg Cu, about 75 mCi $^{64}$Cu/μg Cu up to about 100 mCi $^{64}$Cu/μg Cu, about 100 mCi $^{64}$Cu/μg Cu up to about 125 mCi $^{64}$Cu/μg Cu, about 125 mCi $^{64}$Cu/μg Cu up to about 150 mCi $^{64}$Cu/μg Cu, about 150 mCi $^{64}$Cu/μg Cu up to about 175 mCi $^{64}$Cu/μg Cu, about 175 mCi $^{64}$Cu/μg Cu up to about 200 mCi $^{64}$Cu/μg Cu, about 200 mCi $^{64}$Cu/μg Cu up to about 225 mCi $^{64}$Cu/μg Cu, about 225 mCi $^{64}$Cu/μg Cu up to about 250 mCi $^{64}$Cu/μg Cu, about 250 mCi $^{64}$Cu/μg Cu up to about 275 mCi $^{64}$Cu/μg Cu, about 275 mCi $^{64}$Cu/μg Cu up to about 300 mCi $^{64}$Cu/μg Cu, about 300 mCi $^{64}$Cu/μg Cu up to about 325 mCi $^{64}$Cu/μg Cu, about 325 mCi $^{64}$Cu/μg Cu up to about 350 mCi $^{64}$Cu/μg Cu, about 350 mCi $^{64}$Cu/μg Cu up to about 375 mCi $^{64}$Cu/μg Cu, about 375 mCi $^{64}$Cu/μg Cu up to about 400 mCi $^{64}$Cu/μg Cu, about 400 mCi $^{64}$Cu/μg Cu up to about 425 mCi $^{64}$Cu/μg Cu, about 425 mCi $^{64}$Cu/μg Cu up to about 450 mCi $^{64}$Cu/μg Cu, about 450 mCi $^{64}$Cu/μg Cu up to about 475 mCi $^{64}$Cu/μg Cu, about 475 mCi $^{64}$Cu/μg Cu up to about 500 mCi $^{64}$Cu/μg Cu, about 500 mCi $^{64}$Cu/μg Cu up to about 525 mCi $^{64}$Cu/μg Cu, about 525 mCi $^{64}$Cu/μg Cu up to about 550 mCi $^{64}$Cu/μg Cu, about 550 mCi $^{64}$Cu/μg Cu up to about 575 mCi $^{64}$Cu/μg Cu, about 575 mCi $^{64}$Cu/μg Cu up to about 600 mCi $^{64}$Cu/μg Cu, about 600 mCi $^{64}$Cu/μg Cu up to about 625 mCi $^{64}$Cu/μg Cu, about 625 mCi $^{64}$Cu/μg Cu up to about 650 mCi $^{64}$Cu/μg Cu, about 650 mCi $^{64}$Cu/μg Cu up to about 675 mCi $^{64}$Cu/μg Cu, about 675 mCi $^{64}$Cu/μg Cu up to about 700 mCi $^{64}$Cu/μg Cu, about 700 mCi $^{64}$Cu/μg Cu up to about 725 mCi $^{64}$Cu/μg Cu, about 725 mCi $^{64}$Cu/μg Cu up to about 750 mCi $^{64}$Cu/μg Cu, about 750 mCi $^{64}$Cu/μg Cu up to about 775 mCi $^{64}$Cu/μg Cu, about 775 mCi $^{64}$Cu/μg Cu up to about 800 mCi $^{64}$Cu/μg Cu, about 800 mCi $^{64}$Cu/μg Cu up to about 825 mCi $^{64}$Cu/μg Cu, about 825 mCi $^{64}$Cu/μg Cu up to about 850 mCi $^{64}$Cu/μg Cu, about 850 mCi $^{64}$Cu/μg Cu up to about 875 mCi $^{64}$Cu/μg Cu, about 875 mCi $^{64}$Cu/μg Cu up to about 1000 mCi $^{64}$Cu/μg Cu. In certain aspects, the composition has a specific activity up to about 3850 mCi $^{64}$Cu/μg Cu. In some embodiments, the composition comprises a solution of hydrochloric acid, such that the $^{64}$Cu exists as $^{64}CuCl_2$.

One aspect of the present disclosure provides a composition comprising from about 2 Ci to about 110 Ci of $^{64}$Cu, about 5 Ci to about 110 Ci of $^{64}$Cu, about 9 Ci to about 110 Ci of $^{64}$Cu, about 12 Ci to about 110 Ci of $^{64}$Cu, about 15 Ci to about 110 Ci of $^{64}$Cu, about 18 Ci to about 110 Ci of $^{64}$Cu, or about 20 Ci to about 110 Ci of $^{64}$Cu, or more at end of bombardment (EOB). Another aspect of the present disclosure provides a composition comprising from about 15 Ci to about 70 Ci of $^{64}$Cu, about 20 Ci to about 70 Ci of $^{64}$Cu, about 25 Ci to about 70 Ci of $^{64}$Cu, about 30 Ci to about 70 Ci of $^{64}$Cu, about 15 Ci to about 60 Ci of $^{64}$Cu, about 20 Ci to about 60 Ci of $^{64}$Cu, about 25 Ci to about 60 Ci of $^{64}$Cu, about 30 Ci to about 60 Ci of $^{64}$Cu, about 15 Ci to about 55 Ci of $^{64}$Cu, about 15 Ci to about 50 Ci of $^{64}$Cu, about 20 Ci to about 50 Ci of $^{64}$Cu, or about 30 Ci to about 50 Ci of $^{64}$Cu or more at end of bombardment (EOB). The compositions of the present invention may further be characterized as pharmaceutical grade, suitable for human administration, and/or suitable for administration to a human subject in need thereof. The compositions of the present invention may be suitable for administration to a human subject in need thereof once divided into a smaller aliquot. In another aspect, the present invention includes a method comprising applying a proton beam from about 50 μA to about 100 μA, about 100 μA to about 150 μA, from about 150 μA to about 200 μA, from about 200 μA to about 250 μA, from about 250 μA to about 300 μA, from about 300 μA to about 350 μA, from about 350 μA to about 400 μA, from about 450 μA to about 500 μA, from about 550 μA to about 600 μA, from about 600 μA to about 650 μA, from about 650 μA to about 700 μA, from about 700 μA to about 750 μA, from about 750 μA to about 800 μA, from about 800 μA to about 850 μA, from about 850 μA to about 900 μA, from about 900 μA to about 950 μA, from about 950 μA to about 1000 μA, from about 1000 μA to about 1050 μA, from about 1050 μA to about 1100 μA, or from about 1150 μA to about 1200 μA to a target (e.g., to one or two targets) to obtain a composition comprising from 20 Ci to about 100 Ci of $^{64}$Cu at end of bombardment (EOB). In another aspect, the current of the proton beam may be split between two targets or a plurality of targets. The current of the proton beam to each target may range from about 190 μA to about 230 μA, from about 200 μA to about 225 μA, from about 250 μA to about 300 μA, from about 300 μA to about 350 μA, or from about 350 μA to about 410 μA, from about 405 μA to about 410 μA, about 410 μA to about 420 μA, about 420 μA to about 440 μA, 440 μA to about 460 μA, or about 460 μA to about 480 μA. In specific embodiments, the current of the proton beam may be about 300 μA, about 400 μA, about 408 μA, about 410 μA or about 500 μA. Another aspect of the present invention includes a method comprising bombarding a particle accelerator (e.g., cyclotron) target comprising $^{64}$Ni with a proton beam to generate a bombarded target comprising from 20 Ci to about 110 Ci of $^{64}$Cu at end of bombardment (EOB), wherein the proton beam is a high amperage proton beam (≥300 μA) or a very high amperage proton beam (≥400 μA), and wherein the proton beam of the particle accelerator has an energy from about 10 MeV to about 12 MeV, from about 12 MeV to about 14 MeV, from about 14 MeV to about 16 MeV, from about 16 MeV to about 18 MeV, from about 18 MeV to about 20 MeV, from about 20 MeV to about 22 MeV, from about 22 MeV to about 24 MeV, and from about 24 MeV to about 30 MeV on the target. High amperage proton beam is any proton beam with a current of about 300 μA or greater. Very high amperage proton beam is any proton beam with a current of about 400 μA or greater.

In other embodiments, the bombarded target may comprise from about 15.0-95.0 Ci of $^{64}$Cu, including from about 20.0-85.0 Ci of $^{64}$Cu, from about 25.0-80.0 Ci of $^{64}$Cu, from about 30.0-75.0 C of $^{64}$Cu, and from about 40.0-70.0 Ci of $^{64}$Cu. The bombarded target may comprise from about 20.0-95.0 Ci, from about 20.0-90.0 Ci, from about 20.0-85.0 Ci, from about 20.0-80.0 Ci, from about 20.0-75.0 Ci, and from about 20.0-70.0 Ci of $^{64}$Cu. In still further embodiments, the bombarded target may comprise from about 15.0-25.0 Ci, from about 25.0-35.0 Ci, from about 35.0-45.0 Ci, from about 45.0-55.0 Ci, from about 55.0-65.0 Ci, from about 65.0-75.0 Ci, from about 75.0-85.0 Ci, and from about 85.0-95.0 Ci of $^{64}$Cu. In still further embodiments, the bombarded target may comprise ≥17.5 Ci of $^{64}$Cu, ≥20 Ci of $^{64}$Cu, ≥22.5 Ci of $^{64}$Cu, ≥25 Ci of $^{64}$Cu, ≥30 Ci of $^{64}$Cu, ≥35 Ci of $^{64}$Cu, ≥40 Ci of $^{64}$Cu, ≥45 Ci of $^{64}$Cu, ≥50 Ci of $^{64}$Cu, ≥55 Ci of $^{64}$Cu, ≥60 Ci of $^{64}$Cu, ≥65 Ci of $^{64}$Cu, ≥70 Ci of $^{64}$Cu, ≥75 Ci of $^{64}$Cu, ≥80 Ci of $^{64}$Cu, ≥85 Ci of $^{64}$Cu, ≥90 Ci of $^{64}$Cu, ≥95 Ci of $^{64}$Cu, and/or ≥100 Ci of $^{64}$Cu. The composition may be obtained from a single target during one particle accelerator (e.g., cyclotron) run. The composition may have a specific activity of at least about 15 mCi $^{64}$Cu/μg Cu, at least about 18 mCi $^{64}$Cu/μg Cu, at least about 20 mCi $^{64}$Cu/μg Cu, at least about 22 mCi $^{64}$Cu/μg Cu, at least about 25 mCi $^{64}$Cu/μg Cu, at least about 30 mCi $^{64}$Cu/μg Cu, at least about 35 mCi $^{64}$Cu/μg Cu, at least about 40 mCi $^{64}$Cu/μg Cu, at least about 45 mCi $^{64}$Cu/μg Cu, at least about 50 mCi $^{64}$Cu/μg Cu, at least about 55 mCi $^{64}$Cu/μg Cu, at least about 60 mCi $^{64}$Cu/μg Cu, at least about 65 mCi $^{64}$Cu/μg Cu, at least about 70 mCi $^{64}$Cu/μg Cu, at least about 75 mCi $^{64}$Cu/μg Cu, at least about 80 mCi $^{64}$Cu/μg Cu, at least about 85 mCi $^{64}$Cu/μg Cu, at least about 90 mCi $^{64}$Cu/μg Cu, at least about 95 mCi $^{64}$Cu/μg Cu, at least about 100 mCi $^{64}$Cu/μg Cu, at least about 105 mCi $^{64}$Cu/μg Cu, at least about 110 mCi $^{64}$Cu/μg Cu, at least about 115 mCi $^{64}$Cu/μg Cu, at least about 120 mCi $^{64}$Cu/μg Cu, at least about 125 mCi $^{64}$Cu/μg Cu, at least about 130 mCi $^{64}$Cu/μg Cu, at least about 135 mCi $^{64}$Cu/μg Cu, at least about 140 mCi $^{64}$Cu/μg Cu, at least about 145 mCi $^{64}$Cu/μg Cu, or at least about 150 mCi $^{64}$Cu/μg Cu. The composition may have a specific activity up to about 3750 mCi $^{64}$Cu/μg Cu, about 3775 mCi $^{64}$Cu/μg Cu about 3800 mCi $^{64}$Cu/μg Cu, about 3825 mCi $^{64}$Cu/μg Cu, or about 3850 mCi $^{64}$Cu/μg Cu. The composition may have a specific activity at least about 30 mCi $^{64}$Cu/μg Cu up to about 3750 mCi $^{64}$Cu/μg Cu, at least about 30 mCi $^{64}$Cu/μg Cu up to about 3775 mCi $^{64}$Cu/μg, at least about 30 mCi $^{64}$Cu/μg Cu up to about 3800 mCi $^{64}$Cu/μg Cu, at least about 30 mCi $^{64}$Cu/μg Cu up to about 3825 mCi $^{64}$Cu/μg Cu, or at least about 30 mCi $^{64}$Cu/μg Cu up to about 3850 mCi $^{64}$Cu/μg Cu. The composition may have a specific activity at least about 40 mCi $^{64}$Cu/μg Cu up to about 3750 mCi $^{64}$Cu/μg Cu, at least about 40 mCi $^{64}$Cu/μg Cu up to about 3775 mCi $^{64}$Cu/μg, at least about 40 mCi $^{64}$Cu/μg Cu up to about 3800 mCi $^{64}$Cu/μg Cu, at least about 40 mCi $^{64}$Cu/μg Cu up to about 3825 mCi $^{64}$Cu/μg Cu, or at least about 40 mCi $^{64}$Cu/μg Cu up to about 3850 mCi $^{64}$Cu/μg Cu. The composition may have a specific activity of at least about 50 mCi $^{64}$Cu/μg Cu up to about 3750 mCi $^{64}$Cu/μg Cu, at least about 50 mCi $^{64}$Cu/μg Cu up to about 3775 mCi $^{64}$Cu/μg, at least about 50 mCi $^{64}$Cu/μg Cu up to about 3800 mCi $^{64}$Cu/μg Cu, at least about 50 mCi $^{64}$Cu/μg Cu up to about 3825 mCi $^{64}$Cu/μg Cu, or at least about 50 mCi $^{64}$Cu/μg Cu up to about 3850 mCi $^{64}$Cu/μg Cu. The composition may have a specific activity at least about 50 mCi $^{64}$Cu/μg Cu up to about 3750 mCi $^{64}$Cu/μg Cu, about 3775 mCi $^{64}$Cu/μg Cu about 3800 mCi $^{64}$Cu/μg Cu, about 3825 mCi $^{64}$Cu/μg Cu, or about 3850 mCi $^{64}$Cu/μg Cu. The composition may have a specific activity at least about 75 mCi $^{64}$Cu/μg Cu up to about 3750 mCi $^{64}$Cu/μg Cu, about 3775 mCi $^{64}$Cu/μg Cu about 3800 mCi $^{64}$Cu/μg Cu, about 3825 mCi $^{64}$Cu/μg Cu, or about 3850 mCi $^{64}$Cu/μg Cu. The composition may have a specific activity at least about 100 mCi $^{64}$Cu/μg Cu up to about 3750 mCi $^{64}$Cu/μg Cu, about 3775 mCi $^{64}$Cu/μg Cu about 3800 mCi $^{64}$Cu/μg Cu, about 3825 mCi $^{64}$Cu/μg Cu, or about 3850 mCi $^{64}$Cu/μg Cu or higher. In some embodiments, the composition comprises a solution of hydrochloric acid, such that the $^{64}$Cu exists as $^{64}CuCl_2$.

A further aspect of the present disclosure encompasses a process for preparing the $^{64}$Cu from $^{64}$Ni. The process comprises (a) bombarding a particle accelerator target comprising $^{64}$Ni with a proton beam to generate a bombarded target; (b) stripping the bombarded target with a volume of HCl having a molarity of about 6 M to about 12.1 M to form a strip solution comprising $^{64}$Ni and $^{64}$Cu; and (c) purifying the $^{64}$Cu from the strip solution by ion exchange chromatography, wherein the ion exchange chromatography comprises (i) passing the strip solution through a column comprising an ion exchange resin such that $^{64}$Cu binds to the ion exchange resin and $^{64}$Ni passes through the column as a flow-through; (ii) rinsing the column with a volume of HCl having a molarity of about 3 M to about 6 M; and (iii) adding a volume of HCl having a molarity of about 0.5 M to about 3 M to the column to elute the $^{64}$Cu from the ion exchange resin and collecting an eluate comprising $^{64}$Cu.

Another aspect of the present disclosure encompasses an additional process for purifying the $^{64}$Cu from other metals in the strip solution by using a packed bed ion exchange chromatography column. The process comprises (a) bombarding a particle accelerator target comprising $^{64}$Ni with a proton beam to generate a bombarded target; (b) stripping the bombarded target with a volume of HCl having a molarity of about 6 M to about 12.1 M to form a strip solution comprising $^{64}$Ni, $^{64}$Cu, $^{61}$Co, and other metals; and (c) purifying the $^{64}$Cu from the strip solution by chromatography, wherein the chromatography comprises (i) passing the strip solution through an ion exchange resin such that the $^{64}$Cu and $^{61}$Co bind to the ion exchange resin in the column, and $^{64}$Ni passes through as a first flow-through fraction; (ii) rinsing the column with a volume of HCl having a molarity of about 6 M to about 12.1 M to remove residual $^{64}$Ni as a second flow-through fraction; (iii) rinsing the column with a volume of HCl having a molarity of about 3 M to about 6 M to elute $^{61}$Co as a first waste fraction; and (iv) adding a volume of HCl having a molarity of about 0.01 M to about 3 M to the column to elute the $^{64}$Cu as a product fraction comprising $^{64}$Cu.

Another aspect of the present disclosure encompasses an additional process for preparing $^{64}$Cu from $^{64}$Ni, wherein the $^{64}$Cu is purified by a combination of extraction chromatography and ion exchange chromatography. The process comprises (a) bombarding a particle accelerator target comprising $^{64}$Ni with a proton beam to generate a bombarded target; (b) stripping the bombarded target with a volume of HCl having a molarity of about 6 M to about 12.1 M to form a strip solution comprising $^{64}$Ni, $^{64}$Cu, $^{61}$Co, and one or more other metals; and (c) purifying the $^{64}$Cu from the strip solution by chromatography, wherein the chromatography comprises (i) passing the strip solution through a first column comprising an extraction resin connected in series to a second column comprising an ion exchange resin, such that the one or more other metals binds to the extraction resin in the first column, $^{64}$Cu and $^{61}$Co bind to the ion exchange resin in the second column, and $^{64}$Ni passes through both columns as a first flow-through fraction. The process further comprises (ii) rinsing the first and second columns with a volume of HCl having a molarity of about 6 M to about 12.1 M to remove residual $^{64}$Ni as a second flow-through fraction; (iii) rinsing the second column with a volume of HCl having a molarity of about 3 M to about 6 M to elute $^{61}$Co as a first waste fraction; (iv) rinsing the second column with a volume of NaCl having a molarity of about 3 M to 6 M in HCl having a molarity of about 0.01 M to about 3 M or with a volume of HCl having a molarity of about 3 M to about 6 M to elute residual $^{61}$Co as a second waste fraction; and (v) adding a volume of HCl having a molarity of about 0.01 M to about 3 M to the second column to elute the $^{64}$Cu as a product fraction comprising $^{64}$Cu. Particle accelerators as referenced herein include any machine or device capable of accelerating particles to produce $^{64}$Cu, including but not limited to cyclotrons, fixed-field alternating gradient accelerators ("FFAs"), synchrotrons, particle accelerators, and linear accelerators ("LINAC" or "LINACs"). As described herein any particle accelerators available in the art may be employed to bombard the target particles, for example $^{64}$Ni. In some embodiments, the particle accelerator is a cyclotron. In some other embodiments, the particle accelerator is a linear accelerator (LINACS). Any description herein of a particular particle accelerator may also be applied via an alternative particle accelerator. As such, for example, any description of a cyclotron or a cyclotron run may be substituted with other particle accelerator(s).

For the avoidance of doubt, the processes described herein may be performed manually, automatedly, or a combination thereof. Other aspects and iterations of the present disclosure are detailed below.

BRIEF DESCRIPTION OF THE DRAWINGS

FIG. 5A shows plated natural nickel target used in a bombardment (Run 1).

FIG. 5B shows bombarded and stripped natural nickel-plated target (Run 1).

FIG. 5C shows Ni-64 plated targets (Runs 2-4).

FIG. 5D shows bombarded and stripped Ni-64 plated target 30 Jul. 2024-PB3-2.

FIG. 5E shows bombarded and stripped Ni-64 plated target 30 Jul. 2024-PB2-1.

DETAILED DESCRIPTION

Figure 1:
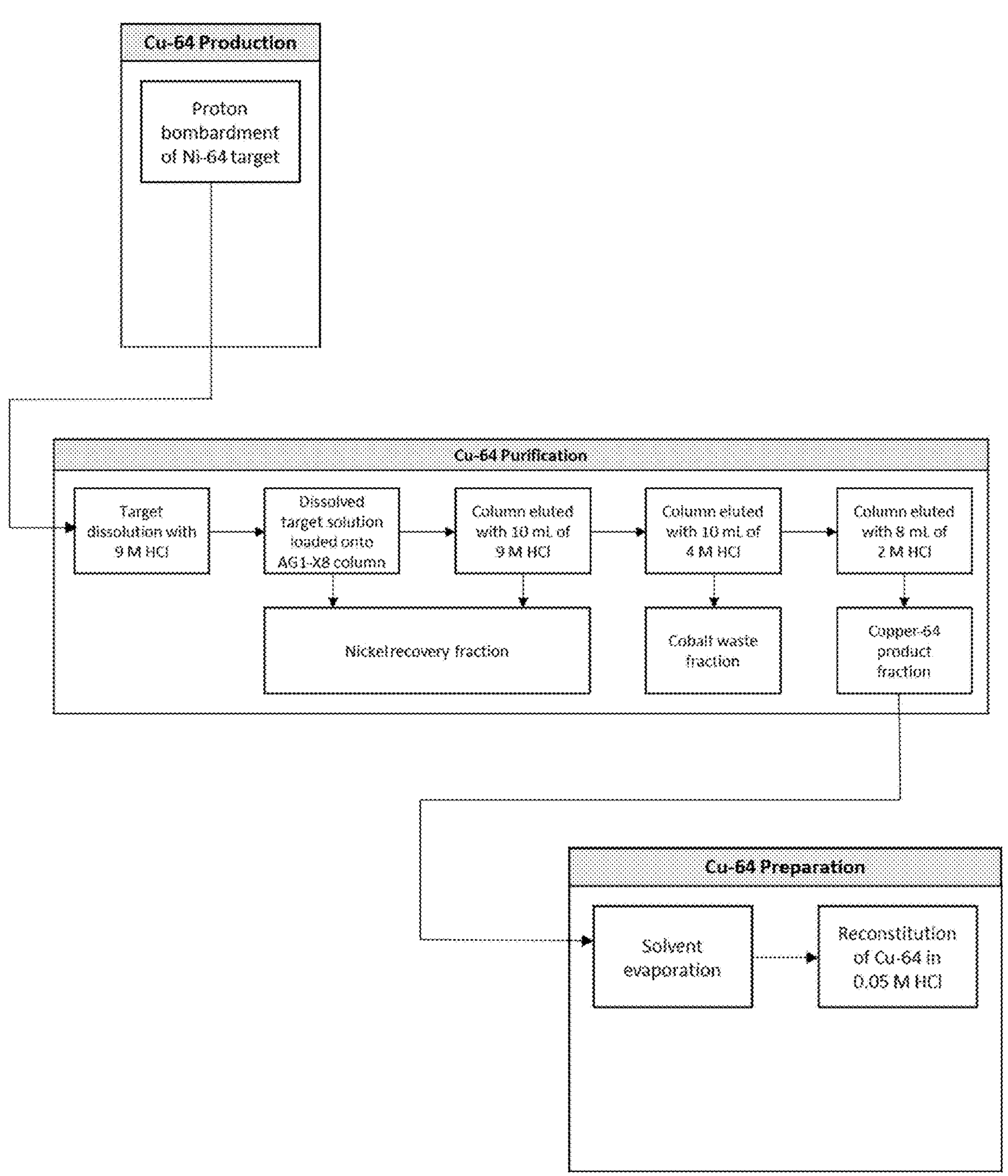
FIG. 1 presents a schematic of the purification process comprising ion exchange chromatography.

Provided herein are compositions comprising high levels of high specific activity $^{64}$Cu and processes for preparing said compositions. The $^{64}$Cu compositions described herein are suitable for administration to a human patient in need thereof. The $^{64}$Cu compositions described herein are suitable for administration via injection. The processes disclosed herein are able to produce high levels of $^{64}$Cu from a single target during one continuous particle accelerator bombardment (i.e., cyclotron run). The $^{64}$Cu produced by these processes has a high specific activity, as well as high chemical and radionuclidic purities. Radionuclidic purity is a measurement of the percent of total radioactivity that is due to the desired radioisotope in a given composition. For example, if a $^{64}$Cu composition has a radionuclidic purity of 98%, then 98% of the radioactivity would be due to the $^{64}$Cu present in the composition and 2% of the radioactivity would be due to radioisotopes other than $^{64}$Cu that are present in the composition. Favorably, the $^{64}$Cu compositions produced by the processes disclosed herein also have low levels of metal impurities such as cobalt, iron, nickel and lead. The $^{64}$Cu compositions produced by the processes disclosed herein also have low levels of $^{67}$Cu or an absence of $^{67}$Cu (i.e., zero ppm $^{67}$Cu). The $^{64}$Cu compositions produced by the processes disclosed herein also have low levels of $^{68}$Zn or an absence of $^{68}$Zn (i.e., zero ppm $^{68}$Zn). The $^{64}$Cu compositions produced by the processes disclosed herein also have low levels of or an absence of any element or isotope with a mass number of 67 or greater. The $^{64}$Cu compositions produced by the processes disclosed herein also have low levels of or an absence of any element or isotope with a mass number of 68 or greater. The $^{64}$Cu compositions produced by the processes disclosed herein also have an absence of zinc-based target source materials (i.e., 0 ppm).

(I) Compositions

The $^{64}$Cu compositions disclosed herein (e.g., 20.0-100.0 Ci of $^{64}$Cu) may comprise high levels of high specific activity $^{64}$Cu. The $^{64}$Cu compositions described herein include isolated $^{64}$Cu compositions, wherein the $^{64}$Cu has been removed or stripped from the target. In general, the $^{64}$Cu compositions may comprise up to about 110 Ci of $^{64}$Cu and have specific activities up to about 3850 mCi $^{64}$Cu/μg Cu. In some embodiments, the $^{64}$Cu compositions may comprise ≥2 Ci of $^{64}$Cu, ≥5 Ci of $^{64}$Cu, ≥15 Ci of $^{64}$Cu, ≥20 Ci of $^{64}$Cu, ≥25 Ci of $^{64}$Cu, ≥30 Ci of $^{64}$Cu, ≥35 Ci of $^{64}$Cu, 40 Ci of $^{64}$Cu, ≥45 Ci of $^{64}$Cu, ≥50 Ci of $^{64}$Cu, ≥55 Ci of $^{64}$Cu, ≥60 Ci of $^{64}$Cu, ≥65 Ci of $^{64}$Cu, ≥70 Ci of $^{64}$Cu, ≥75 Ci of $^{64}$Cu, ≥80 Ci of $^{64}$Cu, ≥85 Ci of $^{64}$Cu, ≥90 Ci of $^{64}$Cu, ≥95 Ci of $^{64}$Cu, ≥100 Ci of $^{64}$Cu, ≥105 Ci of $^{64}$Cu, ≥110 Ci of $^{64}$Cu, ≥115 Ci of $^{64}$Cu, or ≥120 Ci of $^{64}$Cu and have specific activities from 20 mCi $^{64}$Cu/μg Cu up to about 3900 mCi $^{64}$Cu/μg Cu. In some embodiments, the $^{64}$Cu compositions may comprise ≥2 Ci of $^{64}$Cu, ≥5 Ci of $^{64}$Cu, ≥15 Ci of $^{64}$Cu, ≥20 Ci of $^{64}$Cu, ≥25 Ci of $^{64}$Cu, ≥30 Ci of $^{64}$Cu, ≥35 Ci of $^{64}$Cu, 40 Ci of $^{64}$Cu, ≥45 Ci of $^{64}$Cu, ≥50 Ci of $^{64}$Cu, ≥55 Ci of $^{64}$Cu, ≥60 Ci of $^{64}$Cu, ≥65 Ci of $^{64}$Cu, ≥70 Ci of $^{64}$Cu, ≥75 Ci of $^{64}$Cu, ≥80 Ci of $^{64}$Cu, ≥85 Ci of $^{64}$Cu, ≥90 Ci of $^{64}$Cu, ≥95 Ci of $^{64}$Cu, ≥100 Ci of $^{64}$Cu, ≥105 Ci of $^{64}$Cu, ≥110 Ci of $^{64}$Cu, ≥115 Ci of $^{64}$Cu, or ≥120 Ci of $^{64}$Cu and have specific activities from 20 mCi $^{64}$Cu/μg Cu up to about 3900 mCi $^{64}$Cu/μg Cu. In some embodiments, the $^{64}$Cu compositions may comprise up to about 120 Ci of $^{64}$Cu and have specific activities up to about 3900 mCi $^{64}$Cu/μg Cu.

The composition(s) described herein may comprise a specific activity from 15 mCi to 3850 mCi $^{64}$Cu/μg Cu, from 25 mCi to 3850 mCi $^{64}$Cu/μg Cu, or from 50 mCi to 3850 mCi $^{64}$Cu/μg Cu. In some embodiments, the composition(s) described herein may comprise a specific activity from 15 mCi to 20 mCi $^{64}$Cu/μg Cu, 20 mCi to 25 mCi $^{64}$Cu/μg Cu, 25 mCi to 50 mCi $^{64}$Cu/μg Cu, 50 mCi to 75 mCi $^{64}$Cu/μg Cu, 75 mCi to 100 mCi $^{64}$Cu/μg Cu, 100 mCi to 150 mCi $^{64}$Cu/μg Cu, 150 mCi to 200 mCi $^{64}$Cu/μg Cu, 200 mCi to 250 mCi $^{64}$Cu/μg Cu, 250 mCi to 300 mCi $^{64}$Cu/μg Cu, 300 mCi to 350 mCi $^{64}$Cu/μg Cu, 350 mCi to 400 mCi $^{64}$Cu/μg Cu, 400 mCi to 450 mCi $^{64}$Cu/μg Cu, or 450 mCi to 500 mCi $^{64}$Cu/μg Cu, 500 mCi to 550 mCi $^{64}$Cu/μg Cu, 550 mCi to 600 mCi $^{64}$Cu/μg Cu, 600 mCi to 650 mCi $^{64}$Cu/μg Cu, 650 mCi to 700 mCi $^{64}$Cu/μg Cu, 700 mCi to 750 mCi $^{64}$Cu/μg Cu, 750 mCi to 800 mCi $^{64}$Cu/μg Cu, 800 mCi to 850 mCi $^{64}$Cu/μg Cu, 850 mCi to 900 mCi $^{64}$Cu/μg Cu, 900 mCi to 950 mCi $^{64}$Cu/μg Cu, or 950 mCi to 1,000 mCi $^{64}$Cu/μg Cu.

In some embodiments, the composition(s) described herein may comprise a specific activity from 1,000 mCi to 1,050 mCi $^{64}$Cu/μg Cu, 1,100 mCi to 1,150 mCi $^{64}$Cu/μg Cu, 1,150 mCi to 1,200 mCi $^{64}$Cu/μg Cu, 1,200 mCi to 1,250 mCi $^{64}$Cu/μg Cu, 1,250 mCi to 1,300 mCi $^{64}$Cu/μg Cu, 1,300 mCi to 1,350 mCi $^{64}$Cu/μg Cu, 1,350 mCi to 1,400 mCi $^{64}$Cu/μg Cu, 1,400 mCi to 1,450 mCi $^{64}$Cu/μg Cu, or 1,450 mCi to 1,500 mCi $^{64}$Cu/μg Cu, 1,500 mCi to 1,550 mCi $^{64}$Cu/μg Cu, 1,550 mCi to 1,600 mCi $^{64}$Cu/μg Cu, 1,600 mCi to 1,650 mCi $^{64}$Cu/μg Cu, 1,650 mCi to 1,700 mCi $^{64}$Cu/μg Cu, 1,700 mCi to 1,750 mCi $^{64}$Cu/μg Cu, 1,750 mCi to 1,800 mCi $^{64}$Cu/μg Cu, 1,800 mCi to 1,850 mCi $^{64}$Cu/μg Cu, 1,850 mCi to 1,900 mCi $^{64}$Cu/μg Cu, 1,900 mCi to 1,950 mCi $^{64}$Cu/μg Cu, or 1,950 mCi to 2,000 mCi $^{64}$Cu/μg Cu.

In some embodiments, the composition(s) described herein may comprise a specific activity from 2,000 mCi to 2,050 mCi $^{64}$Cu/μg Cu, 2,100 mCi to 2,150 mCi $^{64}$Cu/μg Cu, 2,150 mCi to 2,200 mCi $^{64}$Cu/μg Cu, 2,200 mCi to 2,250 mCi $^{64}$Cu/μg Cu, 2,250 mCi to 2,300 mCi $^{64}$Cu/μg Cu, 2,300 mCi to 2,350 mCi $^{64}$Cu/μg Cu, 2,350 mCi to 2,400 mCi $^{64}$Cu/μg Cu, 2,400 mCi to 2,450 mCi $^{64}$Cu/μg Cu, or 2,450 mCi to 2,500 mCi $^{64}$Cu/μg Cu, 2,500 mCi to 2,550 mCi $^{64}$Cu/μg Cu, 2,550 mCi to 2,600 mCi $^{64}$Cu/μg Cu, 2,600 mCi to 2,650 mCi $^{64}$Cu/μg Cu, 2,650 mCi to 2,700 mCi $^{64}$Cu/μg Cu, 2,700 mCi to 2,750 mCi $^{64}$Cu/μg Cu, 2,750 mCi to 2,800 mCi $^{64}$Cu/μg Cu, 2,800 mCi to 2,850 mCi $^{64}$Cu/μg Cu, 2,850 mCi to 2,900 mCi $^{64}$Cu/μg Cu, 2,900 mCi to 2,950 mCi $^{64}$Cu/μg Cu, or 2,950 mCi to 3,000 mCi $^{64}$Cu/μg Cu.

In some embodiments, the composition(s) described herein may comprise a specific activity from 3,000 mCi to 3,050 mCi $^{64}$Cu/μg Cu, 3,100 mCi to 3,150 mCi $^{64}$Cu/μg Cu, 3,150 mCi to 3,200 mCi $^{64}$Cu/μg Cu, 3,200 mCi to 2,250 mCi $^{64}$Cu/μg Cu, 3,250 mCi to 3,300 mCi $^{64}$Cu/μg Cu, 3,300 mCi to 3,350 mCi $^{64}$Cu/μg Cu, 3,350 mCi to 3,400 mCi $^{64}$Cu/μg Cu, 3,400 mCi to 3,450 mCi $^{64}$Cu/μg Cu, or 3,450 mCi to 3,500 mCi $^{64}$Cu/μg Cu, 3,500 mCi to 3,550 mCi $^{64}$Cu/μg Cu, 3,550 mCi to 3,600 mCi $^{64}$Cu/μg Cu, 3,600 mCi to 3,650 mCi $^{64}$Cu/μg Cu, 3,650 mCi to 3,700 mCi $^{64}$Cu/μg Cu, 3,700 mCi to 3,750 mCi $^{64}$Cu/μg Cu, 3,750 mCi to 3,800 mCi $^{64}$Cu/μg Cu, or 3,800 mCi to 3,850 mCi $^{64}$Cu/μg Cu.

In some embodiments, the composition(s) described herein may comprise a radioactive concentration from 10 mCi/ml to 1000 mCi mCi/ml at EOB. The radioactive concentration may be about 250 to about 300 mCi/mL, about 300 to about 350 mCi/mL, about 350 to about 400 mCi/mL, about 400 to about 450 mCi/mL, about 450 to about 500 mCi/mL, about 500 to about 550 mCi/mL, about 550 to about 600 mCi/mL, about 600 to about 650 mCi/mL, about 650 to about 700 mCi/mL, about 700 to about 750 mCi/mL, about 750 to about 800 mCi/mL, about 800 to about 850 mCi/mL, about 850 to about 900 mCi/mL, about 900 to about 950 mCi/mL, about 950 to about 1,000 mCi/mL, or greater than 1,000 mCi/mL. In some embodiments, the radioactive concentration may be about 700 to about 705 mCi/mL, about 705 to about 710 mCi/mL, about 710 to about 715 mCi/mL, about 715 to about 720 mCi/mL, about 720 to about 725 mCi/mL, about 725 to about 730 mCi/mL, about 730 to about 735 mCi/mL, about 735 to about 740 mCi/mL, about 740 to about 745 mCi/mL, or about 745 to about 750 mCi/mL.

In some embodiments, the $^{64}$Cu compositions may comprise about ≤15 ppm, 14 ppm, 13 ppm, 12 ppm, 11 ppm, 10 ppm, ≤9 ppm, ≤8 ppm, ≤7 ppm, ≤6 ppm, ≤5 ppm, ≤4 ppm, ≤3 ppm, ≤2 ppm, ≤1 ppm, ≤0.5 ppm, ≤0.4 ppm, ≤0.3 ppm, ≤0.2 ppm, or ≤0.1 ppm of Cu. The amount of Cu may be about 0.1 ppm to about 12 ppm, about 0.5 ppm to about 10 ppm, about 1 ppm to about 5 ppm, or about 2 ppm to about 4 ppm.

In some embodiments, the $^{64}$Cu compositions may comprise about ≤15 ppm, 14 ppm, 13 ppm, 12 ppm, 11 ppm, 10 ppm, ≤9 ppm, ≤8 ppm, ≤7 ppm, ≤6 ppm, ≤5 ppm, ≤4 ppm, ≤3 ppm, ≤2 ppm, ≤1 ppm, ≤0.5 ppm, ≤0.4 ppm, ≤0.3 ppm, ≤0.2 ppm, or ≤0.1 ppm of Fe. The amount of Fe may be about 0.1 ppm to about 12 ppm, about 0.5 ppm to about 10 ppm, about 1 ppm to about 5 ppm, or about 2 ppm to about 4 ppm. In some embodiments, the amount of Fe may be undetectable.

In some embodiments, the $^{64}$Cu compositions may comprise about ≤15 ppm, 14 ppm, 13 ppm, 12 ppm, 11 ppm, 10 ppm, ≤9 ppm, ≤8 ppm, ≤7 ppm, ≤6 ppm, ≤5 ppm, ≤4 ppm, ≤3 ppm, ≤2 ppm, ≤1 ppm, ≤0.5 ppm, ≤0.4 ppm, ≤0.3 ppm, ≤0.2 ppm, or ≤0.1 ppm of Ni. The amount of Ni may be about 0.1 ppm to about 12 ppm, about 0.5 ppm to about 10 ppm, about 1 ppm to about 5 ppm, or about 2 ppm to about 4 ppm. In some embodiments, the amount of Fe may be undetectable.

In some embodiments, the $^{64}$Cu compositions may comprise about ≤5 ppm, ≤4 ppm, ≤3 ppm, ≤2 ppm, ≤1 ppm, ≤0.5 ppm, ≤0.4 ppm, ≤0.3 ppm, ≤0.2 ppm, or ≤0.1 ppm of Pb. The amount of Pb may be about 0.1 ppm to about 5 ppm, about 0.5 ppm to about 2 ppm, about 0.01 ppm to about 0.09 ppm, or about 2 ppm to about 4 ppm. In some embodiments, the amount of Pb may be undetectable.

In some embodiments, the $^{64}$Cu compositions may comprise about ≤1 ppm, ≤0.5 ppm, ≤0.4 ppm, ≤0.3 ppm, ≤0.2 ppm, or ≤0.1 ppm of Zn. The amount of Zn may be about 0.1 ppm to about 1 ppm, about 0.01 ppm to about 1 ppm, about 0.01 ppm to about 0.09 ppm, or about 2 ppm to about 4 ppm. In some embodiments, the amount of Zn may be undetectable.

In some embodiments, the $^{64}$Cu compositions may comprise about ≤30 ppm, ≤20 ppm, ≤15 ppm≤15 ppm, 14 ppm, 13 ppm, 12 ppm, 11 ppm, 10 ppm, ≤9 ppm, ≤8 ppm, ≤7 ppm, ≤6 ppm, ≤5 ppm, ≤4 ppm, ≤3 ppm, ≤2 ppm, ≤1 ppm, ≤0.5 ppm, ≤0.4 ppm, ≤0.3 ppm, ≤0.2 ppm, or ≤0.1 ppm of trace metals. The total amount of trace metals may be about 1 ppm to about 30 ppm, about 5 ppm to about 20 ppm, or about 10 ppm to about 15 ppm.

In some embodiments, the $^{64}$Cu compositions may comprise ≥2 Ci of $^{64}$Cu, ≥5 Ci of $^{64}$Cu, ≥15 Ci of $^{64}$Cu, ≥20 Ci of $^{64}$Cu, ≥25 Ci of $^{64}$Cu, ≥30 Ci of $^{64}$Cu, ≥35 Ci of $^{64}$Cu, 40 Ci of $^{64}$Cu, ≥45 Ci of $^{64}$Cu, ≥50 Ci of $^{64}$Cu, ≥55 Ci of $^{64}$Cu, ≥60 Ci of $^{64}$Cu, ≥65 Ci of $^{64}$Cu, ≥70 Ci of $^{64}$Cu, ≥75 Ci of $^{64}$Cu, ≥80 Ci of $^{64}$Cu, ≥85 Ci of $^{64}$Cu, ≥90 Ci of $^{64}$Cu, ≥95 Ci of $^{64}$Cu, ≥100 Ci of $^{64}$Cu, ≥105 Ci of $^{64}$Cu, ≥110 Ci of $^{64}$Cu, ≥115 Ci of $^{64}$Cu, or ≥120 Ci of $^{64}$Cu and have specific activities from 20 mCi $^{64}$Cu/μg Cu up to about 4800 mCi $^{64}$Cu/μg Cu. In some embodiments, the $^{64}$Cu compositions may comprise up to about 120 Ci of $^{64}$Cu and have specific activities up to about 4800 mCi $^{64}$Cu/μg Cu.

The $^{64}$Cu compositions may comprise up to about 110 Ci of $^{64}$Cu and have specific activities from 30 mCi $^{64}$Cu/μg Cu up to about 3850 mCi $^{64}$Cu/μg Cu. The $^{64}$Cu compositions comprise up to about 110 Ci of $^{64}$Cu and have specific activities from 40 mCi $^{64}$Cu/μg Cu up to about 3850 mCi $^{64}$Cu/μg Cu. The $^{64}$Cu compositions comprise up to about 110 Ci of $^{64}$Cu and have specific activities from 50 mCi $^{64}$Cu/μg Cu up to about 3850 mCi $^{64}$Cu/μg Cu. The $^{64}$Cu compositions may be prepared by the processes described below in sections (II) to (IV).

The $^{64}$Cu activity (Ci or Bq) may be measured by gamma spectroscopy (e.g., high purity germanium (HPGe) detector), a dose calibrator, or similar means. Specific activity (mCi $^{64}$Cu/μg Cu) may be determined by measuring the mass of Cu by a variety of methods including inductively coupled plasma optical emission spectroscopy (ICP-OES), inductively coupled plasma mass spectrometry (ICP-MS), or titration. The compositions described herein may be suitable for administration to a human patient in need thereof. The compositions described herein may be suitable for administration via a single dose vial. In one aspect, the compositions described herein comprise about 35 MBq to about 40 MBq of $^{64}$Cu per 1 mL of the composition in a single dose vial. In one aspect, the compositions described herein comprise about 35 MBq to about 40 MBq of $^{64}$Cu DOTATATE per 1 mL of the composition in a single dose vial. In another aspect, the compositions described herein comprise about 36 MBq to about 38 MBq of $^{64}$Cu per 1 mL of the composition in a single dose vial. In another aspect, the compositions described herein comprise about 36 MBq to about 38 MBq of $^{64}$Cu DOTATATE per 1 mL of the composition in a single dose vial. In another aspect, the compositions described herein comprise about 36.5 MBq to about 37.5 MBq of $^{64}$Cu per 1 mL of the composition in a single dose vial. In another aspect, the compositions described herein comprise about 36.5 MBq to about 37.5 MBq of $^{64}$Cu per 1 mL of the composition in a single dose vial. In another aspect, the compositions described herein comprise about 36.5 MBq to about 37.5 MBq of $^{64}$Cu DOTATATE per 1 mL of the composition in a single dose vial. In another aspect, the compositions described herein comprise about 37.0 MBq of $^{64}$Cu DOTATATE per 1 mL of the composition in a single dose vial. In another aspect, the compositions described herein comprise about 145 to about 150 MBq of $^{64}$Cu DOTATATE per 1 mL of the composition in a single dose vial. In another aspect, the compositions described herein comprise about 145 to about 150 MBq of $^{64}$Cu per 1 mL of the composition in a single dose vial. In another aspect, the compositions described herein comprise about 145 to about 150 MBq of $^{64}$Cu in a single dose vial, wherein the composition further comprises DOTA and/or DOTAGA. The composition in the single dose vial suitable for administration to a human patient in need thereof may be isolated or aliquoted from a composition comprising from 15 Ci to 110 Ci of $^{64}$Cu and having a specific activity from 50 mCi to 3850 mCi $^{64}$Cu/μg Cu.

The compositions in the single dose vial(s) may also have low levels of $^{67}$Cu or a complete absence of $^{67}$Cu (i.e., zero ppm $^{67}$Cu or zero ppb $^{67}$Cu). The compositions in the single dose vial produced by the processes disclosed herein may also have low levels of $^{68}$Zn or a complete absence of $^{68}$Zn (i.e., zero ppm $^{68}$Zn or zero ppb $^{68}$Zn). The compositions in the single dose vial may also have low levels of or an absence of any element or isotope with a mass number of 67 or greater. The composition in the single dose vials produced by the processes disclosed herein may also have low levels of or an absence of any element or isotope with a mass number of 68 or greater. The composition in the single dose vials produced by the processes disclosed herein have an absence of zinc-based target source materials.

In general, the compositions disclosed herein may comprise from about 2 Ci to about 15 Ci of $^{64}$Cu at the end of bombardment (EOB). The level of $^{64}$Cu may be determined at EOB or a later time point. Persons skilled in the art understand that the level of $^{64}$Cu activity decreases over time. In some embodiments, the compositions may comprise from about 2 Ci to about 3 Ci, from about 3 Ci to about 4 Ci, from about 4 Ci to about 5 Ci, from about 5 Ci to about 6 Ci, from about 6 Ci to about 7 Ci, from about 7 Ci to about 8 Ci, from about 8 Ci to about 9 Ci, from about 9 Ci to about 10 Ci, from about 10 Ci to about 11 Ci, from about 11 Ci to about 12 Ci, from about 12 Ci to about 13 Ci, from about 13 Ci to about 14 Ci, or from about 14 Ci to about 15 Ci of $^{64}$Cu. In other embodiments, the composition may comprise from about 4.0-4.5 Ci, from about 4.5-5.0 Ci, from about 5.0-5.5 Ci, from about 5.5-6.0 Ci, from about 6.0-6.5 Ci, from about 6.5-7.0 Ci, from about 7.0-7.5 Ci, from about 7.5-8.0 Ci, from about 8.0-8.5 Ci, from about 8.5-9.0 Ci, from about 9.0-12.0 Ci, from about 12.0-15.0 Ci, from about 4.0-5.5 Ci, from about 5.5-7.0 Ci, from about 6.0-7.5 Ci, from about 7.0-8.5 Ci, r from about 7.5-9.0 Ci, or from about 9.0-15.0 Ci of $^{64}$Cu. In other embodiments, the composition may comprise from about 4.0-15.5 Ci, from about 4.5-15.0 Ci, from about 5.0-15.0 Ci, from about 5.5-15.0 Ci, from about 6.0-15.0 Ci, from about 6.5-15.0 Ci, from about 7.0-15.0 Ci, from about 7.5-15.0 Ci, from about 8.0-15.0 Ci, from about 8.5-15.0 Ci, from about 9.0-15.0 Ci, from about 9.5-15.0 Ci, from about 10.0-15.0 Ci, from about 10.5-15.0 Ci, from about 11.0-15.0 Ci, from about 11.5-15.0 Ci, from about 12.0-15.0 Ci, from about 12.5-15.0 Ci, or from about 13.0-15.0 Ci of $^{64}$Cu.

In other embodiments, the composition may comprise from about 15.0-25.0 Ci, including from about 16.0-24.0 Ci, from about 17.0-23.0 Ci, from about 18.0-22.0 Ci, from about 19.0-21.0 Ci, or from about 17.0-20.0 Ci of $^{64}$Cu.

In other embodiments, the composition may comprise from about 15.0-95.0 Ci, including from about 20.0-85.0 Ci, from about 25.0-80.0 Ci, from about 30.0-75.0 Ci, or from about 40.0-70.0 Ci of $^{64}$Cu. In other embodiments, the composition may comprise from about 15.0-100.0 Ci, including from about 20.0-100.0 Ci, from about 25.0-100.0 Ci, from about 30.0-100.0 Ci, or from about 50.0-100.0 Ci of $^{64}$Cu. The composition may comprise from about 20.0-95.0 Ci, from about 20.0-90.0 Ci, from about 20.0-85.0 Ci, from about 20.0-80.0 Ci, from about 20.0-75.0 Ci, and from about 20.0-70.0 Ci of $^{64}$Cu. In still further embodiments, the composition may comprise from about 15.0-25.0 Ci, from about 25.0-35.0 Ci, from about 35.0-45.0 Ci, from about 45.0-55.0 Ci, from about 55.0-65.0 Ci, from about 65.0-75.0 Ci, from about 75.0-85.0 Ci, and from about 85.0-95.0 Ci of $^{64}$Cu.

In other embodiments, the composition may comprise from about 15.0-110.0 Ci, including from about 20.0-110.0 Ci, from about 25.0-110.0 Ci, from about 30.0-110.0 Ci, or from about 50.0-110.0 Ci of $^{64}$Cu. The composition may comprise from about 20.0-95.0 Ci, from about 20.0-90.0 Ci, from about 20.0-85.0 Ci, from about 20.0-80.0 Ci, from about 20.0-75.0 Ci, and from about 20.0-70.0 Ci of $^{64}$Cu. In still further embodiments, the composition may comprise from about 15.0-35.0 Ci, from about 25.0-35.0 Ci, from about 35.0-45.0 Ci, from about 45.0-55.0 Ci, from about 55.0-65.0 Ci, from about 65.0-75.0 Ci, from about 75.0-85.0 Ci, and from about 85.0-95.0 Ci of $^{64}$Cu.

In still further embodiments, the composition may comprise ≥15 Ci of $^{64}$Cu, ≥17.5 Ci of $^{64}$Cu, ≥20 Ci of $^{64}$Cu, ≥22.5 Ci of $^{64}$Cu, ≥25 Ci of $^{64}$Cu, ≥30 Ci of $^{64}$Cu, ≥35 Ci of $^{64}$Cu, ≥40 Ci of $^{64}$Cu, ≥45 Ci of $^{64}$Cu, ≥50 Ci of $^{64}$Cu, ≥55 Ci of $^{64}$Cu, ≥60 Ci of $^{64}$Cu, ≥65 Ci of $^{64}$Cu, ≥70 Ci of $^{64}$Cu, ≥75 Ci of $^{64}$Cu, ≥80 Ci of $^{64}$Cu, ≥85 Ci of $^{64}$Cu, ≥90 Ci of $^{64}$Cu, ≥95 Ci of $^{64}$Cu, and/or ≥100 Ci of $^{64}$Cu at EOB. Alternatively, the composition may comprise at least about 15 Ci of $^{64}$Cu, at least about 17.5 Ci of $^{64}$Cu, at least about 20 Ci of $^{64}$Cu, at least about 25 Ci of $^{64}$Cu, at least about 30 Ci of $^{64}$Cu, at least about 35 Ci of $^{64}$Cu, at least about 40 Ci of $^{64}$Cu, at least about 45 Ci of $^{64}$Cu, at least about 50 Ci of $^{64}$Cu, at least about 55 Ci of $^{64}$Cu, at least about 60 Ci of $^{64}$Cu, at least about 65 Ci of $^{64}$Cu, at least about 70 Ci of $^{64}$Cu, at least about 75 Ci of $^{64}$Cu, at least about 80 Ci of $^{64}$Cu, at least about 85 Ci of $^{64}$Cu, at least about 90 Ci of $^{64}$Cu, at least about 95 Ci of $^{64}$Cu, or at least about 100 Ci of $^{64}$Cu. In other iterations, the composition may comprise ≥20 Ci of $^{64}$Cu and ≤100 Ci of $^{64}$Cu, ≥20 Ci of $^{64}$Cu and ≤90 Ci of $^{64}$Cu, ≥20 Ci of $^{64}$Cu and ≤80 Ci of $^{64}$Cu, ≥20 Ci of $^{64}$Cu and ≤70 Ci of $^{64}$Cu, ≥20 Ci of $^{64}$Cu and ≤60 of Ci $^{64}$Cu, ≥20 Ci of $^{64}$Cu and ≤50 Ci of $^{64}$Cu, ≥50 Ci of $^{64}$Cu and ≤100 Ci of $^{64}$Cu. The composition may also comprise ≥90.0% purity of $^{64}$Cu, ≥90.5% purity of $^{64}$Cu, ≥91.0% purity of $^{64}$Cu, ≥91.5% purity of $^{64}$Cu, ≥92.0% purity of $^{64}$Cu, ≥92.5% purity of $^{64}$Cu, ≥93.0% purity of $^{64}$Cu, ≥93.5% purity of $^{64}$Cu, ≥94.0% purity of $^{64}$Cu, ≥94.5% purity of $^{64}$Cu, ≥95.0% purity of $^{64}$Cu, ≥95.5% purity of $^{64}$Cu, ≥96.0% purity of $^{64}$Cu, ≥96.5% purity of $^{64}$Cu, ≥97.0% purity of $^{64}$Cu, ≥97.5% purity of $^{64}$Cu, ≥98.0% purity of $^{64}$Cu≥98.5% purity of $^{64}$Cu, ≥98.7% purity of $^{64}$Cu, ≥99.0% purity of $^{64}$Cu, ≥99.3% purity of $^{64}$Cu, ≥99.5% purity of $^{64}$Cu, ≥99.7% purity of $^{64}$Cu, ≥99.9% purity, or 100.0% of $^{64}$Cu. The composition may also comprise from 0 to about 5%, from 0 to about 4.5%, from 0 to about 4.0%, from 0 to about 3.5%, from 0 to about 3.0%, from 0 to about 2.5%, from 0 to about 2.0%, from 0 to about 1.5%, from 0 to about 1.0%, from 0 to about 0.7%, from 0 to about 0.5%, from 0 to about 0.3%, or from 0 to about 0.1% of metals other than $^{64}$Cu by weight of the composition. The composition may also comprise from 0 to about 5%, from 0 to about 4.5%, from 0 to about 4.0%, from 0 to about 3.5%, from 0 to about 3.0%, from 0 to about 2.5%, from 0 to about 2.0%, from 0 to about 1.5%, from 0 to about 1.0%, from 0 to about 0.7%, from 0 to about 0.5%, from 0 to about 0.3%, or from 0 to about 0.1% by weight of the composition of metal contaminants selected from the group consisting of calcium, cobalt, gallium, germanium, copper, gold, iron, lead, mercury, nickel, zinc, and combinations thereof. The composition may also comprise from 0 to about 1.0%, from 0 to about 0.7%, from 0 to about 0.5%, from 0 to about 0.3%, and/or from 0 to about 0.1% of $^{67}$Cu by weight of the composition. The composition may also comprise from 0 to about 0.01%, from 0 to about 0.005%, from 0 to about 0.001%, or from 0 to about 0.0005% of $^{67}$Cu by weight of the composition. The composition may also comprise from 0 to about 1.0%, from 0 to about 0.7%, from 0 to about 0.5%, from 0 to about 0.3%, and/or from 0 to about 0.1% of $^{67}$Cu. The composition may also comprise from 0 to about 0.01%, from 0 to about 0.005%, from 0 to about 0.001%, or from 0 to about 0.0005% of $^{68}$Zn by weight of the composition. The composition may also comprise from 0 to about 1.0%, from 0 to about 0.7%, from 0 to about 0.5%, from 0 to about 0.3%, and/or from 0 to about 0.1% of $^{67}$Cu by weight of the composition. The composition may also comprise from 0 to about 0.01%, from 0 to about 0.005%, from 0 to about 0.001%, or from 0 to about 0.0005% of any element or isotope with a mass number of 67 or greater by weight of the composition. The composition may also comprise from 0 to about 0.01%, from 0 to about 0.005%, from 0 to about 0.001%, or from 0 to about 0.0005% of any element or isotope with a mass number of 68 or greater by weight of the composition. The composition may also comprise from 0 to about 5%, from 0 to about 4.5%, from 0 to about 4.0%, from 0 to about 3.5%, from 0 to about 3.0%, from 0 to about 2.5%, from 0 to about 2.0%, from 0 to about 1.5%, from 0 to about 1.0%, from 0 to about 0.7%, from 0 to about 0.5%, from 0 to about 0.3%, or from 0 to about 0.1% by weight of the composition of radioactive or nonradioactive elements selected from the group consisting of calcium, cobalt, gallium, germanium, gold, iron, lead, mercury, nickel, zinc, and combinations thereof. The composition comprising $^{64}$Cu may have a total content of trace metals of less than about 25 ppm, less than about 10 ppm, less than about 5 ppm, less than about 1 ppm, less than about 0.5 ppm, or less than about 0.1 ppm of trace metals, the trace metals being cobalt, copper, gold, iron, lead, mercury, nickel, gallium, germanium, zinc, and combinations thereof. The composition comprising $^{64}$Cu may have a total content of less than about 25 ppm, less than about 10 ppm, less than about 5 ppm, less than about 1 ppm, less than about 0.5 ppm, or less than about 0.1 ppm of $^{67}$Cu (e.g., 0 ppm of $^{67}$Cu). The composition comprising $^{64}$Cu may have a total content of less than about 50 ppb, less than about 25 ppb, less than about 10 ppb, less than about 5 ppb, less than about 1 ppb, less than about 0.5 ppb, or less than about 0.1 ppb of $^{67}$Cu (e.g., 0 ppb of $^{67}$Cu). The composition comprising $^{64}$Cu may have a total content of less than about 25 ppm, less than about 10 ppm, less than about 5 ppm, less than about 1 ppm, less than about 0.5 ppm, or less than about 0.1 ppm of $^{68}$Zn (e.g., 0 ppm of $^{68}$Zn). The composition comprising $^{64}$Cu may have a total content of less than about 50 ppb, less than about 25 ppb, less than about 10 ppb, less than about 5 ppb, less than about 1 ppb, less than about 0.5 ppb, or less than about 0.1 ppb of $^{68}$Zn (e.g., 0 ppb of $^{68}$Zn). The composition comprising $^{64}$Cu may have a total content of less than about 25 ppm, less than about 10 ppm, less than about 5 ppm, less than about 1 ppm, less than about 0.5 ppm, or less than about 0.1 ppm of any element or isotope with a mass number of 67 or greater. The composition comprising $^{64}$Cu may have a total content of less than about 50 ppb, less than about 25 ppb, less than about 10 ppb, less than about 5 ppb, less than about 1 ppb, less than about 0.5 ppb, or less than about 0.1 ppb of any element or isotope with a mass number of 67 or greater. The composition comprising $^{64}$Cu may have a total content of less than about 25 ppm, less than about 10 ppm, less than about 5 ppm, less than about 1 ppm, less than about 0.5 ppm, or less than about 0.1 ppm of any element or isotope with a mass number of 68 or greater. The composition comprising $^{64}$Cu may have a total content of less than about 50 ppb, less than about 25 ppb, less than about 10 ppb, less than about 5 ppb, less than about 1 ppb, less than about 0.5 ppb, or less than about 0.1 ppb of any element or isotope with a mass number of 68 or greater.

The composition may also comprise from 0 to about 1.0%, from 0 to about 0.7%, from 0 to about 0.5%, from 0 to about 0.3%, and/or from 0 to about 0.1% of $^{67}$Cu by weight of the composition. The composition may also comprise from 0 to about 0.01%, from 0 to about 0.005%, from 0 to about 0.001%, or from 0 to about 0.0005% of $^{67}$Cu by weight of the composition. The composition may also comprise from 0 to about 1.0%, from 0 to about 0.7%, from 0 to about 0.5%, from 0 to about 0.3%, and/or from 0 to about 0.1% of $^{67}$Cu by weight of the composition. The composition may also comprise from 0 to about 0.01%, from 0 to about 0.005%, from 0 to about 0.001%, or from 0 to about 0.0005% of $^{68}$Zn by weight of the composition. The composition may also comprise from 0 to about 1.0%, from 0 to about 0.7%, from 0 to about 0.5%, from 0 to about 0.3%, and/or from 0 to about 0.1% of $^{67}$Cu by weight of the composition. The composition may also comprise from 0 to about 0.01%, from 0 to about 0.005%, from 0 to about 0.001%, or from 0 to about 0.0005% by weight of the composition of any element or isotope with a mass number of 67 or greater. The composition may also comprise from 0 to about 0.01%, from 0 to about 0.005%, from 0 to about 0.001%, or from 0 to about 0.0005% by weight of the composition of any element or isotope with a mass number of 68 or greater.

The composition comprising $^{64}$Cu may have a total content of less than or equal to about 10 μg/mL, less than or equal to about 9 μg/mL, less than or equal to about 8 μg/mL, less than or equal to about 7 μg/mL, less than or equal to about 6 μg/mL, less than or equal to about 5 μg/mL, less than or equal to about 4 μg/mL, less than or equal to about 3 μg/mL, less than or equal to about 2 μg/mL, less than or equal to about 1 μg/mL, or about 0 μg/mL individually of copper, gold, iron, lead, mercury, nickel, gallium, germanium, and/or zinc. The composition comprising $^{64}$Cu may have a total content of less than or equal to about 10 μg/mL, less than or equal to about 9 μg/mL, less than or equal to about 8 μg/mL, less than or equal to about 7 μg/mL, less than or equal to about 6 μg/mL, less than or equal to about 5 μg/mL, less than or equal to about 4 μg/mL, less than or equal to about 3 μg/mL, less than or equal to about 2 μg/mL, less than or equal to about 1 μg/mL, or about 0 μg/mL of $^{67}$Cu. The composition comprising $^{64}$Cu may have a total content of less than or equal to about 10 μg/mL, less than or equal to about 9 μg/mL, less than or equal to about 8 μg/mL, less than or equal to about 7 μg/mL, less than or equal to about 6 μg/mL, less than or equal to about 5 μg/mL, less than or equal to about 4 μg/mL, less than or equal to about 3 μg/mL, less than or equal to about 2 μg/mL, less than or equal to about 1 μg/mL, or about 0 μg/mL of $^{68}$Zn. The composition comprising $^{64}$Cu may have a total content of less than or equal to about 10 μg/mL, less than or equal to about 9 μg/mL, less than or equal to about 8 μg/mL, less than or equal to about 7 μg/mL, less than or equal to about 6 μg/mL, less than or equal to about 5 μg/mL, less than or equal to about 4 μg/mL, less than or equal to about 3 μg/mL, less than or equal to about 2 μg/mL, less than or equal to about 1 μg/mL, or about 0 μg/mL of any element or isotope with a mass number of 67 or greater. The composition comprising $^{64}$Cu may have a total content of less than or equal to about 10 μg/mL, less than or equal to about 9 μg/mL, less than or equal to about 8 μg/mL, less than or equal to about 7 μg/mL, less than or equal to about 6 μg/mL, less than or equal to about 5 μg/mL, less than or equal to about 4 μg/mL, less than or equal to about 3 μg/mL, less than or equal to about 2 μg/mL, less than or equal to about 1 μg/mL, or about 0 μg/mL of any element or isotope with a mass number of 68 or greater. The composition comprising $^{64}$Cu may have a total metals content of less than or equal to about 10 μg/mL, less than or equal to about 9 μg/mL, less than or equal to about 8 μg/mL, less than or equal to about 7 μg/mL, less than or equal to about 6 μg/mL, less than or equal to about 5 μg/mL, less than or equal to about 4 μg/mL, less than or equal to about 3 μg/mL, less than or equal to about 2 μg/mL, less than or equal to about 1 μg/mL, or about 0 μg/mL for all trace metals combined, wherein the trace metals are selected from the group consisting of copper, gold, iron, lead, mercury, nickel, gallium, germanium, zinc, and combinations thereof. As such, the compositions may be characterized as being substantially free from metals other than $^{64}$Cu. The compositions of the present invention may further be characterized as pharmaceutical grade, suitable for human administration, and/or suitable for administration to a human subject in need thereof. The compositions of the present invention may be suitable for administration to a human subject in need thereof once divided into a smaller aliquot.

In other embodiments, the compositions may comprise from about 2 Ci to about 5 Ci of $^{64}$Cu at EOB, from about 5 Ci to about 9 Ci of $^{64}$Cu at EOB, from about 9 Ci to about 15 Ci at EOB, or from about 15 Ci to about 17 Ci at EOB. In further embodiments, the compositions may comprise from about 2 Ci to about 5 Ci of $^{64}$Cu (at EOB) after about 2-4 h of bombardment, or about 5 Ci to about 9 Ci of $^{64}$Cu (at EOB) after about 6 h of bombardment, or about 4 Ci to about 15 Ci of $^{64}$Cu (at EOB) after about 8-16 h of bombardment. In further embodiments, the compositions may comprise from about 15 Ci to about 20 Ci of $^{64}$Cu at EOB, or about 20 Ci to about 30 Ci of $^{64}$Cu at EOB, or about 30 Ci to about 40 Ci of $^{64}$Cu at EOB, or about 40 Ci to about 50 Ci of $^{64}$Cu at EOB, or about 50 Ci to about 60 Ci of $^{64}$Cu at EOB for a single bombarded target after 10-16 hours. In further embodiments, the compositions may comprise from about 60 Ci to about 70 Ci of $^{64}$Cu at EOB, or about 70 Ci to about 80 Ci of $^{64}$Cu at EOB, or about 80 Ci to about 90 Ci of $^{64}$Cu at EOB, or about 90 Ci to about 100 Ci of $^{64}$Cu at EOB, or about 100 Ci to about 110 Ci of $^{64}$Cu at EOB, or about 110 Ci to about 120 Ci of $^{64}$Cu at EOB, or greater than 120 Ci of $^{64}$Cu at EOB for a dual target configuration after about 8-20 h of bombardment.

Each of the compositions disclosed herein may be produced during a single particle accelerator (e.g. cyclotron) run and/or may be obtained from a single particle accelerator (e.g. cyclotron) target bombardment. Dual targets, plural targets, or multiple targets may also be used. Alternatively, each of the compositions disclosed herein may be produced during a multiple-particle accelerator (e.g. cyclotron) target bombardment. In some embodiments, a particle accelerator (e.g. cyclotron) is employed as the particle accelerator. In some other embodiments, a linear accelerator (linacs) is employed as the particle accelerator. As a non-limiting example of a $^{64}$Cu composition production schedule, production of a $^{64}$Cu composition begins with the particle accelerator (e.g. cyclotron) bombardment of a target beginning on Day 0 until EOB. The EOB time may range from the afternoon to the evening of Day 0 or even earlier or longer in some instances. At EOB, the $^{64}$Cu is stripped or removed from the target and processed to form a $^{64}$Cu composition that has a high level of radionuclidic purity. The radionuclidic purity of the $^{64}$Cu composition is typically measured on Day 1, which is referred to as the Raw Material Calibration Time. In some cases, the raw material calibration time may occur about 6:00 am on Day 1. The $^{64}$Cu composition that is produced using the $^{64}$Cu composition is then sent to a location where it is administered to a patient on Day 2.

The radionuclidic purity of the $^{64}$Cu compositions disclosed herein is generally greater than about 95.0%, greater than about 96%, greater than about 97.0%, greater than about 98.0%, greater than about 98.5%, greater than about 99%, greater than about 99.5%, or greater than about 99.9% at the Raw Material Calibration Time.

As time passes, short-lived radioisotopes present in the $^{64}$Cu compositions will decay away which causes the radionuclidic purity of the $^{64}$Cu compositions to increase. Thus, another calculation of the radionuclidic purity is determined for $^{64}$Cu composition at the Drug Product Calibration Time, which is a set time on Day 2 that occurs shortly before the expiration of the $^{64}$Cu radiopharmaceutical. In some instances, the Drug Product Calibration Time is calculated for the radionuclidic purity of the $^{64}$Cu composition that exists at 5:00 pm on Day 2, the day when the $^{64}$Cu radiopharmaceutical is administered to the patient.

The radionuclidic purity of the $^{64}$Cu compositions disclosed herein is generally greater than about greater than about 99%, greater than about 99.5%, greater than about 99.7%, greater than about 99.8%, or greater than about 99.9% at the Drug Product Calibration Time.

The specific activity of the $^{64}$Cu in the compositions disclosed herein may be greater than 25 mCi $^{64}$Cu/μg Cu, greater than 30 mCi $^{64}$Cu/μg Cu, greater than 35 mCi $^{64}$Cu/μg Cu, greater than 40 mCi $^{64}$Cu/μg Cu, greater than 45 mCi $^{64}$Cu/μg Cu, greater than 50 mCi $^{64}$Cu/μg Cu, greater than 75 mCi $^{64}$Cu/μg Cu, or greater than 100 mCi $^{64}$Cu/μg Cu at EOB. The specific activity of the $^{64}$Cu in the compositions disclosed herein may be greater than or equal to 3800 mCi $^{64}$Cu/μg Cu greater than or equal to 4800 mCi $^{64}$Cu/μg Cu, greater than or equal to 5800 mCi $^{64}$Cu/μg Cu, or greater than or equal to 6800 mCi $^{64}$Cu/μg Cu at EOB. Those skilled in the art understand that the specific activities of the compositions decrease over time. In various embodiments, the specific activity may range from about 30 mCi $^{64}$Cu/μg Cu to about 100 mCi $^{64}$Cu/μg Cu, from about 40 mCi $^{64}$Cu/μg Cu to about 100 mCi $^{64}$Cu/μg Cu, from about 50 mCi $^{64}$Cu/μg Cu to about 200 mCi $^{64}$Cu/μg Cu, from about 100 mCi $^{64}$Cu/μg Cu to about 200 mCi $^{64}$Cu/μg Cu, from about 100 mCi $^{64}$Cu/μg Cu to about 250 mCi $^{64}$Cu/μg Cu, from about 100 mCi $^{64}$Cu/μg Cu to about 300 mCi $^{64}$Cu/μg Cu, from about 100 mCi $^{64}$Cu/μg Cu to about 400 mCi $^{64}$Cu/μg Cu, from about 100 mCi $^{64}$Cu/μg Cu to about 500 mCi $^{64}$Cu/μg Cu, from about 150 mCi $^{64}$Cu/μg Cu to about 200 mCi $^{64}$Cu/μg Cu, from about 150 mCi $^{64}$Cu/μg Cu to about 250 mCi $^{64}$Cu/μg Cu, from about 150 mCi $^{64}$Cu/μg Cu to about 300 mCi $^{64}$Cu/μg Cu, from about 150 mCi $^{64}$Cu/μg Cu to about 400 mCi $^{64}$Cu/μg Cu, from about 150 mCi $^{64}$Cu/μg Cu to about 500 mCi $^{64}$Cu/μg Cu, from about 500 mCi $^{64}$Cu/μg Cu to about 1000 mCi $^{64}$Cu/μg Cu, from about 1000 mCi $^{64}$Cu/μg Cu to about 1500 mCi $^{64}$Cu/μg Cu, from about 1500 mCi $^{64}$Cu/μg Cu to about 2500 mCi $^{64}$Cu/μg Cu, from about 2500 mCi $^{64}$Cu/μg Cu to about 3000 mCi $^{64}$Cu/μg Cu, or from about 3000 mCi $^{64}$Cu/μg Cu to about 3800 mCi $^{64}$Cu/μg Cu. In other embodiments, the specific activity may range from about 50 mCi $^{64}$Cu/μg Cu to about 3800 mCi $^{64}$Cu/μg Cu, from about 75 mCi $^{64}$Cu/μg Cu to about 3800 mCi $^{64}$Cu/μg Cu, from about 100 mCi $^{64}$Cu/μg Cu to about 3800 mCi $^{64}$Cu/μg Cu, from about 125 mCi $^{64}$Cu/μg Cu to about 3800 mCi $^{64}$Cu/μg Cu, from about 150 mCi $^{64}$Cu/μg Cu to about 3800 mCi $^{64}$Cu/μg Cu, from about 175 mCi $^{64}$Cu/μg Cu to about 3800 mCi $^{64}$Cu/μg Cu, from about 200 mCi $^{64}$Cu/μg Cu to about 3800 mCi $^{64}$Cu/μg Cu, from about 300 mCi $^{64}$Cu/μg Cu to about 3800 mCi $^{64}$Cu/μg Cu, from about 350 mCi $^{64}$Cu/μg Cu to about 3800 mCi $^{64}$Cu/μg Cu, from about 400 mCi $^{64}$Cu/μg Cu to about 3800 mCi $^{64}$Cu/μg Cu, from about 500 mCi $^{64}$Cu/μg Cu to about 3800 mCi $^{64}$Cu/μg Cu, from about 750 mCi $^{64}$Cu/μg Cu to about 3800 mCi $^{64}$Cu/μg Cu, from about 1000 mCi $^{64}$Cu/μg Cu to about 3800 mCi $^{64}$Cu/μg Cu, from about 1500 mCi $^{64}$Cu/μg Cu to about 3800 mCi $^{64}$Cu/μg Cu, or from about 2000 mCi $^{64}$Cu/μg Cu to about 3800 mCi $^{64}$Cu/μg Cu. In other embodiments, the specific activity may range from about 50 mCi $^{64}$Cu/μg Cu to about 3800 mCi $^{64}$Cu/μg Cu, from about 75 mCi $^{64}$Cu/μg Cu to about 3800 mCi $^{64}$Cu/μg Cu, from about 100 mCi $^{64}$Cu/μg Cu to about 3800 mCi $^{64}$Cu/μg Cu, from about 300 mCi $^{64}$Cu/μg Cu to about 3800 mCi $^{64}$Cu/μg Cu, from about 350 mCi $^{64}$Cu/μg Cu to about 3800 mCi $^{64}$Cu/μg Cu, from about 400 mCi $^{64}$Cu/μg Cu to about 3800 mCi $^{64}$Cu/μg Cu, from about 500 mCi $^{64}$Cu/μg Cu to about 3800 mCi $^{64}$Cu/μg Cu, from about 750 mCi $^{64}$Cu/μg Cu to about 3800 mCi $^{64}$Cu/μg Cu, from about 1000 mCi $^{64}$Cu/μg Cu to about 3800 mCi $^{64}$Cu/μg Cu, from about 1500 mCi $^{64}$Cu/μg Cu to about 3800 mCi $^{64}$Cu/μg Cu, from about 2000 mCi $^{64}$Cu/μg Cu to about 4000 mCi $^{64}$Cu/μg Cu, or from about 2000 mCi $^{64}$Cu/μg Cu to about 6000 mCi $^{64}$Cu/μg Cu. In some embodiments, the specific activity may range from about 40 $^{64}$Cu/μg Cu to about 2300 mCi $^{64}$Cu/μg Cu. In other embodiments, the specific activity may range from about 50 mCi $^{64}$Cu/μg Cu to about 4800 mCi $^{64}$Cu/μg Cu, from about 75 mCi $^{64}$Cu/μg Cu to about 4800 mCi $^{64}$Cu/μg Cu, from about 100 mCi $^{64}$Cu/μg Cu to about 4800 mCi $^{64}$Cu/μg Cu, from about 50 mCi $^{64}$Cu/μg Cu to about 5800 mCi $^{64}$Cu/μg Cu, from about 75 mCi $^{64}$Cu/μg Cu to about 5800 mCi $^{64}$Cu/μg Cu, from about 100 mCi $^{64}$Cu/μg Cu to about 5800 mCi $^{64}$Cu/μg Cu, from about 50 mCi $^{64}$Cu/μg Cu to about 6800 mCi $^{64}$Cu/μg Cu, from about 75 mCi $^{64}$Cu/μg Cu to about 6800 mCi $^{64}$Cu/μg Cu, or from about 100 mCi $^{64}$Cu/μg Cu to about 6800 mCi $^{64}$Cu/μg Cu. In further embodiments, the specific activity may range from about 40 $^{64}$Cu/μg Cu to about 500 mCi $^{64}$Cu/μg Cu at EOB, from about 500 $^{64}$Cu/μg Cu to about 1000 mCi $^{64}$Cu/μg Cu at EOB, or from about 1000 $^{64}$Cu/μg Cu to about 2300 mCi $^{64}$Cu/μg Cu at EOB.

In general, the $^{64}$Cu compositions disclosed herein comprise low levels of metal contaminants. The metal contaminants may be radioactive or nonradioactive. The metal contaminants may include calcium, cobalt, copper, gold, iron, lead, mercury, nickel, and zinc. For example, the 2 M HCl eluate described below in Example 5 comprises 0 ppm Au, 0 ppm Hg, <0.02 ppm Co, <0.2 ppm Fe, <0.4 ppm Pb, <0.5 ppm Ni, <0.6 ppm Cu, and <1.5 ppm Zn. In general, the $^{64}$Cu compositions disclosed herein comprise less than about 6 ppm total, less than about 5 ppm total, less than about 4 ppm total, or less than about 3 ppm total of cobalt, copper, gold, iron, lead, mercury, nickel, and zinc. In general, the $^{64}$Cu compositions disclosed herein comprise less than about 6 ppm total, less than about 5 ppm total, less than about 4 ppm total, or less than about 3 ppm total of cobalt, $^{67}$Cu, gold, iron, lead, mercury, nickel, and/or zinc. In general, the $^{64}$Cu compositions disclosed herein comprise less than about 6 ppm total, less than about 5 ppm total, less than about 4 ppm total, or less than about 3 ppm total of $^{68}$Zn. The $^{64}$Cu compositions disclosed herein may comprise less than about 6 ppm total, less than about 5 ppm total, less than about 4 ppm total, less than about 3 ppm total, less than about 2 ppm total, less than about 1 ppm total, or less than about 0.5 ppm total of any element or isotope with a mass number of 67 or greater. The $^{64}$Cu compositions disclosed herein may comprise less than about 6 ppm total, less than about 5 ppm total, less than about 4 ppm total, less than about 3 ppm total, less than about 2 ppm total, less than about 1 ppm total, or less than about 0.5 ppm total of any element or isotope with a mass number of 68 or greater.

The $^{64}$Cu compositions disclosed herein may comprise a solution of hydrochloric acid (HCl) such that the solution comprises $^{64}CuCl_2$. The solution of HCl may comprise from about 0.005 M to about 3.0 M of HCl. In some embodiments, the solution of HCl may comprise HCl at a molarity from about 0.01 M to about 2.0 M, from about 0.02 M to about 1.0 M, or from about 0.04 M to about 0.06 M. In specific embodiments, the $^{64}$Cu compositions may comprise a solution of about 0.05 M HCl.

In some embodiments, the compositions disclosed herein may further comprise at least one bifunctional chelating agent such that the copper may complex with the bifunctional chelating agent. The bifunctional chelating agent may be a macrocyclic compound, a bridged macrocyclic compound, a bicyclic compound, or an acyclic compound. Examples of suitable bifunctional chelating agents include 1,4,7,10-tetraazacyclododecane-N,N',N'',N'''-tetraacetic acid (DOTA), DOTAGA, 1,4,7-triazacyclononane-1,4,7-triacetic acid (NOTA), 1,4,8,11-tetraazacyclotetradecane-N,N', N'', N'-tetraacetic acid (TETA), 5-(8-methyl-3,6,10,13,16,19-hexaaza-bicyclo[6.6.6]icosan-1-ylamino)-5-oxopentanoic acid (MeCOSar), 5-((8-amino-3,6,10,13,16,19-hexaazabicyclo(6.6.6) eicos-1-yl)amino)-5-oxopentanoic acid (sar-CO2H), di- and trimethylthiazolyl 1,4,7-triazacyclononane (TACN), diethylenetriaminepentaacetic acid (DTPA), 3,6,9,15-tetraazabicyclo[9.3.1]pentadeca-1(15), 11,13-triene-3,6,9-triacetic acid (PCTA), analogs, or derivatives thereof. In specific embodiments, the bifunctional chelating agent may be DOTA or DOTAGA. The bifunctional chelating agent may be linked to a cell targeting agent such as a peptide, protein, antibody, or fragment thereof.

(II) Processes for Producing Copper-64—Purification by Ion Exchange Chromatography Also provided herein are processes for preparing $^{64}$Cu from $^{64}$Ni, wherein the $^{64}$Cu has high specific activity, high chemical purity, and high radionuclidic purity. $^{64}$Cu is formed when a $^{64}$Ni nucleus captures a proton and then emits a neutron as shown in the following reaction, $^{64}Ni + p \rightarrow {}^{64}Cu + n$. Proton-induced production of $^{64}$Cu occurs in a particle accelerator (e.g. cyclotron). In some embodiments, the processes disclosed herein may be "non-carrier added" in that no inactive material or carrier is intentionally added during the production process. In other embodiments, the processes disclosed herein may optionally be "carrier added" in that an inactive material or carrier (e.g., elemental copper) may be intentionally added during the production process.

The processes disclosed herein are able to produce $^{64}$Cu in high yield and with high specific activity in one particle accelerator (e.g. cyclotron run). Stated another way, high yield and high specific activity compositions comprising $^{64}$Cu are obtainable from a single cyclotron target during one cyclotron run, dual targets during a single cyclotron run, multiple cyclotron targets during one cyclotron run, or one target or plural targets (e.g., multiple targets) from plural cyclotron runs (e.g., multiple cyclotron runs). Depending upon the various parameters, yields as high as about 40 Ci to about 110 Ci of $^{64}$Cu may be achieved using the processes disclosed herein.

The production process comprises bombarding a $^{64}$Ni target with a proton beam such that $^{64}$Cu is produced, and cobalt-61 ($^{61}$Co) is produced as a by-product. The next step of the process comprises stripping the metals from the bombarded target with a strong acid (e.g., 6 M to about 12.1 M HCl) to form a strip solution. The last step of the production process comprises purifying the $^{64}$Cu by ion exchange chromatography. The ion exchange chromatography process comprises (i) passing the strip solution through a column comprising an ion exchange resin such that $^{64}$Cu binds to the ion exchange resin and $^{64}Ni$ passes through the column as a flow-through, (ii) rinsing the column with a volume of HCl having a molarity of about 3 M to about 6 M and (iii) adding a volume of HCl having a molarity of about 0.5 M to about 3 M to the column to elute the $^{64}Cu$ from the ion exchange resin and collecting an eluate comprising $^{64}Cu$. FIG. 1 presents a schematic of an iteration of the process.

(a) Bombarding the Target

The proton-induced production of $^{64}Cu$ via a $^{64}Ni$ target occurs in a particle accelerator (e.g. cyclotron). Suitable cyclotrons include low-energy cyclotrons (e.g., 3-20 MeV energy range) and medium-energy cyclotrons (e.g., 15-30 MeV range). The targets of said cyclotrons may be curved or flat. As detailed in Example 3 below, the present disclosure reveals that cyclotron targets may be bombarded at high currents with approximately 12 MeV to 13 MeV protons. Suitable cyclotrons and cyclotron targets are also described below in Section (III) (a) and Section (IV) (a). In some embodiments, other particle accelerators including linear accelerators (linacs) may be employed.

The cyclotron target may comprise a copper layer that has been electroplated to a thickness of about 5 μm to about 10 μm, about 10 μm to about 25 μm, about 25 μm to about 50 μm, about 50 μm to about 75 μm, or about 75 μm to about 100 μm (e.g., on an enriched $^{64}Ni$ layer). Alternatively, the cyclotron target may comprise a copper base layer that has been electroplated with gold to a thickness of about 50 μm. The gold-plated cyclotron target then may be plated with enriched $^{64}Ni$. The $^{64}Ni$ may be enriched to about 98%, about 99%, about 99.6%, or about 99.9% $^{64}Ni$. The targeting mass of the plated material may range from about 40 mg to about 800 mg, about 50 mg to about 790 mg, about 60 mg to about 780 mg, about 70 mg to about 770 mg, about 80 mg to about 760 mg, about 90 mg to about 750 mg, about 100 mg to about 740 mg, about 110 mg to about 730 mg, about 120 mg to about 720 mg, about 130 mg to about 710 mg, about 120 mg to about 700 mg, about 110 mg to about 690 mg, 120 mg to about 680 mg, about 130 mg to about 670 mg, about 140 mg to about 660 mg, about 150 mg to about 650 mg, about 160 mg to about 640 mg, about 170 mg to about 630 mg, about 180 mg to about 620 mg, about 190 mg to about 610 mg, about 200 mg to about 600 mg, about 210 mg to about 590 mg, 220 mg to about 580 mg, about 230 mg to about 570 mg, about 240 mg to about 560 mg, about 250 mg to about 550 mg, about 260 mg to about 540 mg, about 270 mg to about 530 mg, about 280 mg to about 520 mg, about 290 mg to about 510 mg, about 300 mg to about 500 mg, about 310 mg to about 490 mg, 320 mg to about 480 mg, about 330 mg to about 470 mg, about 340 mg to about 460 mg, about 350 mg to about 450 mg, about 360 mg to about 440 mg, about 370 mg to about 430 mg, about 380 mg to about 420 mg, about 390 mg to about 410 mg, from about 45 mg to about 55 mg, from about 48 mg to about 52 mg, or about 50 mg. In some specific embodiments, the targeting mass of enriched $^{64}Ni$ may be about 550 mg, about 551 mg, about 552 mg, about 553 mg, about 554 mg, about 555 mg, about 556 mg, about 557 mg, about 558 mg, about 559 mg, about 600 mg, about 601 mg, about 602 mg, about 603 mg, about 604 mg, about 605 mg, about 606 mg, about 607 mg, about 608 mg, about 609 mg, about 610 mg, about 611 mg, about 612 mg, about 613 mg, about 614 mg, about 615 mg, about 616 mg, about 617 mg, about 618 mg, about 619 mg, about 620 mg, about 621 mg, about 622 mg, about 623 mg, about 624 mg, about 625 mg, about 626 mg, about 627 mg, about 628 mg, about 629 mg, about 630 mg, about 631 mg, about 632 mg, about 633 mg, about 634 mg, about 635 mg, about 636 mg, about 637 mg, about 638 mg, about 639 mg, about 640 mg, about 641 mg, about 642 mg, about 643 mg, about 644 mg, about 645 mg, about 646 mg, about 647 mg, about 648 mg, about 649 mg, about 650 mg, about 651 mg, about 652 mg, about 653 mg, about 654 mg, about 655 mg, about 656 mg, about 657 mg, about 658 mg, about 659 mg, about 660 mg, about 661 mg, about 662 mg, about 663 mg, about 664 mg, about 665 mg, about 666 mg, about 667 mg, about 668 mg, about 669 mg, about 670 mg, about 671 mg, about 672 mg, about 673 mg, about 674 mg, about 675 mg, about 676 mg, about 677 mg, about 678 mg, about 679 mg, about 680 mg, about 681 mg, about 682 mg, about 683 mg, about 684 mg, about 685 mg, about 686 mg, about 687 mg, about 688 mg, about 689 mg, about 690 mg, about 691 mg, about 692 mg, about 693 mg, about 694 mg, about 695 mg, about 696 mg, about 697 mg, about 698 mg, about 699 mg, about 700 mg, about 701 mg, about 702 mg, about 703 mg, about 704 mg, about 705 mg, about 706 mg, about 707 mg, about 708 mg, about 709 mg, about 710 mg, about 711 mg, about 712 mg, about 713 mg, about 714 mg, about 615 mg, about 616 mg, about 617 mg, about 618 mg, about 619 mg, about 620 mg, about 721 mg, about 722 mg, about 723 mg, about 724 mg, about 725 mg, about 726 mg, about 727 mg, about 728 mg, about 729 mg, about 730 mg, about 731 mg, about 732 mg, about 733 mg, about 734 mg, about 735 mg, about 736 mg, about 737 mg, about 738 mg, about 739 mg, about 740 mg, about 741 mg, about 742 mg, about 743 mg, about 744 mg, about 745 mg, about 746 mg, about 747 mg, about 748 mg, about 749 mg, or about 750 mg. In one example, the targeting mass is 450-750 mg.

The plating area may range from about 3.0 $cm^2$ to about 25.0 $cm^2$, from about 3.5 $cm^2$ to about 24.5 $cm^2$, from about 4.0 $cm^2$ to about 24.0 $cm^2$, from about 4.5 $cm^2$ to about 23.5 $cm^2$, from about 5.0 $cm^2$ to about 23.0 $cm^2$, from about 5.5 $cm^2$ to about 22.5 $cm^2$, from about 6.0 $cm^2$ to about 22.0 $cm^2$, from about 6.5 $cm^2$ to about 21.5 $cm^2$, from about 7.0 $cm^2$ to about 21.0 $cm^2$, from about 7.5 $cm^2$ to about 20.5 $cm^2$, from about 8.0 $cm^2$ to about 20.0 $cm^2$, from about 8.5 $cm^2$ to about 19.5 $cm^2$, from about 9.0 $cm^2$ to about 19.0 $cm^2$, from about 9.5 $cm^2$ to about 18.5 $cm^2$, from about 10.0 $cm^2$ to about 18.0 $cm^2$, from about 10.5 $cm^2$ to about 17.5 $cm^2$, from about 11.0 $cm^2$ to about 17.0 $cm^2$, from about 11.5 $cm^2$ to about 16.5 $cm^2$, from about 12.0 $cm^2$ to about 16.0 $cm^2$, from about 12.5 $cm^2$ to about 15.5 $cm^2$, from about 13.0 $cm^2$ to about 15.0 $cm^2$, from about 13.5 $cm^2$ to about 14.5 $cm^2$, from about 13.0 $cm^2$ to about 14.0 $cm^2$, from about 3.2 $cm^2$ to about 4.8 $cm^2$, from about 3.6 $cm^2$ to about 4.4 $cm^2$, from about 3.8 $cm^2$ to about 4.2 $cm^2$, or 4.0 $cm^2$. In one example, the plating area is about 20 $cm^2$, 21 $cm^2$, 22 $cm^2$, 23 $cm^2$, 24 $cm^2$, or 25 $cm^2$. In another example, the plating area is 23 $cm^2$ and the targeting mass is 550-750 mg.

The plated layer of $^{64}Ni$ may have a thickness from about 8 μm to about 20 μm, from about 10 μm to about 18 μm, from about 12 μm to about 16 μm, or about 14 μm.

In the processes disclosed herein, the $^{64}Ni$ target area is bombarded with low energy protons to produce $^{64}Cu$. In general, the proton beam of the cyclotron is adjusted to have an energy of less than about 20 MeV, less than about 25 MeV, or less than about 30 MeV on the target. In some embodiments, the energy of the proton beam at the target can range from about 5 MeV to about 20 MeV, about 5 MeV to about 30 MeV, about 10 MeV to about 30 MeV, about 15 MeV to about 30 MeV, from about 7 MeV to about 17 MeV, from about 10 MeV to about 15 MeV, from about 11 MeV to about 14 MeV, from about 10 MeV to about 14 MeV, from about 11 MeV to about 12 MeV, from about 12 MeV to about 13 MeV, from about 15 MeV to about 20 MeV, from about 17 MeV to about 22 MeV, from about 20 MeV to about 25 MeV, from about 22 MeV to about 27 MeV, or from about 25 MeV to about 30 MeV. In specific embodiments, the actual beam energy at the target is about 12 MeV. In other specific embodiments, the actual beam energy at the target is about 13 MeV.

The current of the proton beam may range up to about 1200 μA. In some embodiments, the current of the proton beam may range from about 10 μA to about 30 μA, about 30 μA to about 100 μA, from about 100 μA to about 175 μA, from about 175 μA to about 250 μA, from about 250 μA to about 300 μA, from about 300 μA to about 350 μA, from about 350 μA to about 400 μA, from about 450 μA to about 500 μA, from about 550 μA to about 600 μA, from about 600 μA to about 650 μA, from about 650 μA to about 700 μA, from about 700 μA to about 750 μA, from about 750 μA to about 800 μA, from about 800 μA to about 850 μA, from about 850 μA to about 900 μA, from about 900 μA to about 950 μA, from about 950 μA to about 1000 μA, from about 1000 μA to about 1050 μA, from about 1050 μA to about 1100 μA, or from about 1500 μA to about 1200 μA. In some embodiments, the current of the proton beam may be split between two targets or a plurality of targets. In specific embodiments, the current of the proton beam to each target may range from about 190 μA to about 230 μA, from about 200 μA to about 225 μA, from about 250 μA to about 300 μA, from about 300 μA to about 350 μA, or from about 350 μA to about 410 μA, from about 405 μA to about 410 μA, about 410 μA to about 420 μA, about 420 μA to about 440 μA, 440 μA to about 460 μA, or about 460 μA to about 480 μA. In specific embodiments, the current of the proton beam may be about 300 μA, about 400 μA, about 408 μA, about 410 μA or about 500 μA.

The proton beam hits the target area at an angle. In some embodiments, the angle of the proton beam may range from about 1° to about 20°, from about 2° to about 10°, from 2° to about 8°, from about 3° to about 6°, or about 4°. In other embodiments, the angle of the proton beam may be tangential to the target area.

In some embodiments, the target radius of the proton beam may range from about 24 cm to about 32 cm, from about 26 cm to about 30 cm, from about 27 cm to about 29 cm, or about 28 cm. In certain embodiments, the target radius of the proton beam may be about 27.9 cm. In some embodiments, the proton beam may strike about 20-25%, about 15-30%, or about 10-35% of the entire target face. In other embodiments, the total area covered by the beam may range from about 1 $cm^2$ to about 16 $cm^2$, from about 2 $cm^2$ to about 8 $cm^2$, from about 3 $cm^2$ to about 6 $cm^2$, or from about 3.5 $cm^2$ to about 4.5 $cm^2$. In still other embodiments, the total area covered by the beam may be about 3.0 $cm^2$, about 3.5 $cm^2$, about 4.0 $cm^2$, about 4.5 $cm^2$, about 5.0 $cm^2$, or about 6.0 $cm^2$.

The time of bombardment may range from about 0.5 h to about 24 h. In some embodiments, the time of bombardment may range from about 0.5 h to about 8 h, from about 8 h to about 16 h, or from about 16 h to about 24 h. In other embodiments, the bombardments time may range from about 1 h to about 8 h, from about 2 h to about 8 h, from about 4 h to about 8 h, from about 5 h to about 8 h, or about from 5 h to about 7 h. In certain embodiments, the bombardment time may range from about 1 h to about 6 h, from about 2 h to about 6 h, from about 3 h to about 6 h, from about 4 h to about 6 h, or from about be about 5 h to about 6 h. In other embodiments, the time of bombardment may be less than 8 h, less than 7.5 h, less than 7 h, less than 6.5 h, less than 6 h, less than 5.5 h, less than 5.0 h, less than 4.5 h, or less than 4 h. In further embodiments, the time of bombardment may be about 1 h, about 2 h, about 3 h, about 4 h, about 5 h, about 6 h, about 7 h, or about 8 h. In specific embodiments, the time of bombardment may range from about 2 h to about 4 h or the time of bombardment may be about 6 h.

In specific embodiments, a cyclotron target comprising 50 mg $^{64}Ni$ is bombarded with a proton beam having an energy of about 12 MeV and a beam current of 200 μA or 225 μA for about 1 h, 2 h, 3 h, 4 h, or 6 h. In other embodiments, a cyclotron target comprising 50 mg of $^{64}Ni$ is bombarded with a proton beam having an energy of about 12 MeV and a beam current of 100 μA or 225 μA for 2 h to 16 h. In specific embodiments, a cyclotron target comprising $^{64}Ni$ is with a proton beam having an energy of about 10 MeV to about 16 MeV and a beam current of 150 μA to 408 μA, 200 μA to 408 μA, 250 μA to 408 μA, 275 μA to 408 μA, or 300 μA to 408 μA, for about 1 h to 2 h, about 1 h to 3 h, about 1 h to 4 h, about 1 h to 6 h, about 1 h to 8 h, about 1 h to 10 h, or about 1 h to 20 h.

The bombarded target may comprise from about 2 Ci to about 15 Ci of $^{64}Cu$ at the end of bombardment (EOB). The bombarded target also comprises unreacted $^{64}Ni$ and $^{61}Co$ that is also produced during the bombardment process. In various embodiments, the bombarded target may comprise from about 2 Ci to about 3 Ci, from about 3 Ci to about 4 Ci, from about 4 Ci to about 5 Ci, from about 5 Ci to about 6 Ci, from about 6 Ci to about 7 Ci, from about 7 Ci to about 8 Ci, from about 8 Ci to about 9 Ci of $^{64}Cu$, from about 9 Ci to about 10 Ci, from about 10 Ci to about 11 Ci, from about 11 Ci to about 12 Ci, from about 12 to about 13 Ci, from about 13 to about 14 Ci, or from about 14 to about 15 Ci of $^{64}Cu$. In other embodiments, the bombarded target may comprise from about 15.0-95.0 Ci, including from about 20.0-85.0 Ci, from about 25.0-80.0 Ci, from about 30.0-75.0 Ci, or from about 40.0-70.0 Ci of $^{64}Cu$. The bombarded target may comprise from about 20.0-95.0 Ci, from about 20.0-90.0 Ci, from about 20.0-85.0 Ci, from about 20.0-80.0 Ci, from about 20.0-75.0 Ci, and from about 20.0-70.0 Ci of $^{64}Cu$. In still further embodiments, the bombarded target may comprise from about 15.0-25.0 Ci, from about 25.0-35.0 Ci, from about 35.0-45.0 Ci, from about 45.0-55.0 Ci, from about 55.0-65.0 Ci, from about 65.0-75.0 Ci, from about 75.0-85.0 Ci, and from about 85.0-95.0 Ci of $^{64}Cu$. In still further embodiments, the bombarded target may comprise ≥15 Ci of $^{64}Cu$, ≥17.5 Ci of $^{64}Cu$, ≥20 Ci of $^{64}Cu$, ≥22.5 Ci of $^{64}Cu$, ≥25 Ci of $^{64}Cu$, ≥30 Ci of $^{64}Cu$, ≥35 Ci of $^{64}Cu$, ≥40 of $^{64}Cu$, ≥45 of $^{64}Cu$, ≥50 of $^{64}Cu$, ≥55 of $^{64}Cu$, ≥60 of $^{64}Cu$, ≥65 of $^{64}Cu$, ≥70 of $^{64}Cu$, ≥75 of $^{64}Cu$, ≥80 of $^{64}Cu$, ≥85 of $^{64}Cu$, ≥90 of $^{64}Cu$, ≥95 of $^{64}Cu$, and/or ≥100 $^{64}Cu$. In general, longer bombardment times will yield higher levels of $^{64}Cu$.

For example, bombardment times of about 2 h to about 4 h may yield about 2 Ci to about 5 Ci of $^{64}Cu$ at EOB, bombardment times of about 6 h may yield about 5 Ci to about 9 Ci of $^{64}Cu$ at EOB, and bombardment times of about 12 h may yield about 7 Ci to about 15 Ci of $^{64}Cu$ at EOB. Bombardment times of greater than 12 h may yield ≥15 Ci of $^{64}Cu$ at EOB, ≥20 Ci of $^{64}Cu$ at EOB, and/or ≥25 Ci of $^{64}Cu$ at EOB. In general, the processes disclosed herein may produce from about 1 Ci/h to about 1.5 Ci/h of bombardment with proton beam having an energy of about 12 MeV and a current up to about 225 μA.

Increasing proton energy may result in increased production yield, however this is not accurate for radionuclide production. Instead, incident particle energy is an indication of whether the energy of activation for a particular nuclear reaction is being met. Additionally, reactions may have different probabilities of occurrence as a function of proton energy.

For example, the maximum probability of producing $^{64}$Cu from $^{64}$Ni occurs when the proton energy is approximately 11 MeV. As the proton energy deviates from that maximum probability (either by increasing or decreasing) the production yield decreases. Additionally, the probability of producing radionuclidic impurities may increase. The incident energy may be optimized to meet the requirements of the desired reaction and minimize unwanted reactions. Bombarding a target with about 29 MeV to about 30 MeV proton (the maximum proton energy of the existing cyclotron) does not yield $^{64}$Cu from $^{64}$Ni. In this specific case, since the maximum reaction probability occurs at approximately 11 MeV, the incident proton energy should be carefully selected such that the proton energy attenuates within the $^{64}$Ni target material to capture the maximum possible production cross section. For example, bombarding an appropriately thick $^{64}$Ni target with 13 MeV protons may allow those protons to attenuate in the material, slowing a portion of them down to 11 MeV where they may have the highest probability of causing the desired nuclear reaction.

Similar to proton energy, it may seem that simply increasing the number of target atoms (in this case $^{64}$Ni) may increase production yields. However, as mentioned above, the mass of the target impacts the target thickness and thus attenuation of the proton beam. For example, an effective thickness of 290 μm $^{64}$Ni may attenuate a 13 MeV proton beam to an average energy of 5 MeV. Below 5 MeV, the probability of inducing the desired reaction approaches zero. Increasing the target mass may result in further attenuation of the proton beam; however, capturing proton energies of 0-5 MeV may not have a large impact on the production yield. For example, assume the beam is orthogonal to a $^{64}$Ni target. Bombarding a 290 μm thick target with 13 MeV protons at a current of 100 um for 10 h will yield approximately 10.1 Ci of $^{64}$Cu. Doubling the target thickness to 580 um will produce approximately 10.4 Ci of $^{64}$Cu. Doubling the thickness of the target increases the yield by 3%. The required mass of target material may be optimized to match the parameters of the particle accelerator (e.g. cyclotron). The incident proton energy further increases do not yield increased production yields.

Increasing production yields requires the careful selection and implementation of multiple critical factors, including the particle accelerator (e.g. cyclotron) and its capabilities (e.g., proton energy, beam current), the design of the target and target station and careful considerations for impacts to equipment and materials as a result of higher exposure rates and extreme conditions of use.

One or more embodiments of the present disclosure includes a 30 MeV variable energy particle accelerator (e.g. cyclotron). Details of the new cyclotron are provided in Example 8.

In some embodiments, the target may be cooled using water flow through the target. The water may flow through a series of cooling fins along the length of the target. In some examples, the target may include 5 to 50, 5 to 10, 10 to 20, 20 to 25, 25 to 30, 30 to 35, 35 to 40, or 40 to 50 cooling fins. The water flow area within the target and cooling fins may range from 40 mm$^2$ to 45 mm$^2$, 45 mm$^2$ to 50 mm$^2$, 50 mm$^2$ to 55 mm$^2$, 55 mm$^2$ to 60 mm$^2$, 60 mm$^2$ to 65 mm$^2$, 65 mm$^2$ to 70 mm$^2$, 70 mm$^2$ to 75 mm$^2$, 75 mm$^2$ to 80 mm$^2$, 80 mm$^2$ to 85 mm$^2$, or 85 mm$^2$ to 90 mm$^2$. The water flow within the target and cooling fins may range from 40 L/min to 90 L/min, 50 L/min to 90 L/min, 55 L/min to 90 L/min, 40 L/min to 50 L/min, 50 L/min to 55 L/min, 55 L/min to 60 L/min, 60 L/min to 65 L/min, 65 L/min to 70 L/min, 70 L/min to 75 L/min, or 75 L/min to 80 L/min, 80 L/min to 85 L/min, or 85 L/min to 90 L/min.

(b) Stripping the Bombarded Target

The next step of the process comprises stripping the $^{64}$Ni, $^{64}$Cu, $^{61}$Co, and other metals from the bombarded target. The metals are stripped from the target with a strong acid having a pKa of less than 1. Suitable strong acids include hydrochloric acid, nitric acid, hydrobromic acid, and sulfuric acid. In some embodiments, the bombarded target is stripped with HCl having a molarity from about 6 M to about 12.1 M (concentrated HCl). For example, the bombarded target may be stripped with about 6 M HCl, about 7 M HCl, about 8 M HCl, about 9 M HCl, about 10 M HCl, about 11 M HCl, or about 12.1 M HCl. In specific embodiments, the bombarded target is stripped with about 9 M HCl.

The stripping may comprise adding a volume of the strong acid to a chamber or holding vessel comprising the bombarded target, wherein the target is heated to a temperature from about 65° C. to about 100° C. In particular embodiments, the stripping is conducted at a temperature of about 75° C. After about 3-5 minutes, the acid may be removed and saved as the first strip solution. The target may be contacted with the strong acid several more times, and the resultant solutions combined with the first strip solution. The chamber holding the target then may be rinsed with the strong acid, and the rinse may be combined with the strip solutions to form the final strip solution. In particular embodiments, the bombarded target may be exposed three times with about 3 mL of strong acid (e.g., 9 M HCl) to generate a strip solution of approximately 9 mL.

In some embodiments, the strip solution may be evaporated to dryness or a small volume and the residue may be reconstituted in HCl of the desired molarity (e.g., 9 M) for column chromatography.

In specific embodiments, the stripping comprises contacting the bombarded target with several aliquots of 9 M HCl, at a temperature of about 65° C. to about 100° C., and collecting the aliquots as the strip solution. The chamber holding the bombarded target may be rinsed with 9 M HCl, and the rinse combined with the strip solution.

(c) Purifying $^{64}$Cu by Ion Exchange Chromatography

The process further comprises isolating the $^{64}$Cu from the other metals in the strip solution by ion exchange chromatography. In general, the ion exchange chromatography utilizes a strong anion exchange resin. Strong anion exchange resins generally comprise quaternary ammonium groups. For example, a strong anion exchange resin may comprise trialkyl ammonium chloride (e.g., trialkylbenzyl ammonium or trimethylbenzyl ammonium) surface groups or dialkyl 2-hydroxyethyl ammonium chloride (e.g., dimethyl-2-hydroxyethylbenzyl ammonium) surface groups. Examples of suitable strong anion exchange resins comprising trimethylbenzyl ammonium groups include AG® 1-X8 (available from Bio-Rad) and Dowex® 1X8 resin. In specific embodiments, the strong anion exchange resin may be AG® 1-X8, 100-200 mesh, chloride form.

A variety of columns sizes and bed volumes may be used to purify $^{64}$Cu from the other metals in the strip solution. This process was developed to effectively isolate $^{64}$Cu generated from about 50 mg of $^{64}$Ni target material, using about 4.5 g of strong anion exchange resin in a column having an inner diameter of about 1 cm. It is understood that the amount of strong anion exchange resin may range from about 4.0 g to about 5.0 g and the inner diameter of the column may range from about 0.7 cm to about 1.25 cm without departing from the scope of the disclosure. Similarly, the volumes of the eluents passed through the column may vary depending upon the size and volume of the column and/or the amount of $^{64}Ni$ target material. In general, the ion exchange column is equilibrated with HCl (e.g., 9 M HCl) prior to the chromatography process.

(i) Removing $^{64}Ni$

In one or more embodiments, the ion exchange separation process comprises passing the strip solution to the prepared ion exchange column, as well as an additional 1 mL of 9 M HCl used to rinse the holding vessel. The strip solution may be added in multiple smaller aliquots (e.g., 3×3 mL, 2×4.5 mL, etc.) or the strip solution may be added all at once. The Ni in the strip solution does not bind to the strong anion exchange resin and passes through the column, while Cu and Co and other metals bind to the strong anion exchange resin. The column flow through may be collected as a Ni recovery fraction.

The column may be rinsed with an additional volume of HCl having the same molarity as that of the strip solution to completely remove any residual Ni from the column. For example, the column may be rinsed with about 10 mL of 9 M HCl. The 10 mL may be added in multiple smaller aliquots (e.g., 5×2 mL, 3×3.333 mL, etc.) or the 10 mL may be added all at once. The column flow through from the rinse may be collected and combined with the original Ni recovery fraction. The combined Ni recovery fraction may be further processed to recover the $^{64}Ni$, which then may be recycled and used for plating additional particle accelerator (e.g. cyclotron) targets. Nickel recovery processes are well known in the art. On average, about 82% of the target $^{64}Ni$ present in the strip solution may be recovered from the Ni recovery fraction. In various embodiments, the percentage of $^{64}Ni$ recovered in the recovery fraction may range from about 40% to about 99% of the starting $^{64}Ni$.

In certain embodiments, the separation process comprises adding the strip solution to the prepared ion exchange column. In this process, the strip solution volume comprises around 20 mL to around 40 mL. The strip solution may be added in multiple smaller aliquots (e.g., 4×10 mL, 2×10 mL, etc.) or the strip solution may be added all at once. The Ni in the strip solution does not bind to the chromatographic resin and freely passes through the column, while Cu and Co and other metals bind to the ion exchange column. The column flow through volume may be collected as a Ni recovery fraction.

The column may be rinsed with an additional volume of HCl having the same molarity as that of the strip solution to completely remove any residual Ni from the column. For example, the column may be rinsed with about 8 mL to about 10 mL of 9 M HCl. For example, the column may be rinsed with about 8 mL of 9 M HCl. The volume of HCl may be added in multiple smaller aliquots (e.g., 4×2 mL, 2×4 mL, etc.) or the volume of HCl may be added all at once. The column flow through from the 9 M HCl rinse may be collected and combined with the original Ni recovery fraction. The combined Ni recovery fraction may be further processed to recover the $^{64}Ni$, which then may be recycled and used for plating additional particle accelerator (e.g. cyclotron) targets. Nickel recovery processes are well known in the art. On average, in tracer studies that mimicked a $^{64}Cu$ purification, about 98% of the target Ni present in a simulated strip solution may be recovered from the Ni recovery fraction. In various embodiments, the percentage of Ni recovered in the recovery fraction may range from about 40% to about 99% of the starting Ni.

(ii) Removing $^{61}Co$

The ion exchange purification process further comprises adding a volume of HCl having a molarity from about 3 M to about 6 M to the ion exchange column to elute $^{61}Co$ (and metals other than Cu). In various embodiments, a volume of 3 M HCl, 4 M HCl, 5 M HCl, or 6 M HCl may be added to the ion exchange column. In specific embodiments, a volume (e.g., from about 10 mL to about 20 mL) of 4 M HCl may be added to the ion exchange column. For example, about 10 mL of 4 M HCl may be added to the column. The eluent may be added in smaller aliquots (e.g., 5×2 mL, 3×3.33 mL, etc.) or as a bolus or the eluent may be added all at once. The ion exchange column eluate may be collected as a first waste fraction that mainly comprises $^{61}Co$.

The ion exchange column may be rinsed with an additional volume (e.g., from about 8 mL to about 10 mL) of NaCl having a molarity of about 3 M to 6 M in HCl having a molarity of about 0.01 M to about 3 M to elute residual $^{61}Co$. In specific embodiments, a volume (e.g., 8 mL) of 5 M NaCl in 0.05 M HCl may be added to the ion exchange column. The eluent may be added in smaller aliquots (e.g., 4×2 mL, 2×4 mL, etc.) or the eluent may be added all at once. The ion exchange column eluate from the 5 M NaCl eluent containing $^{61}Co$ may be collected and combined with the first waste fraction containing $^{61}Co$.

Alternatively, the ion exchange column may be rinsed with an additional volume (e.g., from about 8 mL to about 10 mL) of HCl having a molarity from about 3 M to about 6 M to elute residual $^{61}Co$. In specific embodiments, a volume (e.g., 8 mL) of 4 M HCl may be added to the ion exchange column. The eluent may be added in smaller aliquots (e.g., 4×2 mL, 2×4 mL, etc.) or the eluent mL may be added all at once. The ion exchange column eluate from the 5 M HCl eluent containing $^{61}Co$ may be collected and combined with first waste fraction containing $^{61}Co$.

(iii) Isolating $^{64}Cu$

In one or more embodiments, the purification process further comprises adding a volume of HCl having a molarity from about 0.5 M to about 3 M to the ion exchange column to elute the $^{64}Cu$. In certain embodiments, a volume of 0.5 M HCl, 1 M HCl, 2 M HCl, or 3 M HCl may be added to the ion exchange column. In specific embodiments, the $^{64}Cu$ may be eluted from the ion exchange column with a volume of 2 M HCl. For example, about 8 mL to about 20 mL of 2 M HCl may be added to the column. The eluent may be added in smaller aliquots (e.g., 4×2 mL, 4×5 mL, etc.) or as a bolus. The eluate comprising $^{64}Cu$ is collected as the product of the process. On average, about 80% of the $^{64}Cu$ present in the strip solution may be recovered in the eluate comprising $^{64}Cu$. In various embodiments, the percentage of $^{64}Cu$ recovered in the eluate comprising $^{64}Cu$ may range from about 60% to about 100%. The $^{64}Cu$ in the eluate exists as $^{64}CuCl_2$.

In certain embodiments, the purification process further comprises adding a volume of HCl having a molarity from about 0.01 M to about 3 M to the ion exchange column to elute the $^{64}Cu$. In certain embodiments, a volume of 0.05 M HCl, 1 M HCl, 2 M HCl, or 3 M HCl may be added to the ion exchange column. In specific embodiments, the $^{64}Cu$ may be eluted from the ion exchange column with a volume of 0.05 M HCl. For example, about 10 mL of 0.05 M HCl may be added to the ion exchange column. The eluent may be added in smaller aliquots (e.g., 5×2 mL, 4×2.5 mL, etc.) or the eluent may be added all at once. The eluate comprising $^{64}Cu$ is collected as the product of the process. On average, in tracer studies that mimicked a $^{64}Cu$ purification, about 89% of the Cu present in a simulated strip solution may be recovered in the eluate comprising Cu. In various embodiments, the percentage of $^{64}Cu$ recovered in the eluate comprising $^{64}Cu$ may range from about 60% to about 100%. The $^{64}Cu$ in the eluate exists as $^{64}CuCl_2$.

The final eluate comprising $^{64}Cu$ may be evaporated to dryness (or to a smaller volume) and the resultant residue may be reconstituted in a volume of HCl having a molarity about 0.001 M to about 1 M. In various embodiments, the residue may be reconstituted in HCl having a molarity from about 0.005 M to about 0.5 M, from about 0.010 M to about 0.2 M, from about 0.025 M to about 0.1 M, or from about 0.04 M to about 0.06 M. In specific embodiments, the residue may be reconstituted in 0.05 M HCl to form a final product comprising $^{64}Cu$.

The $^{64}Cu$ compositions prepared by the processes disclosed herein are described above in section (I).

(iv) Exemplary Ion Exchange Chromatography Purification Process

The 9 M HCl strip solution is passed through the ion exchange column, wherein $^{64}Cu$ and $^{61}Co$ bind to the resin and $^{64}Ni$ flows through the column. The column is rinsed with 9 M HCl to remove residual $^{64}Ni$. The initial column flow through and the 9 M HCL rinse can be combined as the Ni recovery fraction. The column is rinsed with 4 M HCl to elute the $^{61}Co$, which is a waste fraction. Lastly, the $^{64}Cu$ is eluted from the column with 2 M HCl.

(III) Processes for Producing Copper-64-Purification Ion Exchange Chromatography Another aspect of the present disclosure encompasses an additional process for purifying the $^{64}Cu$ from other metals in the strip solution by using a packed bed ion exchange chromatography column. The process comprises (a) bombarding a cyclotron target comprising $^{64}Ni$ with a proton beam to generate a bombarded target; (b) stripping the bombarded target with a volume of HCl having a molarity of about 6 M to about 12.1 M to form a strip solution comprising $^{64}Ni$, $^{64}Cu$, $^{61}Co$, and other metals; and (c) purifying the $^{64}Cu$ from the strip solution by chromatography, wherein the chromatography comprises (i) passing the strip solution through an ion exchange resin such that the $^{64}Cu$ and $^{61}Co$ bind to the ion exchange resin in the column, and $^{64}Ni$ passes through as a first flow-through fraction; (ii) rinsing the column with a volume of HCl having a molarity of about 6 M to about 12.1 M to remove residual $^{64}Ni$ as a second flow-through fraction; (iii) rinsing the column with a volume of HCl having a molarity of about 3 M to about 6 M to elute $^{61}Co$ as a first waste fraction; and (iv) adding a volume of HCl having a molarity of about 0.01 M to about 3 M to the column to elute the $^{64}Cu$ as a product fraction comprising $^{64}Cu$.

(a) Bombarding the Target

Suitable particle accelerators (e.g. cyclotrons) and cyclotron targets are also described above in Section (II) (a) and below in Section (IV) (a). The cyclotron target may comprise a copper base layer that has been electroplated with gold to a thickness of about 50 μm. The gold-plated cyclotron target then may be plated with enriched $^{64}Ni$. The $^{64}Ni$ may be enriched to about 98%, about 99%, about 99.6%, or about 99.9% $^{64}Ni$. The targeting mass of enriched $^{64}Ni$ may range from about 675 mg to about 825 mg, from about 700 mg to about 800 mg, from about 720 mg to about 780 mg, or about 750 mg. The plating area may range from about 17.3 $cm^2$ to about 28.8 $cm^2$, from about 18.4 $cm^2$ to about 27.6 $cm^2$, from about 20.7 $cm^2$ to about 25.3 $cm^2$, from about 21.8 $cm^2$ to about 24.2 $cm^2$, from about 22.0 $cm^2$ to about 24.0 $cm^2$, or about 23.0 $cm^2$. The plated layer of $^{64}Ni$ may have a thickness from about 21 μm to about 53 μm, from about 26 μm to about 48 μm, from about 32 μm to about 42 μm, or about 37 μm.

In the processes disclosed herein, the $^{64}Ni$ target area is bombarded with low energy protons to produce $^{64}Cu$. In general, the proton beam of the cyclotron is adjusted to have an energy of less than about 20 MeV on the target. In some embodiments, the energy of the proton beam at the target can range from about 5 MeV to about 20 MeV, from about 7 MeV to about 18 MeV, from about 9 MeV to about 16 MeV, from about 10 MeV to about 15 MeV, from about 11 MeV to about 14 MeV, from about 12 MeV to about 13 MeV, or from about 12 MeV to about 14 MeV. In specific embodiments, the actual beam energy at the target is about 12 MeV.

The current of the proton beam may range up to about 408 μA. In some embodiments, the current of the proton beam may range from about 100 μA to about 150 μA, from about 150 μA to about 200 μA, from about 200 μA to about 250 μA, from about 250 μA to about 300 μA, from about 300 μA to about 350 μA, or from about 350 μA to about 410 μA, from about 405 μA to about 410 μA, or about 408 μA. In specific embodiments, the current of the proton beam may range from about 325 μA to about 375 μA, or from about 350 μA to about 408 μA.

The proton beam hits the target area at an angle. In some embodiments, the angle of the proton beam may range from about 1° to about 20°, from about 2° to about 10°, from 2° to about 8°, from about 3° to about 6°, or about 5°. In other embodiments, the angle of the proton beam may be tangential to the target area.

In some embodiments, the beam strike has an elliptic shape with minor and major axes. The minor axes may range from about 25.8 mm to about 34.2 mm, from about 27.9 mm to about 32.1 mm, from about 28.8 mm to about 31.2 mm, or about 30.0 mm. The major axes may range from about 84.4 mm to about 63.6 mm, from about 79.2 mm to about 68.8 mm, from about 77.0 mm to about 71.0 mm, or about 74.0 mm. In certain embodiments, the minor and major axis of the elliptic beam strike may be about 30.0 mm and 74.0 mm, respectively. In some embodiments, the proton beam may strike about 70-80%, about 60-90%, or about 55-95% of the entire target face. In other embodiments, the total area covered by the beam may range from about 14.0 $cm^2$ to about 30.0 $cm^2$, from about 28.0 $cm^2$ to about 16.0 $cm^2$, from about 26.0 $cm^2$ to about 18.0 $cm^2$, or from about 25.0 $cm^2$ to about 20.0 $cm^2$, or 23.0 $cm^2$.

The time of bombardment may range from about 0.5 h to about 24 h. In some embodiments, the time of bombardment may range from 0.5 h to about 8 h, from about 8 h to about 20 h, or from about 20 h to about 24 h. In other embodiments, the bombardment time may range from 1 h to about 24 h, from about 2 h to about 24 h, from about 4 h to about 24 h, from about 5 h to about 24 h, or about from 5 h to about 23 h. In certain embodiments, the bombardment time may range from about 1 h to about 19 h, from about 2 h to about 19 h, from about 3 h to about 19 h, from about 4 h to about 19 h, or from about 5 h to about 19 h. In other embodiments, the time of bombardment may be less than 19 h, less than 18 h, less than 17.5 h, less than 17 h, less than 16.5 h, less than 16 h, less than 15.5 h, or less than 15 h. In further embodiments, the time of bombardment may be about 8 h, about 9 h, about 10 h, about 11 h, about 12 h, about 13 h, about 14 h, or about 15 h. In specific embodiments, the time of bombardment may range from about 1 h to about 12 h or the time of bombardment may be about 12 h.

In some embodiments, a target comprising about 750 mg $^{64}$Ni may be bombarded with a proton beam having an energy of about 10 MeV to about 20 MeV, about 11 MeV to about 18 MeV, or about 12 MeV to about 14 MeV and a beam current of 300 μA to about 350 μA, about 350 μA to about 408 μA, about 400 μA to about 450 μA, about 450 μA to about 500 μA, or 500+μA for about 10 h, 12 h, 14 h, 16 h, or 19 h. In other embodiments, a plurality of targets comprising about 750 mg $^{64}$Ni per target may be bombarded with a proton beam having an energy of about 10 MeV to about 20 MeV, about 11 MeV to about 18 MeV, or about 12 MeV to about 14 MeV and a beam current of 300 μA to about 350 μA, about 350 μA to about 408 μA, about 400 μA to about 450 μA, about 450 μA to about 500 μA, or 500+μA per target for about 10 h, 12 h, 14 h, 16 h, or 19 h. In specific embodiments, two targets each comprising about 750 mg $^{64}$Ni may be bombarded simultaneously with a proton beam having an energy of about 12 MeV to about 14 MeV and a beam current, incident on each target, of about 350 μA to about 408 μA for about 10 h, 12 h, 14 h, or 19 h.

The bombarded target may comprise from about 58 Ci to about 80 Ci of $^{64}$Cu at the end of bombardment (EOB). The bombarded target also comprises unreacted $^{64}$Ni and $^{61}$Co that are produced during the bombardment process. In various embodiments, the bombarded target may comprise from about 38 Ci to about 52 Ci, from about 43 Ci to about 59 Ci, from about 48 Ci to about 66 Ci, from about 52 Ci to about 72 Ci, from about 56 Ci to about 77 Ci, from about 58 Ci to about 80 Ci of $^{64}$Cu, from about 60 Ci to about 150 Ci of $^{64}$Cu, or from about 60 Ci to about 200 Ci of $^{64}$Cu, or greater than 200 Ci of $^{64}$Cu In general, longer bombardment times will yield higher levels of $^{64}$Cu. For example, bombardment times of about 12 h to about 16 h may yield about 43 Ci to about 72 Ci of $^{64}$Cu at EOB, and bombardments times of about 19 h may yield about 58 Ci to about 80 Ci of $^{64}$Cu at EOB. In general, the processes disclosed herein may produce from about 3.3 Ci/h to about 3.8 Ci/h of bombardment with proton beam having an energy of about 13 MeV and a current of about 350 μA or about 408 μA.

In some embodiments, greater than 12 hours (e.g., ≥12 hours) of bombardment time yields about 50 Ci to about 120 Ci of $^{64}$Cu at EOB. In some embodiments, greater than 12 hours (e.g., ≥12 hours) of bombardment time yields about 50 Ci to about 100 Ci of $^{64}$Cu at EOB. In some embodiments, greater than 12 hours (e.g., ≥12 hours) of bombardment time yields about 60 Ci to about 90 Ci of $^{64}$Cu at EOB. In some embodiments, greater than 12 hours (e.g., ≥12 hours) of bombardment time yields about 60 Ci to about 80 Ci of $^{64}$Cu at EOB. In some embodiments, greater than 12 hours (e.g., ≥12 hours) of bombardment time yields about 60 Ci to about 70 Ci of $^{64}$Cu at EOB.

In certain embodiments, as described herein, a yield of about 75 Ci or more of $^{64}$Cu may be achieved at EOB. In certain embodiments a yield of about 70 Ci ore more of $^{64}$Cu may be achieved at EOB. In certain embodiments a yield of about 65 Ci or more of $^{64}$Cu may be achieved at EOB. In certain embodiments a yield of about 60 Ci or more of $^{64}$Cu may be achieved at EOB.

(b) Stripping the Bombarded Target

The next step of the process comprises stripping metals from the bombarded target. The metals are stripped from the target with a strong acid having a pKa of less than 1. Suitable strong acids include hydrochloric acid, nitric acid, hydrobromic acid, and sulfuric acid. In some embodiments, the bombarded target is stripped with HCl having a molarity from about 6 M to about 12.1 M. For example, the bombarded target may be stripped with about 6 M HCl, about 7 M HCl, about 8 M HCl, about 9 M HCl, about 10 M HCl, about 11 M HCl, or about 12.1 M HCl. In specific embodiments, the bombarded target is stripped with about 9 M HCl.

The stripping may comprise adding a volume of the strong acid to a chamber or holding vessel comprising the bombarded target, wherein the target is heated to a temperature from about 65° C. to about 100° C. In particular embodiments, the stripping is conducted at a temperature of about 75° C. After about 3-5 minutes, the acid may be removed and saved as the first strip solution. The target may be contacted with the strong acid several more times, and the resultant solutions combined with the first strip solution. The chamber holding the target then may be rinsed with the strong acid, and the rinse may be combined with the strip solutions to form the final strip solution. In particular embodiments, the bombarded target and the holding chamber may be contacted several times with aliquots (e.g., 5-10 mL) of the strong acid (e.g., HCl) to generate a final strip solution of approximately 20 mL to 40 mL.

In specific embodiments, the stripping comprises contacting the bombarded target with several aliquots of 9 M HCl, at a temperature of about 65° C. to about 100° C., and collecting the aliquots as the strip solution. The chamber holding the bombarded target may be rinsed with 9 M HCl, and the rinse combined with the strip solution. The strip solution comprises $^{64}$Ni, $^{64}$Cu, $^{61}$Co, and can contain other metals (e.g., Fe).

(c) Purifying $^{64}$Cu by Ion Exchange Chromatography

The last step of the process comprises purifying $^{64}$Cu from the other metals in the strip solution by chromatography. The process comprises passing the strip solution through a packed ion exchange resin bed using a controlled flow rate. Given the quantity of enriched nickel required to produce >25 Ci of $^{64}$Cu, the existing purification process using AG® 1-X8 resin is not a viable manufacturing process. $^{64}$Cu recovery dropped from an average of 84% for a 50-mg $^{64}$Ni plated target to approximately 75% for $^{64}$Ni plated masses in the 60-90 mg range using the AG® 1-X8 resin. Increasing $^{64}$Ni plated masses up to as much as 750 mg could lead to even further reduction in $^{64}$Cu recovery. Moreover, continued utilization of the AG® 1-X8 resin may require partitioning the strip solution (described above) across multiple columns. A high-capacity resin and pressure driven controlled flow rates may be required as detailed in the following paragraphs.

The ion exchange column comprises a weak anion exchange resin. Weak anion exchange resins generally comprise polystyrene or polyacrylic ester frames that contain a primary, secondary, or tertiary amino group as the functional group. Suitable weak anionic functional groups include diethyl aminoethyl (DEAE) and dimethyl aminoethyl (DMAE). Examples of suitable weak anion exchange resins comprising tertiary ammonium groups include AmberLite™ FPA53 (available from Dupont) and TrisKem TK201 resin. In specific embodiments, the weak anion exchange resin is TK201 resin, 50-100 micron, and in the chloride form.

A variety of column sizes and bed volumes may be used to purify $^{64}$Cu from the other metals in the strip solution. This process was developed to effectively isolate $^{64}$Cu generated from about 750 mg of $^{64}$Ni target material, using a weak anion exchange resin. The column uses about 2.7 g of weak anion exchange resin in a column having an inner diameter of about 1 cm. It is understood that the amount of weak anion exchange resin may range from about 2.4 g to about 3.0 g and the inner diameter of the column may range from about 0.7 cm to about 1.25 cm without departing from the scope of the disclosure. Similarly, the volumes of the eluents passed through the column may vary depending upon the size and volume of the column and/or the amount of $^{64}$Ni target material. In general, the column ion exchange resin is equilibrated with HCl (e.g., 9 M HCl) prior to the chromatography process.

To effectively separate the quantities of metals in the process solution the packed resin requires a controlled, pressure generated flow. The 50-100 micron resin bead size equates to roughly 140-270 mesh (as compared to the 100-200 mesh AG® 1-X8 resin) which requires a force greater than gravitational to permit flow. Flow rates in the range of 1 mL/min to 4 mL/min (~75 cm/h to 300 cm/h) have been demonstrated to bind and elute the metals of interest in a manner that meets process requirements. One manner to control chromatography flow for radioisotopes is to use a Trasis Synthesizer. Using syringe drivers, a valve manifold system, and process specific programming parameters allows for delivery of the mobile phases at the prescribed flow rates and volumes. Alternatively, a manual process using a syringe driver and flow-controlled positive displacement (peristaltic) pump may be used to deliver the prescribed mobile phase flow rates and volumes.

(i) Removing $^{64}$Ni

The separation process comprises adding the strip solution to the prepared ion exchange column. In this process, the strip solution volume comprises around 20 mL to around 40 mL. The strip solution may be added in multiple smaller aliquots (e.g., 4×10 mL, 2×10 mL, etc.) or the strip solution may be added all at once. The Ni in the strip solution does not bind to the chromatographic resin and freely passes through the column, while Cu and Co and other metals bind to the ion exchange column. The column flow through volume may be collected as a Ni recovery fraction.

The column may be rinsed with an additional volume of HCl having the same molarity as that of the strip solution to completely remove any residual Ni from the column. For example, the column may be rinsed with about 8 mL to about 10 ml of 9 M HCl. For example, the column may be rinsed with about 8 mL of 9 M HCl. The volume of HCl may be added in multiple smaller aliquots (e.g., 4×2 mL, 2×4 mL, etc.) or the volume of HCl may be added all at once. The column flow through from the 9 M HCl rinse may be collected and combined with the original Ni recovery fraction. The combined Ni recovery fraction may be further processed to recover the $^{64}$Ni, which then may be recycled and used for plating additional cyclotron targets. Nickel recovery processes are well known in the art. On average, in tracer studies that mimicked a $^{64}$Cu purification, about 98% of the target Ni present in a simulated strip solution may be recovered from the Ni recovery fraction. In various embodiments, the percentage of Ni recovered in the recovery fraction may range from about 40% to about 99% of the starting Ni.

(ii) Removing $^{61}$Co

The separation process further comprises adding a volume of HCl having a molarity from about 3 M to about 6 M to the column comprising the ion exchange resin to elute $^{61}$Co (and metals other than Cu). In various embodiments, a volume of 3 M HCl, 4 M HCl, 5 M HCl, or 6 M HCl may be added to the ion exchange column. In specific embodiments, a volume (e.g., from about 10 mL to about 20 mL) of 4 M HCl may be added to the ion exchange column. For example, about 10 mL of 4 M HCl may be added to the ion exchange column. The eluent may be added in smaller aliquots (e.g., 5×2 mL, 3×3.33 mL, etc.) or the eluent may be added all at once. The ion exchange column eluate may be collected as a first waste fraction that mainly comprises $^{61}$Co.

The ion exchange column may be rinsed with an additional volume (e.g., from about 8 mL to about 10 mL) of NaCl having a molarity of about 3 M to 6 M in HCl having a molarity of about 0.01 M to about 3 M to elute residual 61 Co. In specific embodiments, a volume (e.g., 8 mL) of 5 M NaCl in 0.05 M HCl may be added to the ion exchange column. The eluent may be added in smaller aliquots (e.g., 4×2 mL, 2×4 mL, etc.) or the eluent may be added all at once. The ion exchange column eluate from the 5 M NaCl eluent containing $^{61}$Co may be collected and combined with the first waste fraction containing $^{61}$Co.

Alternatively, the ion exchange column may be rinsed with an additional volume (e.g., from about 8 mL to about 10 mL) of HCl having a molarity from about 3 M to about 6 M to elute residual $^{61}$Co. In specific embodiments, a volume (e.g., 8 mL) of 4 M HCl may be added to the ion exchange column. The eluent may be added in smaller aliquots (e.g., 4×2 mL, 2×4 mL, etc.) or the eluent mL may be added all at once. The ion exchange column eluate from the 5 M HCl eluent containing $^{61}$Co may be collected and combined with first waste fraction containing $^{61}$Co.

(iii) Isolating $^{64}$Cu

The separation process further comprises adding a volume of HCl having a molarity from about 0.01 M to about 3 M to the ion exchange column to elute the $^{64}$Cu. In certain embodiments, a volume of 0.05 M HCl, 1 M HCl, 2 M HCl, or 3 M HCl may be added to the ion exchange column. In specific embodiments, the $^{64}$Cu may be eluted from the ion exchange column with a volume of 0.05 M HCl. For example, about 10 mL of 0.05 M HCl may be added to the ion exchange column. The eluent may be added in smaller aliquots (e.g., 5×2 mL, 4×2.5 mL, etc.) or the eluent may be added all at once. The eluate comprising $^{64}$Cu is collected as the product of the process. On average, in tracer studies that mimicked a $^{64}$Cu purification, about 89% of the Cu present in a simulated strip solution may be recovered in the eluate comprising Cu. In various embodiments, the percentage of $^{64}$Cu recovered in the eluate comprising $^{64}$Cu may range from about 60% to about 100%. The $^{64}$Cu in the eluate exists as $^{64}CuCl_2$.

The final eluate comprising $^{64}$Cu may be evaporated to dryness (or to a smaller volume) and the resultant residue may be reconstituted in a volume of HCl having a molarity about 0.001 M to about 1 M. In various embodiments, the residue may be reconstituted in HCl having a molarity from about 0.005 M to about 0.5 M, from about 0.010 M to about 0.2 M, from about 0.025 M to about 0.1 M, or from about 0.04 M to about 0.06 M. In specific embodiments, the residue may be reconstituted in 0.05 M HCl to form a final product comprising $^{64}$Cu.

The $^{64}$Cu compositions prepared by this process are described above in section (I).

Figure 2A:
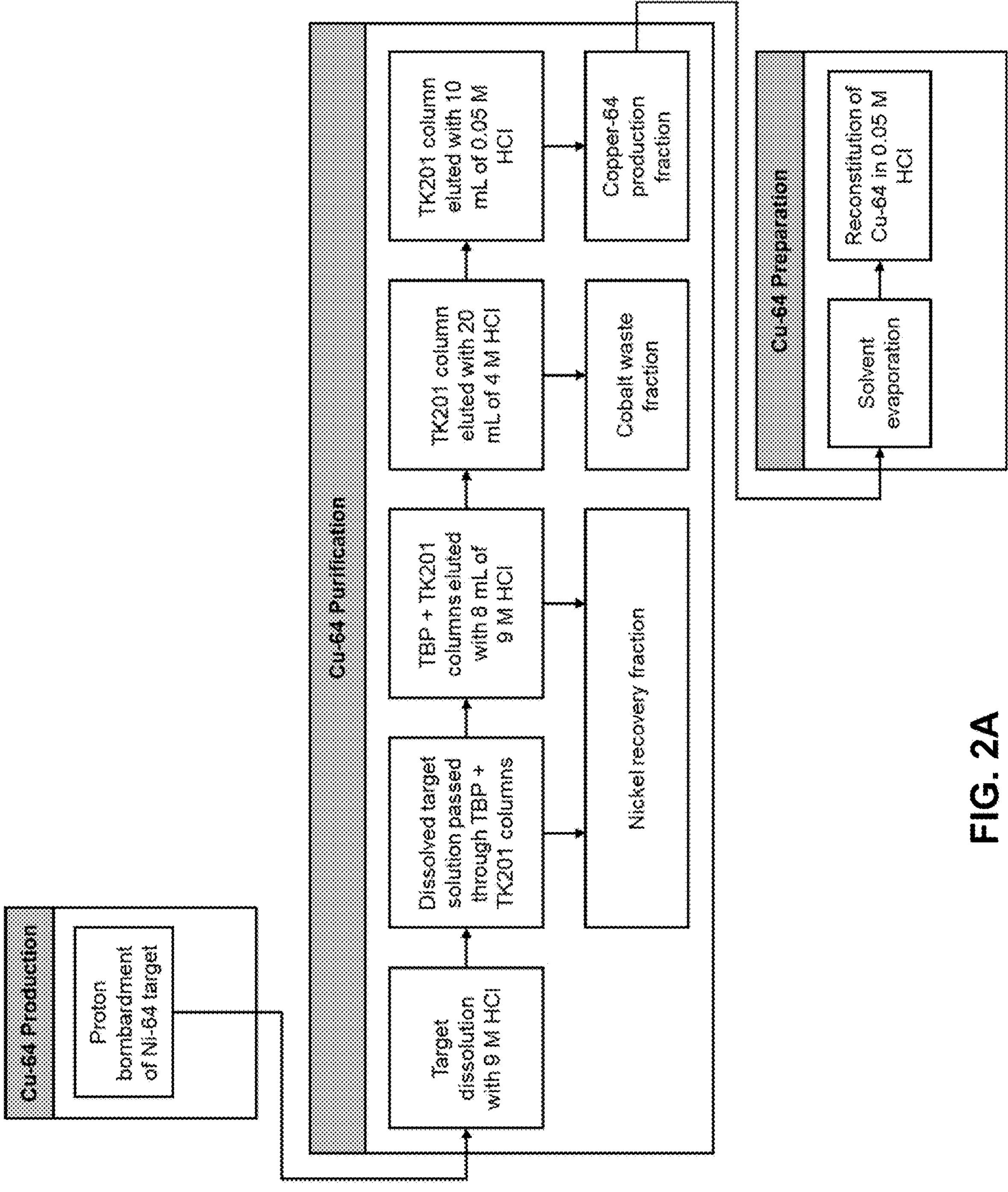
FIGS. 2A, 2B, and 2C present various embodiments of the purification process comprising a combination of extraction chromatography and ion exchange chromatography.
Figure 2B:
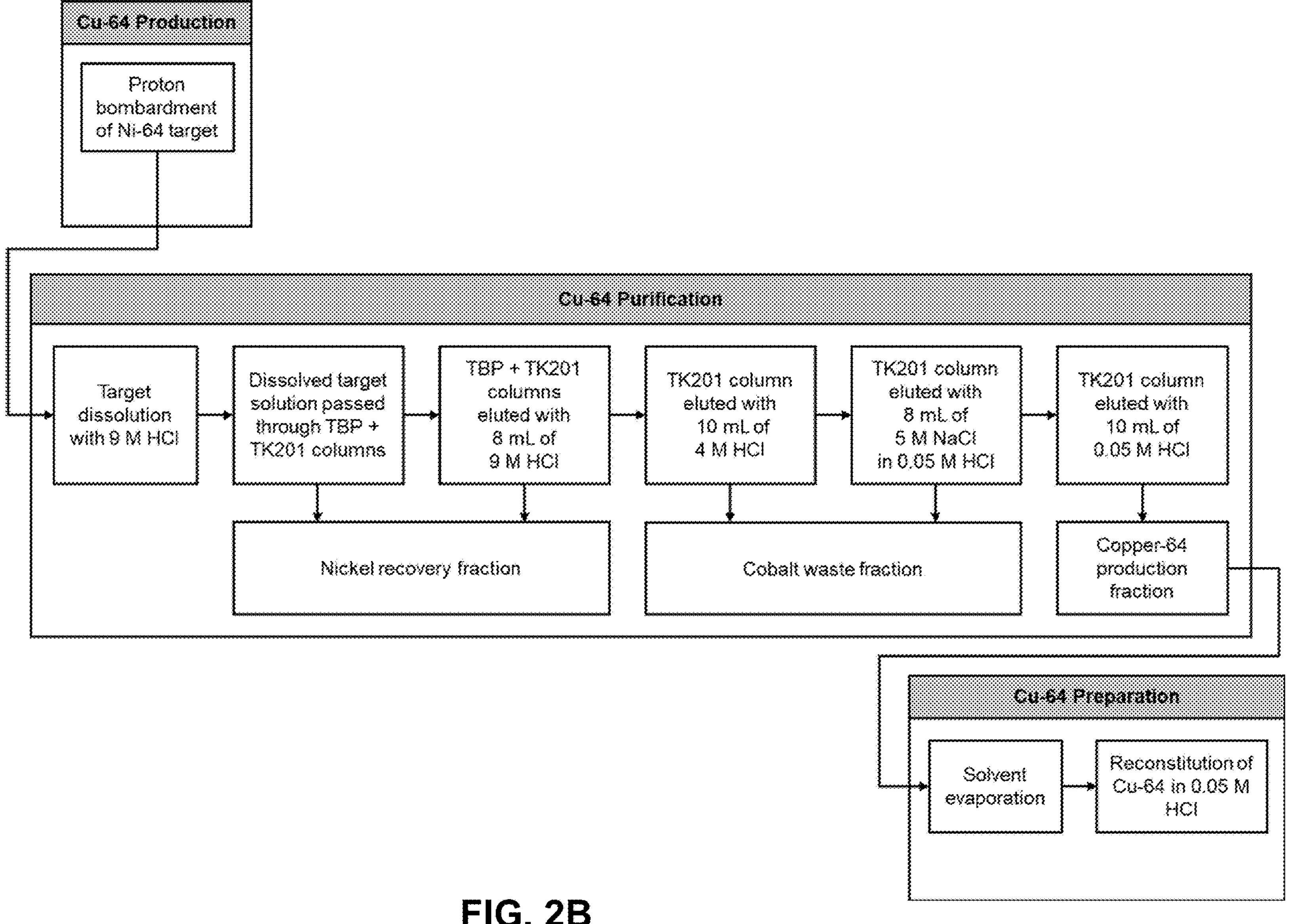
Figure 2C:
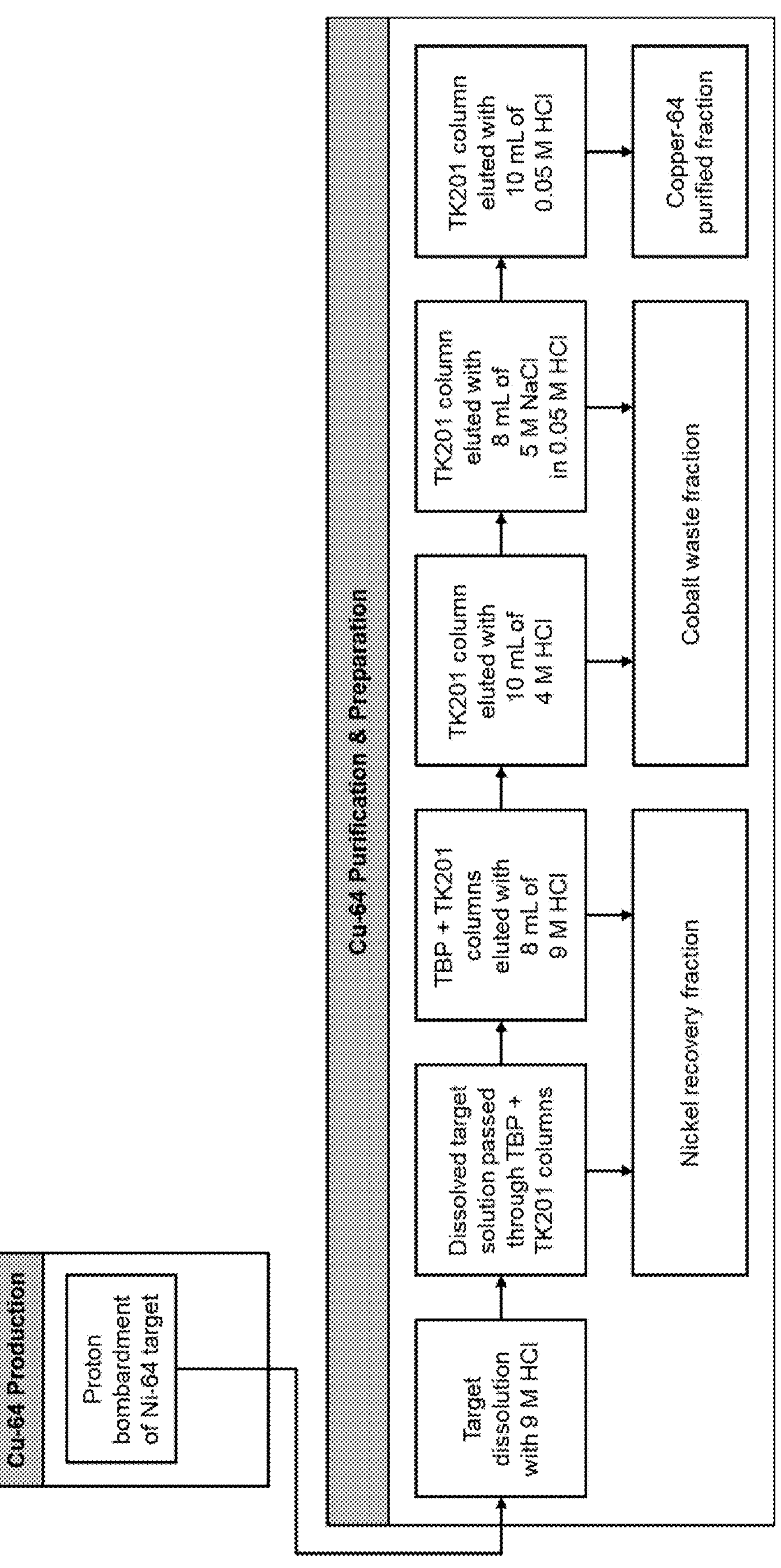

(IV) Processes for Producing Copper-64-Purification by Extraction Chromatography and Ion Exchange Chromatography Another aspect of the present disclosure encompasses an additional process for purifying the $^{64}$Cu from other metals in the strip solution by a combination of extraction chromatography and ion exchange chromatography. The process comprises (a) bombarding a cyclotron target comprising $^{64}$Ni with a proton beam to generate a bombarded target; (b)

stripping the bombarded target with a volume of HCl having a molarity of about 6 M to about 12.1 M to form a strip solution comprising $^{64}$Ni, $^{64}$Cu, $^{61}$Co, and other metals; and (c) purifying the $^{64}$Cu from the strip solution by chromatography, wherein the chromatography comprises (i) passing the strip solution through a first column comprising an extraction resin connected in series to a second column comprising an ion exchange resin such that the one or more metals (e.g., cationic iron) binds to the extraction resin in the first column, the $^{64}$Cu and $^{61}$Co bind to the ion exchange resin in the second column, and $^{64}$Ni passes through both columns as a first flow-through fraction; (ii) rinsing the first and second columns with a volume of HCl having a molarity of about 6 M to about 12.1 M to remove residual $^{64}$Ni as a second flow-through fraction; (iii) rinsing the second column with a volume of HCl having a molarity of about 3 M to about 6 M to elute $^{61}$Co as a first waste fraction; (iv) rinsing the second column with a volume of NaCl having a molarity of about 3 M to 6 M in HCl having a molarity of about 0.01 M to about 3 M to elute residual $^{61}$Co as a second waste fraction or rinsing the second column with an additional volume of HCl having a molarity of about 3 M to about 6 M to elute $^{61}$Co as a second waste fraction; and (v) adding a volume of HCl having a molarity of about 0.01 M to about 3 M to the second column to elute the $^{64}$Cu as a product fraction comprising $^{64}$Cu. FIGS. 2A, 2B, and 2C present schematics or several embodiments of the dual chromatography purification process.

(a) Bombarding the Target

Suitable cyclotrons and cyclotron targets are also described above in Section (II)(a) and Section (III)(a). The cyclotron target may comprise a copper base layer that has been electroplated with gold to a thickness of about 50 μm. The gold-plated cyclotron target then may be plated with enriched $^{64}$Ni. The $^{64}$Ni may be enriched to about 98%, about 99%, about 99.6%, or about 99.9% $^{64}$Ni. The targeting mass of enriched $^{64}$Ni may range from about 675 mg to about 825 mg, from about 700 mg to about 800 mg, from about 720 mg to about 780 mg, or about 750 mg. The plating area may range from about 17.3 cm$^2$ to about 28.8 cm$^2$, from about 18.4 cm$^2$ to about 27.6 cm$^2$, from about 20.7 cm$^2$ to about 25.3 cm$^2$, from about 21.8 cm$^2$ to about 24.2 cm$^2$, from about 22.0 cm$^2$ to about 24.0 cm$^2$, or about 23.0 cm$^2$. The plated layer of $^{64}$Ni may have a thickness from about 21 μm to about 53 μm, from about 26 μm to about 48 μm, from about 32 μm to about 42 μm, or about 37 um.

In the processes disclosed herein, the $^{64}$Ni target area is bombarded with low energy protons to produce $^{64}$Cu. In general, the proton beam of the cyclotron is adjusted to have an energy of less than about 20 MeV on the target. In some embodiments, the energy of the proton beam at the target can range from about 5 MeV to about 20 MeV, about 5 MeV to about 30 MeV, about 10 MeV to about 30 MeV, about 15 MeV to about 30 MeV, from about 7 MeV to about 18 MeV, from about 9 MeV to about 16 MeV, from about 10 MeV to about 15 MeV, from about 11 MeV to about 14 MeV, from about 12 MeV to about 13 MeV, from about 12 MeV to about 14 MeV, from about 15 MeV to about 20 MeV, from about 17 MeV to about 22 MeV, from about 20 MeV to about 25 MeV, from about 22 MeV to about 27 MeV, or from about 25 MeV to about 30 MeV. In specific embodiments, the actual beam energy at the target is about 12 MeV or about 13 MeV.

The current of the proton beam may range up to about 125 μA to about 200 μA, about 200 μA to about 300 μA, about 300 μA to about 700 μA, 350 μA to about 700 μA, 400 μA to about 700 μA, 450 μA to about 700 μA, 500 μA to about 700 μA. The current of the proton beam may range up to 400 μA, up to 500 μA, up to 600 HA, up to 700 μA, up to 800 μA, up to 900 μA, up to 960 μA, or up to 1200 μA. In some embodiments, the current of the proton beam may be split between two targets or a plurality of targets. In an example, the current of the proton beam for each target may be up to about 408 μA. In some embodiments, the current of the proton beam for each target may range from about 100 μA to about 150 μA, from about 150 μA to about 200 μA, from about 200 μA to about 250 μA, from about 250 μA to about 300 μA, from about 300 μA to about 350 μA, or from about 350 μA to about 410 μA, from about 405 μA to about 410 μA, about 410 μA to about 420 μA, about 420 μA to about 440 μA, 440 μA to about 460 μA, or about 460 μA to about 480 μA. In specific embodiments, the current of the proton beam may range from about 325 μA to about 375 μA, or from about 350 μA to about 408 μA.

The proton beam hits the target area at an angle. In some embodiments, the angle of the proton beam may range from about 1° to about 20°, from about 2° to about 10°, from 2° to about 8°, from about 3° to about 6°, or about 5°. In other embodiments, the angle of the proton beam may be tangential to the target area.

In some embodiments, the beam strike has an elliptic shape with minor and major axes. The minor axes may range from about 25.8 mm to about 34.2 mm, from about 27.9 mm to about 32.1 mm, from about 28.8 mm to about 31.2 mm, or about 30.0 mm. The major axes may range from about 84.4 mm to about 63.6 mm, from about 79.2 mm to about 68.8 mm, from about 77.0 mm to about 71.0 mm, or about 74.0 mm. In certain embodiments, the minor and major axis of the elliptic beam strike may be about 30.0 mm and 74.0 mm, respectively. In some embodiments, the proton beam may strike about 70-80%, about 60-90%, or about 55-95% of the entire target face. In other embodiments, the total area covered by the beam may range from about 14.0 cm$^2$ to about 30.0 cm$^2$, from about 28.0 cm$^2$ to about 16.0 cm$^2$, from about 26.0 cm$^2$ to about 18.0 cm$^2$, or from about 25.0 cm$^2$ to about 20.0 cm$^2$, or about 23.0 cm$^2$.

The time of bombardment may range from about 0.5 h to about 24 h. In some embodiments, the time of bombardment may range from 0.5 h to about 8 h, from about 8 h to about 20 h, or from about 20 h to about 24 h. In other embodiments, the bombardment time may range from about 1 h to about 24 h, from about 2 h to about 24 h, from about 4 h to about 24 h, from about 5 h to about 24 h, or about from 5 h to about 23 h. In certain embodiments, the bombardment time may range from about 1 h to about 19 h, from about 2 h to about 19 h, from about 3 h to about 19 h, from about 4 h to about 19 h, or from about 5 h to about 19 h. In other embodiments, the time of bombardment may be less than 19 h, less than 18 h, less than 17.5 h, less than 17 h, less than 16.5 h, less than 16 h, less than 15.5 h, or less than 15 h. In further embodiments, the time of bombardment may be about 8 h, about 9 h, about 10 h, about 11 h, about 12 h, about 13 h, about 14 h, or about 15 h. In specific embodiments, the time of bombardment may range from about 1 h to about 12 h or the time of bombardment may be about 12 h.

In some embodiments, a target comprising about 750 mg $^{64}$Ni may be bombarded with a proton beam having an energy of about 12 MeV to about 14 MeV and a beam current of about 350 μA to about 408 μA for about 10 h, 12 h, 14 h, 16 h, or 19 h. In specific embodiments, two targets each comprising about 750 mg $^{64}$Ni may be bombarded simultaneously with a proton beam having an energy of about 12 MeV to about 14 MeV and a beam current, incident on each target, of about 350 μA to about 408 μA for about 10 h, 12 h, 14 h, or 19 h.

The bombarded target may comprise from about 58 Ci to about 80 Ci of $^{64}$Cu at the end of bombardment (EOB). The bombarded target also comprises unreacted $^{64}$Ni and $^{61}$Co that are produced during the bombardment process. In various embodiments, the bombarded target may comprise from about 38 Ci to about 52 Ci, from about 43 Ci to about 59 Ci, from about 48 Ci to about 66 Ci, from about 52 Ci to about 72 Ci, from about 56 Ci to about 77 Ci, from about 58 Ci to about 80 Ci of $^{64}$Cu, from about 60 Ci to about 150 Ci of $^{64}$Cu, or from about 60 Ci to about 200 Ci of $^{64}$Cu, or greater than 200 Ci of $^{64}$Cu. In general, longer bombardment times will yield higher levels of $^{64}$Cu. For example, bombardment times of about 12 h to about 16 h may yield about 43 Ci to about 72 Ci of $^{64}$Cu at EOB, and bombardments times of about 19 h may yield about 58 Ci to about 80 Ci of $^{64}$Cu at EOB. In general, the processes disclosed herein may produce from about 3.3 Ci/h to about 3.8 Ci/h of bombardment with proton beam having an energy of about 13 MeV and a current of about 350 μA or about 408 μA.

In some embodiments, greater than 12 hours (e.g., ≥12 hours) of bombardment time yields about 50 Ci to about 120 Ci of $^{64}$Cu at EOB. In some embodiments, greater than 12 hours (e.g., ≥12 hours) of bombardment time yields about 50 Ci to about 100 Ci of $^{64}$Cu at EOB. In some embodiments, greater than 12 hours (e.g., ≥12 hours) of bombardment time yields about 60 Ci to about 90 Ci of $^{64}$Cu at EOB. In some embodiments, greater than 12 hours (e.g., ≥12 hours) of bombardment time yields about 60 Ci to about 80 Ci of $^{64}$Cu at EOB. In some embodiments, greater than 12 hours (e.g., ≥12 hours) of bombardment time yields about 60 Ci to about 70 Ci of $^{64}$Cu at EOB.

In certain embodiments, as described herein, a yield of about 75 Ci or more of $^{64}$Cu may be achieved at EOB. In certain embodiments a yield of about 70 Ci or more of $^{64}$Cu may be achieved at EOB. In certain embodiments a yield of about 65 Ci or more of $^{64}$Cu may be achieved at EOB. In certain embodiments a yield of about 60 Ci or more of $^{64}$Cu may be achieved at EOB.

(b) Stripping the Bombarded Target

The next step of the process comprises stripping metals from the bombarded target. The metals are stripped from the target with a strong acid having a pKa of less than 1. Suitable strong acids include hydrochloric acid, nitric acid, hydrobromic acid, and sulfuric acid. In some embodiments, the bombarded target is stripped with HCl having a molarity from about 6 M to about 12.1 M. For example, the bombarded target may be stripped with about 6 M HCl, about 7 M HCl, about 8 M HCl, about 9 M HCl, about 10 M HCl, about 11 M HCl, or about 12.1 M HCl. In specific embodiments, the bombarded target is stripped with about 9 M HCl.

The stripping may comprise adding a volume of the strong acid to a chamber or holding vessel comprising the bombarded target, wherein the target is heated to a temperature from about 65° C. to about 100° C. In particular embodiments, the stripping is conducted at a temperature of about 75° C. After about 3-5 minutes, the acid may be removed and saved as the first strip solution. The target may be contacted with the strong acid several more times, and the resultant solutions combined with the first strip solution. The chamber holding the target then may be rinsed with the strong acid, and the rinse may be combined with the strip solutions to form the final strip solution. In particular embodiments, the bombarded target and the holding chamber may be contacted several times with aliquots (e.g., 5-10 mL) of the strong acid (e.g., HCl) to generate a final strip solution of approximately 20 mL to 40 mL.

In specific embodiments, the stripping comprises contacting the bombarded target with several aliquots of 9 M HCl, at a temperature of about 65° C. to about 100° C., and collecting the aliquots as the strip solution. The chamber holding the bombarded target may be rinsed with 9 M HCl, and the rinse combined with the strip solution. The strip solution comprises $^{64}$Ni, $^{64}$Cu, $^{61}$Co, and can contain other metals (e.g., Fe).

(c) Purifying $^{64}$Cu by Extraction Chromatography and Ion Exchange Chromatography The last step of the process comprises purifying $^{64}$Cu from the other metals in the strip solution by two chromatography columns. The process comprises passing the strip solution through two columns connected in series, the first column comprising an extraction resin and the second column comprising an ion exchange resin.

Extraction chromatography resins generally comprise macroporous polymers that hold an organic complexing compound or extractant within the pore structure of the polymer. Suitable extraction chromatography extractants include tributylphosphate (TBP), carbamoyl-methylphosphine oxide (CMPO), di-(2-ethylhexyl)-phosphoric acid (D2EHPA), and dipentyl pentylphosphonate (DP [PP]). In some embodiments, the extraction chromatography extractant may be a mixture of CMPO and TBP (e.g., TRU resin; TrisKem). In specific embodiments, the extraction chromatography extractant is TBP. An example of a suitable impregnated macroporous polymer (i.e., resin) containing TBP is TrisKem TBP resin. In specific embodiments, the extraction resin may be TBP resin, 100-150 mesh, and in the chloride form.

The ion exchange column comprises a weak anion exchange resin. Weak anion exchange resins generally comprise polystyrene or polyacrylic ester frames that contain a primary, secondary, or tertiary amino group as the functional group. Suitable weak anionic functional groups include diethyl aminoethyl (DEAE) and dimethyl aminoethyl (DMAE). Examples of suitable weak anion exchange resins comprising tertiary ammonium groups include AmberLite™ FPA53 (available from Dupont) and TrisKem TK201 resin. In specific embodiments, the weak anion exchange resin is TK201 resin, 50-100 mesh, and in the chloride form.

A variety of columns sizes and bed volumes may be used to purify $^{64}$Cu from the other metals in the strip solution. This process was developed to effectively isolate $^{64}$Cu generated from about 750 mg of $^{64}$Ni target material, using two distinct columns, containing extraction and weak anion exchange resins, connected in series. The first column comprises about 300 mg of extraction resin in a column having an inner diameter of 0.5 cm. It is understood that the amount of extraction resin may range from about 270 mg to about 330 mg and the inner diameter of the column may range from about 0.4 cm to about 0.6 cm without departing from the scope of the disclosure. The second column uses about 2.7 g of weak anion exchange resin in a column having an inner diameter of about 1 cm. It is understood that the amount of weak anion exchange resin may range from about 2.4 g to about 3.0 g and the inner diameter of the column may range from about 0.7 cm to about 1.25 cm without departing from the scope of the disclosure. Similarly, the volumes of the eluents passed through the column may vary depending upon the size and volume of the column and/or the amount of $^{64}$Ni target material. In general, the columns containing extraction resin and ion exchange resin are equilibrated with HCl (e.g., 9 M HCl) prior to the chromatography process.

(iv) Removing Cationic Fe and $^{64}$Ni

The separation process comprises adding the strip solution to the prepared extraction column connected in series to the prepared ion exchange column. In this process, the strip solution volume comprises around 20 mL to around 40 mL. The strip solution may be added in multiple smaller aliquots (e.g., 4×10 mL, 2×10 mL, etc.) or the strip solution may be added all at once. The Fe in the strip solution binds to the extractant (e.g., TBP) in the first column. The Ni in the strip solution does not bind to the chromatographic resins and freely passes through both columns, while Cu and Co and other metals bind to the ion exchange column. The columns flow through volume may be collected as a Ni recovery fraction.

The columns may be rinsed with an additional volume of HCl having the same molarity as that of the strip solution to completely remove any residual Ni from the columns. For example, the columns may be rinsed with about 8 mL to about 10 mL of 9 M HCl. For example, the columns may be rinsed with about 8 mL of 9 M HCl. The volume of HCl may be added in multiple smaller aliquots (e.g., 4×2 mL, 2×4 mL, etc.) or the volume of HCl may be added all at once. The column flow through from the 9 M HCl rinse may be collected and combined with the original Ni recovery fraction. The combined Ni recovery fraction may be further processed to recover the $^{64}$Ni, which then may be recycled and used for plating additional cyclotron targets. Nickel recovery processes are well known in the art. On average, in tracer studies that mimicked a $^{64}$Cu purification, about 98% of the target Ni present in a simulated strip solution may be recovered from the Ni recovery fraction. In various embodiments, the percentage of Ni recovered in the recovery fraction may range from about 40% to about 99% of the starting Ni.

(v) Removing $^{61}$Co

The separation process further comprises adding a volume of HCl having a molarity from about 3 M to about 6 M to the second column comprising the ion exchange resin to elute $^{61}$Co (and metals other than Cu). In various embodiments, a volume of 3 M HCl, 4 M HCl, 5 M HCl, or 6 M HCl may be added to the ion exchange column. In specific embodiments, a volume (e.g., from about 10 mL to about 20 mL) of 4 M HCl may be added to the ion exchange column. For example, about 10 mL of 4 M HCl may be added to the ion exchange column. The eluent may be added in smaller aliquots (e.g., 5×2 mL, 3×3.33 mL, etc.) or the eluent may be added all at once. The ion exchange column eluate may be collected as a first waste fraction that mainly comprises $^{61}$Co.

The ion exchange column may be rinsed with an additional volume (e.g., from about 8 mL to about 10 mL) of NaCl having a molarity of about 3 M to 6 M in HCl having a molarity of about 0.01 M to about 3 M to elute residual $^{61}$Co. In specific embodiments, a volume (e.g., 8 mL) of 5 M NaCl in 0.05 M HCl may be added to the ion exchange column. The eluent may be added in smaller aliquots (e.g., 4×2 mL, 2×4 mL, etc.) or the eluent may be added all at once. The ion exchange column eluate from the 5 M NaCl eluent containing $^{61}$Co may be collected and combined with the first waste fraction containing $^{61}$Co.

Alternatively, the ion exchange column may be rinsed with an additional volume (e.g., from about 8 mL to about 10 mL) of HCl having a molarity from about 3 M to about 6 M to elute residual $^{61}$Co. In specific embodiments, a volume (e.g., 8 mL) of 4 M HCl may be added to the ion exchange column. The eluent may be added in smaller aliquots (e.g., 4×2 mL, 2×4 mL, etc.) or the eluent mL may be added all at once. The ion exchange column eluate from the 5 M HCl eluent containing $^{61}$Co may be collected and combined with first waste fraction containing $^{61}$Co.

(vi) Isolating $^{64}$Cu

The separation process further comprises adding a volume of HCl having a molarity from about 0.01 M to about 3 M to the ion exchange column to elute the $^{64}$Cu. In certain embodiments, a volume of 0.05 M HCl, 1 M HCl, 2 M HCl, or 3 M HCl may be added to the ion exchange column. In specific embodiments, the $^{64}$Cu may be eluted from the ion exchange column with a volume of 0.05 M HCl. For example, about 10 mL of 0.05 M HCl may be added to the ion exchange column. The eluent may be added in smaller aliquots (e.g., 5×2 mL, 4×2.5 mL, etc.) or the eluent may be added all at once. The eluate comprising $^{64}$Cu is collected as the product of the process. On average, in tracer studies that mimicked a $^{64}$Cu purification, about 89% of the Cu present in a simulated strip solution may be recovered in the eluate comprising Cu. In various embodiments, the percentage of $^{64}$Cu recovered in the eluate comprising $^{64}$Cu may range from about 60% to about 100%. The $^{64}$Cu in the eluate exists as $^{64}CuCl_2$.

The final eluate comprising $^{64}$Cu may be evaporated to dryness (or to a smaller volume) and the resultant residue may be reconstituted in a volume of HCl having a molarity about 0.001 M to about 1 M. In various embodiments, the residue may be reconstituted in HCl having a molarity from about 0.005 M to about 0.5 M, from about 0.010 M to about 0.2 M, from about 0.025 M to about 0.1 M, or from about 0.04 M to about 0.06 M. In specific embodiments, the residue may be reconstituted in 0.05 M HCl to form a final product comprising $^{64}$Cu.

The $^{64}$Cu compositions prepared by this process are described above in section (I).

(iv) Exemplary Extraction and Ion Exchange Chromatography Purification Process

The 9 M HCl strip solution is passed through a first column comprising an extraction resin connected in series with a second column comprising a weak anion exchange resin. The Fe in the strip solution binds to the extraction resin in the first column, $^{64}$Cu and $^{61}$Co bind to the ion exchange resin in the second column, and $^{64}$Ni flows through both columns. The first and second columns are rinsed with 9 M HCl to remove residual $^{64}$Ni. The initial column flow through and the 9 M HCL rinse can be combined as the Ni recovery fraction. The ion exchange column is rinsed with 4 M HCl to elute the $^{61}$Co and then with 5 M NaCl in 0.05 M HCl or additional 4 M HCl to elute residual $^{61}$Co. Lastly, the $^{64}$Cu is eluted from the ion exchange column with 0.05 M HCl.

(V) Improving the Consistency of the Radiochemical Purity of a Radiopharmaceutical Composition The present disclosure also includes a process for improving the consistency of the radiochemical purity (RCP) of radiopharmaceutical compositions comprising $^{64}$Cu coordinated to a targeting ligand through an attached chelating group. Elemental copper (non-radioactive copper) is an existing copper $^{64}$Cu chloride process impurity originating from the copper targets used during cyclotron bombardment. Improvements in target robustness and cyclotron optimization have reduced the level of elemental copper in the radiopharmaceutical composition comprising $^{64}$Cu radiopharmaceuticals. It has been discovered that in some radiopharmaceuticals, RCP may be affected by the presence of elemental copper in the radiopharmaceutical product. For example, in the manufacture of some radiopharmaceutical, it was discovered that the RCP began to diminish as the bombardment process improved and reduced the concentration of elemental copper present in the purified $^{64}CuCl_2$ product. Adding elemental copper to the purified $^{64}CuCl_2$ product used to label some ligands was found to improve the RCP of the resulting labeled radiopharmaceutical. In such cases, to ensure consistent RCP between batches of $^{64}$Cu radiopharmaceutical compositions produced, elemental or non-radioactive copper may be added to the reaction mixture comprising the $^{64}$Cu eluate used to make the $^{64}$Cu radiopharmaceutical composition. This process is referred to herein as "spiking".

In some embodiments, the targeting ligand may be attached to a chelating group for use as a radiopharmaceutical. The targeting moiety may be any peptide, small-molecule inhibitor, antibody or engineered protein that binds a cell-surface receptor, transporter, enzyme, or extracellular matrix component preferentially expressed in pathological tissue. Examples of targeting ligands include but are not limited to DOTATATE, DOTATOC, DOTANOC, PSMA I&T, SAR-bisPSMA, SAR-BBBN, SARTATE, PSMA-R2, PSMA-62, rHPSMA, PSMA-11, PSMA-617, or any other pharmaceutically acceptable targeting ligand The composition(s) comprising Copper-64 ($^{64}$Cu) described herein may be used in radiopharmaceuticals for imaging, positron emission tomography (PET), and/or other theranostic applications. The compositions described herein may be useful for labeling. The compositions described herein may comprise a ligand. Several classes of ligands may be used with $^{64}$Cu, including but not limited to tetraazamacrocyclic ligands (DOTA, NOTA, TETA, etc.), cross-bridged macrocyclic ligands, macrobicyclic and macrotricyclic cage ligands (cryptands), acyclic ligands, dithiocarbamate ligands N2S2 tetradentate ligands, or any other pharmaceutically acceptable ligand. Such ligands include but are not limited to DOTA (1,4,7,10-tetraazacyclododecane-1,4,7,10-tetraacetic acid), TETA (1,4,8,11-tetraazacyclotetradecane-1,4,8,11-tetraacetic acid) NOTA (1,4,7-triazacyclononane-1,4,7-triacetic acid), CB-TE2A (Cross-bridged 1,4,8,11-tetraazacyclotetradecane-1,4-bis (methanecarboxylic acid) CB-TE2P (Cross-bridged 1,4,8,11-tetraazacyclotetradecane-1,8-bis(methanephosphonic acid), or CB-TE1A1P (4,8,11-tetraazacyclotetradecane-1-(methanephosphonic acid)-8-(methanecarboxylic acid).

The composition(s) described herein may be suitable for administration to a human patient in need thereof. The composition(s) described herein may be suitable for administration to a human in need thereof may be carrier-added or non-carrier added. In some embodiments, the composition(s) described herein may be used as radiopharmaceuticals used in nuclear medicine, such as for imaging, diagnosis, therapy, and/or treatment of cancer in a human patient in need thereof. Imaging may comprise detecting or visualizing tumors using techniques such as PET (positron emission tomography). The compositions described herein may comprise a chelating agent and/or a targeting molecule. The compositions described herein may include DOTA, NOTA, or similar group that is a chelating agent. Chelating agents/chelators are molecules that bind to the radioactive isotope, allowing them to be attached to a targeting molecule. In one embodiment, a targeting molecule is attached to a chelating group, which in turn is attached to a radioisotope (e.g., Cu-64) for use as a radiopharmaceutical. Specific targets may comprise PSMA (Prostate-Specific Membrane Antigen) and/or SSTR (Somatostatin Receptor). PSMA is a protein highly expressed on prostate cancer cells. SSTRs are found on neuroendocrine tumors (NETs). Targeting molecules may comprise but are not limited to DOTATATE, DOTATOC, DOTANOC, PSMA I&T, SAR-bisPSMA, SAR-BBBN, SARTATE, PSMA-R2, PSMA-62, rHPSMA, PSMA-11, and PSMA-617) or any PSMA- or SSTR-targeting molecule.

In one embodiment, the $^{64}$Cu radiopharmaceutical composition may be used in labeling ligands. The labeling reaction may occur in a mixture. The mixture may include different activity ranges of $^{64}$Cu. In some embodiments, the mixture may include 2 Ci or greater of $^{64}$Cu. In another aspect, the composition may comprise 2 Ci to 150 Ci of copper-64 ($^{64}$Cu). In some embodiments, the compositions may comprise from about 2 Ci to about 3 Ci, from about 3 Ci to about 4 Ci, from about 4 Ci to about 5 Ci, from about 5 Ci to about 6 Ci, from about 6 Ci to about 7 Ci, from about 7 Ci to about 8 Ci, from about 8 Ci to about 9 Ci, from about 9 Ci to about 10 Ci, from about 10 Ci to about 11 Ci, from about 11 Ci to about 12 Ci, from about 12 to about 13 Ci, from about 13 to about 14, from about 14 Ci to about 15 Ci, from about 15 Ci to about 16 Ci, from about 16 Ci to about 17 Ci, from about 17 Ci to about 18 Ci, from about 18 Ci to about 19 Ci, from about 19 Ci to about 20 Ci, from about 20 Ci to about 21 Ci, from about 21 Ci to about 22 Ci, from about 22 to about 23 Ci, from about 23 to about 24, from about 24 Ci to about 25 Ci, from about 25 Ci to about 26 Ci, from about 26 Ci to about 27 Ci, from about 27 Ci to about 28 Ci, from about 28 Ci to about 29 Ci, from about 29 Ci to about 30 Ci, from about 30 Ci to about 31 Ci, from about 31 Ci to about 32 Ci, from about 32 Ci to about 33 Ci, from about 33 Ci to about 34, from about 34 Ci to about 35 Ci, from about 35 Ci to about 36 Ci, from about 36 Ci to about 37 Ci, from about 37 Ci to about 38 Ci, from about 38 Ci to about 39 Ci, from about 39 Ci to about 40 Ci, from about 40 Ci to about 41 Ci, from about 41 Ci to about 42 Ci, from about 42 Ci to about 43 Ci, from about 43 Ci to about 44 Ci, from about 44 Ci to about 45 Ci, from about 45 Ci to about 46 Ci, from about 46 Ci to about 47 Ci, from about 47 Ci to about 48 Ci, from about 48 Ci to about 49 Ci, from about 49 Ci to about 50 Ci, from about 50 Ci to about 51 Ci, from about 51 Ci to about 52 Ci, from about 52 to about 53 Ci, from about 53 Ci to about 54 Ci, from about 54 Ci to about 55 Ci, from about 55 Ci to about 56 Ci, from about 56 Ci to about 57 Ci, from about 57 Ci to about 58 Ci, from about 58 Ci to about 59 Ci, from about 59 Ci to about 60 Ci, from about 60 Ci to about 61 Ci, from about 61 Ci to about 62 Ci, from about 62 Ci to about 63 Ci, from about 63 Ci to about 64 Ci, from about 64 Ci to about 65 Ci, from about 65 Ci to about 66 Ci, from about 66 Ci to about 67 Ci, from about 67 Ci to about 68 Ci, from about 68 Ci to about 69 Ci, from about 69 Ci to about 70 Ci, from about 70 Ci to about 71 Ci, from about 71 Ci to about 72 Ci, from about 72 to about 73 Ci, from about 73 Ci to about 74 Ci, from about 74 Ci to about 75 Ci, from about 75 Ci to about 76 Ci, from about 76 Ci to about 77 Ci, from about 77 Ci to about 78 Ci, from about 78 Ci to about 79 Ci, from about 79 Ci to about 80 Ci, from about 80 Ci to about 81 Ci, from about 81 Ci to about 82 Ci, from about 82 Ci to about 83 Ci, from about 83 Ci to about 84 Ci, from about 84 Ci to about 85 Ci, from about 85 Ci to about 86 Ci, from about 86 Ci to about 87 Ci, from about 87 Ci to about 88 Ci, from about 88 Ci to about 89 Ci, from about 89 Ci to about 90 Ci, from about 90 Ci to about 91 Ci, from about 91 Ci to about 92 Ci, from about 92 Ci to about 93 Ci, from about 93 Ci to about 94 Ci, from about 94 Ci to about 95 Ci, from about 95 Ci to about 96 Ci, from about 96 Ci to about 97 Ci, from about 97 Ci to about 98 Ci, from about 98 Ci to about 99 Ci, from about 99 Ci to about 100 Ci, from about 100 Ci to about 101 Ci, from about 101 Ci to about 102 Ci, from about 102 to about 103 Ci, from about 103 Ci to about 104 Ci, from about 104 Ci to about 105 Ci, from about 105 Ci to about 106 Ci, from about 106 Ci to about 107 Ci, from about 107 Ci to about 108 Ci, from about 108 Ci to about 109 Ci, from about 109 Ci to about 110 Ci, from about 110 Ci to about 111 Ci, from about 111 Ci to about 112 Ci, from about 112 Ci to about 113 Ci, from about 113 Ci to about 114 Ci, from about 114 Ci to about 115 Ci, from about 115 Ci to about 116 Ci, from about 116 Ci to about 117 Ci, from about 117 Ci to about 118 Ci, from about 118 Ci to about 119 Ci, from about 119 Ci to about 120 Ci, from about 120 Ci to about 121 Ci, from about 121 Ci to about 122 Ci, from about 122 Ci to about 123 Ci, from about 123 Ci to about 124 Ci, from about 124 Ci to about 125 Ci, from about 125 Ci to about 126 Ci, from about 126 Ci to about 127 Ci, from about 127 Ci to about 128 Ci, from about 128 Ci to about 129 Ci, from about 129 Ci to about 130 Ci, from about 130 Ci to about 131 Ci, from about 131 Ci to about 132 Ci, from about 132 to about 133 Ci, from about 133 Ci to about 134 Ci, from about 134 Ci to about 135 Ci, from about 135 Ci to about 136 Ci, from about 136 Ci to about 137 Ci, from about 137 Ci to about 138 Ci, from about 138 Ci to about 139 Ci, from about 139 Ci to about 140 Ci, from about 140 Ci to about 141 Ci, from about 141 Ci to about 142 Ci, from about 142 Ci to about 143 Ci, from about 143 Ci to about 144 Ci, from about 144 Ci to about 145 Ci, from about 145 Ci to about 146 Ci, from about 146 Ci to about 147 Ci, from about 147 Ci to about 148 Ci, from about 148 Ci to about 149 Ci, or from about 149 Ci to about 150 Ci of $^{64}$Cu. In other embodiments, the composition may comprise from about 14.0-14.5 Ci, from about 14.5-15.0 Ci, from about 15.0-15.5 Ci, from about 15.5-16.0 Ci, from about 16.0-16.5 Ci, from about 16.5-17.0 Ci, from about 17.0-17.5 Ci, from about 17.5-18.0 Ci, from about 18.0-18.5 Ci, from about 18.5-19.0 Ci, from about 19.0-22.0 Ci, from about 12.0-15.0 Ci, from about 14.0-15.5 Ci, from about 15.5-17.0 Ci, from about 16.0-17.5 Ci, from about 17.0-18.5 Ci, from about 17.5-19.0 Ci, or from about 19.0-25.0 Ci of $^{64}$Cu.

In one embodiment, the final radiopharmaceutical composition may include from at least about 0.1 ppm to about 5 ppm of elemental copper, about 1 ppm to about 5 ppm of elemental copper, about 2.5 ppm to about 7.5 ppm of elemental copper, about 5 ppm to about 10 ppm of elemental copper, about 5 ppm to about 30 ppm of elemental copper, about 5 ppm to about 50 ppm of elemental copper, about 30 ppm to about 75 ppm of elemental copper, or about 0.1 ppm to about 75 ppm of elemental copper. In some examples, the final radiopharmaceutical composition may include 1 ppm to 75 ppm, 2 ppm to 60 ppm, 5 ppm to 50 ppm, 10 ppm to 40 ppm, or 20 ppm to 30 ppm of elemental copper. The final radiopharmaceutical composition (and the elemental copper) may be in an injectable solution form.

In another embodiment, there is at least about 1 ppm, about 2 ppm, about 5 ppm, about 10 ppm, about 15 ppm, about 20 ppm, about 25 ppm, about 30 ppm, about 35 ppm, about 40 ppm, about 50 ppm, about 55 ppm, or about 60 ppm of elemental copper in the final radiopharmaceutical composition. In still a further embodiment, the amount to elemental, or non-reactive copper, in the final radiopharmaceutical composition is less than about 60 ppm.

As stated in sections (II)-(IV) above, the eluate comprising $^{64}$Cu may be reconstituted in 0.05 M HCl.

Figure 4A:
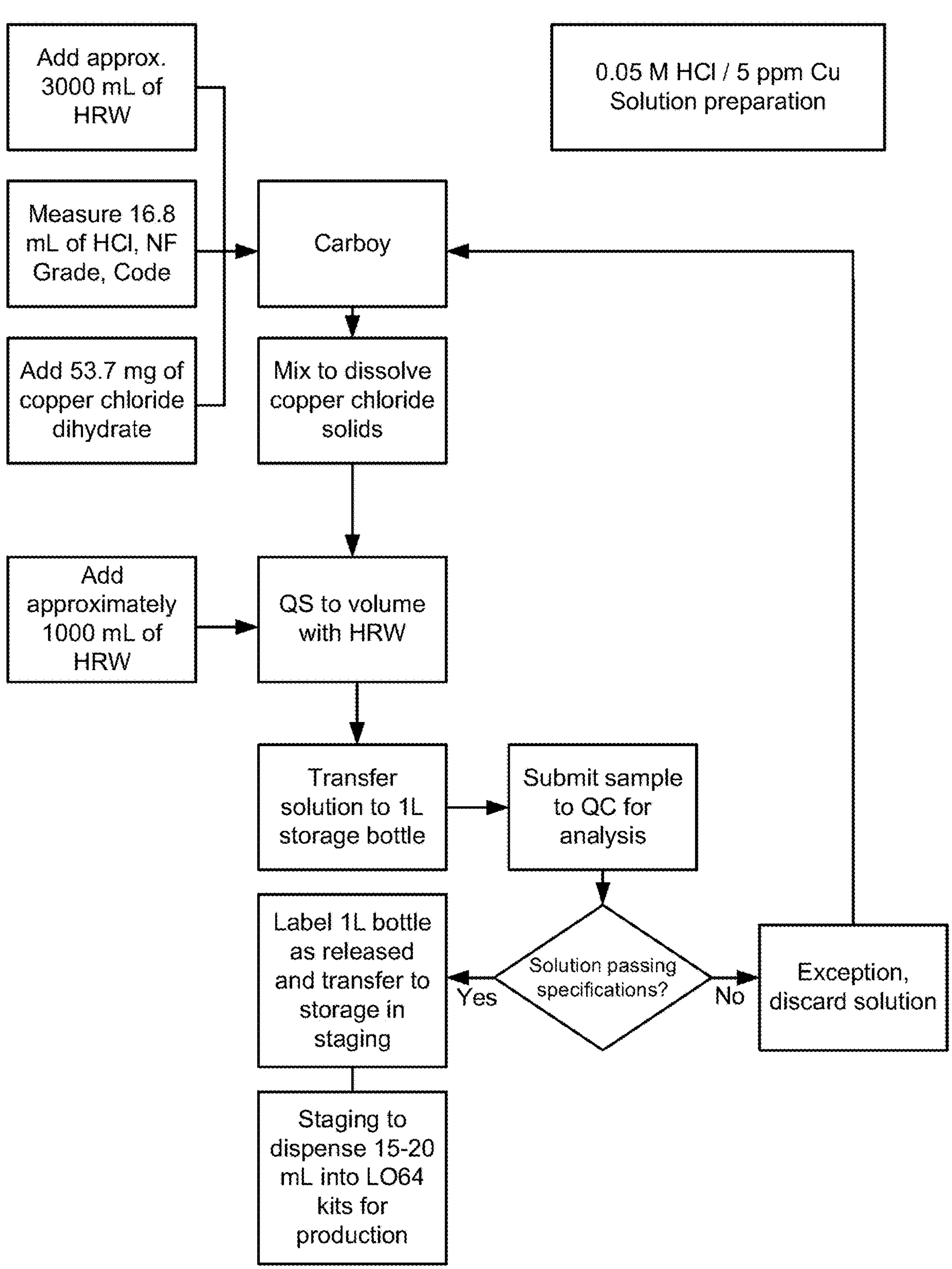
FIGS. 4A and 4B present various embodiments of the process to improve the radiochemical purity of a radiopharmaceutical composition.

The process of spiking the final radiopharmaceutical composition with elemental copper includes (i) preparing a solution comprising 0.05 M HCl solution with 5 ppm elemental copper; and (ii) reconstituting the $^{64}$Cu eluate in the 5 ppm copper in 0.05 M HCl solution. FIG. 4A presents a schematic of an iteration of the process to prepare a 5 ppm elemental copper in 0.05 M HCl solution.

After target stripping, the strip solution may optionally be tested using an in-process copper "spot" test to determine the level of elemental copper in the strip solution. The process may proceed to purification if the result is less than about 20 ppm. If the result is greater than about 20 ppm, a second test may be performed at a determination level of 60 ppm. The process may proceed to purification if the result is less than 60 ppm, and the strip solution may be abandoned if the result is greater than 60 ppm. This process control point ensures that the level of elemental copper remains below the specification of not more than 75 ppm.

Figure 4B:
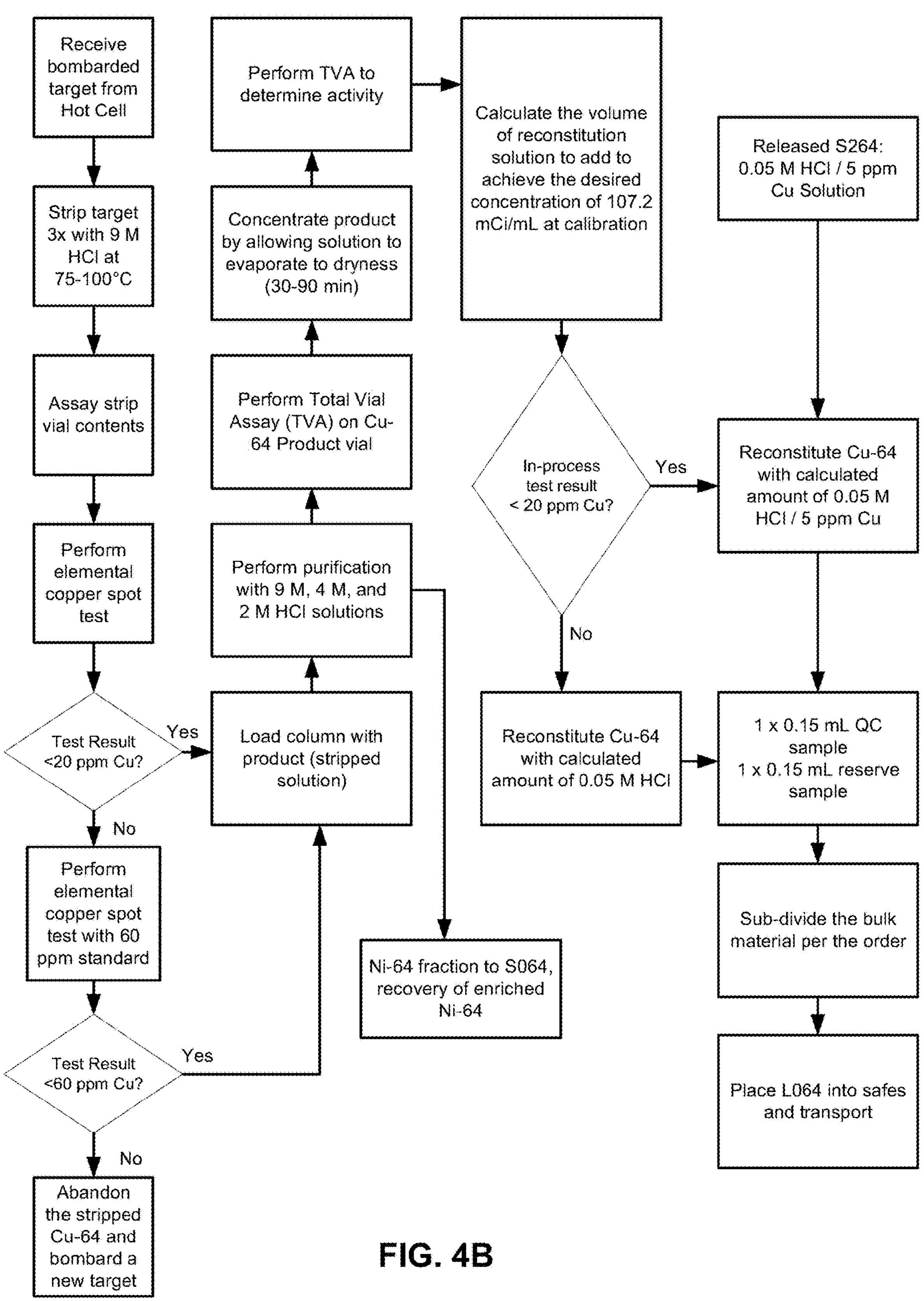

If the in-process spot test result is less than 20 ppm the $^{64}$Cu eluate is reconstituted with about 5 ppm elemental copper in 0.05 M HCl solution. If the in-process spot test result is greater than about 20 ppm but less than about 60 ppm, the $^{64}$Cu eluate may be reconstituted with 0.05 M HCl solution (no additional copper). The reconstituted $^{64}$Cu eluate may then be dispensed for downstream radiolabeling processes to form a radiopharmaceutical composition. If the in-process spot test is greater than 60 ppm, the batch is abandoned, and a new target bombardment is completed. FIG. 4B presents a schematic of an iteration of the process to reconstitute the $^{64}$Cu eluate in a 5 ppm copper in 0.05 M HCl solution.

In other embodiments, after target stripping, the strip solution may optionally be tested using an in-process copper "spot" test to determine whether a lower level of elemental copper is present in the strip solution. In such embodiments, the presence of elemental copper is tested to determine if it is greater than about 5 ppm but less than about 20 ppm, about 25 ppm, about 30 ppm, about 35 ppm, about 40 ppm, about 50 ppm, or about 55 ppm. The test then identifies the concentration limit of elemental copper that is desired for a particular radiopharmaceutical. If the batch exceeds a particular concentration of elemental copper, the batch is discarded. If it is below a particular concentration, the $^{64}$Cu eluate is reconstituted with about 5 ppm elemental copper in 0.05 M HCl solution.

(VI) Cyclotron, Target Design, and Hot Cell

The present disclosure further includes a cyclotron configured to produce high activity amounts of $^{64}$Cu. The cyclotron utilized in the present invention was uniquely designed to be configured to operate at a lower energy and/or a higher amperage. For example, the cyclotron disclosed herein may operate at a higher current up to 1200 μA and at lower MeV energies below 15 MeV, while previous cyclotrons usually only operated up to 800 μA at an energy of 15 MeV to 30 MeV. In non-limiting examples, the cyclotron may produce a proton beam with current of at least 800 μA, at least 850μ, at least 900μ, at least 950μ, at least 1000 μA, at least 1100 μA, or at least 1200 μA. In some embodiments, the beam may be split between multiple targets. In addition, the cyclotron disclosed herein may be configured to operate at energy levels lower than 15 MeV, while previous cyclotrons usually only operated at energy levels of 15 MeV to 30 MeV. For example, the cyclotron may be configured to generate a proton beam with an energy of up to 30 MeV, 15 MeV, 14 MeV, 13 MeV, 12 MeV, 11 MeV, or 10 MeV. A beam energy of 13 to 30 MeV may be important for the production of $^{64}Cu$. In an example, when bombarding the target with 13 MeV energy, the attrition of power decreases as it passes through the $^{64}Ni$ to the key energy of 11 MEV, which may be the optimal energy to turn $^{64}Ni$ into $^{64}Cu$. In some other embodiments, the particle accelerator employed may be a linear accelerator (linacs).

The particle accelerator (e.g. cyclotron) configured to produce both lower energy and higher current used with the particle accelerator (e.g. cyclotron) target and processes as described herein then allows for the production of higher activity $^{64}Cu$ that was not achievable with the energy and current specifications of previously used cyclotrons.

The present disclosure also includes a particle accelerator (e.g. cyclotron) target that may be used with the particle accelerator (e.g. cyclotron) for generating radionuclides. Various embodiments are shown in the figures. The target may include a target body and a beam plate. The target body has a top surface, a bottom surface, and a side surface around the sides of the target body between the top surface and the bottom surface. In some embodiments, the target body may have a ledge extending from the bottom surface. The beam plate has a top surface and a bottom surface. The target body and beam plate are connected using a plurality of screws and O-rings. The top surface of the target body may interface with the bottom surface of the beam plate when connected.

The target (e.g. the beam plate and the target body) may have a length of about 50 mm to about 200 mm, about 50 mm to about 75 mm, about 75 mm to about 100 mm, about 100 mm to about 125 mm, about 125 mm to about 150 mm, about 150 mm to about 175 mm, or about 175 mm to about 200 mm. The target may have a width of about 50 mm to about 100 mm, about 50 mm to about 60 mm, about 60 mm to about 70 mm, about 70 mm to about 80 mm, about 80 mm to about 90 mm, or about 90 mm to about 100 mm. In some examples, the ledge of the target body may extend 3 mm to 10 mm from the target body. Thus, the target body may have a length and width that is 6 mm to 200 mm larger than the beam plate. The target may have a height of about 15 mm to about 45 mm, about 15 mm to 25 mm, about 25 mm to about 30 mm, about 30 mm to about 35 mm, or about 35 mm to 45 mm. The beam plate may have a height/thickness of about 3 mm to about 10 mm, about 3 mm to about 5 mm, about 4 mm to about 6 mm, about 5 mm to about 7 mm, about 6 mm to about 8 mm, about 7 mm to about 9 mm, about 8 mm to about 10 mm, about 4 mm to about 4.5 mm, about 4.5 mm to about 5 mm, about 5 mm to about 5.5 mm, about 5.5 mm to about 6 mm, about 6 mm to about 6.5 mm, about 6.5 mm to about 7 mm, about 7 mm to about 7.5 mm, or about 7.5 mm to about 8 mm. In one example, the beam plate may have a thickness of about 6 mm.

The target may be plated with materials to be used in generating a desired radionuclide, such as $^{64}Cu$ or $^{68}Ge$. In an embodiment, the beam plate may further include any material that can be electroplated. Depending on the material to be used for the target, the beam plate may include a pocket cut into the top surface of the beam plate. The pocket may be configured to contain a non-solid material that cannot be electroplated. In one example, the pocket may be configured to contain nickel germanium. In other example, the beam plate does not need to include a pocket. For example, the beam plate may include enriched nickel with electroplated copper.

The target body may further include an inlet for receiving a flow of water connected to an inlet of the beam plate and an outlet for receiving the flow of water from an outlet of the beam plate, such that water flows through the inlet of the target body, into the inlet of the beam plate, through a plurality of channels/cooling fins in the beam plate, out the outlet of the beam plate, and out the outlet of the target body.

The beam plate may have 4, 5, 6, 7, 8, 9, 10, 11, 12, 13, 14, 15, 16, 17, 18, 19, 20, 21, 22, 23, 24, 25, 26, 27, 28, 29, or 30 channels/cooling fins. In some examples, the beam plate may have 5 to 10, 10 to 15, 15 to 20, 20 to 25, 25 to 30, 30 to 40, or 40 to 50 channels/cooling fins. Each channel/cooling fin may have a width of about 0.4 mm, about 0.5 mm, about 0.6 mm, about 0.7 mm, about 0.8 mm, about 0.8 mm, about 0.9 mm, or about 1 mm. Each channel/cooling fin may have a height ranging from about 3.5 mm to about 5.5 mm, about 3.5 mm to about 4 mm, about 4 mm to about 4.5 mm, about 4.5 mm to about 5 mm, or about 5 mm to about 5.5 mm. The channels/cooling fins may have the same height, different height, or combinations thereof. The water flow area within each of the channels/cooling fins may range from about 2 $mm^2$ to about 2.5 $mm^2$, about 2.5 $mm^2$ to about 3 $mm^2$, or about 3 $mm^2$ to about 3.5 $mm^2$. The channels/cooling fins may be spread across the beam plate and generally covers at least 50%, at least 55%, at least 60%, at least 65%, at least 70%, at least 75%, or at least 80% of the length and/or width of the beam plate.

The beam plate may have a higher water flow area (i.e. more heat removed from the beam plate) as compared to prior targets with only 2-3 channels or water flow areas. The water flow area within the target and cooling fins may range from 40 $mm^2$ to 45 $mm^2$, 45 $mm^2$ to 50 $mm^2$, 50 $mm^2$ to 55 $mm^2$, 55 $mm^2$ to 60 $mm^2$, 60 $mm^2$ to 65 $mm^2$, 65 $mm^2$ to 70 $mm^2$, 70 $mm^2$ to 75 $mm^2$, 75 $mm^2$ to 80 $mm^2$, 80 $mm^2$ to 85 $mm^2$, or 85 $mm^2$ to 90 $mm^2$. In at least one example, the water flow area through 25 channels/cooling fins is about 77 $mm^2$ to 78 $mm^2$. The water flow rate within the target and cooling fins may range from 40 L/min to 90 L/min, 50 L/min to 90 L/min, 55 L/min to 90 L/min, 40 L/min to 50 L/min, 50 L/min to 55 L/min, 55 L/min to 60 L/min, 60 L/min to 65 L/min, 65 L/min to 70 L/min, 70 L/min to 75 L/min, or 75 L/min to 80 L/min, 80 L/min to 85 L/min, or 85 L/min to 90 L/min.

The channels/cooling fins may be rectangular in shape, cylindrical in shape, oval in shape, or have one rounded edge or end. In some embodiments, having a radius along a top edge of each of the channels/cooling fins improves the water cooling efficiency by up to 5%, up to 7%, or up to 10%, as compared to channels/cooling fins with a squared edge. The inlet and outlet of the beam plate may include cutout portions to widen the inlet to match the width of the area covered by the plurality of channels/cooling fins. This may reduce the turbulence of the water from the inlet entering the channels/cooling fins.

The target may include 1, 2, 3, 4, 5, 6, 7, 8, 9, 10, 11, 12, 13, 14, 15, 16, 17, 18, 19, or 20 screws. The screws may be positioned around the perimeter of the beam plate and extend through the top surface of the target body to secure the beam plate to the target body.

The target body may further include one or more holes on the side surface. In some embodiments, there may be a hole at each location where a screw is within the target body. The hole may be perpendicular to the length of each screw. The holes may help to pull air out of the target and improve the pump down of the target.

The target may include 1, 2, 3, 4, 5, 6, 7, 8, 9, or 10 O-rings. In an embodiment, the target may include an outer O-ring, an inner O-ring, an inlet O-ring, and an outlet O-ring. The outer O-ring may be configured to surround the outer surface of the target body. For example, the circumference of the outer O-ring may be approximately the same as the circumference of the target body. The outer O-ring may rest on the ledge extending from the bottom surface of the target body. The inner O-ring may be configured to be within the interface of the target body and the beam plate. In some examples, the target body may have an inset configured to hold the inner O-ring. The inset may be around the perimeter of the top surface of the target body. The inlet O-ring may be positioned within the inlet of the target body and the outlet O-ring may be positioned within the outlet of the target body. There may be high O-ring compression within the target. For example, there may be 35% O-ring compression.

In some embodiments, the beam plate may include one or more notches that are configured to receive one or more protrusions of the target base. The protrusions may have a triangular, pointed shape. For example, the notch may be a 90 degree (i.e.,) 90° angle. In some embodiments, protrusions and corresponding notches may be located where there is high point pressure. The shape and location of the protrusion and corresponding notch may help to minimize water to vacuum leak when thermal shock appears. For example, the notch may cut into an O-ring to minimize steam pressure and leaking.

In some embodiments, the beam plate may be made of copper and may be plated with further materials. For example, the beam plate may be made of oxygen-free Cu Alloy 101. The target base may be made of aluminum. For example, the target body may be made of Alu 6061-T6. The screws may be made of stainless steel. For example, the screws may be made of SS 18-8. The O-rings may be any O-ring known in the art, including but not limited to Viton® 2-152 durometer 75A, Buna-N AS5668A Dash No 2-212, Markez® Durometer 75A (2-152) W35760, any equivalent FFKM O-ring, or any suitable fluoroelastomer O-ring.

The target base may include one or more openings in the lower surface for reducing the weight of the target. For example, the target base may include 1, 2, 3, 4, 5, 6, 7, 8, 9, 10, 11, 12, 13, 14, or 15 openings to reduce the weight of the target. The openings may have the same diameter, a different diameter, or combinations thereof. The target may have a weight ranging from 400 g to 600 g, 400 g to 450 g, 450 g to 500 g, 500 g to 550 g, or 550 g to 600 g. The target may have a weight that allows it to be transported in a transport tube in a hot cell. For example, the total target weight, including the O-rings, may be about 502 g for a copper target and about 496 g for a germanium target. The plating material may have a weight ranging from 450 mg to 650 mg, 450 mg to 475 mg, 475 mg to 500 mg, 500 mg to 525 mg, 525 mg to 550 mg, 550 mg to 575 mg, 575 mg to 600 mg, 600 mg to 625 mg, or 625 mg to 650 mg. The beam plate may have a plated surface area of 2000 $mm^2$ to 3000 $mm^2$, 2000 $mm^2$ to 2100 $mm^2$, 2100 $mm^2$ to 2200 $mm^2$, 2200 $mm^2$ to 2300 $mm^2$, 2300 $mm^2$ to 2400 $mm^2$, 2400 $mm^2$ to 2500 $mm^2$, 2500 $mm^2$ to 2600 $mm^2$, 2600 $mm^2$ to 2700 $mm^2$, 2700 $mm^2$ to 2800 $mm^2$, 2800 $mm^2$ to 2900 $mm^2$, or 2900 $mm^2$ to 3000 $mm^2$.

Design requirements for cGMP Hot Cells for recovering and purification of a radioactive Isotope. The Hot Cells Interior may be designed as a Grade C Environment, to eliminate possible contamination inside the Cells. (The official environmental classification for validation and commercial operation may remain Controlled Unclassified). The Hot Cells may be adjoined by guillotine doors with each other, completely furnished, shielded enclosures. Lead shielding may be for up to 107 Ci of $^{64}$Cu.

To safely process large quantities of $^{64}$Cu (>20 Ci), several distinct design considerations were needed. For safe and effective transport of the irradiated target, a target transport tube equipped to transfer the larger targets had to be built. The target strip cell was designed to hold the new target. The final product volumes will increase with activity, so a PLC controlled dispenser was programmed to accurately deliver solution volumes to meet product concentration requirements. A product safe and safe lift mechanism were designed to shield operators from the high activity levels when removing product from the hot cells.

In some embodiments, the hot cell may include chamber coating for acid resistance (e.g. SR65 ethylenechlorotrifluoroethylene (ECTFE)), a shielding requirement equivalent to shield up to 107 Ci of $^{64}$Cu, two tele-manipulators per hot cell, a pneumatically operated target send/receive station, shielded waste chambers, a guillotine door connecting hot cells, the ability to operate under negative pressure, and an ionization chamber (dose calibrator) for sample measurements.

(VII) Specific Compositions and Methods of the Disclosure

Accordingly, the present disclosure relates in particular to the following non-limiting compositions and methods.

In a first composition, Composition 1, the present disclosure provides a composition comprising from about 20 Ci to about 110 Ci of isolated copper-64 ($^{64}$Cu) and having a specific activity up to about 3850 mCi $^{64}$Cu/μg Cu.

In another composition, Composition 2, the present disclosure provides a composition comprising from about 20 Ci to about 110 Ci of $^{64}$Cu at the end of bombardment (EOB) of a single cyclotron run.

In another composition, Composition 3, the present disclosure provides a composition comprising from about 2 Ci to about 5 Ci of $^{64}$Cu at EOB of a single cyclotron run of about 2 h or about 4 h.

In another composition, Composition 4, the present disclosure provides a composition comprising from about 5 Ci to about 9 Ci of $^{64}$Cu at EOB of a single cyclotron run of about 6 h.

In another composition, Composition 5, the present disclosure provides a composition comprising up to about 15 Ci of $^{64}$Cu at EOB of a single cyclotron run of about 12 h.

In another composition, Composition 6, the present disclosure provides a composition, as provided in any one of Compositions 1 to 5, wherein the composition has a specific activity from about 40 mCi $^{64}$Cu/μg Cu to about 3850 mCi $^{64}$Cu/μg Cu.

In another composition, Composition 7, the present disclosure provides a composition, as provided in any one of Compositions 1 to 6, wherein the composition has a specific activity from about 40 mCi $^{64}$Cu/μg Cu to about 2300 mCi $^{64}$Cu/μg Cu.

In another composition, Composition 8, the present disclosure provides a composition, as provided in any one of Compositions 3 to 7, wherein the single cyclotron run comprises bombarding a nickel-64 target with a beam of protons having an energy of about 12 MeV to about 14 MeV.

In another composition, Composition 9, the present disclosure provides a composition, as provided in any one of Compositions 1 to 8, wherein the composition has a total content of trace metals of less than about 5 parts per million (ppm), the trace metals being cobalt, copper, gold, iron, lead, mercury, nickel, and zinc.

In another composition, Composition 10, the present disclosure provides a composition, as provided in any one of Compositions 1 to 9, wherein the composition comprises a solution of hydrochloric acid (HCl).

In another composition, Composition 11, the present disclosure provides a composition, as provided in Composition 10, wherein the solution comprises about 0.001 M to about 3 M HCl.

In another composition, Composition 12, the present disclosure provides a composition, as provided in Compositions 10 or 11, wherein the solution comprises about 2 M HCl.

In another composition, Composition 13, the present disclosure provides a composition, as provided in any one of Compositions 10 to 12, wherein the solution comprises about 0.05 M HCl.

In another composition, Composition 14, the present disclosure provides a composition, as provided in any one of Compositions 10 to 13, wherein the $^{64}Cu$ exists as $^{64}CuCl_2$.

In another composition, Composition 15, the present disclosure provides a composition, as provided in any one of Compositions 1 to 14, wherein the composition further comprises a chelating agent or a bifunctional chelating agent in which the $^{64}Cu$ is coordinated therein.

In another composition, Composition 16, the present disclosure provides a composition, as provided in Composition 15, wherein the chelating agent or the bifunctional chelating agent is a macrocyclic compound, a bridged macrocyclic compound, a bicyclic compound, or an acyclic compound.

In another composition, Composition 17, the present disclosure provides a composition, as provided in Compositions 15 or 16, wherein the bifunctional chelating agent is DOTA.

In another composition, Composition 18, the present disclosure provides a solution comprising (i) about 2 Ci to about 15 Ci of $^{64}Cu$ that has a specific activity up to about 3800 mCi $^{64}Cu$/μg Cu and (ii) HCl.

In another composition, Composition 19, the present disclosure provides a composition, as provided in Composition 18, wherein the specific activity of the solution is from about 40 mCi $^{64}Cu$/μg Cu to about 2300 mCi $^{64}Cu$/μg Cu.

In another composition, Composition 20, the present disclosure provides a composition, as provided in Compositions 18 or 19, wherein the HCl has a concentration from about 0.001 M to about 3 M.

In another composition, Composition 21, the present disclosure provides a composition, as provided in any one of Compositions 18 to 20, wherein the HCl has a concentration of about 0.5 M.

In another composition, Composition 22, the present disclosure provides a composition, as provided in any one of Compositions 18 to 21, wherein the $^{64}Cu$ exists as $^{64}CuCl_2$.

In another composition, Composition 23, the present disclosure provides a composition, as provided in any one of Compositions 18 to 22, wherein the solution has a total content of trace metals of less than about 5 ppm, the trace metals being cobalt, copper, gold, iron, lead, mercury, nickel, and zinc.

In another composition, Composition 24, the present disclosure provides a composition, as provided in any one of Compositions 18 to 23, wherein the solution further comprises a chelating agent or a bifunctional chelating agent in which the $^{64}Cu$ is coordinated therein.

In another composition, Composition 25, the present disclosure provides a composition, as provided in Composition 25, wherein the chelating agent or the bifunctional chelating agent is a macrocyclic compound, a bridged macrocyclic compound, a bicyclic compound, or an acyclic compound.

In another composition, Composition 26, the present disclosure provides a composition, as provided in Compositions 24 or 25, wherein the bifunctional chelating agent is DOTA.

In a first process, Process 1, the present disclosure provides a process for preparing copper-64 ($^{64}Cu$) from nickel-64 ($^{64}Ni$), the process comprising (a) bombarding a cyclotron target comprising $^{64}Ni$ with a proton beam to generate a bombarded target; (b) stripping the bombarded target with a volume of hydrochloric acid (HCl) having a molarity of about 6 M to about 12.1 M to form a strip solution comprising $^{64}Ni$ and $^{64}Cu$; and (c) purifying the $^{64}Cu$ from the strip solution by ion exchange chromatography comprising: (i) passing the strip solution through a column comprising an ion exchange resin such that $^{64}Cu$ binds to the ion exchange resin and $^{64}Ni$ passes through the column as a flow-through; (ii) rinsing the column with a volume of HCl having a molarity of about 3 M to about 6 M; and (iii) adding a volume of HCl having a molarity of about 0.5 M to about 3 M to the column to elute the $^{64}Cu$ from the ion exchange resin and collecting an eluate comprising $^{64}Cu$.

In another process, Process 2, the present disclosure provides a process, as provided in Process 1, wherein the cyclotron target comprises about 50 mg of $^{64}Ni$ plated in an area of about 4.0 $cm^2$.

In another process, Process 3, the present disclosure provides a process, as provided in Processes 1 or 2, wherein the proton beam has an energy of about 10 MeV to about 14 MeV and a current of about 100 μA to about 250 μA.

In another process, Process 4, the present disclosure provides a process, as provided in any one of Processes 1 to 3, wherein the proton beam has an energy of about 12 MeV and a current up to about 225 μA.

In another process, Process 5, the present disclosure provides a process, as provided in any one of Processes 1 to 4, wherein the bombarding proceeds for about 1 h to about 6 h.

In another process, Process 6, the present disclosure provides a process, as provided in any one of Processes 1 to 5, wherein after the bombarding, the bombarded target comprises from about 2 Ci to about 12 Ci of $^{64}Cu$ at the end of bombardment (EOB).

In another process, Process 7, the present disclosure provides a process, as provided in Process 6, wherein after about 2 h to about 4 h of bombarding, the bombarded target comprises from about 2 Ci to about 5 Ci of $^{64}Cu$ at EOB.

In another process, Process 8, the present disclosure provides a process, as provided in Process 6, wherein after about 6 h of bombarding, the bombarded target comprises from about 5 Ci to about 9 Ci of $^{64}Cu$ at EOB.

In another process, Process 9, the present disclosure provides a process, as provided in any one of Processes 1 to 8, wherein the stripping of the bombarded target is conducted at a temperature of about 65° C. to about 100° C.

In another process, Process 10, the present disclosure provides a process, as provided in any one of Processes 1 to 9, wherein the stripping comprises contacting the bombarded target three times with an aliquot of 9 M HCl for about 3-5 minutes each time, and collecting the aliquots as the strip solution.

In another process, Process 11, the present disclosure provides a process, as provided in any one of Processes 1 to 10, wherein the bombarded target is rinsed with an additional aliquot of 9 M HCl, which is then added to the strip solution.

In another process, Process 12, the present disclosure provides a process, as provided in any one of Processes 1 to 11, wherein the ion exchange resin is a strong anion exchange resin comprising trimethylbenzyl ammonium chloride groups.

In another process, Process 13, the present disclosure provides a process, as provided in any one of Processes 1 to 12, wherein the flow-through from passing the strip solution through the column is collected as a $^{64}$Ni recovery fraction.

In another process, Process 14, the present disclosure provides a process, as provided in any one of Processes 1 to 13, wherein after passing the strip solution through the column, a further volume of 9 M HCl is added to the column and its flow-through is combined with the $^{64}$Ni recovery fraction.

In another process, Process 15, the present disclosure provides a process, as provided in Process 14, wherein an average of about 82% of the target $^{64}$Ni is recovered in the $^{64}$Ni recovery fraction.

In another process, Process 16, the present disclosure provides a process, as provided in any one of Processes 1 to 15, wherein the rinsing comprises adding 4 M HCl to the column to elute cobalt, which is collected as a waste fraction.

In another process, Process 17, the present disclosure provides a process, as provided in any one of Processes 1 to 16, wherein the $^{64}$Cu is eluted form the column with 2 M HCl.

In another process, Process 18, the present disclosure provides a process, as provided in any one of Processes 1 to 17, wherein an average of about 80% of the $^{64}$Cu present in the strip solution is recovered in the eluate comprising $^{64}$Cu.

In another process, Process 19, the present disclosure provides a process, as provided in any one of Processes 1 to 18, wherein the eluate comprising $^{64}$Cu is evaporated to dryness and reconstituted in 0.05 M HCl, thereby forming a final product comprising $^{64}$Cu.

In another process, Process 20, the present disclosure provides a process, as provided in Process 19, wherein the final product comprising $^{64}$Cu comprises from about 2 Ci to about 12 Ci of $^{64}$Cu.

In another process, Process 21, the present disclosure provides a process, as provided in Processes 19 or 20, wherein the final product comprising $^{64}$Cu has a specific activity up to about 3800 mCi $^{64}$Cu/μg Cu.

In another process, Process 22, the present disclosure provides a process, as provided in any one of Processes 19 to 21, wherein the final product comprising $^{64}$Cu has a specific activity from about 40 mCi $^{64}$Cu/μg Cu to about 2300 mCi $^{64}$Cu/μg Cu.

In another process, Process 23, the present disclosure provides a process, as provided in any one of Processes 19 to 22, wherein the final product comprising $^{64}$Cu has a total content of trace metals of less than about 5 ppm, the trace metals being cobalt, copper, gold, iron, lead, mercury, nickel, gallium, germanium, zinc, and combinations thereof.

In another process, Process 24, the present disclosure provides an additional process for preparing copper-64 ($^{64}$Cu) from nickel-64 ($^{64}$Ni), in which the $^{64}$Cu is purified by a combination of extraction chromatography and ion exchange chromatography. The process comprises (a) bombarding a cyclotron target comprising $^{64}$Ni with a proton beam to generate a bombarded target; (b) stripping the bombarded target with a volume of HCl having a molarity of about 6 M to about 12.1 M to form a strip solution comprising $^{64}$Ni, $^{64}$Cu, $^{61}$Co, and one or more trace metals; and (c) purifying the $^{64}$Cu from the strip solution by chromatography, wherein the chromatography comprises (i) passing the strip solution through a first column comprising an extraction resin connected in series to a second column comprising an ion exchange resin, such that the one or more trace metals binds to the extraction resin in the first column, $^{64}$Cu and $^{61}$Co bind to the ion exchange resin in the second column, and $^{64}$Ni passes through both columns as a first flow-through fraction. The process further comprises (ii) rinsing the first and second columns with a volume of HCl having a molarity of about 6 M to about 12.1 M to remove residual $^{64}$Ni as a second flow-through fraction; (iii) rinsing the second column with a volume of HCl having a molarity of about 3 M to about 6 M to elute $^{61}$Co as a first waste fraction; (iv) rinsing the second column with a volume of NaCl having a molarity of about 3 M to 6 M in HCl having a molarity of about 0.01 M to about 3 M to elute residual $^{61}$Co as a second waste fraction or rinsing the second column with an additional volume of HCl having a molarity of about 3 M to about 6 M to elute $^{61}$Co as a second waste fraction; and (v) adding a volume of HCl having a molarity of about 0.01 M to about 3 M to the second column to elute the $^{64}$Cu as a product fraction comprising $^{64}$Cu.

In another process, Process 25, the present disclosure provides a process, as provided in Process 24, wherein the cyclotron target at (a) comprises about 750 mg of $^{64}$Ni plated in an area of about 23.0 cm$^2$.

In another process, Process 26, the present disclosure provides a process, as provided in Processes 24 or 25, wherein the proton beam at (a) has an energy of about 10 MeV to about 15 MeV and a current of about 350 μA to about 408 μA.

In another process, Process 27, the present disclosure provides a process, as provided in any one of Processes 24 to 26, wherein the proton beam at (a) has an energy of about 13 MeV and a current of about 350 μA to about 408 μA.

In another process, Process 28, the present disclosure provides a process, as provided in any one of Processes 24 to 27, wherein the bombardment (a) proceeds for about 12 h to about 24 h, and the bombarded target comprises from about 46 Ci to about 82 Ci of $^{64}$Cu at the end of bombardment (EOB).

In another process, Process 29, the present disclosure provides a process, as provided in Processes 28, wherein after about 16 h to about 20 h of bombarding at (a), the bombarded target comprises from about 56 Ci to about 75 Ci of $^{64}$Cu at EOB.

In another process, Process 30, the present disclosure provides a process, as provided in Processes 28, wherein after about 19 h of bombarding at (a), the bombarded target comprises from about 62 Ci to about 73 Ci of $^{64}$Cu at EOB.

In another process, Process 31, the present disclosure provides a process, as provided in any one of Processes 24 to 30, wherein the stripping at (b) comprises contacting the bombarded target with 9 M HCl, and the stripping at (b) is conducted at a temperature of about 65° C. to about 100° C.

In another process, Process 32, the present disclosure provides a process, as provided in any one of Processes 24 to 31, wherein the extraction resin in the first column at (c)(i) comprises tributylphosphate as a functional group, and the ion exchange resin in the second column at (c)(i) comprises a tertiary amine as a functional group.

In another process, Process 33, the present disclosure provides a process, as provided in any one of Processes 24 to 32, wherein the rinsing at (c)(ii) comprises 9 M HCl.

In another process, Process 34, the present disclosure provides a process, as provided in any one of Processes 24 to 33, wherein the first and second flow-through fractions are combined as a $^{64}$Ni recovery fraction.

In another process, Process 35, the present disclosure provides a process, as provided in Process 34, wherein an average of about 98% of the target $^{64}$Ni is recovered in the $^{64}$Ni recovery fraction.

In another process, Process 36, the present disclosure provides a process, as provided in any one of Processes 24 to 35, wherein the rinsing at (c)(iii) comprises 4 M HCl, and the rising at (c)(iv) comprises 5 M NaCl in 0.05 M HCl or additional 4 M HCl.

In another process, Process 37, the present disclosure provides a process, as provided in any one of Processes 24 to 36, wherein the $^{64}$Cu is eluted at (c)(v) with 0.05 M HCl.

In another process, Process 38, the present disclosure provides a process, as provided in any one of Processes 24 to 37, wherein an average of about 89% of the $^{64}$Cu present in the strip solution is recovered in the product fraction comprising $^{64}$Cu.

In another process, Process 39, the present disclosure provides a process, as provided in any one of Processes 24 to 38, wherein the product fraction comprising $^{64}$Cu comprises from about 2 Ci to about 15 Ci of $^{64}$Cu and has a specific activity up to about 3850 mCi $^{64}$Cu/μg Cu. In another process, Process 39, the present disclosure provides a process, as provided in any one of Processes 24 to 38, wherein the product fraction comprising $^{64}$Cu comprises from about 15 Ci to about 120 Ci of $^{64}$Cu and has a specific activity from about 10 mCi $^{64}$Cu/μg Cu up to about 4800 mCi $^{64}$Cu/μg Cu.

In another process, Process 40, the present disclosure provides a process, as provided in any one of Processes 24 to 39, wherein the product fraction comprising $^{64}$Cu has a total content of trace metals of less than about 5 ppm, the trace metals being cobalt, copper, gold, iron, lead, mercury, nickel, and zinc.

In another process, Process 41, the present disclosure provides a process for preparing $^{64}$Cu from $^{64}$Ni, the process comprising (a) bombarding a cyclotron target comprising $^{64}$Ni with a proton beam to generate a bombarded target; (b) stripping the bombarded target with a volume of hydrochloric acid (HCl) having a molarity of about 6 M to about 12.1 M to form a strip solution comprising $^{64}$Ni, $^{64}$Cu, $^{61}$Co, and one or more other metals; and (c) purifying the $^{64}$Cu from the strip solution by (i) passing the strip solution through a column comprising an ion exchange resin such that the one or more other metals binds to the ion exchange resin in the column, $^{64}$Cu and $^{61}$Co bind to the ion exchange resin in the column and $^{64}$Ni passes through the column as a first flow-through fraction; (ii) rinsing the column with a volume of HCl having a molarity of about 6 M to about 12.1 M to elute residual $^{64}$Ni as a second flow-through fraction; (iii) rinsing the column with a volume of HCl having a molarity of about 6 M to about 12.1 M to elute residual $^{61}$Co as a first waste fraction; (iv) adding a volume of HCl having a molarity of about 0.01 M to about 3 M to the column to elute the $^{64}$Cu as a product fraction comprising $^{64}$Cu.

In another process, Process 42, the present disclosure provides a process for preparing $^{64}$Cu from $^{64}$Ni, the process comprising (a) bombarding a cyclotron target comprising $^{64}$Ni with a proton beam to generate a bombarded target; (b) stripping the bombarded target with a volume of hydrochloric acid (HCl) having a molarity of about 6 M to about 12.1 M to form a strip solution comprising $^{64}$Ni, $^{64}$Cu, $^{61}$Co, and one or more other metals; and (c) purifying the $^{64}$Cu from the strip solution by (i) passing the strip solution through a column comprising an ion exchange resin such that $^{64}$Cu binds to the ion exchange resin and $^{64}$Ni passes through the column as a first flow-through fraction; (ii) rinsing the column with a volume of HCl having a molarity of about 3 M to about 6 M to elute residual $^{64}$Ni as a second flow-through fraction; and (iii) adding a volume of HCl having a molarity of about 0.5 M to about 3 M to the column to elute the $^{64}$Cu from the ion exchange resin and collecting an eluate comprising $^{64}$Cu.

In another process, Process 43, the present disclosure provides a process, as provided in any one of Processes 1 to 42, wherein the plated material weight is from about 40 mg to about 800 mg.

In another process, Process 44, the present disclosure provides a process, as provided in any one of Processes 1 to 43, wherein the plated material weight is from about 550 mg to about 605 mg.

In another process, Process 45, the present disclosure provides a process, as provided in any one of Processes 1 to 44, wherein the plated surface area (also referred to as the plating area) is from about 3.0 $cm^2$ to about 25 $cm^2$.

In another process, Process 46, the present disclosure provides a process, as provided in any one of Processes 1 to 45, wherein the plated surface area (also referred to as the plating area) is from about 21 $cm^2$ to about 24 $cm^2$.

In another process, Process 47, the present disclosure provides a process, as provided in Processes 1 to 46, wherein the proton beam has an energy of about 10 MeV to about 14 MeV and a current of about 30 μA to about 1200 μA.

In another process, Process 48, the present disclosure provides a process, as provided in any one of Processes 1 to 47, wherein the proton beam has an energy of about 13 MeV and a current of about 408 μA.

In another process, Process 49, the present disclosure provides a process, as provided in any one of Processes 1 to 48, wherein the target is cooled using water flow through the target. The water flows through a series of cooling fins along the length of the target. The target includes 5 to 50 cooling fins.

In another process, Process 50, the present disclosure provides a process, as provided in any one of Processes 1 to 49, wherein the water flow surface area within the target and cooling fins ranges from 40 $mm^2$ to 90 $mm^2$.

In another process, Process 51, the present disclosure provides a process, as provided in any one of Processes 1 to 50, wherein the water flow rate within the target and cooling fins ranges from 40 L/min to 90 L/min.

In another process, Process 52, the present disclosure provides a process, as provided in any one of Processes 1 to 51, wherein the water flow rate within the target and cooling fins ranges from 50 L/min to 90 L/min.

In another process, Process 53, the present disclosure provides a process, as provided in any one of Processes 1 to 52, wherein the water flow rate within the target and cooling fins ranges from 55 L/min to 90 L/min.

In another process, Process 54, the present disclosure provides a process, as provided in any one of Processes 1 to 53, wherein the product fraction comprising $^{64}$Cu comprises from about 15 Ci to about 110 Ci of $^{64}$Cu and has a specific activity up to about 3850 mCi $^{64}$Cu/μg Cu.

In another process, Process 55, the present disclosure provides a process, as provided in any one of Processes 1 to 54, wherein the product fraction comprising $^{64}$Cu comprises from about 15 Ci to about 110 Ci of $^{64}$Cu and has a specific activity from about 50 mCi $^{64}$Cu/μg Cu to about 3800 mCi $^{64}$Cu/μg Cu.

In another process, Process 56, the present disclosure provides a process, as provided in any one of Processes 1 to 55, wherein the product fraction comprising $^{64}Cu$ comprises from about 15 Ci to about 110 Ci of $^{64}Cu$ and has a specific activity from about 100 mCi $^{64}Cu$/μg Cu to about 3850 mCi $^{64}Cu$/μg Cu.

In another process, Process 57, the present disclosure provides a process, as provided in any one of Processes 1 to 56, wherein the product fraction comprising $^{64}Cu$ comprises from about 15 Ci to about 110 Ci of $^{64}Cu$ and has a specific activity from about 50 mCi $^{64}Cu$/μg Cu to about 6000 mCi $^{64}Cu$/μg Cu.

In another process, Process 58, the present disclosure provides a process, as provided in any one of Processes 1 to 57, wherein the product fraction comprising $^{64}Cu$ comprises from about 15 Ci to about 110 Ci of $^{64}Cu$ and has a specific activity from about 100 mCi $^{64}Cu$/μg Cu to about 3850 mCi $^{64}Cu$/μg Cu.

In another process, Process 59, the present disclosure provides a process, as provided in any one of Processes 1 to 58, wherein the product fraction comprising $^{64}Cu$ comprises from about 15 Ci to about 110 Ci of $^{64}Cu$ and less than 10 ppm of $^{67}Cu$, less than 9 ppm of $^{67}Cu$, less than 8 ppm of $^{67}Cu$, less than 7 ppm of $^{67}Cu$, less than 6 ppm of $^{67}Cu$, or less than 5 ppm of $^{67}Cu$.

In another process, Process 60, the present disclosure provides a process, as provided in any one of Processes 1 to 59, wherein the product fraction comprising $^{64}Cu$ comprises from about 15 Ci to about 110 Ci of $^{64}Cu$ and less than 4 ppm of $^{67}Cu$, less than 3 ppm of $^{67}Cu$, less than 2 ppm of $^{67}Cu$, less than 1 ppm of $^{67}Cu$, less than 0.1 ppm of $^{67}Cu$, or less than 0.05 ppm of $^{67}Cu$.

In another process, Process 61, the present disclosure provides a process, as provided in any one of Processes 1 to 60, wherein the product fraction comprising $^{64}Cu$ comprises from about 15 Ci to about 110 Ci of $^{64}Cu$ and less than 10 ppm of $^{68}Zn$, less than 9 ppm of $^{68}Zn$, less than 8 ppm of $^{68}Zn$, less than 7 ppm of $^{68}Zn$, less than 6 ppm of $^{68}Zn$, or less than 5 ppm of $^{68}Zn$.

In another process, Process 62, the present disclosure provides a process, as provided in any one of Processes 1 to 61, wherein the product fraction comprising $^{64}Cu$ comprises from about 15 Ci to about 110 Ci of $^{64}Cu$ and less than 4 ppm of $^{68}Zn$, less than 3 ppm of $^{68}Zn$, less than 2 ppm of $^{68}Zn$, less than 1 ppm of $^{68}Zn$, less than 0.1 ppm of $^{68}Zn$, or less than 0.05 ppm of $^{68}Zn$.

In another process, Process 63, the present disclosure provides a process, as provided in any one of Processes 1 to 62, wherein the product fraction comprising from about 15 Ci to about 110 Ci of $^{64}Cu$ and 0 ppm $^{68}Zn$ (i.e., an absence of $^{68}$zinc).

Definitions

The features, structures, steps, or characteristics disclosed herein in connection with one embodiment may be combined in any suitable manner in one or more alternative embodiments.

The indefinite articles "a" and "an," as used herein in the specification and in the claims, unless clearly indicated to the contrary, should be understood to mean "at least one."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The terms "about" and "substantially" preceding a numerical value mean±10% of the recited numerical value.

Where a range of values is provided, each value between the upper and lower ends of the range are specifically contemplated and described herein.

The term "carrier," as used herein refers to an inactive material deliberately added to a specified radioactive substance to ensure that the radioactivity will behave normally in all subsequent chemical and physical processes.

The term "non-carrier added" refers to a preparation of a radioactive isotope which is 'free' from stable isotopes of the element in question. More precisely, a preparation of a radioactive isotope of high specific activity to which no isotopic carrier was intentionally added and which was not produced by irradiation of a stable isotope of the same element.

EXAMPLES

The following examples illustrate various non-limiting embodiments of the present disclosure.

Example 1: Separation of Metals Via Ion Exchange Chromatography

According to the literature, a bombarded Ni target typically is dissolved in 6 M hydrochloric acid (HCl) and the resulting solution is purified via anion exchange chromatography. After the nickel has completely eluted from the column, the eluent is changed to low molarity HCl (often ≤0.5 M) or water and the copper is collected as it is released from column. However, $^{64}Cu$ prepared this way typically contains some $^{61}Co$, as Co elutes from the resin in ≤4 M HCl. Thus, to obtain better separation of Co and Cu, a trial separation of various metals was performed using solutions of 6 M, 4 M, and 2 M HCl to elute Ni, Co, and Cu, respectively.

A solution containing 5.0 mg/mL Ni and 25 μg/mL each of Co, Cu, Fe, Zn, Hg and Pb in 6 M HCl was prepared to mimic an un-purified mixture. A glass Econo-column (0.7 cm×20 cm) was dry-packed with 4.5 g of AG 1-X8 resin (16 cm bed height, 6 mL bed volume). The resin was pre-treated by washing the column with 30 mL of Chelex-treated $H_2O$ followed by 30 mL of 6 M HCl. This rinse cycle was repeated once more so that the final wash was with 6 M HCl. The columns were gravity drained and each wash was considered complete once droplet formation ceased.

The column was loaded with 10 mL of the metal solution (50 mg Ni, 250 μg each added metal) and the flow through was collected as 2×5 mL fractions (load fraction). The column was eluted with the following: 5×2 mL aliquots of 6 M HCl (6 M fraction), 5×2 mL aliquots of 4 M HCl (4 M fraction), 5×2 mL aliquots of 2 M HCl (2 M fraction), and 1×5 mL aliquot of 0.5 M HCl (0.5 M fraction). Each eluate and an aliquot of the initial unpurified mixture were analyzed by Inductively Coupled Plasma Optical Emission Spectroscopy (ICP-OES). Table 1 presents the amount of metal present in each fraction as a percentage of what was present in the initial unpurified mixture.

TABLE 1

| Percent of metal in each fraction. | | | | | |
|---|---|---|---|---|---|
| | Load | 6M | 4M | 2M | 0.5M |
| Ni | 89.5 | 31.9 | 0.0 | 0.0 | 0.0 |
| Co | 36.5 | 46.5 | 16.7 | 0.0 | 0.0 |
| Cu | 0.0 | 0.0 | 9.6 | 80.6 | 0.1 |
| Fe | 0.0 | 0.0 | 0.0 | 10.7 | 40.7 |
| Hg | 0.0 | 0.0 | 0.0 | 0.0 | 0.0 |
| Pb | 0.4 | 7.2 | 44.0 | 20.0 | 6.4 |
| Zn | 36.9 | 13.1 | 0.0 | 0.0 | 0.0 |

As expected, Ni was present in the load fraction and the 6 M HCl fraction. The majority of Cu was present in 2 M HCl fraction, with a small amount (9.6%) present in the 4 M HCl fraction. Co was observed in the load, 6 M HCl, and 4 M HCl fractions, with no co-elution with Cu in the 2 M HCl fraction. Thus, there was good separation of Ni and Co from Cu, with 80.6% of the total Cu collected in the 2 M HCl faction with no co-elution of either Ni or Co. The only other tested metals present in the 2 M HCl fraction were small percentages of Pb and Fe.

Example 2: Varying Molarity of Starting Acid

To determine whether early breakthrough of Co could be reduced, as well as Pb breakthrough in the 2 M HCl fraction, the molarity of the starting acid was increased to 9 M HCl.

A solution containing 5.0 mg/mL Ni and 25 μg/mL each of Co, Cu, Fe, Zn, Hg and Pb in 9 M HCl was prepared. A column comprising 4.5 g of AG 1-X8 resin was prepared described above in Example 1. The column resin was pre-treated with 30 mL of Chelex-treated $H_2O$ followed by 30 mL of 9 M HCl. This rinse cycle was repeated once more so that the final wash was with 9 M HCl. The prepped column was loaded with 10 mL of the Ni solution (50 mg Ni, 250 μg each added metal) and collected as 2×5 mL fractions. The column then was eluted, and fractions collected with the following: 5×2 mL fractions of 9 M HCl, 5×2 mL fractions of 4 M HCl, 5×2 mL fractions of 2 M HCl, and 1×5 mL of 0.5 M HCl. Samples of the eluates and the initial unpurified mixture were analyzed via ICP-OES. These data are presented in Table 2.

TABLE 2

| Percent of metal in each fraction. | | | | | |
|---|---|---|---|---|---|
| | Load | 9M HCl | 4M HCl | 2M HCl | 0.5M HCl |
| Ni | 78.7 | 27.6 | 0 | 0 | 0 |
| Co | 3.1 | 0.9 | 94.0 | 0.3 | 0 |
| Cu | 0 | 0 | 2.1 | 93.0 | 0.1 |
| Fe | 0 | 0 | 0 | 9.0 | 41.4 |
| Hg | 0 | 0 | 0 | 0 | 0 |
| Pb | 10.6 | 83.2 | 4.7 | 0.1 | 0 |
| Zn | 36.8 | 12.9 | 0 | 0 | 0 |

The use of 9 M HCl as the starting acid concentration improved the overall separation process by shifting the elution profiles of Co and Pb. The majority of Co was eluted in the 4 M HCl fraction (rather than the earlier fractions), and the majority of Pb was eluted in the load and 9 M HCl fractions (rather than the 4 M HCl fraction). The 2 M HCl fraction contained mainly Cu with a low percentage of Fe and trace amounts of Co and Pb.

Example 3: Adjusting a CS-30 Cyclotron to Reduce Proton Beam Energy

Copper-64 may be produced by bombarding enriched nickel-64 with low energy protons (e.g., less than 14 MeV). At higher beam energies, the production of $^{61}Co$ and stable $^{63}Cu$ increases and $^{64}Cu$ production decreases, therefore $^{64}Cu$ production from $^{64}Ni$ via the (p,n) reaction is best performed with 12 MeV protons.

It has been generally assumed that CS-30 cyclotrons were not suitable for $^{64}Cu$ production because they may accelerate a proton beam up to about 30 MeV. It is generally accepted that a cyclotron cannot attain a beam energy lower than half of its maximum energy. Thus, the lowest energy attainable in CS-30 cyclotrons, in theory, is about 15 MeV.

Figure 3:
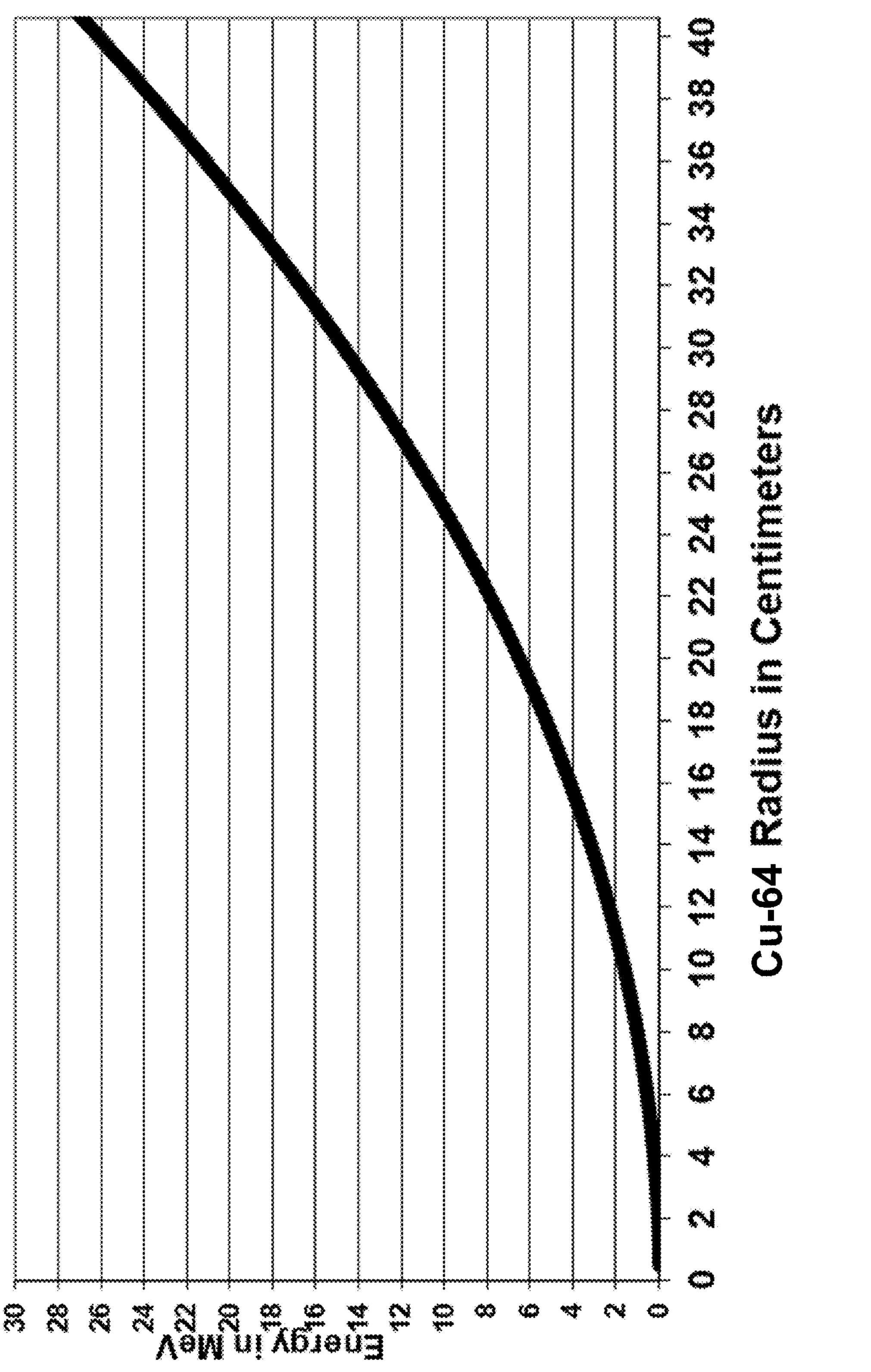
FIG. 3 is a plot of proton energy as a function of proton beam radius.

The output energy of a cyclotron is given by the equation $E=(rqB)^2/2\,m$, where E is the particle energy, r is the radius at which the targets are inserted, q is the charge on the particle of interest, B is the magnetic field, and m is the mass of the particle being accelerated. Since protons are being accelerated, the mass and charge are $1.672\times10^{-27}$ kg, and $1.602\times10^{-19}$ C, respectively. The magnetic field used in CS-30 cyclotrons is 1.847 T. FIG. 3 shows the proton energy as a function of the proton beam radius. This plot predicts a target radius of about 27.9 cm to attain a beam energy of about 12 MeV.

Thus, in order to produce the desired proton beam energy of 12 MeV, the location of the target was adjusted in the cyclotron so that the proton beam would strike the target at the smaller radius of about 27.9 cm.

Initial beam strikes with CS-30 curved targets showed that the proton beam went too far along one edge of the target, all of the way to the end, with no beam on the majority of the target face, completely missing the opposite edge. Only about 25% of the entire target face had beam on it, and half of that was on an unusable edge. With this arrangement, too much of the beam would be lost, and hence it is unsuitable. This was remedied by substituting a flat target for the curved one. Using a flat target allowed the beam to strike about one-fifth of the total target area (e.g., about one-fifth from the end of the target). The total area covered by the beam was 4 $cm^2$. The beam strike from the flat target was acceptable. Tuning parameters of the CS-30 were determined to give the best beam strike at the new radius of 27.9 cm. Thus, by using a flat target, the target radius was reduced, and the energy of the proton beam could be reduced to about 12 MeV.

Example 4: Target Bombardments of Enriched Nickel-64

A CS-30 cyclotron adjusted as described above in Example 3 was used to produce $^{64}Cu$. For this, about 50 mg of $^{64}Ni$ (~99% isotopically enriched) was electroplated on a CS-30 cyclotron flat target comprising a copper base layer that had been electroplated with gold to a thickness of about 50 μm. The plated area was about 4.0 $cm^2$. The target was bombarded with a beam energy of about 12 MeV, a beam current of 200 μA or 225 μA, and bombardment time of 1 to 6 h. The target was stripped with 9 M HCl and the resultant solution was analyzed by HPGe gamma spectroscopy to determine $^{64}Cu$ yield at the end of bombardment (EOB). Table 3 shows results of preliminary runs.

TABLE 3

| Yield of Test Runs. | | | |
|---|---|---|---|
| Run | Beam Current | Bombardment Time | 64Cu Activity, calibrated to EOB |
| 1 | 200 μA | 1 h | 674.1 mCi |
| 2 | 200 μA | 6 h | 6,102 mCi |
| 3 | 225 μA | 1 h | 1,424.8 mCi |
| 4 | 225 μA | 6 h | 6,900.1 mCi |

During bombardment expansion studies, a CS-30 cyclotron adjusted as described above in Example 3 was used to produce $^{64}$Cu. For this, about 50 mg of $^{64}$Ni (~99% isotopically enriched) was electroplated on a CS-30 cyclotron flat target comprising a copper base layer that had been electroplated with gold to a thickness of about 50 μm. The plated area was about 4.0 cm$^2$. The target was bombarded with a beam energy of about 12 MeV, a beam current of 100 μA or 225 μA, and bombardment time of 2 to 16 h. The targets were stripped with 9 M HCl and purified as shown in Example 3, with the exception of using 14-20 mL of 2 M HCl for isolation of the $^{64}$Cu fraction. Results are provided in the table below.

| Bombardment parameter expansion batches | | | | |
|---|---|---|---|---|
| Run | Beam Current | Bombardment Time | mL of 2M HCl | Purified $^{64}$Cu Activity, calibrated to EOB |
| 1 | 100 μA | 2 h | 14 mL | 2098 mCi |
| 2 | 175 μA | 12 h | 20 mL | 17988 mCi |
| 3 | 155 μA | 16 h | 20 mL | 17705 mCi |

Example 5: Purification of Copper-64 from a Bombarded Nickel-64 Target

Flat CS-30 cyclotron targets that had been electroplated with 50 μm of gold, were plated with enriched $^{64}$Ni, targeting a mass of about 50 mg and a plated area of 4.0 cm$^2$. The target was bombarded for 1 to 6 h with a beam energy of about 12 MeV and beam current of approximately 200 μA or 225 μA. The bombarded target was stripped using three 3.0 mL aliquots of 9 M HCl. During this time, the target stripping cell was heated to 75° C., and each aliquot was held for 3-5 minutes. After the hold time, the 3-mL aliquot was removed and placed in a holding vessel. The aliquots were collected together as one, approximately 9 mL strip solution.

The $^{64}$Cu was isolated and purified by anion exchange chromatography essentially as described above in Example 2. For this, a glass ion-exchange column (inner diameter=1.0 cm, length=20 cm) was nitric acid washed, rinsed with high resistivity water, and packed with 4.5 g AG 1-X8 resin (chloride form), 100 to 200 mesh (8 cm bed height, 6 mL bed volume). The column resin was pre-treated by washing twice with Chelex-treated 18.2 MΩ·cm resistivity water followed by 9 M HCl.

The 9-mL strip solution was loaded onto a pre-treated ion-exchange column along with an additional 1 mL of 9 M HCl that was used to rinse the vessel holding the strip solution. The 10-mL load volume was eluted from the column by gravity at ~1 mL per minute as the load fraction. Gravity filtration was used for all the solutions that passed through the column. The column was then rinsed with another 10 mL of 9 M HCl and the eluate was combined with the load fraction. The combined fractions (approximately 20 mL) comprised the $^{64}$Ni recovery fraction. After the $^{64}$Ni recovery fraction was collected from the column, 10 mL of 4 M HCl was added to the column. The eluate comprising cobalt was collected separately as a waste fraction. After the 4 M HCl fraction was collected from the column, 8 mL of 2 M HCl was added to the column. The 2 M HCl eluate collected in a separate vial and contained the $^{64}$Cu product. The 2 M HCl eluate was evaporated to dryness and reconstituted in 0.05 M HCl to a target radioactive concentration of approximately 1.25 Ci/mL.

Aliquots of the strip solution and the eluates were analysed by gamma spectroscopy and/or with a dose calibrator to determine $^{64}$Cu activity, and via ICP-OES to determine metallic content. The yield of $^{64}$Cu at EOB for 15 runs ranged from 674 mCi (1 h bombardment at 200 μA) to 8,706 mCi (6 h bombardment at 200 μA). The average yield of $^{64}$Cu at EOB for 8 runs that had a bombardment time of 6 h and beam current of 200-225 μA was 67132.6 mCi (s.d.=1189.1). The average recovery of $^{64}$Cu in the 2 M HCl eluate (relative to the strip solution) for the 15 runs was about 80% (s.d.=20%). After reconstituting the $^{64}$Cu in 0.05 M HCl, the resulting specific activity of the $^{64}CuCl_2$ averaged 965.8 mCi $^{64}$Cu/μg Cu (s.d.=658) at EOB when measured by the dose calibrator, and 1,724.2 mCi $^{64}$Cu/μg Cu (s.d.=750) at EOB when measured by the HPGe detector. The Cu content was determined via ICP-OES. Further analysis revealed no statistically significant difference between the dose calibrator and the HPGe detector. The dose calibrator method was preferred because it was more straightforward to use during manufacturing. The average recovery of $^{64}$Ni (in the $^{64}$Ni recovery fraction) from the 15 processed targets was about 82%.

Presented below is a detailed analysis of the purified product from three representative runs. For these runs, the target was bombarded for 6 h with a beam energy of approximately 12 MeV and beam current of 200 or 225 μA. Total activity was measured with a dose calibrator calibrated for $^{64}$Cu. Table 4 shows the activity of $^{64}$Cu collected after the purification process. Table 4 also shows the purification process yields as amount of $^{64}$Cu per total activity of the strip solution (as determined by dose calibrator).

TABLE 4

| Recovery of $^{64}$Cu During Purification | | | |
|---|---|---|---|
| | Batch 1 | Batch 2 | Batch 3 |
| Strip Solution (mCi) | 9,872.0 | 10,625 | 10,798 |
| 2M HCl Eluate (mCi) | 6,154.4 | 8,385 | 8,760 |
| % $^{64}$Cu recovery | 62.3% | 78.9% | 81.1% |

Table 5 presents the levels of trace metals in the 2 M HCl eluate.

TABLE 5

| Trace Metal Analysis in 2M HCl Eluate | | | |
|---|---|---|---|
| | Batch 1 | Batch 2 | Batch 3 |
| Au (μg/mL) | 0 | 0 | 0 |
| Co (μg/mL) | 0 | 0 | 0.047 |
| Cu (μg/mL) | 0.343 | 0.745 | 0.673 |
| Fe (μg/mL) | 0.102 | 0.117 | 0.261 |
| Hg (μg/mL) | 0 | 0 | 0 |

TABLE 5-continued

| Trace Metal Analysis in 2M HCl Eluate | | | |
|---|---|---|---|
| | Batch 1 | Batch 2 | Batch 3 |
| Ni (μg/mL) | 0.434 | 0.403 | 0.484 |
| Pb (μg/mL) | 0.031 | 0.031 | 0.886 |
| Zn (μg/mL) | 0.114 | 1.899 | 2.448 |

Table 6 presents the specific activity of the $^{64}$Cu product in the 0.05 M HCl solution.

TABLE 6

| Specific Activity of $^{64}$Cu in 0.05M HCl Solution | | | |
|---|---|---|---|
| | Batch 1 | Batch 2 | Batch 3 |
| $^{64}$Cu activity (i)mC | 4,041.1 | 7,650.0 | 8,109.0 |
| Cu mass (μg) | 2.0 | 8.2 | 5.7 |
| Specific Activity (mCi $^{64}$Cu/μg Cu) | 2,010.5 | 937.6 | 1,425.2 |

Example 6. Separation of Metals Via Extraction and Ion Exchange Chromatography A trial separation of various metals was performed using a combination of extraction chromatography and ion exchange chromatography to more effectively separate Cu from masses of Ni up to 750 mg, Co, Fe, and other transition metals.

A polyethylene (PE) column (0.7 cm×20 cm) was vacuum-packed using 20 mL of 0.05 M HCl with 2.7 g of TK201 resin (about 5 cm to 6 cm bed height, about 1 mL to 2 mL bed volume). A PE frit was securely placed atop the packed resin bed. The packed PE column, containing TK201 resin, was rinsed with 20 mL of 0.05 M HCl under vacuum. The packed PE column was capped and stored at 4.4° C.

The pre-packed PE column containing 2.7 g of TK201 resin, stored in 0.05 M HCl at 4.4° C., and a 2 mL PE column containing 300 mg of TBP resin were pre-treated by washing each column with 10 mL of high-resistivity water (HRW) followed by 10 mL of 9 M HCl. The HRW and 9 M HCl were passed through each column at a flow-rate of 1 mL/min using a syringe pump. Each wash was considered complete once droplet formation ceased.

A solution containing 25.0 mg/mL Ni, 20.4 μg/mL Co, 8.6 μg/mL Cu, 8.1 μg/mL Fe, and 10.3 μg/mL Pb was prepared in 9 M HCl to simulate a bombarded target stripping solution.

The PE columns, connected in series, were loaded at a flow-rate of 1 mL/min using a syringe pump with 30 mL of the metal solution (746 mg Ni, 259 μg Cu, 611 μg Co, 244 μg Fe, 309 μg Pb) and the flow through was collected as a single 30 mL fraction (load fraction). The two columns were eluted with 2×4 mL aliquots of 9 M HCl (9 M fraction) and the flow through was collected. The ion exchange column was then eluted with the following: 2×5 mL aliquots of 4 M HCl (4 M fraction), 2×4 mL aliquots of 5 M NaCl in 0.05 M HCl (5 M NaCl fraction), and 2×5 mL aliquot of 0.05 M HCl (0.05 M fraction). Each eluate and an aliquot of the initial mixture were analyzed by Inductively Coupled Plasma Optical Emission Spectroscopy (ICP-OES). Table 7 presents the amount of metal present in each fraction as a percentage of the starting amount in the simulated stripping solution mixture.

TABLE 7

| Percentages of Various Metals in Each Fraction | | | | | |
|---|---|---|---|---|---|
| Element | Load | 9M HCl | 4M HCl | 5M NaCl | 0.05M HCl |
| Co | 53.5 | 7.0 | 21.6 | 11.4 | n.d.* |
| Cu | n.d. | n.d. | n.d. | n.d. | 86.5 |
| Ni | 88.3 | 10.1 | 0.03 | n.d. | n.d. |
| Fe | n.d. | n.d. | n.d. | n.d. | n.d. |
| Pb | 75.4 | 11.4 | 0 | 0 | 0 |

*n.d. = not detected or below the limits of detection

As expected, Ni was present in the load fraction and the 9 M HCl rinse fraction (98.4%). The Cu was measured only in the 0.05 M HCl fraction (86.5%). Co was observed in the load, 9 M HCl, 4 M HCl, and 5 M NaCl fractions, with no co-elution of Cu in the 0.05 M HCl fraction. Thus, there was good separation of Ni and Co from Cu, with 86.5% of the total Cu collected in the 0.05 M HCl faction with no co-elution of either Ni or Co.

Example 7: Analyses of Copper Cu-64 Chloride Compositions

Batches of copper Cu-64 chloride compositions of the present disclosure were prepared as described herein. Six batches were analyzed for quality control, including analysis for elemental impurities, radioactive concentration, radionuclidic identity, radionuclidic purity, and specific activity. The data for each batch is provided in Tables 8-13.

TABLE 8

| Batch 1 | | |
|---|---|---|
| Parameter | Result | Limit |
| Elemental Impurities | | |
| Co | 0 μg/mL | ≤50 μg/mL |
| Cu | 5 μg/mL | ≤75 μg/mL |
| Fe | 1 μg/mL | ≤50 μg/mL |
| Ni | 1 μg/mL | ≤75 μg/mL |
| Pb | 1 μg/mL | ≤50 μg/mL |
| Zn | 1 μg/mL | ≤50 μg/mL |
| Total Impurities | 9 μg/mL | ≤100 μg/mL |
| Radioactive Concentration | | |
| Radioactive concentration | 737.5 mCi/mL | Report mCi/mL value at date and time of calibration |
| Radionuclidic Identity | | |
| Radionuclidic Identity | Conforms | Gamma emission spectra at 511 keV and 1346 keV |
| Radionuclidic Purity | | |
| Cu-64 | 100.0% | ≥98.9% at date and time of calibration |
| Co-61 | 0% | ≤1% at date and time of calibration |
| Single other impurity | Conforms | ≤0.05% at date and time of calibration |
| Total other impurities | 0.0% | ≤0.1% at date and time of calibration |
| Specific Activity | | |
| Specific Activity | 83 mCi/μg | ≥6 mCi/μg at date and time of calibration |

TABLE 9

| Batch 2 | | |
|---|---|---|
| Parameter | Result | Limit |
| Elemental Impurities | | |
| Co | 1 μg/mL | ≤50 μg/mL |
| Cu | 2 μg/mL | ≤75 μg/mL |
| Fe | 1 μg/mL | ≤50 μg/mL |
| Ni | 1 μg/mL | ≤75 μg/mL |
| Pb | 0 μg/mL | ≤50 μg/mL |
| Zn | 1 μg/mL | ≤50 μg/mL |
| Total Impurities | 6 μg/mL | ≤100 μg/mL |
| Radioactive Concentration | | |
| Radioactive concentration | 627.5 mCi/mL | Report mCi/mL value at date and time of calibration |
| Radionuclidic Identity | | |
| Radionuclidic Identity | Conforms | Gamma emission spectra at 511 keV and 1346 keV |
| Radionuclidic Purity | | |
| Cu-64 | 100.0% | ≥98.9% at date and time of calibration |
| Co-61 | 0% | ≤1% at date and time of calibration |
| Single other impurity | Conforms | ≤0.05% at date and time of calibration |
| Total other impurities | 0.0% | ≤0.1% at date and time of calibration |
| Specific Activity | | |
| Specific Activity | 98 mCi/μg | ≥6 mCi/μg at date and time of calibration |

TABLE 10

| Batch 3 | | |
|---|---|---|
| Parameter | Result | Limit |
| Elemental Impurities | | |
| Co | 0 μg/mL | ≤50 μg/mL |
| Cu | 12 μg/mL | ≤75 μg/mL |
| Fe | 1 μg/mL | ≤50 μg/mL |
| Ni | 1 μg/mL | ≤75 μg/mL |
| Pb | 1 μg/mL | ≤50 μg/mL |
| Zn | 1 μg/mL | ≤50 μg/mL |
| Total Impurities | 16 μg/mL | ≤100 μg/mL |
| Radioactive Concentration | | |
| Radioactive concentration | 722.0 mCi/mL | Report mCi/mL value at date and time of calibration |
| Radionuclidic Identity | | |
| Radionuclidic Identity | Conforms | Gamma emission spectra at 511 keV and 1346 keV |
| Radionuclidic Purity | | |
| Cu-64 | 100.0% | ≥98.9% at date and time of calibration |
| Co-61 | 0% | ≤1% at date and time of calibration |
| Single other impurity | Conforms | ≤0.05% at date and time of calibration |
| Total other impurities | 0.0% | ≤0.1% at date and time of calibration |
| Specific Activity | | |
| Specific Activity | 46 mCi/μg | ≥6 mCi/μg at date and time of calibration |

TABLE 11

| Batch 4 | | |
|---|---|---|
| Parameter | Result | Limit |
| Elemental Impurities | | |
| Co | 0 μg/mL | ≤50 μg/mL |
| Cu | 1 μg/mL | ≤75 μg/mL |
| Fe | 1 μg/mL | ≤50 μg/mL |
| Ni | 1 μg/mL | ≤75 μg/mL |
| Pb | 0 μg/mL | ≤50 μg/mL |
| Zn | 1 μg/mL | ≤50 μg/mL |
| Total Impurities | 4 μg/mL | ≤100 μg/mL |
| Radioactive Concentration | | |
| Radioactive concentration | 703.8 mCi/mL | Report mCi/mL value at date and time of calibration |
| Radionuclidic Identity | | |
| Radionuclidic Identity | Conforms | Gamma emission spectra at 511 keV and 1346 keV |
| Radionuclidic Purity | | |
| Cu-64 | 100.0% | ≥98.9% at date and time of calibration |
| Co-61 | 0% | ≤1% at date and time of calibration |
| Single other impurity | Conforms | ≤0.05% at date and time of calibration |
| Total other impurities | 0.0% | ≤0.1% at date and time of calibration |
| Specific Activity | | |
| Specific Activity | 176 mCi/μg | ≥6 mCi/μg at date and time of calibration |

TABLE 12

| Batch 5 | | |
|---|---|---|
| Parameter | Result | Limit |
| Elemental Impurities | | |
| Co | 1 μg/mL | ≤50 μg/mL |
| Cu | 2 μg/mL | ≤75 μg/mL |
| Fe | 1 μg/mL | ≤50 μg/mL |
| Ni | 1 μg/mL | ≤75 μg/mL |
| Pb | 0 μg/mL | ≤50 μg/mL |
| Zn | 1 μg/mL | ≤50 μg/mL |
| Total Impurities | 6 μg/mL | ≤100 μg/mL |
| Radioactive Concentration | | |
| Radioactive concentration | 711.0 mCi/mL | Report mCi/mL value at date and time of calibration |
| Radionuclidic Identity | | |
| Radionuclidic Identity | Conforms | Gamma emission spectra at 511 keV and 1346 keV |
| Radionuclidic Purity | | |
| Cu-64 | 100.0% | ≥98.9% at date and time of calibration |
| Co-61 | 0% | ≤1% at date and time of calibration |
| Single other impurity | Conforms | ≤0.05% at date and time of calibration |
| Total other impurities | 0.0% | ≤0.1% at date and time of calibration |
| Specific Activity | | |
| Specific Activity | 129 mCi/μg | ≥6 mCi/μg at date and time of calibration |

TABLE 13

| Parameter | Result | Limit |
|---|---|---|
| Batch 6 | | |
| Elemental Impurities | | |
| Co | 1 μg/mL | ≤50 μg/mL |
| Cu | 1 μg/mL | ≤75 μg/mL |
| Fe | 1 μg/mL | ≤50 μg/mL |
| Ni | 1 μg/mL | ≤75 μg/mL |
| Pb | 0 μg/mL | ≤50 μg/mL |
| Zn | 1 μg/mL | ≤50 μg/mL |
| Total Impurities | 5 μg/mL | ≤100 μg/mL |
| Radioactive Concentration | | |
| Radioactive concentration | 712.5 mCi/mL | Report mCi/mL value at date and time of calibration |
| Radionuclidic Identity | | |
| Radionuclidic Identity | Conforms | Gamma emission spectra at 511 keV and 1346 keV |
| Radionuclidic Purity | | |
| Cu-64 | 100.0% | ≥98.9% at date and time of calibration |
| Co-61 | 0% | ≤1% at date and time of calibration |
| Single other impurity | Conforms | ≤0.05% at date and time of calibration |
| Total other impurities | 0.0% | ≤0.1% at date and time of calibration |
| Specific Activity | | |
| Specific Activity | 143 mCi/μg | ≥6 mCi/μg at date and time of calibration |

Example 8: Cyclotron

The 30 MeV variable energy cyclotron may be variable in energy down to 13 MeV to maximize production yields for $^{64}$Cu. A variable energy 30 MeV cyclotron may be tuned down to about 15 to about 16 MeV. The cyclotron and ion source may also be capable of producing almost about 0.8 mA of current that may be split along two external beam lines (approximately about 375 μA per beam line) running simultaneously.

Increasing currents to 375 μA/target necessitates improvements in design of the target and the target station to handle much higher water flow rates than typical.

In some embodiments, production of $^{64}$Cu on a new target and using a new beamline led to modifications to the Ni-64 targetry. The targets may require as much as 700 mg of $^{64}$Ni.

Target mass requirements were determined to maximize production yields, and the electroplating process to prepare targets was re-evaluated.

The $^{64}$Ni thicknesses necessary to degrade protons of varying incident energies of about 12 to about 15 MeV to about 5 MeV were determined, and subsequently the mass of $^{64}$Ni needed to obtain that thickness over a 23 cm$^2$ plating area was calculated. It is assumed that the proton beam will strike the target at a beam angle of 85° incident to the target face (referred to as a 5° beam angle) over an area of 22.2 cm$^2$, and that the strike area will be shaped like an ellipse with a major axis of 74 mm and minor axis of 30.1 mm.

Depending on the incident proton energy the following Ni-64 plating masses would be required (Table 14).

TABLE 14

Effective target thickness requirements to degrade proton beams of different incident energies to 5 MeV exit energy

| Incident proton energy (MeV) | Average proton exit energy (MeV) | Effective thickness (μm) | Actual thickness (μm) | Ni-64 mass required (g) |
|---|---|---|---|---|
| 15.0 | 5.02 | 390 | 34 | 0.70 |
| 14.5 | 5.04 | 364 | 32 | 0.65 |
| 14.0 | 5.00 | 340 | 30 | 0.61 |
| 13.5 | 5.03 | 313 | 27 | 0.56 |
| 13.0 | 4.97 | 290 | 25 | 0.52 |

Targets plated with Ni masses of up to 805 mg were prepared using different plating baths to demonstrate feasibility (Table 15).

TABLE 15

Plating baths used to plate Ni onto an Au substrate over a 23 cm$^2$ area

| Bath | pH | Plated mass (mg) |
|---|---|---|
| $NiCl_2/NH_4OH$ | 11.5 | 743-759 |
| | 11.6 | 749-767 |
| $NiCl_2/NH_4OH/SO_4$ | 11.7 | 794-805 |
| $NiCl_2/NH_4OH/H_3BO_3$ | 9.3 | 305-298 |
| | 9.8 | 732-745 |

Preparation of Ni targets at the required masses is feasible. It is reasonable to assume that if bombarded using the above outlined cyclotron parameters (i.e., 5° beam angle, 375 μA current, 13-15 MeV protons) higher $^{64}$Cu production yields are feasible. Calculations were performed to estimate potential production yields using the following assumptions that Ni density of the deposit is approximately 8.9 g/cm$^3$ and the isotopic abundance of $^{64}$Ni is 99.5% (see Table 16)

TABLE 16

Predicted $^{64}$Ni (p,n)Cu-64 thick target yields at EOB for different incident proton energies and 5 MeV average proton exit energy[a,b]

| Time (h) | μA*h | 12.0 MeV | 12.5 MeV | 13.0 MeV | 13.5 MeV | 14.0 MeV | 14.5 MeV | 15.0 MeV |
|---|---|---|---|---|---|---|---|---|
| 1 | 375 | 4.690 | 5.069 | 5.410 | 5.716 | 5.991 | 6.241 | 6.468 |
| 2 | 750 | 9.131 | 9.869 | 10.532 | 11.128 | 11.664 | 12.150 | 12.592 |
| 3 | 1125 | 13.335 | 14.414 | 15.383 | 16.252 | 17.036 | 17.745 | 18.391 |
| 4 | 1500 | 17.317 | 18.718 | 19.976 | 21.105 | 22.122 | 23.043 | 23.882 |
| 5 | 1875 | 21.087 | 22.793 | 24.324 | 25.699 | 26.938 | 28.059 | 29.081 |
| 6 | 2250 | 24.657 | 26.651 | 28.442 | 30.050 | 31.498 | 32.809 | 34.004 |
| 7 | 2625 | 28.037 | 30.305 | 32.341 | 34.170 | 35.816 | 37.307 | 38.665 |
| 8 | 3000 | 31.237 | 33.764 | 36.033 | 38.070 | 39.905 | 41.566 | 43.079 |
| 9 | 3375 | 34.268 | 37.040 | 39.529 | 41.764 | 43.777 | 45.599 | 47.259 |
| 10 | 3750 | 37.138 | 40.142 | 42.840 | 45.261 | 47.442 | 49.417 | 51.216 |
| 11 | 4125 | 39.855 | 43.079 | 45.974 | 48.573 | 50.914 | 53.033 | 54.964 |

TABLE 16-continued

Predicted $^{64}Ni$ (p,n)Cu-64 thick target yields at EOB for different incident proton energies and 5 MeV average proton exit energy[a,b]

| Time (h) | μA*h | 12.0 MeV | 12.5 MeV | 13.0 MeV | 13.5 MeV | 14.0 MeV | 14.5 MeV | 15.0 MeV |
|---|---|---|---|---|---|---|---|---|
| 12 | 4500 | 42.428 | 45.860 | 48.942 | 51.709 | 54.200 | 56.457 | 58.512 |
| 13 | 4875 | 44.864 | 48.493 | 51.752 | 54.678 | 57.313 | 59.698 | 61.872 |
| 14 | 5250 | 47.171 | 50.987 | 54.413 | 57.489 | 60.260 | 62.768 | 65.053 |
| 15 | 5625 | 49.355 | 53.348 | 56.933 | 60.151 | 63.050 | 65.674 | 68.065 |
| 16 | 6000 | 51.423 | 55.583 | 59.319 | 62.672 | 65.692 | 68.427 | 70.918 |
| 17 | 6375 | 53.382 | 57.700 | 61.578 | 65.059 | 68.194 | 71.033 | 73.619 |
| 18 | 6750 | 55.236 | 59.704 | 63.717 | 67.319 | 70.563 | 73.500 | 76.176 |
| 19 | 7125 | 56.992 | 61.602 | 65.742 | 69.459 | 72.806 | 75.837 | 78.598 |
| 20 | 7500 | 58.655 | 63.399 | 67.660 | 71.485 | 74.930 | 78.049 | 80.890 |
| 21 | 7875 | 60.229 | 65.101 | 69.476 | 73.404 | 76.941 | 80.144 | 83.062 |
| 22 | 8250 | 61.720 | 66.712 | 71.196 | 75.220 | 78.845 | 82.127 | 85.117 |
| 23 | 8625 | 63.131 | 68.238 | 72.824 | 76.941 | 80.649 | 84.006 | 87.064 |
| 24 | 9000 | 64.468 | 69.683 | 74.366 | 78.570 | 82.356 | 85.784 | 88.907 |

[a]Values are presented in Ci;

[b]Note:

Higher energies require an increased target mass to achieve predicted EOB yield (see Table 16)

Example 9: Improving the Radiochemical Purity of the Final Radiopharmaceutical Composition Formation of 5 ppm Elemental Copper in 0.05 M HCl Solution Four (4) liters of five (5) ppm elemental copper in 0.05 M HCl solution was prepared by adding 3000 mL of High Resistivity Water (HRW) to an appropriately sized container (flask, carboy, etc.). 16.8 mL of concentrated HCl and 53.7 mg of copper chloride (II) dihydrate were then added to the container. The solution was mixed to dissolve the solids, and then the container volume was brought up to 4000 mL with HRW. The container was mixed, and then the solution was transferred to 1 L bottles. The bottles were quarantined until passing laboratory results are received. FIG. 4A presents a schematic of an iteration of the process.

Example 10: Improved Enrichment of Cu-64

This example demonstrates compositions with improved enrichment of Ni-64 and methods of making them. Four experimental proton bombardments were performed in a new cyclotron tested herein on one natural nickel and three enriched Ni-64 targets (650 mg each). The four 13 MeV proton bombardments successfully produced Cu-64, and the enriched Ni-64 targets produced 2.0, 4.9, and 16.1 Ci of Cu-64 at end of bombardment at beam currents of 139, 750, and 1500 μA×hr respectively. The Cu-64 yields for the natural nickel and two of the enriched Ni-64 targets were within 0.2%, 12.7%, and 0.7% of the theoretical values calculated using the thick target yield equation. It was hypothesized that the run that did not match the theoretical yield calculations was not homogenous upon sampling, and therefore, the discrepancy was not due to issues with the new cyclotron during bombardment. The isotopic impurity profiles for the various runs matched the calculated profiles determined based on the nickel isotopes present in the target. As both the Cu-64 yields and impurity profiles matched the theoretical calculations, it was determined that the new cyclotron was operating close to the designated parameters and is ready for production of Cu-64.

Introduction

Copper-64 (Cu-64, $t_{1/2}$=12.7 h) is a diagnostic radionuclide capable of being imaged via positron-emission tomography (PET). Cu-64 (product code L064 or N164) is produced via proton irradiation of isotopically enriched Ni-64 metal. Copper-64 is produced by irradiating enriched Ni-64 targets using CS-30 cyclotrons. The current CS-30 targets used for Cu-64 production consist of a flat copper target body with a 50-um protective layer of gold (Au) on the surface, on top of which, 50 mg of enriched Ni-64 starting material is electroplated over a 4 $cm^2$ area.

A new cyclotron for producing Cu-64 will employ targets that have a larger plating area (23 $cm^2$) that requires larger plated Ni-64 masses of 450-750 mg. A larger plating area would allow a larger amount of the target surface to be irradiated. This results in the proton energy being spread over a larger amount of the target; and the heat from the proton beam being spread across more of the target surface. Larger targets have less heat buildup in the target during irradiations and better target survivability. Targets with this design can be irradiated at higher proton currents and can produce more of the radioactive isotope.

Prior to the use of the new cyclotron to run production batches of Cu-64, the operation of the cyclotron must be established and optimized. Previously, optimized parameters for maximizing Cu-64 production were predicted using theoretical calculations estimating the thick target Cu-64 yields and will serve as starting parameters for testing operation of the new cyclotron.

Purpose

This example confirms that the beam energy output of the cyclotron matches the intended value and compare cyclotron parameters (i.e., beam energy and current, bombardment time) to Cu-64 production. This example summarizes both the experimental data measuring the activity and identity of produced isotopes and the results of theoretical calculations for the four initial runs of the new cyclotron, including a bombardment of a natural nickel target and three subsequent bombardments of enriched Ni-64 targets.

Approach

The performance of the new cyclotron was evaluated by bombarding a natural nickel and three (3) enriched nickel 64 targets using a beam energy of 13 MeV and beam currents between 150 and 375 μA. The bombarded targets were then stripped to remove the produced radio isotopes and remaining nickel before analysis using gamma spectroscopy on a high purity germanium (HPGe) detector and inductively coupled plasma optical emission spectroscopy (ICP-OES) to quantify the radioisotopes and metals content. Calculations were performed to estimate the yields from each run and determine if the new cyclotron was operating close to the intended parameters. Additional calculations were carried out to estimate how various cyclotron parameters would impact future Cu-64 yields.

Experimental Summaries

Operational summaries of the plating and bombardment work performed during the execution of this protocol are detailed below. For these initial bombardments, a plated target mass of approximately 650 mg per target was selected. This mass provides a target thickness that is sufficient to ensure beam degradation to 5 MeV or less.

Natural Nickel Bombardment—Run 1

Natural nickel in the form of nickel chloride hexahydrate from Sigma-Aldrich was used to plate the target intended for the first bombardment. Three targets were plated used methods disclosed herein. The plating bath pH was 10.06 and the targets were plated for 2 hours at 500 mA. Target 24 Jun. 2024-PB1-2, which was selected for bombardment, had a plated mass of 649 mg. Plated target appearance and adhesion were both acceptable with Pugh Matrix scores of 1. These values correspond to a uniform gray color with no significant defects and no Ni residue on the tape after performing an adhesion test. See FIG. 5A for a photo of the plated target. Target bombardment occurred on 11 Jul. 2024 for 30 minutes at 150 μA, for a total electric charge of 75 μA×hr. End of Bombardment (EOB) was at 0922 on 11 Jul. 2024. The plated surface of the target during bombardment can be seen in a photo in (FIG. 5B). The target strip cell was set to 92° C. (to reach a target temperature of 60° C.). The target was stripped 3 times each with 12.5 mL of concentrated HCl for 5 minutes. Final strip solution volume was 31 mL. The activity of the consolidated strip solution, by dose calibrator, was 10.38 Ci at 1004 on 11 Jul. 2024. The target was visually inspected to ensure complete removal of the plated nickel (see FIG. 5B). Strip solution samples were submitted for ICP and HPGe analysis.

Ni-64 Bombardments—Runs 2-4

Enriched nickel (Ni-64) from Trace Sciences International was used to plate the three targets intended for irradiation. 1.9546 g of Ni-64 at 95.4% purity was weighed out to plate 650 mg per target. Targets were plated following the procedure detailed herein. To ensure no loss of Ni-64 and cross contamination by the pH meter, plating bath pH was not measured, but all chemical addition quantities were as expected. The targets were plated for 2 hours at 500 mA on 30 Jul. 2024. Plated target appearance and adhesion were acceptable for all three targets. See FIG. 5C for a photo of the Ni-64 plated targets.

First Ni-64 Bombardment (Run 2)

Target 30 Jul. 2024-PB3-2 was selected for the initial Ni-64 target bombardment which had a plated mass of 660 mg. Target bombardment occurred on 1 Aug. 2024 for 1 hour at 150 μA, for a total electric charge of 139 μA×hr. EOB was at 1020 on 1 Aug. 2024. The plated surface of the target remained integral during bombardment (FIG. 5D). The target strip was performed identically to the natural nickel target detailed above in this Example. Final strip solution volume was 33 mL. The activity of the first and second strip solutions, by dose calibrator, was 3.06 Ci at 1105 on 1 Aug. 2024. A partial spill of the strip material after adding the 3rd strip solution prevented a final assay from being taken. It is expected that the vast majority (>98%) of the target is stripped with the first two acid additions so that the dose calibrator reading taken after the second strip is representative of the majority of the activity produced during the run. After the run, the target was visually inspected to ensure complete removal of the plated nickel (FIG. 5D). Strip solution samples were submitted for ICP and HPGe analysis.

Second Ni-64 Bombardment—Run 3

Target 30 Jul. 2024-PB2-1 was selected for the second Ni-64 target bombardment. This target had a plated mass of 666 mg. Target bombardment occurred on 29 Aug. 2024 for 2 hours and 11 minutes at 375 μA, for a total electric charge of 750 μA×hr. EOB was at 1021 on 29 Aug. 2024. The plated surface of the target remained integral during bombardment (FIG. 5E). The target strip was performed identically to the natural nickel target detailed above in this Example. Final strip solution volume was 34.5 mL. A dose calibrator was used to determine the activity of the consolidated strip solutions and was 9.93 Ci at 1110 on 29 Aug. 2024. After the run, the target was visually inspected to ensure complete removal of the plated nickel (FIG. 5E). Strip solution samples were submitted for ICP and HPGe analysis.

Third Ni-64 Bombardment—Run 4

Figures 5F, 6A, 6B:
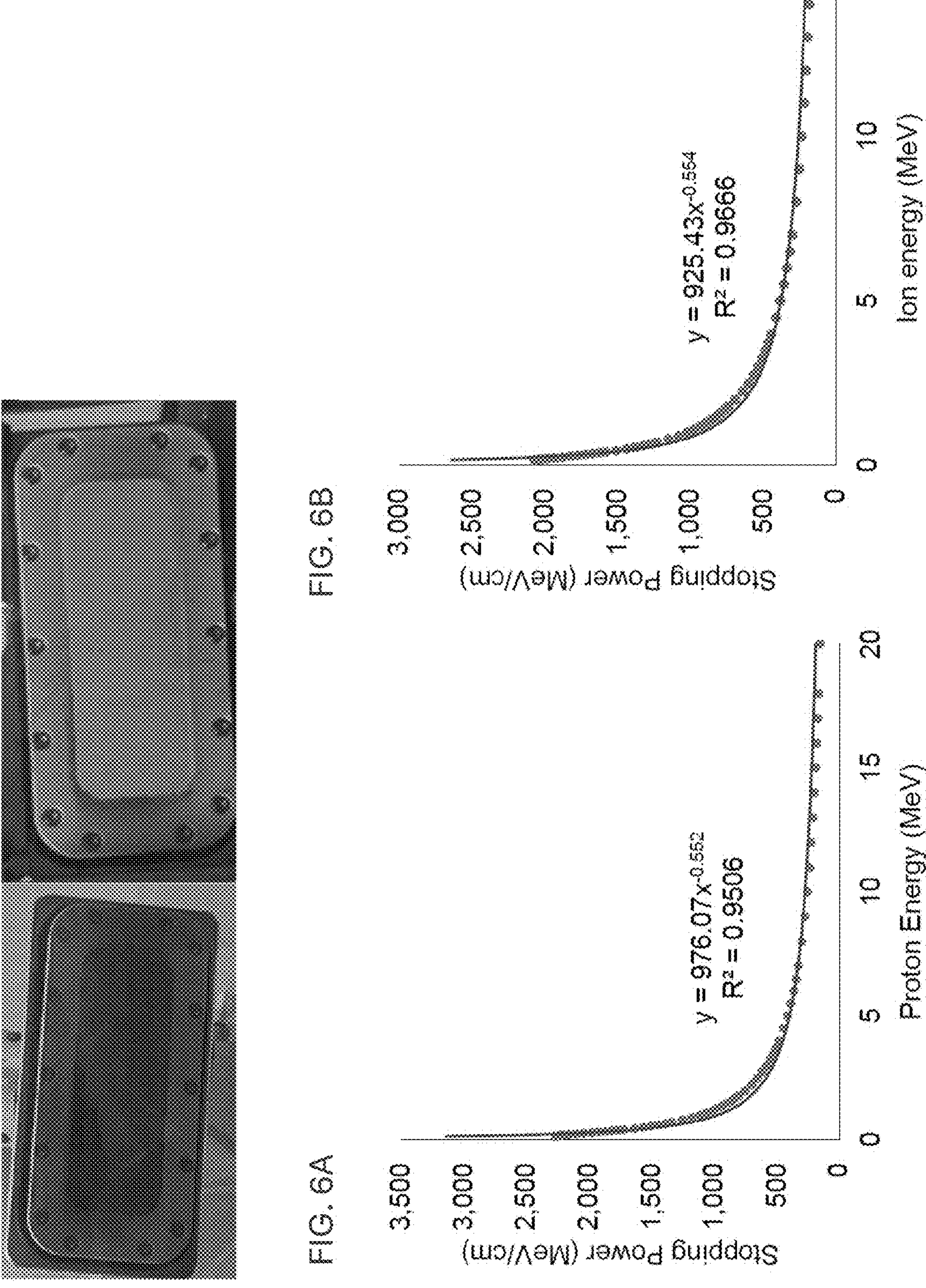
FIG. 5F shows bombarded and stripped Ni-64 plated target 30 Jul. 2024-PB4-3.
FIG. 6A shows stopping power for a hydrogen ion in Nickel-58. Blue dots represent the calculated values from SRIM and the red line represents the fit associated with the displayed equation.
FIG. 6B shows stopping power for a hydrogen ion in Nickel-64. Blue dots represent the calculated values from SRIM and the red line represents the fit associated with the displayed equation.

Target 30 Jul. 2024-PB4-3 was selected for the third Ni-64 target bombardment. This target had a plated mass of 649 mg. Target bombardment occurred on 12 Sep. 2024 for 4 hours and 35 minutes at 375 μA, for a total electric charge of 1500 μA×hr. EOB was at 1220 on 12 Sep. 2024. The plated surface of the target remained integral during bombardment (FIG. 5F). The target strip was performed identically to the Natural Nickel target detailed above in this Example, except that a 4th strip of 12.5 mL was performed to ensure full removal of the plated nickel. Final strip solution volume was 45.7 mL. A dose calibrator was used to determine the activity of the consolidated strip solutions and was 19.25 Ci at 1321 on 12 Sep. 2024. After the run, the target was visually inspected to ensure complete removal of the plated nickel (see FIG. 5F). Strip solution samples were submitted for ICP and HPGe analysis.

Bombardment Summary

The table below summarizes the conditions under which bombardments were performed.

TABLE 17

Bombardment summary

| Target | Natural Nickel (Run 1) | Enriched Nickel (Ni-64) (Run 2) | Enriched Nickel (Ni-64) (Run 3) | Enriched Nickel (Ni-64) (Run 4) |
|---|---|---|---|---|
| % Nickel-64 | 0.9261 | 95.4 ± 0.52 | 95.4 ± 0.52 | 95.4 ± 0.52 |
| Target ID | 24Jun24-PB1-2 | 30Jul24-PB3-2 | 30Jul24-PB2-1 | 30Jul24-PB4-3 |
| Plated mass (mg) | 649 | 660 | 666 | 649 |
| Target thickness (μm) | 31.7 | 32.2 | 32.5 | 31.7 |
| Date of irradiation | 11Jul24 | 01Aug24 | 29Aug24 | 12Sep24 |
| Bombardment time | 30 min | 1 hr | 2 hr 11 min | 4 hr 35 min |

TABLE 17-continued

| Bombardment summary | | | | |
|---|---|---|---|---|
| Target | Natural Nickel (Run 1) | Enriched Nickel (Ni-64) (Run 2) | Enriched Nickel (Ni-64) (Run 3) | Enriched Nickel (Ni-64) (Run 4) |
| Bombardment current (μA) | 150 | 150 | 375 | 375 |
| Total μA × hrs | 75 | 1393 | 7503 | 15003 |
| Beam energy (MeV) | 13.0 | 13.0 | 13.0 | 13.0 |
| Beam line | 1.2 | 1.2 | 1.2 | 1.2 |
| Beam angle (deg) | 5 | 5 | 5 | 5 |

[1] From the Janis webbook www.oecd-nea.org/JCMS/PL_39910/JANIS, accessed Aug. 2024

[2] From Ni-64 COA

[3] Based on integration of the bombardment curve (current vs. time)

HPGe Analysis

Radionuclidic isotopes including Cu-64 and impurities (listed in Table 18) were analyzed using a high purity germanium (HPGe) gamma detector. The detector was calibrated using multigamma standard (MGS) in a counting geometry of 5 mL liquid in a 20 cc HDPE scintillation vial that was placed 10 cm above the detector face. The samples were prepared with a targeted activity of 25 μCi of Cu-64 sample at time of analysis. Samples were counted for a length of time so that major peaks of interest for Cu-64 and impurities reached at least 1000 counts for quantitative data at time 0, 1 day, 1 week, 2 weeks, 3 weeks, and 4 weeks post end of bombardment (EOB). This corresponded to count times ranging from 3000 seconds at time 0 to 28800 seconds or longer at 4 weeks post EOB. The isotopes are grouped into three (3) groups based on half-life, displayed in Table 18. Short lived isotopes ($t½ \leq 3.5$ hours) are color coded orange, medium-lived isotopes ($t_{1/2} \leq 3.5$ days and $\geq 3.5$ hours) are color coded blue, and long-lived isotopes ($t_{1/2} \geq 5.5$ days) are color coded green. The short and medium-lived isotopes may be detected up to 1 week post EOB. Medium-lived isotopes with a half-life greater than 1 day may be detected up to 2-3 weeks post EOB. Long-lived isotopes can be detected up to 4 weeks post EOB or even longer. At time 0, Cu-64 and Co-61 are present and some of the lower abundant isotopes are masked by the Compton background. Once Cu-64 decays away, the lack of secondary particle-particle interactions are present, resulting in detection of medium to longer-lived isotopes that may be present in lower amounts. Once the short to medium-lived isotopes are decayed away, longer-lived isotopes can then be detected. It is important to point out that very short-lived isotopes such as Cu-60 and Cu-62 ($t_{1/2}$=24 min and 10 min, respectively) may be decayed entirely prior to the time 0 measurement, and therefore won't be identified.

TABLE 18

| Radionuclidic Isotopes (Cu-64 and Impurities, [1]short-lived isotopes, [2]medium-lived isotopes, [3]long-lived isotopes) | |
|---|---|
| Isotope | Half-Life |
| Cu-64 | 12.701 hr[2] |
| Co-55 | 17.53 hr[2] |
| Co-57 | 271.8 d[3] |
| Co-58 | 70.9 d[3] |
| Co-61 | 1.65 hr[1] |
| Ni-57 | 35.6 hr[2] |
| Cu-60 | 23.74 min[1] |
| Cu-61 | 3.339 hr[1] |
| Cu-62 | 9.7 min[1] |
| In-111 | 2.80 d[2] |

TABLE 18-continued

| Radionuclidic Isotopes (Cu-64 and Impurities, [1]short-lived isotopes, [2]medium-lived isotopes, [3]long-lived isotopes) | |
|---|---|
| Isotope | Half-Life |
| V-48 | 15.974 d[3] |
| Mn-52 | 5.591 d[3] |
| Co-56 | 77.236 d[3] |
| Zn-65 | 243.93 d[3] |
| Ga-67 | 3.2617 d[2] |

ICP Analysis

Target strip solution elemental profile, including Cu and Ni were analyzed for via Inductively Coupled Plasma Optical Emission Spectroscopy (ICP-OES). The purpose of this analysis is to support the yield data by, along with visual confirmation of complete target strip, indicating successful and complete target stripping. In addition, elevated levels of metals besides Ni could indicate a contamination issue. Characterization for selected metallic impurities was performed by following STM 262-087.

Calculation Summaries

Determining Beam Energies Using Radioactivity from Irradiated Targets

To provide a comparison to the experimentally determined activities for the various isotopes produced during bombardment, thick target yield calculations were performed estimating the activity of nine different isotopes at EOB. The governing equation used to approximate the thick target activity yields can be found in the equation below where A is the activity at EOB, n is the number of target nuclei per unit volume, λ is the decay constant of the produced nuclide, t is the bombardment time, E is the proton energy, σ is the cross section for the nuclear reaction, I is the proton current and S is the stopping power of the target.

$$A = nI\left(1 - e^{-\lambda t}\right)\int_{E_{exit}}^{E_{entry}} \frac{\sigma(E)}{S(E)} dE$$

The decay constant (λ) is calculated using the following equation where $t_{1/2}$ is the half-life for the target isotope.

$$\lambda = \frac{\ln(2)}{t_{1/2}}$$

The number of target nuclei per unit volume is calculated using the following equation where ρ is the density of nickel, Na is Avogadro's Number, f is the fraction of the specific nickel isotope present in the nickel target associated with the nuclear reaction, and MWNi is the molecular weight of nickel.

$$n = \frac{\rho_{Ni} \times N_a \times f}{MW_{Ni}}$$

Parameters used in the calculation of the activity can be found in Table 17.

Stopping Power

Stopping power of the proton is a function of the proton's energy as it passes through the nickel target and can be calculated using the Stopping and Range of Ions in Matter (SRIM) software package. The stopping power was calculated for a natural nickel target using the hydrogen ion with a mass of 1.008 amu and a Nickel-58 mass of 58.69 amu and a density of 8.89550 g/cm$^3$ (FIG. 6A and following equation) and for an enriched Ni-64 target using the hydrogen ion with a mass of 1.008 amu and a Nickel-64 mass of 63.93 amu and a density of 8.9080 g/cm$^3$ (FIG. 6B and following equation). The stopping power for the natural nickel target was estimated for ion energies between 0.12 and 20 MeV and the Ni-64 target was estimated between 0.15 and 15 MeV. The total stopping power contributions from both electronic and radiative contributions were summed together to get the total stopping power. The dotted red line represents the equation fit to the SRIM output using Microsoft Excel with an $R^2$ of 0.9506 and 0.9666 for the natural nickel and Ni-64 targets respectively.

Stopping power equation for a natural nickel target: $S(E)=976.07\times E^{-0.552}$ Stopping power equation for a Ni-64 target: $S(E)=925.4\times E^{-0.554}$ Cross Section The cross section of each nuclear reaction was sourced from the JANIS Web database of proton induced nuclear reactions (WWW.OECD-NEA.org/JANISWEB/BOOK/PROTONS, accessed 2024). Typically, for each reaction, the largest set of experimental data or the dataset closest to the operating range of the new cyclotron (≤13 MeV) was chosen to fit a 6th-order polynomial according to the equation below. In cases where a single polynomial fit was inadequate for describing the data set, two 6th-order polynomials were fit to the experimental data.

$$\sigma(E) = C_1E^6 + C_2E^5 + C_3E^4 + C_4E^3 + C_5E^2 + C_6E + C_7$$

Exit Energy ($E_{exit}$)

To solve for the exit energy of the proton leaving the target, the ordinary differential equation (ODE) relating the stopping power (dE/dx=S(E)) of the nickel target to the beam energy will be solved by the following equation. The equation is kept general by using C8 and P to represent the constant and power of the power fit for the stopping power equation.

$$\frac{dE}{dx} = S(E) = C_8 \times E^P$$

The ODE in the above equation is separable and can be split into two definite integrals (Equation 6-8) where $x_{eff}$ is the effective thickness of the target (described later).

$$C_8 \int_0^{x_{eff}} dx = \int_{E_{entry}}^{E_{exit}} E^{-P}\, dE$$

Solving the integral gives the following equation for the exit energy as a function of the thickness of the plate (following equation).

$$E_{exit} = \sqrt[1-P]{\left(E_{entry}^{1-P} - (1-P) \times C_8 \times x_{xeff}\right)}$$

Since the target is positioned at a 5° angle (FIG. 6C), the $x_{eff}$ must be calculated using the following equation.

$$x_{eff} = \frac{x_{act}}{\sin(\theta)}$$

The actual thickness of the target ($x_{act}$) was estimated using the following equation where $m_{Ni}$ is the mass of deposited nickel, $\rho_{Ni}$ is the density of nickel, and a is the plated area. The values used for the mass of deposited nickel and plated area can be found in Table 17.

$$x_{act} = \frac{m_{Ni}}{\rho_{Ni} \times a}$$

Figures 6C, 6D, 6E:
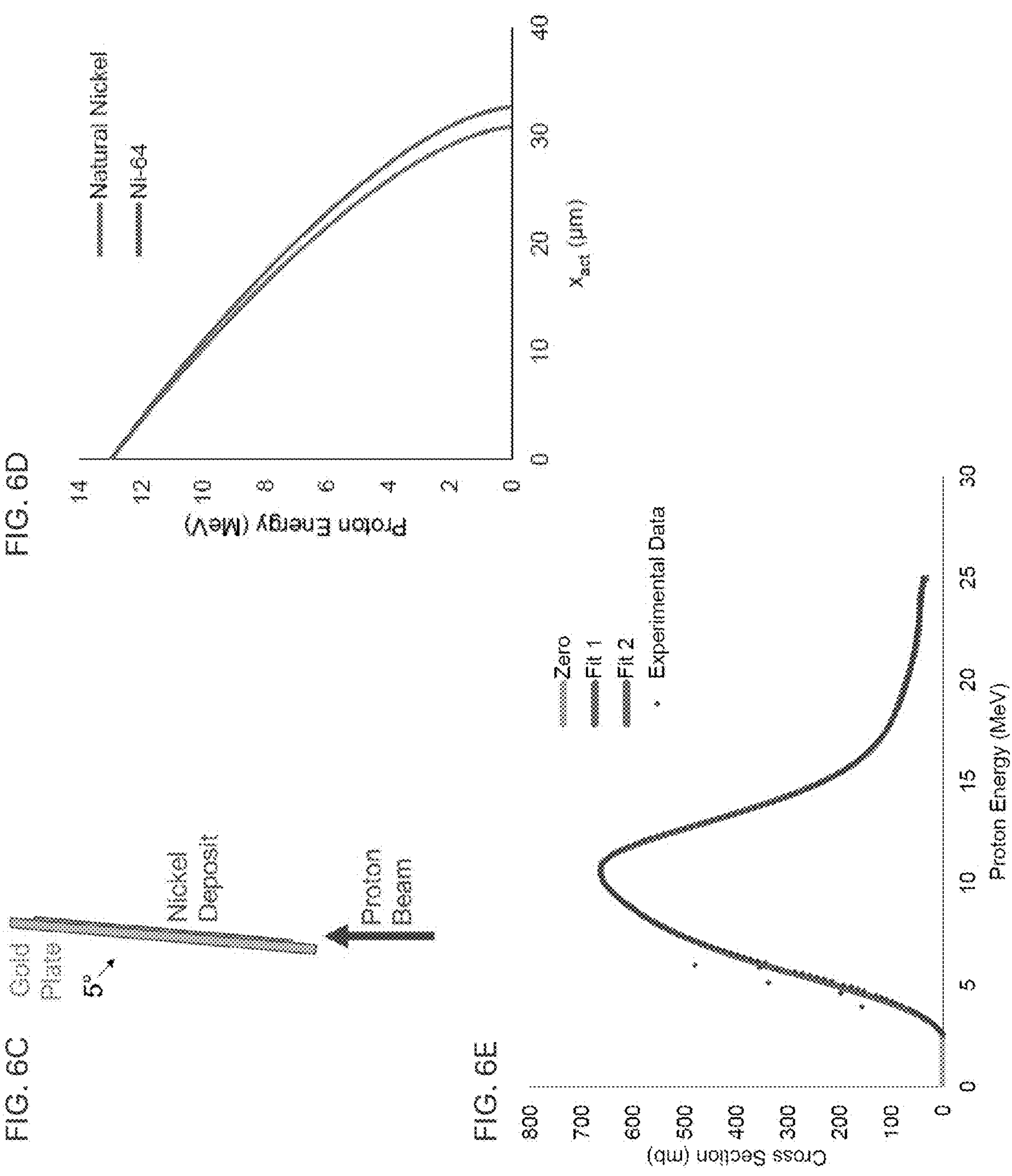
FIG. 6C shows an example of proton beam hitting a nickel target electroplated on a gold plate.
FIG. 6D shows proton energy as a function of the actual thickness of a plate.
FIG. 6E shows the fits used to solve the $^{64}$Ni(p,n)$^{64}$Cu cross section.

Plotting the equation above for calculating $E_{exit}$ as a function of $x_{act}$ and using an entrance proton energy of 13 MeV produces FIG. 6D, which displays the energy of the proton as it travels through the target. Due to the interactions between the proton and the atoms in the target, the proton slows down before finally reaching an energy of 0 MeV at 30.8 and 32.6 μm for the natural nickel and Ni-64 targets respectively. For any natural nickel and Ni-64 targets that are thinner than 30.8 and 32.6 μm respectively, then a proton with an entrance energy of 13 MeV is estimated to exit the back of the target and embed in the gold target material.

Solving the Integral Portion of the Thick Target Yield Equation

The integral portion of the thick target activity equation was solved by first dividing the 6th-order polynomial fit representing the cross section by the power law fit to the stopping power equation below, where $C_1$ through $C_7$ are the constants for the 6th-order polynomial fit to the cross-section data and $C_8$ and P are the constants for the power law fit to the stopping power data.

$$\int_{E_{exit}}^{E_{entry}} \frac{\sigma(E)}{S(E)} dE = \int_{E_{exit}}^{E_{entry}} \frac{C_1E^6 + C_2E^5 + C_3E^4 + C_4E^3 + C_5E^2 + C_6E + C_7}{C_8E^P} dE$$

Simplifying into an easier to integrate form, as in the following equation, $$\int_{E_{exit}}^{E_{entry}} \frac{\sigma(E)}{S(E)} dE = \frac{1}{C_8}\int_{E_{exit}}^{E_{entry}} (C_1E^{6-P} + C_2E^{5-P} + C_3E^{4-P} + C_4E^{3-P} + C_5E^{2-P} + C_6E^{1-P} + C_7E^{-P})dE = \frac{1}{C_8}\sum_{i=1}^{7}\int_{E_{exit}}^{E_{entry}} C_iE^{7-i-P}dE,$$

each equation is then integrated individually, as in the following equation:

$$\frac{1}{C_8}\sum_{i=1}^{7}\int_{E_{exit}}^{E_{entry}} C_iE^{7-i-P}dE = \frac{1}{C_8}\sum_{i=1}^{7}\left[\frac{C_iE^{7-i-P+1}}{7-i-P+1}\right]_{E_{exit}}^{E_{entry}}.$$

This will work for P values that follow the power rule. For example, if P=−1 for an i value of 7, the integration would be similar to the following equation and would not follow the power law. Each term in the integration is checked to confirm that it follows the power law prior to integration.

$$\frac{1}{C_8}\int_{E_{exit}}^{E_{entry}} C_7E^{-1}dE = \frac{1}{C_8}[\ln(E)]_{E_{exit}}^{E_{entry}}$$

In cases where the cross section was represented by multiple equations, the integration was separated by each set of bounds of the proton energy where that equation was applicable (following equation) where j is the number of equations used to fit the data. This was commonly used to set the integral equal to 0 at energy levels below where the cross section of the nuclear reaction was 0.

$$\frac{1}{C_8}\sum_{i=1}^{7}\int_{E_{exit}}^{E_{entry}} C_iE^{7-i-P}dE = \frac{1}{C_8}\sum_{i=1}^{7}\left(\int_{E_{exit}}^{E_1} C_{i,1}E^{7-i-P}dE + \int_{E_1}^{E_2} C_{i,2}E^{7-i-P}dE + \cdots + \int_{E_{j-1}}^{E_{entry}} C_{i,j}E^{7-i-P}dE\right)$$

For example, the $^{64}Ni(p,n)^{64}Cu$ reaction was modeled using 3 different fits using the equation below (FIG. 6E).

$$\int_{0\,MeV}^{25\,MeV} \frac{\sigma(E)}{S(E)} dE = \frac{1}{C_8}\sum_{i=1}^{7}\left(\int_{0\,MeV}^{2.6\,MeV} 0\,dE + \int_{2.6\,MeV}^{10.6\,MeV} C_{i,1}E^{7-i-P}dE + \int_{10.6\,MeV}^{25.0\,MeV} C_{i,2}E^{7-i-P}dE\right)$$

The data used to fit the $^{64}Ni(p,n)^{64}Cu$ cross section in FIG. 6E are in the table below.

TABLE 19

| | Results from Fit 1 | Results from Fit 2 |
|---|---|---|
| $E_{min}$= | 2.6 MeV | 10.6 MeV |
| $E_{max}$= | 10.6 MeV | 25.0 MeV |

TABLE 19-continued

| | Results from Fit 1 | Results from Fit 2 |
|---|---|---|
| $C_1$= | −0.0260 | −0.0026 |
| $C_2$= | 1.10141 | 0.2953 |
| $C_3$= | −15.4769 | −13.8190 |
| $C_4$= | 114.5851 | 339.5533 |
| $C_5$= | −414.0272 | −4603.9223 |
| $C_6$= | 737.7247 | 32467.7482 |
| $C_7$= | −538.5349 | −91989.1385 |

Results and Analysis

Run 1—Natural Nickel Target (13 MeV, 150 μA, 0.5 hr)

Figures 7A, 7B:
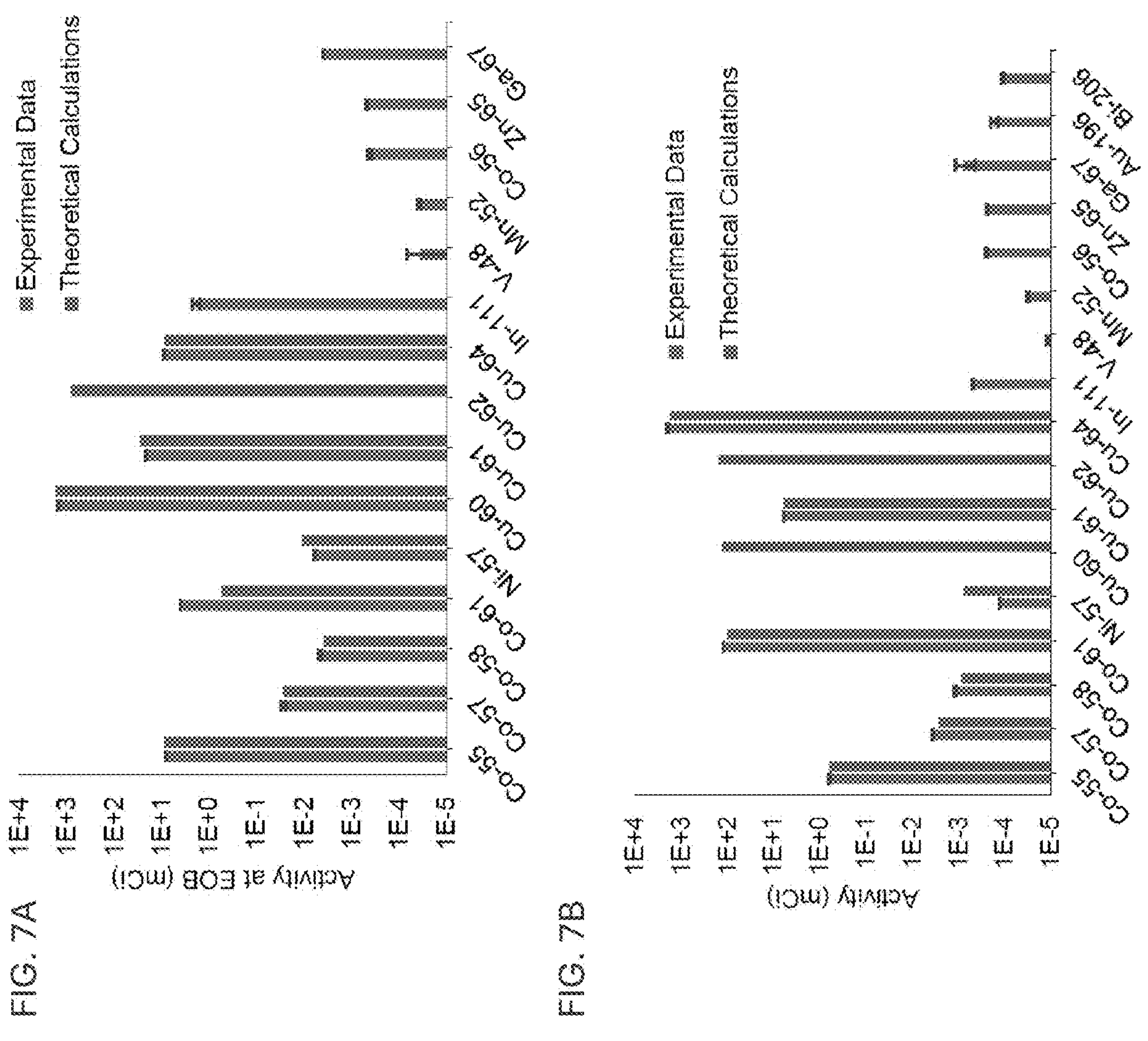
FIG. 7A shows a graphical comparison of the experimentally and theoretically determined activities of radioactive isotopes produced during the bombardment of a natural nickel target with a 13 MeV proton beam at 150 μA for 0.5 hr (Run 1).
FIG. 7B shows a graphical comparison of the experimentally and theoretically determined activities of radioactive isotopes produced during the bombardment of an enriched Ni-64 target with a 13 MeV proton beam at 150 μA for 1 hr (Run 2).

During the bombardment of the natural nickel target with a 13 MeV proton beam (150 μA, 0.5 h), approximately 1.6 Ci total activity was produced as estimated by the HPGe with only 8.8 mCi of Cu-64 (Table 20 and FIG. 7A). The small amount of Cu-64 produced was due to the low concentration of Ni-64 present in natural nickel (i.e., 0.93%) which is the nickel isotope that is converted to Cu-64 through a p,n reaction. The main isotope produced in the bombardment was Cu-60 which is expected to be created by the $^{60}Ni(p,n)^{60}Cu$ reaction which has a favorable cross section near 13 MeV and is benefited by the higher percentage of Ni-60 present in the natural nickel target (i.e., 26.2%). While the highest percentage isotope in the natural nickel target is Ni-58 (i.e., 68.1%), many of the cross sections for the nuclear reactions of a proton with Ni-58 (i.e., $^{58}Ni$ (p, 2p) $^{57}Co$, $^{58}Ni$ (p, n+3He) $^{55}Co$, $^{58}Ni$ (p, n+p) $^{57}Ni$) are not favorable at the 13 MeV beam energy which led to a lower output of these radioactive isotopes than if they had more favorable cross sections.

TABLE 20

Measured and calculated activities of radioactive isotopes produced during the bombardment of a natural nickel target with a 13 MeV proton beam at 150 μA for 0.5 hr (Run 1). Experimentally determined activities were measured on the day of bombardment and 1, 2, 3, and 4 weeks after bombardment and decay corrected to EOB.

| | | Experimental Data[1] | | Theoretical Calculations | |
|---|---|---|---|---|---|
| Isotope | Half-life | Activity (mCi) | Standard Deviation | Activity (mCi) | % Difference |
| Co-55 | 17.53 hr | 8.3E+0 | 2.0E−1 | 9.1E+0 | 9.8% |
| Co-57 | 271.8 d | 2.8E−2 | 3.1E−3 | 2.8E−2 | 0.4% |
| Co-58 | 70.9 d | 4.7E−3 | 3.7E−4 | 3.9E−3 | 17.7% |
| Co-61 | 1.65 hr | 4.0E+0 | N/A | 5.4E−1 | 86.5% |
| Ni-57 | 35.6 hr | 6.2E−3 | 2.0E−4 | 1.1E−2 | 83.9% |
| U-60 | 23.74 min | 1.5E+3 | N/A | 1.8E+3 | 15.8% |
| Cu-61 | 3.339 hr | 2.2E+1 | N/A | 2.9E+1 | 30.0% |
| Cu-62 | 9.7 min | ND | N/A | 8.1E+2 | N/A |
| Cu-64 | 12.701 hr | 8.8E+0 | 1.5E−1 | 8.8E+0 | 0.2% |
| In-111 | 2.80 d | 1.9E+0 | 3.7E−1 | NC | N/A |
| V-48 | 15.974 d | 3.7E−5 | 3.4E−5 | NC | N/A |
| Mn-52 | 5.591 d | 3.9E−5 | 2.6E−6 | NC | N/A |
| Co-56 | 77.236 d | 4.3E−4 | 3.9E−5 | NC | N/A |
| Zn-65 | 243.93 d | 5.0E−4 | 1.6E−5 | NC | N/A |
| Ga-67 | 3.2617 d | 4.0E−3 | 0 N/A | NC | N/A |

ND: Not Detected. NC: Not Calculated.

[E]xperimentally determined activity and standard deviation were calculated using only the measured values when the isotope was detected.

Overall, there was good agreement between the experimental data and theoretical calculations for the bombardment of the natural nickel target with a 0.2% difference in the measured and calculated Cu-64 activities (Table 20 and FIG. 7A). However there was a high activity of Cu-62 that was expected to be produced by the $^{62}Ni(p,n)^{62}Cu$ nuclear reaction which was not found in the HPGe data. As Cu-62 has a 9.7 min half-life, the calculated amount of Cu-62 at EOB would have decayed to 2.1 μCi of activity at 3 h after EOB (the time between EOB and start of HPGe analysis) and would be largely decayed prior to the start of analysis. Error between the calculated and experimentally determined isotopes that was relatively high (i.e., <30%) often corresponded to isotopes that were produced at low activities that make them difficult to quantify during HPGe results. Additionally, any experimental error or error inherent to the calculations (e.g., error between the fit and experimental data, variance between chosen values used in calculations and actual values) will increase the percent difference between the calculated and experimentally determined isotopes. The good agreement between the experimental and predicted activities for many of the isotopes indicates that the new cyclotron operated close to the intended parameters for the natural nickel bombardment.

Run 2—Ni-64 Enriched Target (13 MeV, 150 μA, 1 hr)

The first enriched Ni-64 target bombarded by the new cyclotron produced roughly 2.0 Ci of Cu-64 using a beam energy of 13 MeV at a beam current of 150 μA for 1 hr (Table 21 and FIG. 7B). The Cu-64 produced during this run was 12.7% higher than the calculated Cu-64 activity using these same conditions. This difference could be due to the conditions of the cyclotron being off compared to the reported values, experimental error in the HPGe measurements, inherent error in the calculation method, or issues caused when the strip solution was spilled (see below). As mentioned previously, many of the isotopes at low activities will be close to or below the limit of quantification of the HPGe which could increase the error in the HPGe measurement. This error in the HPGe measurement likely contributed to the higher percent difference between the experimental and calculated activities for some of these isotopes (i.e., Ni-57) compared to many of the higher activity isotopes.

TABLE 21

Measured and calculated activities of radioactive isotopes produced during the bombardment of an enriched Ni-64 target with a 13 MeV proton beam at 150 μA for 1 hr (Run 2). Experimentally determined activities were measured on the day of bombardment, 1 day, and 1, 3, and 4 weeks after bombardment and decay corrected to EOB.

| | | Experimental Data[1] | | Theoretical Calculations | % |
|---|---|---|---|---|---|
| Isotope | Half-life | Activity (mCi) | Standard Deviation | Activity (mCi) | Difference |
| Co-55 | 17.53 hr | 6.3E−1 | 2.2E−2 | 6.2E−1 | 0.9% |
| Co-57 | 271.8 d | 3.6E−3 | 9.5E−5 | 2.7E−3 | 24.2% |
| Co-58 | 70.9 d | 1.2E−3 | 3.4E−5 | 8.7E−4 | 27.4% |
| Co-61 | 1.65 hr | 1.2E+2 | N/A | 9.9E+1 | 17.7% |
| Ni-57 | 35.6 hr | 1.3E−4 | N/A | 7.8E−4 | 503.1% |
| Cu-60 | 23.74 min | ND | N/A | 1.3E+2 | N/A |
| Cu-61 | 3.339 hr | 6.0e−0 | N/A | 5.9E+0 | 2.1% |
| Cu-62 | 9.7 min | ND | N/A | 1.6E+2 | N/A |
| Cu-64 | 12.701 hr | 2.0E+3 | 5.4E+1 | 1.8E+3 | 12.7% |
| In-111 | 2.80 d | 4.9E−4 | 7.0E−6 | NC | N/A |
| V-48 | 15.974 d | 1.2E−5 | 4.3E−7 | NC | N/A |
| Mn-52 | 5.591 d | 3.1E−5 | 1.8E−6 | NC | N/A |
| Co-56 | 77.236 d | 2.5E−4 | 7.8E−6 | NC | N/A |
| Zn-65 | 243.93 d | 2.5E−4 | 7.5E−6 | NC | N/A |
| Ga-67 | 3.2617 d | 8.1E−4 | 3.8E−4 | NC | N/A |

TABLE 21-continued

Measured and calculated activities of radioactive isotopes produced during the bombardment of an enriched Ni-64 target with a 13 MeV proton beam at 150 μA for 1 hr (Run 2). Experimentally determined activities were measured on the day of bombardment, 1 day, and 1, 3, and 4 weeks after bombardment and decay corrected to EOB.

| | | Experimental Data[1] | | Theoretical Calculations | % |
|---|---|---|---|---|---|
| Isotope | Half-life | Activity (mCi) | Standard Deviation | Activity (mCi) | Difference |
| Au-196 | 6.156 d | 1.7E−4 | 3.1E−5 | NC | N/A |
| Bi-206 | 6.243 d | 1.1E−4 | 8.3E−6 | NC | N/A |

ND: Not Detected. NC: Not Calculated.

[1]Average and standard deviation were calculated using only the measured values when the isotope was detected.

Run 3—Ni-64 Enriched Target

Figures 7C, 7D:
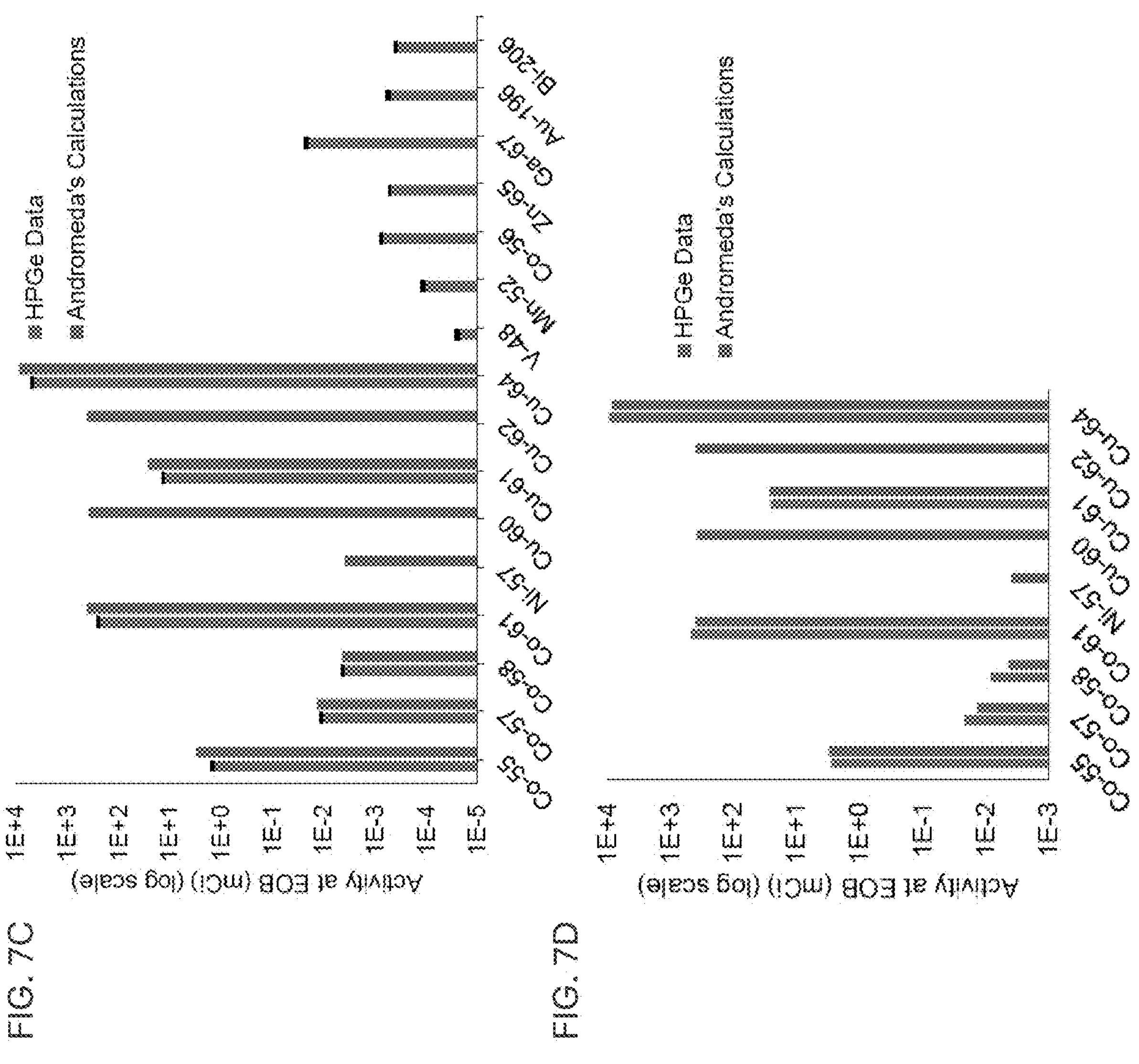
FIG. 7C shows a graphical comparison of the experimentally and theoretically determined activities of radioactive isotopes produced during the bombardment of an enriched Ni-64 target with a 13 MeV proton beam at 375 μA for 2 hr 11 min (Run 3).
FIG. 7D shows a graphical comparison of estimated activity and theoretical calculations of the isotopes produced by a new cyclotron during Run 3.

The quantities of the individual isotopes present in the strip solution for run 3 were assessed using an HPGe at four different measurement timepoints and averaged (Table 22 and FIG. 7C). From the HPGe data, 5.17 Ci of total activity was estimated to be produced at EOB with 4.9 Ci of this being Cu-64. The 5.17 Ci total activity and 4.9 Ci of Cu-64 measured by the HPGe data contradicts both the Dose Cal measurement performed after the target was stripped which read 9.93 Ci at 1110 29 Aug. 2024 and the theoretical calculations which predicted that 8.5 Ci of Cu-64 would be generated. This discrepancy could be the result of an aliquot of the combined strip solutions being taken without sufficient mixing occurring and the aliquot being taken from a portion of the solution that is at a lower concentration than the bulk solution. This hypothesis is also supported by the lower nickel recovery than expected in the strip solution aliquot (below). See below for further discussion of this deviation.

TABLE 22

Measured and calculated activities of radioactive isotopes produced during the bombardment of an enriched Ni-64 target with a 13 MeV proton beam at 375 μA for 2 hr 11 min (Run 3). Experimentally determined activities were measured on the day of bombardment and 2, 3, and 4 weeks after bombardment and decay corrected to EOB.

| | | Experimental Data[1] | | Theoretical Calculations | |
|---|---|---|---|---|---|
| Isotope | Half-life | Activity (mCi) | Standard Deviation | Activity (mCi) | % Difference |
| Co-55 | 17.53 hr | 1.5E+0 | N/A | 3.1E+0 | 108.4% |
| Co-57 | 271.8 d | 1.1E−2 | 8.7E−5 | 1.4E−2 | 20.0% |
| Co-58 | 70.9 d | 4.3E−3 | 5.3E−5 | 4.3E−3 | 0.1% |
| Co-61 | 1.65 hr | 2.5E+2 | N/A | 4.1E+2 | 62.8% |
| Ni-57 | 35.6 hr | ND | N/A | 3.9E−3 | N/A |
| Cu-60 | 23.74 min | ND | N/A | 3.9E+2 | N/A |
| Cu-61 | 3.339 hr | 1.3E+1 | N/A | 2.7E+1 | 98.6% |
| Cu-64 | 12.701 hr | 4.9E+3 | N/A | 8.5 + 3 | 74.4% |
| V-48 | 15.974 d | 2.5E−5 | 1.3E−6 | NC | N/A |
| Mn-52 | 5.591 d | 1.2E−4 | 3.7E−6 | NC | N/A |
| Co-56 | 77.236 d | 7.6E−4 | 1.4E−5 | NC | N/A |
| Zn-65 | 243.93 d | 5.2E−4 | 5.3E−6 | NC | N/A |
| Ga-67 | 3.2617 d | 2.3E−2 | 7.8E−4 | NC | N/A |
| Au-196 | 6.156 d | 5.6E−4 | 3.5E−5 | NC | N/A |
| Bi-206 | 6.243 d | 4.0E−4 | 4.9E−6 | NC | N/A |

ND: Not Detected. NC: Not Calculated.

[1]Average and standard deviation were calculated using only the measured values when the isotope was detected.

To account for the discrepancy between the HPGe data and the Dose Cal measurement and attempt to estimate the activity of each isotope produced by Run 3, the ratio of each individual isotope's activity to the total activity measured on the HPGe was multiplied by the total activity measured by the Dose Cal (i.e., 9.93 Ci at 1110 29 Aug. 2024) (Table 23). The results were compared against the results from the theoretical calculations (Table 23 and FIG. 7D), and it was found that there was better agreement between these estimated values and the theoretical calculations for many of the isotopes compared to the original values reported in Table 22.

One discrepancy that exists between the estimated and theoretical activities is the predicted presence of roughly 0.4 Ci each of Cu-60 and Cu-62 that were not found in the HPGe measurements. Both Cu-60 and Cu-62 have short half-lives (i.e., 23.7 and 9.7 min respectively) and would rapidly decay after bombardment to levels low enough to be undetected during HPGe analysis. The presence of both short-lived isotopes increase the measured Dose Cal activity 49 min after EOB but wouldn't be captured in the estimated activity calculations as the HPGe data was collected after Cu-60 and Cu-62 had decayed below the instruments detection limit. The lack of presence of these two isotopes in the HPGe data could cause the activity of other isotopes to be overestimated in the final estimated activity values displayed in Table 23 which could help explain why the estimated activities are generally higher than the theoretical activities.

TABLE 23

Comparison of estimated activity and theoretical calculations of the isotopes produced by the cyclotron during Run 3

| Isotope | Half-life | Run 3 Total Activity (mCi) at EOB: Estimated Activity | Theoretical Calculations | % Difference |
|---|---|---|---|---|
| Co-55 | 17.5 hr | 2.8E+0 | 3.1E+0 | 8% |
| Co-57 | 271.8 d | 2.2E−2 | 1.4E−2 | 60% |
| Co-58 | 70.9 d | 8.3E−3 | 4.3E−3 | 92% |
| Co-61 | 1.65 hr | 4.8E+2 | 4.1E+2 | 18% |
| Ni-57 | 35.6 hr | ND | 3.9E−3 | N/A |
| Cu-60 | 23.7 min | ND | 3.9E+2 | N/A |
| Cu-61 | 3.34 hr | 2.6E+1 | 2.7E+1 | 3% |
| Cu-62 | 9.7 min | ND | 4.1E+2 | N/A |
| Cu-64 | 12.7 hr | 9.4E+3 | 8.5E+3 | 10% |
| V-48 | 16.0 d | 4.7E−5 | NC | N/A |
| Mn-52 | 5.59 d | 2.2E−4 | NC | N/A |
| Co-56 | 77.2 d | 1.5E−3 | NC | N/A |
| Zn-65 | 243.9 d | 1.0E−3 | NC | N/A |
| Ga-67 | 3.26 d | 4.3E−2 | NC | N/A |
| Au-196 | 6.16 d | 1.1E−3 | NC | N/A |
| Bi-206 | 6.24 d | 7.6E−4 | NC | N/A |

ND: Not Detected. NC: Not Calculated.

[1]Average and standard deviation were calculated using only the measured values when the isotope was detected.

Run 4—Ni-64 Enriched Target

Figures 7E, 7F:
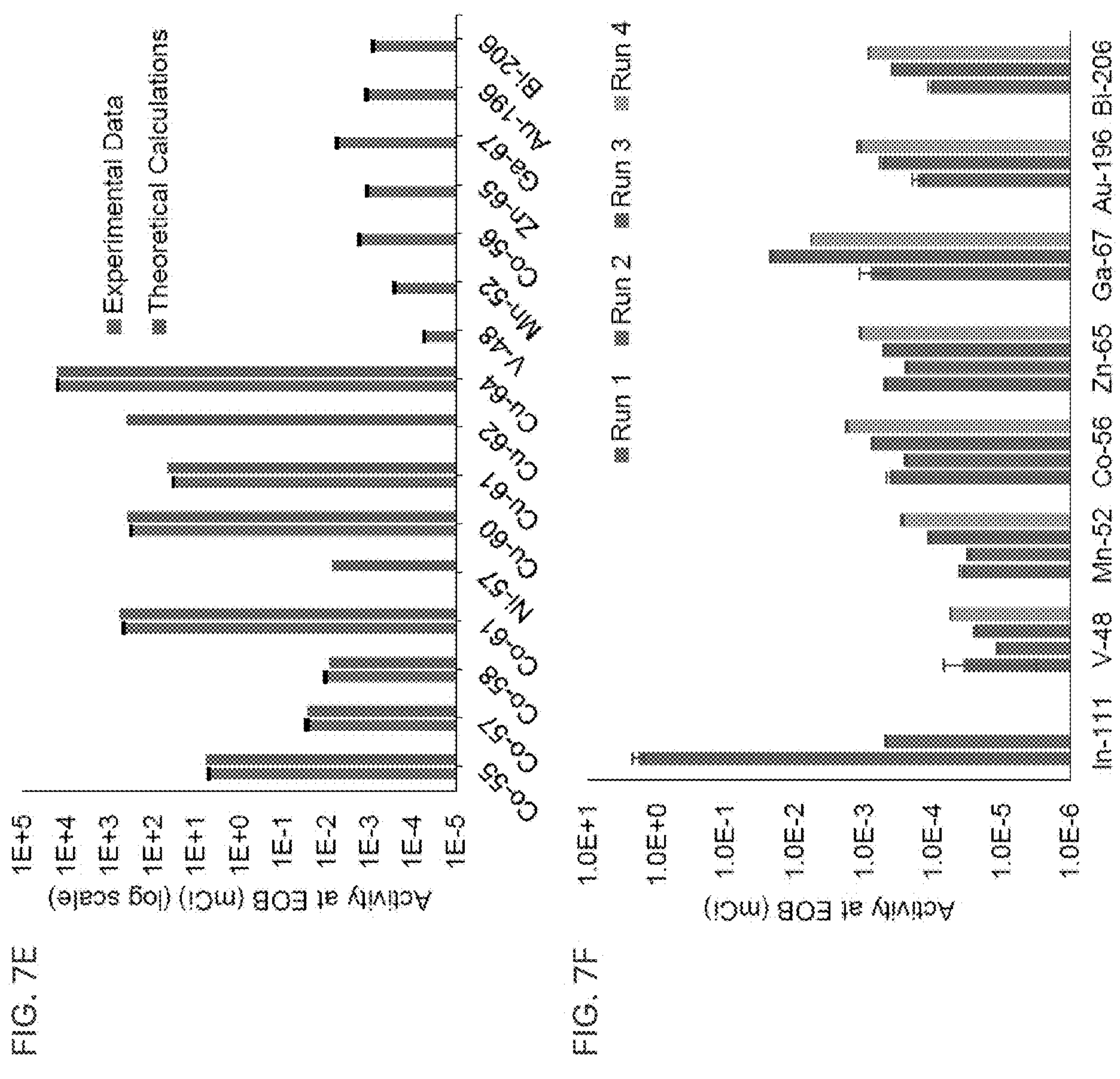
FIG. 7E shows a graphical comparison of the experimentally and theoretically determined activities of radioactive isotopes produced during the bombardment of an enriched Ni-64 target with a 13 MeV proton beam at 375 μA for 4 hr 23 min (Run 4).
FIG. 7F shows a graphical comparison of the experimentally determined activities of radioactive isotopes produced during the bombardment of natural nickel (run 1) and enriched Ni-64 (run 2, 3, and 4) targets.

The final cyclotron run discussed in this Example was performed by bombarding an enriched Ni-64 target using a 13 MeV proton beam at a beam current of 375 μA for 4 hr 35 min. Similar to run 2, the amount of Cu-64 produced during the bombardment was similar to the amount predicted to be produced using thick target yield calculations with a 0.7% difference (Table 24). The impurity profiles for the experimentally determined isotopes and activities and those predicted using calculations were similar (FIG. 7E). Due to the closeness of the experimental data and calculation results, it is expected that the cyclotron is operating close to the expected parameters even when operated for extended periods of time at high beam currents (i.e., 4 h at 375 μA).

TABLE 24

Measured and calculated activities of radioactive isotopes produced during the bombardment of an enriched Ni-64 target with a 13 MeV proton beam at 375 μA for 4 hr 35 min (Run 4). Experimentally determined activities were measured on the day of bombardment and 1, 3, and 4 weeks after bombardment and decay corrected to EOB

| Isotope | Half-life | Experimental Data[1]: Activity (mCi) | Experimental Data[1]: Standard Deviation | Theoretical Calculations: Activity (mCi) | % Difference |
|---|---|---|---|---|---|
| Co-55 | 17.53 hr | 5.1E+0 | 1.3E−1 | 5.9E+0 | 14.9% |
| Co-57 | 271.8 d | 2.8E−2 | 1.3E−3 | 2.7E−2 | 1.8% |
| Co-58 | 70.9 d | 1.0E−2 | 1.6E−4 | 8.7E−3 | 17.1% |
| Co-61 | 1.65 hr | 4.8E+2 | N/A | 5.9E+2 | 23.7% |
| Ni-57 | 35.6 hr | ND | N/A | 7.6E−3 | N/A |
| Cu-60 | 23.74 min | 3.3E+2 | N/A | 4.0E+2 | 21.2% |
| Cu-61 | 3.339 hr | 3.3E+1 | N/A | 4.4E+1 | 33.6% |
| Cu-62 | 9.7 min | ND | N/A | 4.1E+2 | N/A |
| Cu-64 | 12.701 hr | 1.6E+4 | N/A | 1.6E+4 | 0.7% |
| V-48 | 15.974 d | 5.6E−5 | 6.5E−7 | NC | N/A |
| Mn-52 | 5.591 d | 2.8E−4 | 8.9E−6 | NC | N/A |
| Co-56 | 77.236 d | 1.8E−3 | 2.6E−5 | NC | N/A |
| Zn-65 | 243.93 d | 1.1E−3 | 1.4E−5 | NC | N/A |
| Ga-67 | 3.2617 d | 5.8E−3 | N/A | NC | N/A |
| Au-196 | 6.156 d | 1.2E−3 | 6.0E−5 | NC | N/A |
| Bi-206 | 6.243 d | 8.6E−4 | N/A | NC | N/A |

ND: Not Detected.

NC: Not Calculated.

[1]Average and standard deviation were calculated using only the measured values when the isotope was detected.

Radioactive Isotopic Impurities

Predicted Isotopic Impurities

Many of the isotopic impurities produced during the bombardment of the enriched Ni-64 targets were predicted to be present by the calculations of the various nuclear reactions that occur between nickel and protons. A summary of these reactions can be found in Table 25. The main isotopic impurity produced during the bombardment of the enriched Ni-64 targets and the only impurity predicted to be produced by proton bombardment of Ni-64 is Co-61 (i.e., $^{64}$Ni (p,α)$^{61}$Co). For the other isotopes listed in Table 25, their production will be dependent on the concentration of their precursor nickel isotope in the target and can be minimized by using higher purity enriched Ni-64 material. Short lived impurities with half-lives less than 30 min such as Cu-60 and Cu-62, will largely be decayed away within 5 h of EOB. As many of the cobalt isotopes and Ni-57 are longer lived, these will need to be separated from the Cu-64 using chemical separation methods.

Of the isotopes, Cu-61 has the unique combination of possessing a moderately long half-life of 3.3 hr and being difficult to chemically separate from Cu-64. As the $^{61}$Ni(p, n)$^{61}$Cu reaction has a favorable cross section near 13 MeV (i.e., maximum of 508 mb at 10.3 MeV), a high concentration of Ni-61 in the target could lead to a high concentration of Cu-61 in the strip solution such as what was seen in the bombardment of the natural nickel target (Run 1). For the three enriched Ni-64 bombardments performed so far, the Cu-61 presence was kept at or below 0.27% of the total Cu-64 activity at EOB which is likely the result of the 0.13% Ni-61 present in the enriched Ni-64. If enriched Ni-64 targets are purchased with a higher concentration of Ni-61, Cu-61 activity could begin to noticeably decrease the radio nuclide purity of the resulting Cu-64 strip solution.

TABLE 25

Simulated reactions that could produce isotopic impurities in the proton bombardment of Ni-64

| Reactant → Product (Product's Half-Life) | Reaction(s) | Threshold energy (MeV)[1] |
|---|---|---|
| Ni-58 → Co-55 ($t_{1/2}$ = 17.53 hr) | $^{58}$Ni(p, n + $^{3}$He)$^{55}$Co | 7.5 |
| | $^{58}$Ni(p, α)$^{55}$Co | |
| | $^{58}$Ni(p, n + p + d)$^{55}$Co | |
| | $^{58}$Ni(p, 2n + 2p)$^{55}$Co | |
| | $^{58}$Ni(p, p + t)$^{55}$Co | |
| Ni-58 → Co-57 ($t_{1/2}$ = 271.8 d) | $^{58}$Ni(p, 2p)$^{57}$Co | 11 |
| Ni-58 → Ni-57 ($t_{1/2}$ = 35.6 hr) | $^{58}$Ni(p, n + p)$^{57}$Ni | 12 |
| | $^{58}$Ni(p, d)$^{57}$Ni | |
| Ni-60 → Co-57 ($t_{1/2}$ = 271.8 d) | $^{60}$Ni(p, α)$^{57}$Co | 3 |
| Ni-60 → Cu-60 ($t_{1/2}$ = 23.74 min) | $^{60}$Ni(p, γ)$^{61}$Cu | 3 |
| Ni-61 → Co-58 ($t_{1/2}$ = 70.9 d) | $^{61}$Ni(p, α)$^{58}$Co | 6 |
| Ni-61 → Cu-61 ($t_{1/2}$ = 3.339 h) | $^{61}$Ni(p, n)$^{61}$Cu | 3 |
| Ni-61 → Cu-62 ($t_{1/2}$ = 9.7 min) | $^{62}$Ni(p, n)$^{62}$Cu | 4.5 |
| Ni-64 → Co-61 ($t_{1/2}$ = 1.65 h) | $^{64}$Ni(p, α)$^{61}$Co | 7 |

[1] JANIS Webbook - www.oecd-nea.org/janisweb/book/protons, accessed August 2024

Unpredicted Isotopic Impurities

Besides the various radioactive cobalt and copper isotopic impurities that were predicted to be present by the thick target yield calculations, other impurities were found during the HPGe analysis of the target strip solution (FIG. 7F). Many of these impurities were present at low activities but have high enough half-lives to be detectable once all the high activity isotopes have decayed. These impurities were produced at activities less than 0.0005% of the Cu-64 activity at EOB which is well below the ≤0.05% specification for any single isotope at calibration for L064 and are therefore not expected to be present in enough quantities to cause a batch of Cu-64 to be out of specification.

Identifying the precursor isotopes to many of these low-level impurities can be useful during later investigations if one of these isotopes are produced at high enough levels to considerably lower the radionuclidic purity. Some of the low-level isotopic impurities can be explained by proton reactions with impurities present in the nickel targets (Table 26). The proton bombardment of the copper and zinc impurities can produce the Zn-65 (i.e., $^{65}$Cu (p,n) $^{65}$Zn, $^{66}$Zn(p, d)$^{65}$Zn), and both reactions have good cross sections near 13 MeV and high natural abundancies (Cu-65:30.9%, Zn-66: 27.7%). The Ga-67 could be the result of the $^{67}$Zn(p,n)$^{67}$Ga or $^{68}$Zn (p,2n)$^{67}$Ga reactions during bombardment of the zinc impurity which have favorable cross sections in the beam energy range passing through the target with natural abundances of Zn-67 and Zn-68 being 4.0% and 18.5% respectively. Bi-206 is produced by the favorable (p,n) and (p,2n) nuclear reactions for Pb-206 and Pb-207 respectively (natural abundancies: Pb-206:24.1%, Pb-207:22.1%). Besides reactions with impurities, the Au-196 could be produced by the $^{197}$Au(p,d)$^{196}$Au reaction when the proton beam strikes the gold plating that the nickel is played on to (Natural Abundance: Au-197: 100%). A high presence of Au-196 impurities could indicate that the proton beam is not well aligned and is striking sections of the target not plated with nickel.

TABLE 26

Impurities listed in the COA for the enriched Ni-64

| Element | Impurity Measurement (ppm) |
|---|---|
| Magnesium (Mg) | 18 |
| Aluminum (Al) | 24 |
| Copper (Cu) | 170 |
| Zinc (Zn) | 23 |
| Platinum (Pt) | 10 |
| Lead (Pb) | 48 |

Saturation Yield Estimations for Various Cyclotron Parameters

Saturation Yield Estimations for Varied Plating Mass

Figures 7G, 7H:
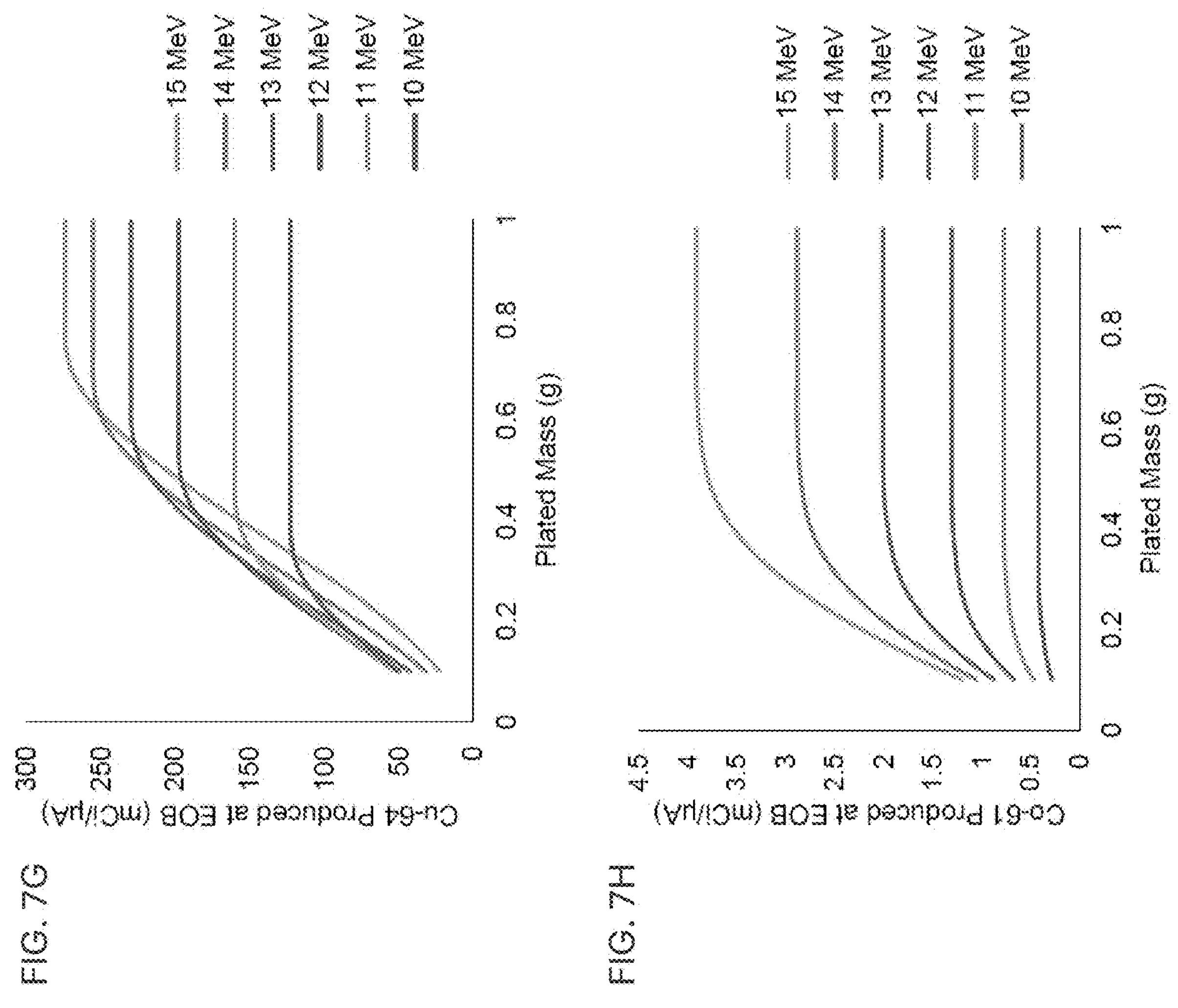
FIG. 7G shows 6 theoretical calculations estimating the $A_{sat}$ of Cu-64 production as a function of the plated mass and beam energy.
FIG. 7H shows theoretical calculations estimating saturation yield of Co-61 production as a function of the plated mass and beam energy.

To estimate the effect of plating mass on the Cu-64 production, theoretical calculations were run estimating the $A_{sat}$ of both Cu-64 and the main isotopic impurity in the enriched Ni-64 targets (i.e., Co-61) for beam energies between 10 and 15 MeV with plating masses between 0.1 and 1 g of Ni-64 (FIGS. 7G-H). At high plated masses of Ni-64 (i.e., 0.7 g), the Cu-64 produced will always increase with beam energy as the target will be thick enough to capture all protons (i.e., $E_{exit}$=0). As the target mass decreases, the target is no longer thick enough to capture all the protons from the beam (i.e., $E_{exit}$>0) and a portion of the beam will penetrate through the entire target without reacting. As the cross section for the $^{64}$Ni(p,n)$^{64}$Cu is highest at 10.6 MeV, beams that exit the back of the target without decreasing to this energy level will not reach energies where the $^{64}$Ni(p,n)$^{64}$Cu is most likely to occur. For example, a 15 MeV beam will only decrease to a predicted exit energy of 13.8 MeV in a target plated with 0.1 g of Ni-64 (See above for a description of the equation used to determine this). For Co-61, the cross section is always increasing when beam energy increases between 10 and 15 MeV, and therefore the amount of Co-61 will always increase with beam energy and plated mass (FIG. 7H).

Yields for Cu-64 and Co-61 as a Function of Bombardment Time

To assess how bombardment time would impact the yields of Cu-64, calculations were performed varying the bombardment time from 1 to 24 h (Table 27). The Cu-64 yields do continuously increase as the bombardment time approaches 24 h, but the yield increase diminishes at longer beam times as the Cu-64 decay rate approaches the production rate. In contrast, Co-61, one of the main impurities produced during the Ni-64 runs, reaches its saturation activity at roughly 13 h of beam time. Since Co-61 has a half-life of only 1.65 hr, it takes less time for the decay rate to equal the production rate. Due to the discrepancies between Cu-64 and Co-61, increasing the bombardment time beyond 13 hr will lead to increases in the Cu-64 activity produced without also drastically increasing the Co-61 activity produced.

TABLE 27

Activity of Cu-64 and Co-61 produced at EOB by bombarding a 100% Ni-64 target at 13 MeV as a function of time

| Target Mass (mg): | 650 |
|---|---|
| Beam Current (μA): | 350 |
| Beam Energy (MeV): | 13 |

| Time (hr) | Cu-64 EOB Yields (mCi) | Co-61 EOB Yields (mCi) |
|---|---|---|
| 1 | 4278.1 | 241.6 |
| 2 | 8329.0 | 400.3 |
| 3 | 12164.8 | 504.5 |
| 4 | 15796.8 | 573.0 |

TABLE 27-continued

| Activity of Cu-64 and Co-61 produced at EOB by bombarding a 100% Ni-64 target at 13 MeV as a function of time | | |
|---|---|---|
| 5 | 19236.0 | 618.0 |
| 6 | 22492.4 | 647.6 |
| 7 | 25575.9 | 667.0 |
| 8 | 28495.7 | 679.8 |
| 9 | 31260.4 | 688.2 |
| 10 | 33878.2 | 693.7 |
| 11 | 36357.0 | 697.3 |
| 12 | 38704.1 | 699.7 |
| 13 | 40926.6 | 701.3 |
| 14 | 43031.1 | 702.3 |
| 15 | 45023.7 | 703.0 |
| 16 | 46910.6 | 703.4 |
| 17 | 48697.2 | 703.7 |
| 18 | 50388.9 | 703.9 |
| 19 | 51990.8 | 704.0 |
| 20 | 53507.6 | 704.1 |
| 21 | 54943.9 | 704.1 |
| 22 | 56303.8 | 704.2 |
| 23 | 57591.5 | 704.2 |
| 24 | 58810.9 | 704.2 |

Saturation Yields Accounting for Backscattering of Ions

To determine the yield that protons of energy 15 MeV would produce, a Monte Carlo simulation was used to get the most accurate results. The reason Monte Carlo was needed was due to the statistical nature of protons moving through a material. Protons in a material can travel random paths and this would lead to different saturation yield results. Various Thicknesses of Ni-64 were used to simulate how far protons were). The atomic weight of the target material was adjusted to that of isotopically pure Ni-64 (63.93 g/mol). A total of 1000 protons at 15 MeV were used for the simulations in question. A SRIM output known as transmitted.txt was enabled to be generated and from this the exit energy of each proton was extracted. From this, a calculation was done to get the total saturation activity of the material. The saturation activity enables one to predict yield given proton energy and target density. The formula that predicts the total yield is given below.

$$A(t_{bombardment}) = A_{sat} I_{avg}\left(1 - e^{-\frac{ln(2)}{T_{1/2}} t_{bombardment}}\right)$$

Figures 7I, 7J:
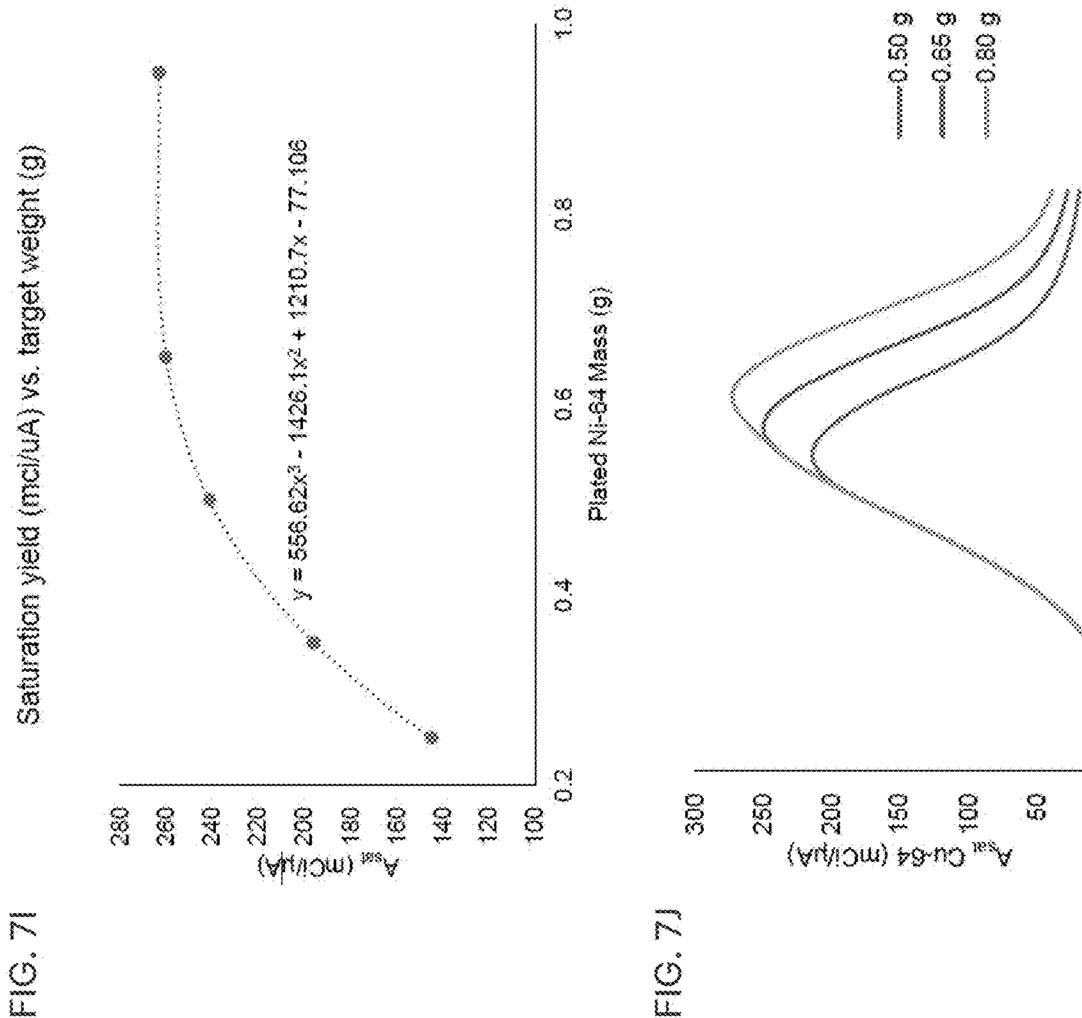
FIG. 7I shows saturation yields as a function of target weight determined using SRIM calculations to determine proton beam exit energy. Determined using the calculation of the exit energy for 1000 protons.
FIG. 7J shows saturation yields for Cu-64 as a function of the beam energy. Calculated for a mass loading of 0.50, 0.65, and 0.80 g of enriched Ni-64 (weight percents: Ni-58: 2.40%, Ni-60:1.41%, Ni-61:0.13%, Ni-62:0.66%, Ni-64: 95.4%).

The saturation yields are summarized in Table 28. The saturation yields as a function of target weights are shown in FIG. 7I.

TABLE 28

| Yield results as a function of bombardment time for different target masses | | | |
|---|---|---|---|
| Target Mass (mg): | 500 | 650 | 800 |
| $A_{sat}$ (mCi/μA) | 253 | 260 | 275 |
| Time (hr) | Cu-64 EOB Yields mCi @ 350 μA | | |
| 1 | 4703.408 | 4833.542 | 5112.4 |
| 2 | 9156.99 | 9410.346 | 9953.25 |
| 3 | 13374.02 | 13744.05 | 14536.97 |
| 4 | 17367.05 | 17847.56 | 18877.23 |
| 5 | 21147.99 | 21733.12 | 22986.95 |
| 6 | 24728.11 | 25412.29 | 26878.38 |
| 7 | 28118.06 | 28896.03 | 30563.11 |
| 8 | 31327.96 | 32194.74 | 34052.13 |
| 9 | 34367.35 | 35318.23 | 37355.82 |
| 10 | 37245.31 | 38275.81 | 40484.03 |

TABLE 28-continued

| Yield results as a function of bombardment time for different target masses | | | |
|---|---|---|---|
| 11 | 39970.4 | 41076.3 | 43446.09 |
| 12 | 42550.75 | 43728.04 | 46250.81 |
| 13 | 44994.04 | 46238.93 | 48906.56 |
| 14 | 47307.55 | 48616.45 | 51421.25 |
| 15 | 49498.18 | 50867.69 | 53802.36 |
| 16 | 51572.45 | 52999.35 | 56057.01 |
| 17 | 53536.54 | 55017.79 | 58191.89 |
| 18 | 55396.31 | 56929.01 | 60213.38 |
| 19 | 57157.3 | 58738.72 | 62127.5 |
| 20 | 58824.75 | 60452.31 | 63939.94 |

Saturation Yield Estimations for Varied Beam Energy

To determine the impact of beam energy on the yields from the IBA IKON cyclotron, simulated saturation yields were modeled for Cu-64 (FIG. 7J). When the beam energy is increased, the saturation yields for Cu-64 increased with beam energy until it reaches a maximum and then begins to decrease. The maximum Cu-64 saturation yields increases with the plating mass for the three plating masses simulated (i.e., 0.50, 0.65, and 0.80 g of enriched Ni-64). Based on the cross-section data for the Cu-64 reaction, the optimum beam energies for producing Cu-64 are between roughly 5 and 16 MeV with a maximum near 10 MeV. If the target is not thick enough and the beam energy is too high, the protons will escape out the back of the target before reaching the optimum beam energy for the $^{64}$Ni(p,n)$^{64}$Cu reaction. At lower beam energies (i.e., <12.5 MeV), varying the plating mass between 0.5 and 0.8 g has no impact on the saturation yields, but at higher beam energies, thicker targets will allow for more distance to degrade the beam into the optimal cross section which increases the simulated saturation yields. Therefore, increasing the beam energy is not guaranteed to increase the saturation yields without also considering the target thickness.

Figure 7K:
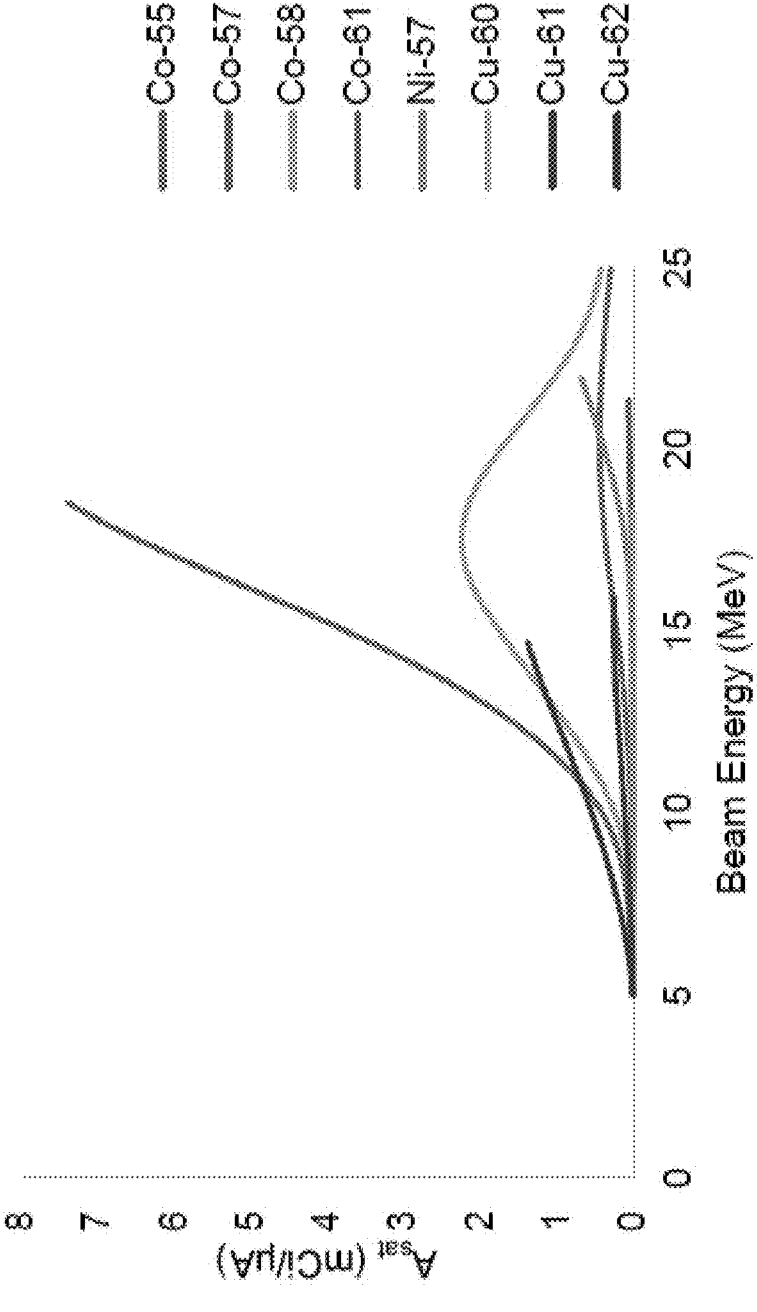
FIG. 7K shows saturation yields for various isotopic impurities as a function of the beam energy. Calculated for a mass loading of 0.65 g of enriched Ni-64 (weight percents: Ni-58:2.40%, Ni-60:1.41%, Ni-61:0.13%, Ni-62:0.66%, Ni-64:95.4%). Isotope predictions were kept within the beam energies of the polynomial fit to their experimental data.

To determine if the choice of beam energy would impact the isotopic impurities present, the saturation yields of seven other isotopes was calculated for the enriched Ni-64 target (FIG. 7K). Many of these isotopes are present at a low saturation yield due to having a smaller cross section at these beam energies and due to the low presence of the nickel isotope that is a precursor to that isotope.

Co-61 is the isotopic impurity with the highest saturation activity as it is produced by the $^{64}$Ni(p, α)$^{61}$Co reaction and Ni-64 is the most prevalent isotope in the enriched Ni-64 target. As the beam energy increases, the Co-61 saturation yield also increases. As the saturation yield for Co-61 starts to increase more rapidly above beam energies of 10 MeV, using a lower beam energy could reduce the production of Co-61 during bombardment. The effectiveness of the separation process for removing Co-61 from Cu-64 in the strip solution will dictate how important optimizing the beam energy to minimize Co-61 production is.

ICP-OES Analysis

ICP-OES results for the strip solution from each IKON bombardment are included in Table 29. Data for Cu, Ni, and common elemental impurities are included.

TABLE 29

| Strip Solution ICP Values and Calculated Nickel Recoveries | | | | | |
|---|---|---|---|---|---|
| Element | Units | Run #1 | Run #2 | Run #3 | Run #4 |
| Co | μg/mL | 2.42 | 2.34 | 1.15 | 1.71 |
| Cu | μg/mL | 1.97 | 2.24 | 2.29 | 1.55 |
| Fe | μg/mL | 5.79 | 1.60 | 1.35 | 3.08 |
| Pb | μg/mL | <1.00 | 1.58 | 1.00 | 1.00 |
| Zn | μg/mL | 1.99 | 2.33 | 1.33 | 2.03 |
| Ni (conc) | μg/mL | 18601.43 | 17248.09 | 8857.95 | 12113.30 |
| Solution Vol. | mL | 31 | 33 | 34.5 | 45.7 |
| Ni (total) | mg | 576.6 | 569.2 | 305.6 | 553.6 |
| Plated Ni | mg | 649 | 660 | 666 | 649 |
| Ni Recovery | % | 88.8 | 86.2 | 45.9 | 85.3 |

Values for elemental impurities (Co, Fe, Pb, and Zn) are consistent and low (<10 ppm) for each of the bombardments. Low levels of Cu detected are expected for short duration bombardments and support that the gold-plated target remained integral throughout the bombardment and target processing. Total Ni recovered was consistent except for Run #3, which was believed to have had a sample analyzed that was not homogenous. The visual confirmation of the stripped target further supports this assertion. Additionally, recovery values for Run #2 indicate that the spill of the strip solution did not appreciably impact the experimental results for the run. See below for further discussion of these run execution deviations.

Deviations

Deviation #1—Spilled Strip Solution, Run #2, 1st Ni-64 Bombardment

As mentioned in above, after adding the 3rd target strip solution to the consolidated strip solution vial, the vial tipped over spilling approximately 15 mL of the 33 mL strip solution. For this run a hard plastic stopper was used in the strip solution vial to facilitate capping and uncapping the vial for the multitude of additions and extractions. However, this stopper did not create an adequate seal when capped such that material was lost when the vial tipped over. Corrective action was to resume using the bromobutyl stoppers that are intended to seal the vial. From a run data standpoint, both HPGe and ICP data indicate that the solution was homogenous, and the samples taken after the spill were representative of the completed process. There was no impact to the data generated because of this deviation.

Deviation #2—Non-Homogenous Strip Solution Sample, Run #3, 2nd Ni-64 Bombardment As mentioned above, the HPGe and ICP results, respectively were not as expected for this run. Whereas the other runs had Cu-64 production and Ni-64 recovery within 20% of the expected values, Run #3 had HPGe and ICP results at approximately 50% of the expected value. Additionally, as explained above, there was disagreement between the dose calibrator reading in the production cell and the scaled value from the sample measured in the R&D dose calibrator. These consistent discrepancies led to the conclusion that the sample submitted was not homogenous and thus the reported production values were lower than actual. However, the production ratio values (Cu-64 to impurities) were not impacted and using a correction factor from the production cell dose calibrator production estimates could be made.

Discussion

The purpose of the studies was to evaluate the beam energy and how much Cu-64 was produced in a series of irradiations with natural nickel and 3 enriched nickel-64 targets. The theoretical activities calculated for the various irradiated targets provided similar results to the experimental radioactivity that were produced. The different Nickel target irradiations indicate the proton energy and current for the new cyclotron can provide predictable results and can accurately calculate Cu-64 yields. Calculations were provided in Table 28 for 15 MeV irradiations of enriched Nickel-64 targets with $A_{sat}$ values of 253, 260, and 275 mCi/μA for plated masses of 500 mg, 650 mg, and 800 mg respectively. Calculations were performed for irradiation times from 1 to 20 hours. Table 27 provides data that Cu-64 production managers can use to estimate the amount of Cu-64 produced for various irradiation times.

CONCLUSION

Experimental results from the initial operation of the new cyclotron successfully demonstrate that the cyclotron is performing within expectations. Three successful 13 MeV runs of the cyclotron were performed on enriched Ni-64 targets (roughly 650 mg plated mass) at 139, 750, and 1500 μA×hr, producing 2.0, 4.9, and 6.1 Ci of Cu-64 at EOB, respectively. The experimentally determined Cu-64 yield results from run 1, 2, and 4 of the cyclotron were comparable to the calculated thick target yields with a difference of 0.2%, 12.7%, and 0.7% for each run, respectively. The experimental impurity profiles for many of the copper and cobalt impurities produced during the bombardment of the nickel targets matched the calculated impurity profiles. Based on the closeness of the experimental and calculated yields for both the Cu-64 and many of the impurities, the new cyclotron is confirmed to be operating near the intended conditions and is ready for production of Cu-64.

Example 11: IBA IKON Cyclotron Irradiations

A series of IBA IKON cyclotron irradiations ("bombardments") using enriched Ni-64 plated targets were performed using increasing bombardment times (4 to 8 hours) and beam currents (200 to 375 μA) to produce Cu-64. The Cu-64 radionuclide produced during bombardment was removed ("stripped") from the targets and purified using AG1-X8 resin.

Run 250211 30 Ci Production

Enriched nickel (Ni-64) from Trace Sciences International (95.4% purity) that was recovered from targets processed in two (2) previous runs was used to plate the target intended for irradiation. The target was plated following the standard procedure and was plated for 4 hours at 250 mA. The plated target appearance and adhesion were acceptable for the target and the plated mass was 610 mg. The target was labelled 31 Jan. 2025-P2-4.

Target 31 Jan. 2025-P2-4 with a plated Ni-64 mass of 610 mg was selected for the bombardment. Target bombardment occurred on target station 2.2 on 10 Feb. 2025 at 13 MeV for 7 hours and 56 minutes. Beam current was controlled at 376 μA on the target resulting in a bombardment total electric charge of 2,999 μA×hr. EOB was at 0700 on 11 Feb. 2025. The plated surface of the target remained integral during bombardment.

In preparation for target processing the strip cell was prepared in the following manner. The strip cell vacuum cap was set to 2" Hg and strip cell preheating started at 0709 with a heater setpoint of 141° C. Target preheat (with leak check) began at 0743 and lasted until 0803. The target was stripped 3 times each with 14 mL of 9 M HCl for 6 minutes. The final strip solution volume was 26.25 mL. The activity of the consolidated strip solution, by dose calibrator, was 30.9 Ci at 0836 on 11 Feb. 2025. The target was visually inspected to ensure complete removal of the plated nickel. Strip solution samples were submitted for ICP and HPGe analysis.

4.319 g of AG 1-X8 resin (BioRad) was slurried in high resistivity water and added to a glass chromatography column. In this setup, fluid flow is gravity driven as opposed to the syringe drivers used in the Trasis AiO synthesizer runs. The resin was conditioned using high resistivity water followed by 9 M HCl. After loading and collecting the strip solution, a 10 mL chase of 9 M HCl was added. These additions were collected in the nickel fraction. 10 mL of 4 M HCl was passed through the column and collected as the cobalt fraction. Then 20 mL of 2 M HCl was passed through the column and collected as the copper fraction. The fractions were assayed by dose calibrator and then sampled for ICP and HPGe analysis.

The fraction and radioactivity assays are provided in Table 30 below.

TABLE 30

| Sample | Estimated Volume (mL) | Assay (mCi) |
|---|---|---|
| Strip Solution | 26.25 | 30,900 |
| Nickel Fraction | 36 | 424.8 |
| Cobalt Fraction | 10 | 3,264 |
| Copper Fraction | 20 | 22,610 |

The strip solution radioactivity from run 250211, corrected to end of bombardment (EOB) was 33,567 mCi. The purified Cu-64 fraction, also corrected to EOB, was 26,754 mCi for a purification yield of 79.7%. The radionuclidic purity, at EOB, for the purified Cu-64 was 99.7%.

Elemental impurity analysis from run 250211 is provided in the Table 31 below.

TABLE 31

| Run 250211 Elemental Impurity Results | | |
|---|---|---|
| | Lot 250211 Cu Fraction | |
| Element | Result (μg/mL) | Report (μg/mL)[a] |
| Co | None Detected | 0.00 |
| Cu | 0.338 | 1.00 |
| Fe | 0.531 | 1.00 |
| Ni | 11.795 | 11.80 |
| Pb | None Detected | 0.00 |
| Zn | 0.125 | 1.00 |

Note:
Results are corrected for dilution factor
[a]Based on reporting contained in STM 262-087

Run 250327 50—60 Ci Production Batch

Enriched, virgin nickel-64 (Ni-64) (99% purity) was used to plate three (3) IKON gold-plated cyclotron targets. The targets were plated following the standard procedure and were plated for 4 hours at 250 mA. The plated target appearance and adhesion were acceptable on all three (3) targets and the plated masses are provided in the Table 32 below.

TABLE 32

| Run 250327 Ni-64 Plated Target Masses | |
|---|---|
| Target ID | Plated Mass (mg) |
| 4 Feb. 2025-P2-1 | 584 |
| 4 Feb. 2025-P2-2 | 595 |
| 4 Feb. 2025-P2-3 | 598 |

Target 4 Feb. 2025-P2-3 with a plated Ni-64 mass of 598 mg was selected for the bombardment. Target bombardment occurred on IKON target station 2.2 on 26 Mar. 2025 at 13 MeV for 15 hours and 55 minutes. Beam current was controlled at 375 μA on the target resulting in a bombardment total electric charge of 6,000 μA×hr. EOB was at 0655 on 27 Mar. 2025. The plated surface of the target remained integral during bombardment.

In preparation for target processing the target strip cell was prepared in the following manner. The strip cell vacuum cap was set to 2" Hg and strip cell preheating started at 0708 with a heater setpoint of 141° C. Target preheat (with leak check) began at 0736 and lasted until 0756. The target was stripped 3 times each with 14 mL of 9 M HCl for 6 minutes. The final strip solution volume was 29.5 mL. The activity of the consolidated strip solution, by dose calibrator, was 50.7 Ci at 0832 on 27 Mar. 2025. The target was visually inspected to ensure complete removal of the plated nickel. Strip solution samples were submitted for ICP and HPGe analysis.

6.027 g of AG 1-X8 resin (BioRad) was slurried in high resistivity water and added to a glass chromatography column. In this setup, fluid flow is gravity driven as opposed to the syringe drivers used in the Trasis AiO synthesizer runs. The resin was conditioned using high resistivity water followed by 9 M HCl. After loading and collecting the strip solution, a 10 mL chase of 9 M HCl was added. These additions were collected in the nickel fraction. 20 mL of 5 M HCl were passed through the column and collected as the cobalt fraction. Then 20 mL of 2 M HCl were passed through the column and collected as the copper fraction (copper fraction #1). An additional 20 mL of 2 M HCl were added and collected separately due to the low activity amount in the initial copper fraction (copper fraction #2). The fractions were assayed by dose calibrator and then sampled for ICP and HPGe analysis.

The fraction and radioactivity assays are provided in the Table 33 below.

TABLE 33

| Run 250211 30 Ci Production Results | | |
|---|---|---|
| Sample | Estimated Volume (mL) | Assay (mCi) |
| Strip Solution | 29.5 | 50,670 |
| Nickel Fraction | 39 | 629 |
| Cobalt Fraction | 20 | 1,111 |
| Copper Fraction #1 | 20 | 5,500 |
| Copper Fraction #2 | 20 | 29,900 |

The strip solution radioactivity from run 250327, corrected to end of bombardment (EOB) was 55,366 mCi. The purified Cu-64 fraction, also corrected to EOB, was 43,831 mCi for a purification yield of 79.2%. The radionuclidic purity, at EOB, for the purified Cu-64 was 98.7%, and an RNP of 100% when corrected to Cu-64 calibration (0600, the day after EOB).

Elemental impurity analysis from run 250327 is shown in the Table 34 below.

TABLE 34

| Run 250327 Elemental Impurity Results | | |
|---|---|---|
| | Lot 250211 Cu Fraction | |
| Element | Result (μg/mL) | Report (μg/mL)[a] |
| Co | None Detected | 0.00 |
| Cu | 0.504 | 1.00 |
| Fe | None Detected | 0.00 |
| Ni | 5.402 | 5.40 |

TABLE 34-continued

| Run 250327 Elemental Impurity Results | | |
|---|---|---|
| | Lot 250211 Cu Fraction | |
| Element | Result (μg/mL) | Report (μg/mL)[a] |
| Pb | 2.162 | 2.16 |
| Zn | 0.658 | 1.00 |

Note:

Results are corrected for dilution factor

[a]Based on reporting contained in STM 262-087

Example 12-IBA Ikon Cyclotron Irradiations

In addition to the examples described above, another series of IBA IKON cyclotron irradiations ("bombardments") using enriched Ni-64 plated targets were performed using increasing bombardment times (16 to 24 hours) and beam currents (up to 375 μA) to produce Cu-64. The Cu-64 radionuclide produced during bombardment was removed ("stripped") from the targets and purified using AG1-X8 resin, as described above.

Summary

Bombardment: 16-hour bombardment at 375 μA (single beam).

Results: The strip solution shows 50.7 Ci activity which decays back to 55 Ci at end of bombardment (EOB). The total amount of Cu-64 at end of bombardment was 55.4 Ci. The theoretical maximum of Cu-64 is 3853.14 mCi/μg Target Processing and Cu-64 Purification: 80% purification yield was obtained based on dose calibrator data. Radionuclidic purity data can be determined, as described above. The obtained batch met elemental impurity release criteria and is also consistent with the current Cu-64 being produced for Detectnet (elemental, or "cold copper", was <1 ppm) with other methods, described above.

TABLE 35

| Production results | | |
|---|---|---|
| Isotope | Cu-64 | |
| Isotope (mass) | 64 | amu |
| Half-Life (d) | 0.5292 | days |
| Half-Life (hours) | 12.7008 | hours |
| Half-Life (min) | 762.048 | minutes |
| Half-life (sec) | 45722.88 | seconds |
| Lambda | 1.51565E−05 | $s^{-1}$ |
| Activity (mCi) | 10000 | mCi |
| A (dps) | 3.70E+11 | dps |
| N (atoms) | 2.44E+16 | atoms |
| Mass of Isotope (g) | 2.60E−06 | g |
| Mass of Isotope (μg) | 2.60E+00 | μg |
| Moles of Isotope (μmol) | 0.04055 | μmol |
| Carrier (0 if none added) | 0 | μg |
| Specific Activity | 3853.14 | mCi/μg |

TABLE 36

| Half-Life of isotopes used | | | |
|---|---|---|---|
| Isotope | Ac-225 | Cu-64 | Lu-177 |
| Half-Life (d) | 225 | 64 | 177 |
| Half-Life hours | 9.92 | 0.5292 | 6.647 |

PSMA I&T Radiolabeling

Greater than 25 Ci of copper Cu-64 chloride was labeled to PSMA I&T in a Pilot Lab, using procedures described above. The labeled product showed optimum radiochemical purity (RCP) data. The release and expiry samples showed >98.5% radiochemical purity (95% minimum specification). The radiochemical purity (RCP) or the Cu-64 PSMA I&T may be achieved at ≥95.0%, ≥96.0%, ≥97.0%, ≥98.0%, ≥99.0%, or ≥99.5%. This also included a 4-hour bulk formulation hold for sample tested at release and expiry.

Example 13-Cu-64 PSMA I&T Drug Substance

The copper Cu-64 PSMA I&T drug substance was prepared in situ and not isolated during the manufacturing process. To prepare the drug substance, copper Cu 64 chloride and PSMA I&T were added to a reaction buffer of 2 mg/mL gentisic acid in 0.25 M acetate solution. The radiolabeling reaction occurred at room temperature (17-30° C.) for 15 minutes. The drug substance was collected in a solution of sodium ascorbate and diluted with additional sodium ascorbate solution to reach the target RAC. The resulting mixture was the copper Cu 64 PSMA I&T injection drug product. Batch summary is provided in Table 37 and Table 38.

TABLE 37

| Batch summary. | | | | | |
|---|---|---|---|---|---|
| Batch Data Batch | Batch Description | Batch Size (Ci) | Reaction RAC (mCi/mL) | Release Testing RCP | Expiry Testing RCP |
| 250327 | 30Ci Batch | 25.13 | 250 | 99.69 | 99.04 |
| 250424 | 30Ci Batch | 31.11 | 350 | 97.27 | 97.31 |
| 250515 | Mixing Study - 15 Ci | 15.87 | 250 | 98.51 | 97.40 |
| 250528 | 30Ci Batch | 31.48 | 275 | 98.83 | 97.54 |
| 250603 | 30Ci Batch | 28.22 | 250 | 99.04P | |

TABLE 38

| List of PSMA radiolabeling runs using high activity $CuCl_2$: | | |
|---|---|---|
| Date | Lot | Activity at Radiolabeling (Ci) |
| 27 MAR. 2025 | 250327PSMA | 25.13 |
| 26 APR. 2025 | 250426PSMA | 31.11 |
| 25 MAY 2025 | 250525PSMA | 31.48 |
| 3 JUN. 2025 | 250603PSMA | 28.22 |
| 10 JUN. 2025 | 250610PSMA | 34.74 |

Table 39 provides a list of Cu-64 PSMA radiolabeling experiments using high activity $CuCl_2$ run materials produced by the Ikon cyclotron.

Table 41 is a list of high activity $CuCl_2$ runs produced from the Ikon or Cs-30 cyclotrons. The activity of the solution used to strip the target (i.e. Strip solution) and after purification for each run is listed in the table decay corrected to End of Bombardment (EOB). I have listed some of the bombardment conditions as well as the purification yield. The run on 15 MAY 25 involves combining two Cs-30 targets (one with 17.7 Ci and one with 7.7 Ci Cu-64) and then purified. The percent yield is effected by the purification process, which was being optimized during these runs. If raw Cu-64 activity production is what you are looking for, use the Activity at EOB, strip solution column.

TABLE 39

List of high activity $CuCl_2$ production runs.

| Lot | Activity at EOB Strip Soln (mCi) | Activity at EOB Purified $CuCl_2$ (mCi) | Total Metal Content (ppm) | RAC (mCi/mL) at EOB | Specific Activity (mCi/µg) at EOB | RAC (mCi/mL) at Cal[1] | Specific Activity (mCi/µg) at Cal[1] |
|---|---|---|---|---|---|---|---|
| 241212 | 18,191 | 10,871 | 14.7 | 1260 | 85.92471 | 485 | 33 |
| 250109 | 18,151 | 15,795 | 18.5 | 882 | 47.74277 | 339 | 18 |
| 250115 | 15,147 | 13,271 | 19.1 | 961 | 50.18801 | 370 | 19 |
| 250122 | 33,753 | 5,597 | 2.0 | 223 | 111.8355 | 86 | 43 |
| 250204 | 31,721 | 10,911 | 2.9 | 511 | 173.3379 | 197 | 67 |
| 250211 | 33,567 | 26,754 | 12.8 | 1520 | 118.8521 | 585 | 46 |
| 250327 | 55,366 | 43,831 | 8.7 | 1880 | 216.3406 | 723 | 83 |
| 250403 | 17,967 | 15,383 | 4.6 | 563 | 122.4445 | 217 | 47 |
| 250424 | 43,095 | 41,497 | 3.0 | 1840 | 622.6734 | 708 | 240 |
| 250515 | 25352 | 20,909 | 4.5 | 1450 | 320.0883 | 558 | 123 |
| 250528 | 52,845 | 47,219 | 10.9 | 1420 | 130.731 | 546 | 50 |
| 250603 | 41,806 | 36,176 | 8.1 | 1540 | 190.2879 | 593 | 73 |
| 250610 | 56,524 | 50,324 | 5.4 | 1550 | 287.4096 | 596 | 111 |

TABLE 40

High Activity Lot results without spiked copper

| Lot | Activity at EOB Strip Soln (mCi) | Activity at EOB Purified $CuCl_2$ (mCi) | Total Metal Content (ppm) | RAC (mCi/mL) at EOB | Specific Activity (mCi/µg) at EOB | RAC (mCi/mL) at Cal[1] | Specific Activity (mCi/µg) at Cal[1] |
|---|---|---|---|---|---|---|---|
| 250515 | 25352 | 20,909 | 2.5 | 1450 | 573.1225 | 558 | 221 |
| 250528 | 52,845 | 47,219 | 8.9 | 1420 | 160.2347 | 546 | 62 |
| 250603 | 41,806 | 36,176 | 6.1 | 1540 | 252.7491 | 593 | 97 |
| 250610 | 56,524 | 50,324 | 3.4 | 1550 | 456.8229 | 596 | 176 |

Specific activity without copper spike calculated at EOB and at Cal.

TABLE 41

| EOB Date | Cyclotron | Lot No. | Bombardment Time (Hr) | Bombardment Current (µA) | Bombardment Total (µA*hr) | Beam Energy (MeV) | Activity at EOB Strip Soln (mCi) | Activity at EOB Purified $CuCl_2$ (mCi) | % Yield |
|---|---|---|---|---|---|---|---|---|---|
| 29 Aug. 2024 | IKON 1.2 | 240829 | 2.183 | 375 | 750 | 13 | 10,383 | | |
| 12 Sep. 2024 | IKON 1.2 | 240912 | 4.583 | 375 | 1500 | 13 | 20,348 | | |
| 12 Dec. 2024 | IKON 2.2 | 241212 | 4 | 375 | 1500 | 13 | 18,191 | 10,871 | 59.8% |
| 9 Jan. 2025 | IKON 2.2 | 250109 | 4 | 375 | 1500 | 13 | 18,151 | 15,795 | 87.0% |
| 15 Jan. 2025 | IKON 2.2 | 250115 | 7.5 | 200 | 1500 | 13 | 15,147 | 13,271 | 87.6% |
| 22 Jan. 2025 | IKON 2.2 | 250122 | 8 | 375 | 3000 | 13 | 33,753 | 5,597 | 16.6% |
| 4 Feb. 2025 | IKON 2.2 | 250204 | 7.983 | 377.6 | 3006 | 13 | 31,721 | 10,911 | 34.4% |
| 11 Feb. 2025 | IKON 2.2 | 250211 | 7.933 | 376 | 2999 | 13 | 33,567 | 26,754 | 79.7% |
| 27 Mar. 2025 | IKON 2.2 | 250327 | 15.92 | 375 | 6000 | 13 | 55,366 | 43,831 | 79.2% |
| 3 Apr. 2025 | IKON 2.2 | 250403 | 4 | 375 | 1500 | 13 | 17,967 | 15,383 | 85.6% |
| 8 Apr. 2025 | IKON 2.2 | 250409 | 8.45 | | | 13 | 25,271 | 24,052 | 95.2% |

TABLE 41-continued

| EOB Date | Cyclotron | Lot No. | Bombardment Time (Hr) | Bombardment Current (μA) | Bombardment Total (μA*hr) | Beam Energy (MeV) | Activity at EOB Strip Soln (mCi) | Activity at EOB Purified $CuCl_2$ (mCi) | % Yield |
|---|---|---|---|---|---|---|---|---|---|
| 24 Apr. 2025 | IKON 2.2 | 250424 | 11.58 | 400 | 4639 | 13 | 43,095 | 41,497 | 96.3% |
| 15 May 2025[1] | CS-30/1 | 250515 | 15 | 150 | 2253 | 12.5 | 17,655 | 20,909 | 82.5% |
| 15 May 2025[1] | CS-30/2 | 250515 | 15 | 150 | 2216 | 12.5 | 7,697 | | |
| 28 May 2025 | IKON 2.1 | 250528 | 15.25 | 371 | 5659 | 13 | 52,845 | 47,219 | 89.4% |
| 3 Jun. 2025 | IKON 2.1 | 250603 | 13 | 340 | 4417 | 13 | 41,806 | 36,176 | 86.5% |
| 10 Jun. 2025 | IKON 2.1 | 250610 | 16 | 403 | 6451 | 13 | 56,524 | 50,324 | 89.0% |

[1]Dual Cs-30 targets were combined and purified on 15 May 2025 run.

TABLE 42

| Lot | Co (ppm) | Cu (ppm) | Fe (ppm) | Ni (ppm) | Pb (ppm) | Zn (ppm) | Total (ppm) | RAC (mCi/mL) at Cal[1] | Specific Activity (mCi/μg) at Cal[1] |
|---|---|---|---|---|---|---|---|---|---|
| 241212 | 0 | 11.598 | 1.607 | 1.202 | 0 | 0.257 | 14.7 | 485 | 33 |
| 250109 | 0 | 11.610 | 0.542 | 1.222 | 0 | 0.222 | 18.5 | 339 | 18 |
| 250115 | 0 | 16.234 | 1.423 | 1.293 | 0 | 0.198 | 19.1 | 370 | 19 |
| 250122 | 0 | 0.157 | 0.767 | 1.012 | 0 | 0.058 | 2.0 | 86 | 43 |
| 250204 | 0 | 1.166 | 1.175 | 0.58 | 0 | 0.027 | 2.9 | 197 | 67 |
| 250211 | 0 | 0.338 | 0.531 | 11.795 | 0 | 0.125 | 12.8 | 585 | 46 |
| 250327 | 0 | 0.504 | 0 | 5.402 | 2.126 | 0.658 | 8.7 | 723 | 83 |
| 250403 | 0 | 1.129 | 2.688 | 0.619 | 0 | 0.162 | 4.6 | 217 | 47 |
| 250424 | 0 | 0.267 | 1.01 | 1.484 | 0 | 0.194 | 3.0 | 708 | 240 |
| 250515 | 0 | 3.401 | 0 | 0.899 | 0.079 | 0.151 | 4.5 | 558 | 123 |
| 250528 | 0 | 2.58 | 6.435 | 1.67 | 0 | 0.177 | 10.9 | 546 | 50 |
| 250603 | 0 | 2.214 | 0.092 | 5.48 | 0 | 0.307 | 8.1 | 593 | 73 |
| 250610 | 0 | 2.145 | 0.282 | 2.271 | 0 | 0.695 | 5.4 | 596 | 111 |

All references cited herein are hereby incorporated by reference. The foregoing is offered primarily for purposes of illustration. It will be readily apparent to those skilled in the art that further drugs can be included, and that the components, additives, proportions, methods of formulation, methods of use, and other parameters described herein can be modified further or substituted in various ways without departing from the spirit and scope of the invention.

Numerous examples are provided herein to enhance the understanding of the present disclosure. A specific set of statements are provided as follows.

Statement 1: A composition comprising from 15 Ci to 110 Ci of copper-64 ($^{64}Cu$) and having a specific activity from 50 mCi to 3850 mCi $^{64}Cu$/μg Cu.

Statement 2: A composition comprising from 50 Ci to 100 Ci of $^{64}Cu$ and having a specific activity from 50 mCi to 3850 mCi $^{64}Cu$/μg Cu.

Statement 3: A composition comprising from 25 Ci to 75 Ci of $^{64}Cu$ and having a specific activity from 50 mCi to 3850 mCi $^{64}Cu$/μg Cu.

Statement 4: A composition comprising from 17 Ci to 20 Ci of $^{64}Cu$ and having a specific activity from 50 mCi to 3850 mCi $^{64}Cu$/μg Cu.

Statement 5: A composition comprising from 25 Ci to 50 Ci of $^{64}Cu$ and having a specific activity from 50 mCi to 3850 mCi $^{64}Cu$/μg Cu.

Statement 6: A composition comprising from 20 Ci to 110 Ci of $^{64}Cu$ and having a specific activity from 50 mCi to 3850 mCi $^{64}Cu$/μg Cu.

Statement 7: A composition comprising from 25 Ci to 110 Ci of $^{64}Cu$ and having a specific activity from 50 mCi to 3850 mCi $^{64}Cu$/μg Cu.

Statement 8: The composition of statement 1, wherein the composition comprises a radionuclidic purity for $^{64}Cu$ of ≥98.9% and a radionuclidic purity of 61 Co of ≤1.0%.

Statement 9: The composition of statement 8, wherein the composition comprises a radionuclidic purity for $^{64}Cu$ of approximately 100.0% and a radionuclidic purity of $^{61}Co$ of approximately 0.0%.

Statement 10: The composition of statement 1, wherein the composition has a total content of less than or equal to 20 μg/mL of elemental copper.

Statement 11: The composition of statement 1, wherein the composition has a total content of less than or equal to 1 μg/mL of cobalt.

Statement 12: The composition of statement 1, wherein the composition has a total content of less than or equal to 1 μg/mL of iron.

Statement 13: The composition of statement 1, wherein the composition has a total content of less than or equal to 1 μg/mL of nickel.

Statement 14: The composition of statement 1, wherein the composition has a total content of less than or equal to 1 g/mL of lead.

Statement 15: The composition of statement 1, wherein the composition has a total content of less than or equal to 1 μg/mL of zinc.

Statement 16: The composition of statement 1, wherein the composition has a total content of trace metals of less than about 5 parts per million (ppm), the trace metals being cobalt, copper, gold, iron, lead, mercury, nickel, gallium, germanium, zinc, and combinations thereof.

Statement 17: The composition of statement 1, wherein the composition comprises a solution of hydrochloric acid (HCl) having a molarity of about 0.001 M to about 3 M.

Statement 18: The composition of statement 17, wherein the molarity of the HCl is about 0.05 M.

Statement 19: The composition of statement 17, wherein the molarity of the HCl is about 0.5 M.

Statement 20: The composition of statement 1, wherein the $^{64}Cu$ exists as $[^{64}Cu]CuCl_2$.

Statement 21: The composition of statement 1, wherein the composition further comprises a chelating agent or a bifunctional chelating agent in which the $^{64}Cu$ is coordinated therein, and the chelating agent or the bifunctional chelating agent is a macrocyclic compound, a bridged macrocyclic compound, a bicyclic compound, or an acyclic compound.

Statement 22: The composition of statement 21, wherein the chelating agent is DOTA or DOTAGA.

Statement 23: The composition of statement 1, wherein the composition is suitable for administration to a human subject in need thereof once divided into a smaller aliquot.

Statement 24: A process for preparing copper-64 ($^{64}Cu$) from nickel-64 ($^{64}Ni$), the process comprising:

(a) bombarding a cyclotron target comprising $^{64}Ni$ with a proton beam to generate a bombarded target;

(b) stripping the bombarded target with a volume of hydrochloric acid (HCl) having a molarity of about 6 M to about 12.1 M to form a strip solution comprising $^{64}Ni$, $^{64}Cu$, $^{61}Co$, and one or more other metals; and (c) purifying the $^{64}Cu$ from the strip solution by:

(i) passing the strip solution through a first column comprising an extraction resin connected in series to a second column comprising an ion exchange resin such that the one or more other metals binds to the extraction resin in the first column, $^{64}Cu$ and $^{61}Co$ bind to the ion exchange resin in the second column, and $^{64}Ni$ passes through the first and second columns as a first flow-through fraction;

(ii) rinsing the first and second columns with a volume of HCl having a molarity of about 6 M to about 12.1 M to elute residual $^{64}Ni$ as a second flow-through fraction;

(iii) rinsing the second column with a volume of HCl having a molarity of about 3 M to about 6 M to elute $^{61}Co$ as a first waste fraction;

(iv) rinsing the second column with a volume of sodium chloride (NaCl) having a molarity of about 3 M to about 6 M in HCl having a molarity of about 0.01 M to about 3 M to elute residual $^{61}Co$ as a second waste fraction, or rinsing the second column with a volume of HCl having a molarity of about 3 M to about 6 M to elute residual $^{61}Co$ as a second waste fraction; and (v) adding a volume of HCl having a molarity of about 0.01 M to about 3 M to the second column to elute the $^{64}Cu$ as a product fraction comprising $^{64}Cu$.

Statement 25: The process of statement 24, wherein the proton beam at (a) has one or more of (i) an energy of about 12 MeV to about 30 MeV, optionally wherein the energy is about 13 MeV; and (ii) a current of 100-1500 μA×hr, optionally wherein the current is 139, 750, or 1500 μA×hr.

Statement 26: The process of statement 24, wherein the bombarding at (a) proceeds for about 1 h to about 24 h, and the bombarded target comprises from about 2 Ci to about 110 Ci of $^{64}Cu$ at the end of bombardment (EOB).

Statement 27: The process of statement 24, wherein after about 2 h to about 4 h of bombarding at (a), the bombarded target comprises from about 2 Ci to about 25 Ci of $^{64}Cu$ at EOB.

Statement 28: The process of statement 24, wherein after about 6 h of bombarding at (a), the bombarded target comprises from about 5 Ci to about 9 Ci of $^{64}Cu$ at EOB.

Statement 29: The process of statement 24, wherein after about 8 h to about 12 h of bombarding at (a), the bombarded target comprises from about 4 Ci to about 15 Ci of $^{64}Cu$ at EOB.

Statement 30: The process of statement 24, wherein the stripping at (b) comprises contacting the bombarded target with 9 M HCl, and the stripping at (b) is conducted at a temperature of about 65° C. to about 100° C.

Statement 31: The process of statement 24, wherein the extraction resin in the first column at (c)(i) comprises tributylphosphate as a functional group, and the ion exchange resin in the second column at (c)(i) comprises a tertiary amine as a functional group.

Statement 32: The process of statement 24, wherein the rinsing at (c)(ii) comprises 9 M HCl.

Statement 33: The process of statement 24, wherein the first and second flow-through fractions are combined as a $^{64}Ni$ recovery fraction.

Statement 34: The process of statement 33, wherein at least 90% of the target $^{64}Ni$ is recovered in the $^{64}Ni$ recovery fraction.

Statement 35: The process of statement 24, wherein the rinsing at (c)(iii) comprises 4 M HCl, and the rising at (c)(iv) comprises 5 M NaCl in 0.05 M HCl or the rinsing at (c)(iv) comprises 4 M HCl.

Statement 36: The process of statement 24, wherein the $^{64}Cu$ is eluted at (c)(v) with 0.05 M HCl.

Statement 37: The process of statement 24, wherein at least 80% of the $^{64}Cu$ present in the strip solution is recovered in the product fraction comprising $^{64}Cu$.

Statement 38: The process of statement 24, wherein the product fraction comprising $^{64}Cu$ comprises from about 2 Ci to about 110 Ci of $^{64}Cu$ and has a specific activity up to about 3850 mCi $^{64}Cu$/μg Cu.

Statement 39: The process of statement 24, wherein the product fraction comprising $^{64}Cu$ has a total content of trace metals of less than about 5 ppm, the trace metals being cobalt, copper, gold, iron, lead, mercury, nickel, and zinc.

Statement 40: A process for preparing copper-64 ($^{64}Cu$) from nickel-64 ($^{64}Ni$), the process comprising:

(a) bombarding a cyclotron target comprising $^{64}Ni$ with a proton beam to generate a bombarded target;

(b) stripping the bombarded target with a volume of hydrochloric acid (HCl) having a molarity of about 6 M to about 12.1 M to form a strip solution comprising $^{64}Ni$, $^{64}Cu$, $^{61}Co$, and one or more other metals; and (c) purifying the $^{64}Cu$ from the strip solution by:

(i) passing the strip solution through a column comprising an ion exchange resin such that the one or more other metals binds to the ion exchange resin in the column, $^{64}Cu$ and $^{61}Co$ bind to the ion exchange resin in the column, and $^{64}Ni$ passes through the column as a first flow-through fraction;

(ii) rinsing the column with a volume of HCl having a molarity of about 6 M to about 12.1 M to elute residual $^{64}Ni$ as a second flow-through fraction;

(iii) rinsing the column with a volume of HCl having a molarity of about 6 M to about 12.1 M to elute $^{61}Co$ as a first waste fraction;

(iv) adding a volume of HCl having a molarity of about 0.01 M to about 3 M to the column to elute the $^{64}Cu$ as a product fraction comprising $^{64}Cu$.

Statement 41: A process for preparing copper-64 ($^{64}Cu$) from nickel-64 ($^{64}Ni$), the process comprising:

(a) bombarding a cyclotron target comprising $^{64}Ni$ with a proton beam to generate a bombarded target;

(b) stripping the bombarded target with a volume of hydrochloric acid (HCl) having a molarity of about 6 M to about 12.1 M to form a strip solution comprising $^{64}Ni$, $^{64}Cu$, $^{61}Co$, and one or more other metals; and (c) purifying the $^{64}Cu$ from the strip solution by:

(i) passing the strip solution through a column comprising an ion exchange resin such that $^{64}Cu$ binds to the ion exchange resin and $^{64}Ni$ passes through the column as a first flow-through fraction;

(ii) rinsing the column with a volume of HCl having a molarity of about 3 M to about 6 M to elute residual $^{64}Ni$ as a second flow-through fraction; and (iii) adding a volume of HCl having a molarity of about 0.5 M to about 3 M to the column to elute the $^{64}Cu$ from the ion exchange resin and collecting an eluate comprising $^{64}Cu$.

Statement 42: The composition of statement 1, wherein the composition has a total content of trace metals of less than about 6 parts per million (ppm), the trace metals being cobalt, copper, gold, iron, lead, mercury, nickel, and zinc.

Statement 43: The composition of statement 1, wherein the composition has a total content of trace metals of less than about 5 parts per million (ppm), the trace metals being cobalt, copper, gold, iron, lead, mercury, nickel, and zinc.

Statement 44: The composition of statement 1, wherein the composition has a total content of trace metals of less than about 3 parts per million (ppm), the trace metals being cobalt, copper, gold, iron, lead, mercury, nickel, and zinc.

Statement 45: The composition of statement 1, wherein the composition has a total content of less than about 6 parts per million (ppm) of copper-67 ($^{67}Cu$).

Statement 46: The composition of statement 1, wherein the composition has a total content of less than about 5 parts per million (ppm) of $^{67}Cu$.

Statement 47: The composition of statement 1, wherein the composition has a total content of less than about 3 parts per million (ppm) of $^{67}Cu$.

Statement 48: The composition of statement 1, wherein the composition has a total content of less than about 1 parts per million (ppm) of $^{67}Cu$.

Statement 49: The composition of statement 1, wherein the composition has a total content of less than about 6 parts per million (ppm) of zinc-68 ($^{68}Zn$).

Statement 50: The composition of statement 1, wherein the composition has a total content of less than about 5 parts per million (ppm) of $^{68}Zn$.

Statement 51: The composition of statement 1, wherein the composition has a total content of less than about 3 parts per million (ppm) of $^{68}Zn$.

Statement 52: The composition of statement 1, wherein the composition has a total content of less than about 1 parts per million (ppm) of $^{68}Zn$.

Statement 53: The composition of statement 1, wherein the composition has a total content of less than about 6 parts per million (ppm) of any atom or isotope with a mass number of 67 or greater.

Statement 54: The composition of statement 1, wherein the composition has a total content of less than about 5 parts per million (ppm) of any atom or isotope with a mass number of 67 or greater.

Statement 55: The composition of statement 1, wherein the composition has a total content of less than about 3 parts per million (ppm) of any atom or isotope with a mass number of 67 or greater.

Statement 56: The composition of statement 1, wherein the composition has a total content of less than about 1 parts per million (ppm) of any atom or isotope with a mass number of 67 or greater.

Statement 57: The composition of statement 1, wherein the composition has a total content of less than about 6 parts per million (ppm) of any atom or isotope with a mass number of 68 or greater.

Statement 58: The composition of statement 1, wherein the composition has a total content of less than about 5 parts per million (ppm) of any atom or isotope with a mass number of 68 or greater.

Statement 59: The composition of statement 1, wherein the composition has a total content of less than about 3 parts per million (ppm) of any atom or isotope with a mass number of 68 or greater.

Statement 60: The composition of statement 1, wherein the composition has a total content of less than about 1 parts per million (ppm) of any atom or isotope with a mass number of 68 or greater.

Statement 61: The composition of statement 1, wherein the composition has an absence of zinc-based target source materials.

Statement 62: The composition of statement 1, wherein the composition has a total content of trace metals of 0 ppm Au, 0 ppm Hg, <0.02 ppm Co, <0.2 ppm Fe, <0.4 ppm Pb, <0.5 ppm Ni, <0.6 ppm Cu, and <1.5 ppm Zn.

Statement 63: The composition of statement 1, wherein the composition comprises a solution of hydrochloric acid (HCl) having a molarity of about 0.001 M to about 3 M.

Statement 64: The composition of statement 1, wherein the $^{64}Cu$ exists as $[^{64}Cu]CuCl_2$.

Statement 65: The composition of statement 1, wherein the composition further comprises a chelating agent or a bifunctional chelating agent in which the $^{64}Cu$ is coordinated therein, and the chelating agent or the bifunctional chelating agent is a macrocyclic compound, a bridged macrocyclic compound, a bicyclic compound, or an acyclic compound.

Statement 66: The composition of statement 65, wherein the bifunctional chelating agent is DOTA.

Statement 67: The composition of statement 65, wherein the chelating agent is DOTAGA.

Statement 68: The composition of statement 1, wherein the radionuclidic purity of the $^{64}Cu$ is greater than 98.5%.

Statement 69: The composition of statement 1, wherein the radionuclidic purity of the $^{64}Cu$ is greater than 99.0%.

Statement 70: The composition of statement 1, wherein the radionuclidic purity of the $^{64}Cu$ is greater than 99.5%.

Statement 71: The composition of statement 1, wherein the composition comprises chemical and radionuclidic purities suitable for positron emission tomography (PET).

Statement 72: A composition comprising copper-64 ($^{64}Cu$) in a single dose vial suitable for administration to a human patient in need thereof, wherein the composition is aliquoted from the composition of any of the previous statements.

Statement 73: A composition comprising 35 MBq to 40 MBq of copper-64 ($^{64}Cu$) per 1 mL of the composition in a single dose vial suitable for administration to a human patient in need thereof, wherein the composition is aliquoted from the composition of any of the previous statements.

Statement 74: A composition comprising 145 MBq to 150 MBq of copper-64 ($^{64}$Cu) in a single dose vial suitable for administration to a human patient in need thereof, wherein the composition is aliquoted from the composition of any of the previous statements.

Statement 75: A composition comprising from 16 Ci to 30 Ci, 20 Ci to 30 Ci, or 25 Ci to 30 Ci of copper-64 ($^{64}$Cu).

Statement 76: A composition comprising from 15 Ci to 110 Ci, 16 Ci to 110 Ci, 17 Ci to 110 Ci, 18 Ci to 110 Ci, 19 Ci to 110 Ci, 20 Ci to 110 Ci, 21 Ci to 110 Ci, 22 Ci to 110 Ci, 23 Ci to 110 Ci, 24 Ci to 110 Ci, 25 Ci to 110 Ci, 26 Ci to 110 Ci, 28 Ci to 110 Ci, 29 Ci to 110 Ci, 30 Ci to 110 Ci, 31 Ci to 110 Ci, 32 Ci to 110 Ci, 33 Ci to 110 Ci, 34 Ci to 110 Ci, 35 Ci to 110 Ci, 36 Ci to 110 Ci, 37 Ci to 110 Ci, 38 Ci to 110 Ci, 39 Ci to 110 Ci, or 40 Ci to 110 Ci of copper-64 ($^{64}$Cu).

Statement 77: A composition comprising ≥17.5 Ci, ≥20 Ci, ≥22.5 Ci, ≥25 Ci, ≥30 Ci, ≥35 Ci, ≥40 Ci, ≥45 Ci, ≥50 Ci, ≥55 Ci, ≥60 Ci, ≥65 Ci, ≥70 Ci, ≥75 Ci, ≥80 Ci, ≥85 Ci, ≥90 Ci, ≥95 Ci, ≥100 Ci, ≥105 Ci, or ≥100 Ci of copper-64 ($^{64}$Cu).

Statement 78: A composition according to any of the previous statements, wherein the composition comprises a specific activity from 10 mCi to 3850 mCi $^{64}$Cu/μg Cu.

Statement 79: A composition according to any of the previous statements, wherein the composition comprises a specific activity from 25 mCi to 3850 mCi $^{64}$Cu/μg Cu.

Statement 83: A composition according to any of the previous statements, wherein the composition comprises a specific activity from 50 mCi to 3850 mCi $^{64}$Cu/μg Cu.

Statement 87: A composition according to any of the previous statements, wherein the composition comprises a specific activity from 100 mCi to 3850 mCi $^{64}$Cu/μg Cu.

Statement 91: A composition according to any of the previous statements, wherein the composition comprises a specific activity from 10 mCi to 100 mCi, 10 mCi to 200 mCi, 10 mCi to 300 mCi, 10 mCi to 400 mCi, 10 mCi to 500 mCi, 10 mCi to 600 mCi $^{64}$Cu/μg, 10 mCi to 700 mCi, 10 mCi to 800 mCi, 10 mCi to 900 mCi, or 10 mCi to 1000 mCi $^{64}$Cu/μg Cu.

Statement 92: A composition according to any of the previous claims, wherein the composition comprises a radionuclidic purity for $^{64}$Cu of ≥95.0%, ≥96.0%, ≥97.0%, ≥98.0%, ≥99.0%, ≥99.5%, or ≥99.0%.

Statement 93: A composition according to any of the previous statements, wherein the composition comprises a radionuclidic purity for $^{64}$Cu of ≥95.0%, ≥96.0%, ≥97.0%, ≥98.0%, ≥99.0%, ≥99.5%, or ≥99.0%, and a radionuclidic purity of $^{61}$Co of ≤1.0%.

Statement 94: A composition according to any of the previous statements, wherein the composition comprises a radionuclidic purity for $^{64}$Cu of ≥98.9% and a radionuclidic purity of $^{61}$Co of ≤1.0%.

Statement 95: A composition according to any of the previous statements, wherein the composition comprises a radionuclidic purity for $^{64}$Cu of approximately 100.0% and a radionuclidic purity of $^{61}$Co of approximately 0.0%.

Statement 96: A composition according to any of the previous statements, wherein the composition has a total content of less than or equal to 20 μg/mL of elemental copper.

Statement 97: A composition according to any of the previous statements, wherein the composition has a total content of less than or equal to 1 μg/mL of cobalt.

Statement 98: A composition according to any of the previous statements, wherein the composition has a total content of less than or equal to 1 μg/mL of iron.

Statement 99: A composition according to any of the previous statements, wherein the composition has a total content of less than or equal to 1 μg/mL of nickel.

Statement 100: A composition according to any of the previous statements, wherein the composition of claim 1, wherein the composition has a total content of less than or equal to 1 μg/mL of lead.

Statement 101: A composition according to any of the previous statements, wherein the composition has a total content of less than or equal to 1 μg/mL of zinc.

Statement 102: A composition according to any of the previous statements, wherein the composition has a total content of trace metals of less than about 5 parts per million (ppm), the trace metals being cobalt, copper, gold, iron, lead, mercury, nickel, gallium, germanium, zinc, and combinations thereof.

Statement 103: A composition according to any of the previous statements, wherein the composition comprises a solution of hydrochloric acid (HCl) having a molarity of about 0.001 M to about 3 M.

Statement 104: A composition according to any of the previous statements, wherein the molarity of the HCl is about 0.05 M.

Statement 105: A composition according to any of the previous statements, wherein the molarity of the HCl is about 0.5 M.

Statement 106: A composition according to any of the previous statements, wherein the $^{64}$Cu exists as [$^{64}$Cu] $CuCl_2$.

Statement 107: A composition according to any of the previous statements, wherein the $^{64}$Cu is isolated from an enriched Ni-64 target bombarded with a 13 MeV proton beam at 150-375 μA.

Statement 108: A composition according to any of the previous statements, wherein the $^{64}$Cu is isolated from a target comprising a plating area ≥20 $cm^2$, ≥21 $cm^2$, ≥22 $cm^2$, ≥23 $cm^2$, ≥24 $cm^2$, or ≥25 $cm^2$.

Statement 109: A composition according to any of the previous statements, wherein the $^{64}$Cu is isolated from a target comprising plated Ni-64 masses of 550-750 mg.

Statement 110: A composition according to any of the previous statements, wherein the composition is homogeneous.

Statement 111: A composition according to any of the previous statements, wherein the $^{64}$Cu is produced by one continuous cyclotron bombardment (i.e., a single cyclotron run).

Statement 112: A composition according to any of the previous statements, wherein the $^{64}$Cu is produced in a single location.

Statement 113: A composition according to any of the previous claims, wherein the composition comprises 2-5 Ci Cu-64 PSMA I&T at a radiochemical purity of ≥95.0%, ≥96.0%, ≥97.0%, ≥98.0%, ≥99.0%, ≥99.5%, or ≥99.0%.

Statement 114: A composition according to any of the previous claims, wherein the composition comprises 5-15 Ci Cu-64 PSMA I&T at a radiochemical purity of ≥95.0%, ≥96.0%, ≥97.0%, ≥98.0%, ≥99.0%, ≥99.5%, or ≥99.0%.

Statement 115: A composition according to any of the previous claims, wherein the composition comprises 15-25 Ci Cu-64 PSMA I&T at a radiochemical purity of ≥95.0%, ≥96.0%, ≥97.0%, ≥98.0%, ≥99.0%, ≥99.5%, or ≥99.0%.

Statement 116: A composition according to any of the previous claims, wherein the composition comprises 50-60

Ci Cu-64 PSMA I&T at a radiochemical purity of ≥95.0%, ≥96.0%, ≥97.0%, ≥98.0%, ≥99.0%, ≥99.5%, or ≥99.0%.

Statement 117: A composition according to any of the previous claims, wherein the composition comprises 60-75 Ci Cu-64 PSMA I&T at a radiochemical purity of ≥95.0%, ≥96.0%, ≥97.0%, ≥98.0%, ≥99.0%, ≥99.5%, or ≥99.0%.

Statement 118: A composition comprising from 15 Ci to 110 Ci of Cu-64 PSMA I&T and having a specific activity from 50 mCi to 3850 mCi $^{64}$Cu/μg Cu.

Statement 119: A composition comprising from 50 Ci to 100 Ci of Cu-64 PSMA I&T and having a specific activity from 50 mCi to 3850 mCi $^{64}$Cu/μg Cu.

Statement 120: A composition comprising from 25 Ci to 75 Ci of Cu-64 PSMA I&T and having a specific activity from 50 mCi to 3850 mCi $^{64}$Cu/μg Cu.

Statement 121: A composition comprising from 17 Ci to 20 Ci of Cu-64 PSMA I&T and having a specific activity from 50 mCi to 3850 mCi $^{64}$Cu/μg Cu.

Statement 122: A composition comprising from 25 Ci to 50 Ci of Cu-64 PSMA I&T and having a specific activity from 50 mCi to 3850 mCi $^{64}$Cu/μg Cu.

Statement 123: A composition comprising from 20 Ci to 110 Ci of Cu-64 PSMA I&T and having a specific activity from 50 mCi to 3850 mCi $^{64}$Cu/μg Cu.

Statement 124: A composition comprising from 25 Ci to 110 Ci of Cu-64 PSMA I&T and having a specific activity from 50 mCi to 3850 mCi $^{64}$Cu/μg Cu.

Statement 125: A composition according to any of the previous statements, wherein the radioactive concentration is about 250 to about 300 mCi/mL, about 300 to about 350 mCi/mL, about 350 to about 400 mCi/mL, about 400 to about 450 mCi/mL, about 450 to about 500 mCi/mL, about 500 to about 550 mCi/mL, about about 550 to about 600 mCi/mL, about 600 to about 650 mCi/mL, about 650 to about 700 mCi/mL, about 700 to about 750 mCi/mL, about 750 to about 800 mCi/mL, about 800 to about 850 mCi/mL, about 850 to about 900 mCi/mL, about 900 to about 950 mCi/mL, about 950 to about 1,000 mCi/mL, or greater than 1,000 mCi/mL.

Statement 126: A composition according to any of the previous statements, wherein the radioactive concentration is about 700 to about 705 mCi/mL, about 705 to about 710 mCi/mL, about 710 to about 715 mCi/mL, about 715 to about 720 mCi/mL, about 720 to about 725 mCi/mL, about 725 to about 730 mCi/mL, about 730 to about 735 mCi/mL, about 735 to about 740 mCi/mL, about 740 to about 745 mCi/mL, or about 745 to about 750 mCi/mL.

Statement 127: A composition according to any of the previous statements, wherein the radionuclidic purity for Cu-64 is ≥98.5%, ≥99.0%, ≥99.0%, ≥99.9%, or 100%, and/or Co-61 is ≤1.5%, ≤1.0%, ≤0.5%, ≤0.1%, or 0%.

Statement 128: A composition according to any of the previous statements, wherein the specific activity for Cu-64 is ≥1 mCi/μg, ≥2 mCi/μg, ≥3 mCi/μg, ≥4 mCi/μg, ≥5 mCi/μg, ≥6 mCi/μg, ≥7 mCi/μg, ≥8 mCi/μg, ≥9 mCi/μg, or ≥10 mCi/μg.

Statement 129: A composition according to any of the previous statements, wherein the specific activity for Cu-64 is from about 2 to about 6 mCi/μg, from about 6 to about 10 mCi/μg, from about 10 to about 20 mCi/μg, from about 20 to about 30 mCi/μg, from about 30 to about 40 mCi/μg, from about 40 to about 50 mCi/μg, from about 50 to about 60 mCi/μg, from about 60 to about 70 mCi/μg, from about 70 to about 80 mCi/μg, from about 80 to about 90 mCi/μg, from about 90 to about 100 mCi/μg, from about 100 to about 110 mCi/μg, from about 110 to about 120 mCi/μg, from about 120 to about 130 mCi/μg, from about 130 to about 140 mCi/μg, from about 140 to about 150 mCi/μg, from about 150 to about 160 mCi/μg, from about 160 to about 170 mCi/μg, from about 170 to about 180 mCi/μg, from about 180 to about 190 mCi/μg, from about 190 to about 200 mCi/μg, from about 200 to about 210 mCi/μg, from about 210 to about 220 mCi/μg, from about 220 to about 230 mCi/μg, from about 230 to about 240 mCi/μg, from about 240 to about 250 mCi/μg, from about 250 to about 260 mCi/μg, from about 260 to about 270 mCi/μg, from about 270 to about 280 mCi/μg, from about 280 to about 290 mCi/μg, from about 290 to about 300 mCi/μg, or greater than 300 mCi/μg.

Statement 130: A composition according to any of the previous statements, wherein the radioactive concentration is about 700 to about 705 mCi/mL, about 705 to about 710 mCi/mL, about 710 to about 715 mCi/mL, about 715 to about 720 mCi/mL, about 720 to about 725 mCi/mL, about 725 to about 730 mCi/mL, about 730 to about 735 mCi/mL, about 735 to about 740 mCi/mL, about 740 to about 745 mCi/mL, or about 745 to about 750 mCi/mL.

Statement 131: A composition according to any of the previous statements, wherein the radionuclidic purity for Cu-64 is ≥98.5%, ≥99.0%, ≥99.0%, ≥99.9%, or 100%, and/or Co-61 is ≤1.5%, ≤1.0%, ≤0.5%, ≤0.1%, or 0%.

Statement 132: A composition according to any of the previous statements, wherein the specific activity for Cu-64 is ≥1 mCi/μg, ≥2 mCi/μg, ≥3 mCi/μg, ≥4 mCi/μg, ≥5 mCi/μg, ≥6 mCi/μg, ≥7 mCi/μg, ≥8 mCi/μg, ≥9 mCi/μg, or ≥10 mCi/μg.

Statement 133: A composition according to any of the previous statements, wherein the specific activity for Cu-64 is from about 2 to about 6 mCi/μg, from about 6 to about 10 mCi/μg, from about 10 to about 20 mCi/μg, from about 20 to about 30 mCi/μg, from about 30 to about 40 mCi/μg, from about 40 to about 50 mCi/μg, from about 50 to about 60 mCi/μg, from about 60 to about 70 mCi/μg, from about 70 to about 80 mCi/μg, from about 80 to about 90 mCi/μg, from about 90 to about 100 mCi/μg, from about 100 to about 110 mCi/μg, from about 110 to about 120 mCi/μg, from about 120 to about 130 mCi/μg, from about 130 to about 140 mCi/μg, from about 140 to about 150 mCi/μg, from about 150 to about 160 mCi/μg, from about 160 to about 170 mCi/μg, from about 170 to about 180 mCi/μg, from about 180 to about 190 mCi/μg, from about 190 to about 200 mCi/μg, from about 200 to about 210 mCi/μg, from about 210 to about 220 mCi/μg, from about 220 to about 230 mCi/μg, from about 230 to about 240 mCi/μg, from about 240 to about 250 mCi/μg, from about 250 to about 260 mCi/μg, from about 260 to about 270 mCi/μg, from about 270 to about 280 mCi/μg, from about 280 to about 290 mCi/μg, from about 290 to about 300 mCi/μg, or greater than 300 mCi/μg Statement 134: A composition according to any of the previous statements, wherein the Au, Co, Cu, Fe, Hg, Ni, Pb, and/or Zn is zero μg/mL or undetectable.

Statement 135: A composition according to any of the previous statements, wherein the total metal content is about 2.0 to about 20.0 ppm.

Statement 136: A composition according to any of the previous statements, wherein the composition comprises no amount of copper spiking.

Statement 137: A composition according to any of the previous statements, further comprising an amount of copper spiking.

Statement 138: A composition comprising from 15 Ci to 110 Ci of Cu-64 PSMA I&T and having a specific activity from 15 mCi to 3850 mCi $^{64}$Cu/μg Cu, from 20 mCi to 3850 mCi $^{64}Cu$/μg Cu, from 25 mCi to 3850 mCi $^{64}Cu$/μg Cu, or from 30 mCi to 3850 mCi $^{64}Cu$/μg Cu.

Statement 139: A composition comprising from 50 Ci to 100 Ci of Cu-64 PSMA I&T and having a specific activity from 15 mCi to 3850 mCi $^{64}Cu$/μg Cu, from 20 mCi to 3850 mCi $^{64}Cu$/μg Cu, from 25 mCi to 3850 mCi $^{64}Cu$/μg Cu, or from 30 mCi to 3850 mCi $^{64}Cu$/μg Cu.

Statement 140: A composition comprising from 25 Ci to 75 Ci of Cu-64 PSMA I&T and having a specific activity from 15 mCi to 3850 mCi $^{64}Cu$/μg Cu, from 20 mCi to 3850 mCi $^{64}Cu$/μg Cu, from 25 mCi to 3850 mCi $^{64}Cu$/μg Cu, or from 30 mCi to 3850 mCi $^{64}Cu$/μg Cu.

Statement 141: A composition comprising from 17 Ci to 20 Ci of Cu-64 PSMA I&T and having a specific activity from 15 mCi to 3850 mCi $^{64}Cu$/μg Cu, from 20 mCi to 3850 mCi $^{64}Cu$/μg Cu, from 25 mCi to 3850 mCi $^{64}Cu$/μg Cu, or from 30 mCi to 3850 mCi $^{64}Cu$/μg Cu.

Statement 142: A composition comprising from 25 Ci to 50 Ci of Cu-64 PSMA I&T and having a specific activity from 15 mCi to 3850 mCi $^{64}Cu$/μg Cu, from 20 mCi to 3850 mCi $^{64}Cu$/μg Cu, from 25 mCi to 3850 mCi $^{64}Cu$/μg Cu, or from 30 mCi to 3850 mCi $^{64}Cu$/μg Cu.

Statement 143: A composition comprising from 20 Ci to 110 Ci of Cu-64 PSMA I&T and having a specific activity from 15 mCi to 3850 mCi $^{64}Cu$/μg Cu, from 20 mCi to 3850 mCi $^{64}Cu$/μg Cu, from 25 mCi to 3850 mCi $^{64}Cu$/μg Cu, or from 30 mCi to 3850 mCi $^{64}Cu$/μg Cu.

Statement 144: A composition comprising from 25 Ci to 110 Ci of Cu-64 PSMA I&T and having a specific activity from 15 mCi to 3850 mCi $^{64}Cu$/μg Cu, from 20 mCi to 3850 mCi $^{64}Cu$/μg Cu, from 25 mCi to 3850 mCi $^{64}Cu$/μg Cu, or from 30 mCi to 3850 mCi $^{64}Cu$/μg Cu.

Statement 145: A composition according to any of the previous statements, wherein the Au, Co, Cu, Fe, Hg, Ni, Pb, and/or Zn is less than or equal to 0.50 g/mL.

Statement 146: A composition according to any of the previous statements, wherein the Au, Co, Cu, Fe, Hg, Ni, Pb, and/or Zn is less than or equal to 0.40 g/mL.

Statement 147: A composition according to any of the previous statements, wherein the Au, Co, Cu, Fe, Hg, Ni, Pb, and/or Zn is less than or equal to 0.30 μg/mL.

Statement 148: A composition according to any of the previous statements, wherein the Au, Co, Cu, Fe, Hg, Ni, Pb, and/or Zn is less than or equal to 0.20 g/mL.

Statement 149: A composition according to any of the previous statements, wherein the Au, Co, Cu, Fe, Hg, Ni, Pb, and/or Zn is less than or equal to 0.10 μg/mL.

Statement 150: A composition according to any of the previous statements, wherein the Au, Co, Cu, Fe, Hg, Ni, Pb, and/or Zn is less than or equal to 0.05 μg/mL.

Statement 151: A composition according to any of the previous statements, wherein the Au, Co, Cu, Fe, Hg, Ni, Pb, and/or Zn is less than or equal to 0.01 μg/mL.

Statement 152: A composition according to any of the previous statements, wherein the Au, Co, Cu, Fe, Hg, Ni, Pb, and/or Zn is ≤10 ppm, ≤9 ppm, ≤8 ppm, ≤7 ppm, ≤6 ppm, ≤5 ppm, ≤4 ppm, ≤3 ppm, ≤2 ppm, ≤1 ppm, or ≤0.5 ppm.

Statement 153: A composition according to any of the previous statements, wherein the activity of Co-55 is ≤8.3E+0 mCi.

Statement 154: A composition according to any of the previous statements, wherein the activity of Co-57 is ≤2.8E-2 mCi.

Statement 155: A composition according to any of the previous statements, wherein the activity of Co-58 is ≤4.7E-3 mCi.

Statement 156: A composition according to any of the previous statements, wherein the activity of Co-61 is ≤4.0E+0 mCi.

Statement 157: A composition according to any of the previous statements, wherein the activity of Ni-57 is ≤6.2E-3 mCi.

Statement 158: A composition according to any of the previous statements, wherein the activity of Cu-60 is ≤1.5E+3 mCi.

Statement 159: A composition according to any of the previous statements, wherein the activity of Cu-61 is ≤2.2E+3 mCi.

Statement 160: A composition according to any of the previous statements, wherein the activity of Cu-62 is ≤8.1E+2 mCi.

Statement 161: A composition according to any of the previous statements, wherein the activity of Cu-64 is ≥8.8E+0 mCi.

Statement 162: A composition according to any of the previous statements, wherein the activity of In-111 is ≤1.9E+0 mCi.

Statement 163: A composition according to any of the previous statements, wherein the activity of V-48 is ≤3.7E-5 mCi.

Statement 164: A composition according to any of the previous statements, wherein the activity of Mn-52 is ≤3.9E-5 mCi.

Statement 165: A composition according to any of the previous statements, wherein the activity of Co-56 is ≤4.3E-4 mCi.

Statement 166: A composition according to any of the previous statements, wherein the activity of Zn-65 is ≤5.0E-4 mCi.

Statement 167: A composition according to any of the previous statements, wherein the activity of Ga-67 is ≤4.0E-3 mCi.

Statement 168: A composition according to any of the previous statements, wherein the activity of Co-55 is ≤6.3E-1 mCi.

Statement 169: A composition according to any of the previous statements, wherein the activity of Co-57 is ≤3.6E-2 mCi.

Statement 170: A composition according to any of the previous statements, wherein the activity of Co-58 is ≤1.2E-3 mCi.

Statement 171: A composition according to any of the previous statements, wherein the activity of Co-61 is ≤1.2E+2 mCi.

Statement 172: A composition according to any of the previous statements, wherein the activity of Ni-57 is ≤1.3E-4 mCi.

Statement 173: A composition according to any of the previous statements, wherein the activity of Cu-60 is ≤1.3E+2 mCi.

Statement 174: A composition according to any of the previous statements, wherein the activity of Cu-61 is ≤6.0E+0 mCi.

Statement 175: A composition according to any of the previous statements, wherein the activity of Cu-62 is ≤1.6E+2 mCi.

Statement 176: A composition according to any of the previous statements, wherein the activity of Cu-64 is ≥2.0E+3 mCi.

Statement 177: A composition according to any of the previous statements, wherein the activity of In-111 is ≤4.9E-4 mCi.

Statement 178: A composition according to any of the previous statements, wherein the activity of V-48 is ≤1.2E-5 mCi.

Statement 179: A composition according to any of the previous statements, wherein the activity of Mn-52 is ≤3.1E-5 mCi.

Statement 180: A composition according to any of the previous statements, wherein the activity of Co-56 is ≤2.5E-4 mCi.

Statement 181: A composition according to any of the previous statements, wherein the activity of Zn-65 is ≤2.5E-4 mCi.

Statement 182: A composition according to any of the previous statements, wherein the activity of Ga-67 is ≤8.1E-4 mCi.

Statement 183: A composition according to any of the previous statements, wherein the activity of Au-196 is ≤1.7E-4 mCi.

Statement 184: A composition according to any of the previous statements, wherein the activity of Bi-206 is ≤1.1E-4 mCi.

Statement 185: A composition according to any of the previous statements, wherein the activity of Co-55 is ≤1.5E+0 mCi.

Statement 186: A composition according to any of the previous statements, wherein the activity of Co-57 is ≤1.1E-2 mCi.

Statement 187: A composition according to any of the previous statements, wherein the activity of Co-58 is ≤4.3E-3 mCi.

Statement 188: A composition according to any of the previous statements, wherein the activity of Co-61 is ≤2.5E+2 mCi.

Statement 189: A composition according to any of the previous statements, wherein the activity of Ni-57 is ≤3.9E-3 mCi.

Statement 190: A composition according to any of the previous statements, wherein the activity of Cu-60 is ≤3.9E-3 mCi.

Statement 191: A composition according to any of the previous statements, wherein the activity of Cu-61 is ≤2.7E+1 mCi.

Statement 192: A composition according to any of the previous statements, wherein the activity of Cu-62 is ≤4.1E+2 mCi.

Statement 193: A composition according to any of the previous statements, wherein the activity of Cu-64 is ≥8.5E+3 mCi.

Statement 194: A composition according to any of the previous statements, wherein the activity of V-48 is ≤2.5E-5 mCi.

Statement 195: A composition according to any of the previous statements, wherein the activity of Mn-52 is ≤1.2E-4 mCi.

Statement 196: A composition according to any of the previous statements, wherein the activity of Co-56 is ≤7.6E-4 mCi.

Statement 197: A composition according to any of the previous statements, wherein the activity of Zn-65 is ≤5.2E-4 mCi.

Statement 198: A composition according to any of the previous statements, wherein the activity of Ga-67 is ≤2.3E-4 mCi.

Statement 199: A composition according to any of the previous statements, wherein the activity of Au-196 is ≤5.6E-4 mCi.

Statement 200: A composition according to any of the previous statements, wherein the activity of Bi-206 is ≤4.0E-4 mCi.

Statement 201: A composition comprising 2-110 Ci Cu-64 at a radiochemical purity of ≥95.0%, ≥96.0%, ≥97.0%, ≥98.0%, ≥99.0%, ≥99.5%, or ≥99.0%.

Statement 202: A composition according to any of the previous statements, comprising 15-25 Ci Cu-64 at a radiochemical purity of ≥95.0%, ≥96.0%, ≥97.0%, ≥98.0%, ≥99.0%, ≥99.5%, or ≥99.0%.

Statement 203: A composition according to any of the previous statements, comprising 25-50 Ci Cu-64 at a radiochemical purity of ≥95.0%, ≥96.0%, ≥97.0%, ≥98.0%, ≥99.0%, ≥99.5%, or ≥99.0%.

Statement 204: A composition according to any of the previous statements, comprising 50-60 Ci Cu-64 at a radiochemical purity of ≥95.0%, ≥96.0%, ≥97.0%, ≥98.0%, ≥99.0%, ≥99.5%, or ≥99.0%.

Statement 205: A composition according to any of the previous statements, comprising 60-75 Ci Cu-64 at a radiochemical purity of ≥95.0%, ≥96.0%, ≥97.0%, ≥98.0%, ≥99.0%, ≥99.5%, or ≥99.0%.

Statement 206: A composition according to any of the previous statements, comprising a specific activity from 25 mCi to 3850 mCi $^{64}$Cu/μg Cu.

Statement 207: A composition according to any of the previous statements, comprising a specific activity from 25 mCi to 50 mCi $^{64}$Cu/μg Cu.

Statement 208: A composition according to any of the previous statements, comprising a specific activity from 50 mCi to 75 mCi $^{64}$Cu/μg Cu.

Statement 209: A composition according to any of the previous statements, comprising a specific activity from 75 mCi to 100 mCi $^{64}$Cu/μg Cu.

Statement 210: A composition according to any of the previous statements, comprising a specific activity from 100 mCi to 150 mCi $^{64}$Cu/μg Cu, 150 mCi to 200 mCi $^{64}$Cu/μg Cu, 200 mCi to 250 mCi $^{64}$Cu/μg Cu, 250 mCi to 300 mCi $^{64}$Cu/μg Cu, 300 mCi to 350 mCi $^{64}$Cu/μg Cu, 350 mCi to 400 mCi $^{64}$Cu/μg Cu, 400 mCi to 450 mCi $^{64}$Cu/μg Cu, or 450 mCi to 500 mCi $^{64}$Cu/μg Cu.

Statement 211: A composition according to any of the previous statements, comprising a specific activity from 500 mCi to 550 mCi $^{64}$Cu/μg Cu, 550 mCi to 600 mCi $^{64}$Cu/μg Cu, 600 mCi to 650 mCi $^{64}$Cu/μg Cu, 650 mCi to 700 mCi $^{64}$Cu/μg Cu, 700 mCi to 750 mCi $^{64}$Cu/μg Cu, 750 mCi to 800 mCi $^{64}$Cu/μg Cu, 800 mCi to 850 mCi $^{64}$Cu/μg Cu, 850 mCi to 900 mCi $^{64}$Cu/μg Cu, 900 mCi to 950 mCi $^{64}$Cu/μg Cu, or 950 mCi to 1,000 mCi $^{64}$Cu/μg Cu.

Statement 212: A composition according to any of the previous statements, comprising a specific activity from 1,000 mCi to 1,050 mCi $^{64}$Cu/μg Cu, 1,100 mCi to 1,150 mCi $^{64}$Cu/μg Cu, 1,150 mCi to 1,200 mCi $^{64}$Cu/μg Cu, 1,200 mCi to 1,250 mCi $^{64}$Cu/μg Cu, 1,250 mCi to 1,300 mCi $^{64}$Cu/μg Cu, 1,300 mCi to 1,350 mCi $^{64}$Cu/μg Cu, 1,350 mCi to 1,400 mCi $^{64}$Cu/μg Cu, 1,400 mCi to 1,450 mCi $^{64}$Cu/μg Cu, or 1,450 mCi to 1,500 mCi $^{64}$Cu/μg Cu, 1,500 mCi to 1,550 mCi $^{64}$Cu/μg Cu, 1,550 mCi to 1,600 mCi $^{64}$Cu/μg Cu, 1,600 mCi to 1,650 mCi $^{64}$Cu/μg Cu, 1,650 mCi to 1,700 mCi $^{64}$Cu/μg Cu, 1,700 mCi to 1,750 mCi $^{64}$Cu/μg Cu, 1,750 mCi to 1,800 mCi $^{64}$Cu/μg Cu, 1,800 mCi to 1,850 mCi $^{64}$Cu/μg Cu, 1,850 mCi to 1,900 mCi $^{64}$Cu/μg Cu, 1,900 mCi to 1,950 mCi $^{64}$Cu/μg Cu, or 1,950 mCi to 2,000 mCi $^{64}$Cu/μg Cu.

Statement 213: A composition according to any of the previous statements, comprising a specific activity from 2,000 mCi to 2,050 mCi $^{64}$Cu/μg Cu, 2,100 mCi to 2,150 mCi $^{64}Cu$/μg Cu, 2,150 mCi to 2,200 mCi $^{64}Cu$/μg Cu, 2,200 mCi to 2,250 mCi $^{64}Cu$/μg Cu, 2,250 mCi to 2,300 mCi $^{64}Cu$/μg Cu, 2,300 mCi to 2,350 mCi $^{64}Cu$/μg Cu, 2,350 mCi to 2,400 mCi $^{64}Cu$/μg Cu, 2,400 mCi to 2,450 mCi $^{64}Cu$/μg Cu, or 2,450 mCi to 2,500 mCi $^{64}Cu$/μg Cu, 2,500 mCi to 2,550 mCi $^{64}Cu$/μg Cu, 2,550 mCi to 2,600 mCi $^{64}Cu$/μg Cu, 2,600 mCi to 2,650 mCi $^{64}Cu$/μg Cu, 2,650 mCi to 2,700 mCi $^{64}Cu$/μg Cu, 2,700 mCi to 2,750 mCi $^{64}Cu$/μg Cu, 2,750 mCi to 2,800 mCi $^{64}Cu$/μg Cu, 2,800 mCi to 2,850 mCi $^{64}Cu$/μg Cu, 2,850 mCi to 2,900 mCi $^{64}Cu$/μg Cu, 2,900 mCi to 2,950 mCi $^{64}Cu$/μg Cu, or 2,950 mCi to 3,000 mCi $^{64}Cu$/μg Cu.

Statement 214: A composition according to any of the previous statements, comprising a specific activity from 3,000 mCi to 3,050 mCi $^{64}Cu$/μg Cu, 3,100 mCi to 3,150 mCi $^{64}Cu$/μg Cu, 3,150 mCi to 3,200 mCi $^{64}Cu$/μg Cu, 3,200 mCi to 2,250 mCi $^{64}Cu$/μg Cu, 3,250 mCi to 3,300 mCi $^{64}Cu$/μg Cu, 3,300 mCi to 3,350 mCi $^{64}Cu$/μg Cu, 3,350 mCi to 3,400 mCi $^{64}Cu$/μg Cu, 3,400 mCi to 3,450 mCi $^{64}Cu$/μg Cu, or 3,450 mCi to 3,500 mCi $^{64}Cu$/μg Cu, 3,500 mCi to 3,550 mCi $^{64}Cu$/μg Cu, 3,550 mCi to 3,600 mCi $^{64}Cu$/μg Cu, 3,600 mCi to 3,650 mCi $^{64}Cu$/μg Cu, 3,650 mCi to 3,700 mCi $^{64}Cu$/μg Cu, 3,700 mCi to 3,750 mCi $^{64}Cu$/μg Cu, 3,750 mCi to 3,800 mCi $^{64}Cu$/μg Cu, or 3,800 mCi to 3,850 mCi $^{64}Cu$/μg Cu.

Statement 215: A composition according to any of the previous statements, wherein the composition has a total content of trace metals of less than about 6 parts per million (ppm), the trace metals being cobalt, copper, gold, iron, lead, mercury, nickel, gallium, germanium, zinc, and combinations thereof.

Statement 216: A composition according to any of the previous statements, wherein the composition has a total content of trace metals of less than about 5 parts per million (ppm), the trace metals being cobalt, copper, gold, iron, lead, mercury, nickel, and zinc.

Statement 217: A composition according to any of the previous statements, wherein the composition has a total content of trace metals of less than about 3 parts per million (ppm), the trace metals being cobalt, copper, gold, iron, lead, mercury, nickel, and zinc.

Statement 218: A composition according to any of the previous statements, wherein the composition has a total content of trace metals of less than about 1 parts per million (ppm), the trace metals being cobalt, copper, gold, iron, lead, mercury, nickel, and zinc.

Statement 219: A composition according to any of the previous statements, wherein the composition has a total content of trace metals of less than about 0.5 parts per million (ppm), the trace metals being cobalt, copper, gold, iron, lead, mercury, nickel, and zinc.

Statement 220: A composition according to any of the previous statements, comprising from 15 Ci to 25 Ci of Cu-64 and having a specific activity from 50 mCi to 3850 mCi $^{64}Cu$/μg Cu.

Statement 221: A composition according to any of the previous statements, comprising from 25 Ci to 50 Ci of Cu-64 and having a specific activity from 50 mCi to 3850 mCi $^{64}Cu$/μg Cu.

Statement 222: A composition according to any of the previous statements, comprising from 25 Ci to 75 Ci of Cu-64 and having a specific activity from 50 mCi to 3850 mCi $^{64}Cu$/μg Cu.

Statement 223: A composition according to any of the previous statements, comprising from 50 Ci to 75 Ci of Cu-64 and having a specific activity from 50 mCi to 3850 mCi $^{64}Cu$/μg Cu.

Statement 224: A composition according to any of the previous statements, comprising from 50 Ci to 100 Ci of Cu-64 and having a specific activity from 50 mCi to 3850 mCi $^{64}Cu$/μg Cu.

Statement 225: A composition comprising at least 15 Ci Cu-64 at a radiochemical purity of ≥95.0%, ≥96.0%, ≥97.0%, ≥98.0%, ≥99.0%, ≥99.5%, or ≥99.0%.

Statement 226: A composition according to any of the previous statements, comprising at least 20 Ci Cu-64 at a radiochemical purity of ≥95.0%, ≥96.0%, ≥97.0%, ≥98.0%, ≥99.0%, ≥99.5%, or ≥99.0%.

Statement 227: A composition according to any of the previous statements, comprising at least 25 Ci Cu-64 at a radiochemical purity of ≥95.0%, ≥96.0%, ≥97.0%, ≥98.0%, ≥99.0%, ≥99.5%, or ≥99.0%.

Statement 228: A composition according to any of the previous statements, comprising at least 30 Ci Cu-64 at a radiochemical purity of ≥95.0%, ≥96.0%, ≥97.0%, ≥98.0%, ≥99.0%, ≥99.5%, or ≥99.0%.

Statement 229: A composition according to any of the previous statements, comprising at least 35 Ci Cu-64 at a radiochemical purity of ≥95.0%, ≥96.0%, ≥97.0%, ≥98.0%, ≥99.0%, ≥99.5%, or ≥99.0%.

Statement 230: A composition according to any of the previous statements, comprising at least 50 Ci Cu-64 at a radiochemical purity of ≥95.0%, ≥96.0%, ≥97.0%, ≥98.0%, ≥99.0%, ≥99.5%, or ≥99.0%.

What is claimed is:

1. A composition comprising 25-50 Ci Cu-64 ($^{64}Cu$) at a radiochemical purity of ≥95.0%.

2. The composition of claim 1, comprising a specific activity from 25 mCi to 3850 mCi $^{64}Cu$/μg Cu.

3. The composition of claim 1, comprising a specific activity from 25 mCi to 50 mCi $^{64}Cu$/μg Cu.

4. The composition of claim 1, comprising a specific activity from 50 mCi to 75 mCi $^{64}Cu$/μg Cu.

5. The composition of claim 1, comprising a specific activity from 75 mCi to 100 mCi $^{64}Cu$/μg Cu.

6. The composition of claim 1, comprising a specific activity from 100 mCi to 500 mCi $^{64}Cu$/μg Cu.

7. The composition of claim 1, comprising a specific activity from 500 mCi to 1,000 mCi $^{64}Cu$/μg Cu.

8. The composition of claim 1, comprising a specific activity from 1,100 mCi to 2,000 mCi $^{64}Cu$/μg Cu.

9. The composition of claim 1, comprising a specific activity from 2,100 mCi to 3,000 mCi $^{64}Cu$/μg Cu.

10. The composition of claim 1, comprising a specific activity from 3,100 mCi to 3,850 mCi $^{64}Cu$/μg Cu.

11. The composition of claim 1, wherein the composition has a total content of trace metals of less than about 6 parts per million (ppm), the trace metals being cobalt, copper, gold, iron, lead, mercury, nickel, gallium, germanium, zinc, and combinations thereof.

12. The composition of claim 1, wherein the composition has a total content of trace metals of less than about 5 parts per million (ppm), the trace metals being cobalt, copper, gold, iron, lead, mercury, nickel, and zinc.

13. The composition of claim 1, wherein the composition has a total content of trace metals of less than about 3 parts per million (ppm), the trace metals being cobalt, copper, gold, iron, lead, mercury, nickel, and zinc.

14. The composition of claim 1, wherein the composition has a total content of trace metals of less than about 1 parts per million (ppm), the trace metals being cobalt, copper, gold, iron, lead, mercury, nickel, and zinc.

15. The composition of claim 1, wherein the composition has a total content of trace metals of less than about 0.5 parts per million (ppm), the trace metals being cobalt, copper, gold, iron, lead, mercury, nickel, and zinc.

16. The composition of claim 1, comprising a specific activity from 50 mCi to 3850 mCi $^{64}Cu$/μg Cu.

* * * * *